(12) United States Patent
Panuganty et al.

(10) Patent No.: US 11,841,854 B2
(45) Date of Patent: *Dec. 12, 2023

(54) DIFFERENTIATION OF SEARCH RESULTS FOR ACCURATE QUERY OUTPUT

(71) Applicant: MachEye, Inc., San Jose, CA (US)

(72) Inventors: Ramesh Panuganty, Fremont, CA (US); Chandrasekhar Varada, Cupertino, CA (US)

(73) Assignee: MachEye, Inc., San Jose, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/169,943

(22) Filed: Feb. 8, 2021

(65) Prior Publication Data

US 2021/0248136 A1 Aug. 12, 2021

Related U.S. Application Data

(63) Continuation-in-part of application No. 17/006,812, filed on Aug. 29, 2020, which is a continuation-in-part of application No. 16/791,469, filed on Feb. 14, 2020, which is a continuation-in-part of application No. 16/425,686, filed on May 29, 2019, now Pat. No. 11,282,020, which is a continuation-in-part of application No. 16/232,934, filed on Dec. 26, 2018, now Pat. No. 11,651,043.

(60) Provisional application No. 62/702,728, filed on Jul. 24, 2018.

(51) Int. Cl.
*G06F 16/24* (2019.01)
*G06F 16/2453* (2019.01)
*G06N 20/00* (2019.01)

(52) U.S. Cl.
CPC ......... *G06F 16/2453* (2019.01); *G06N 20/00* (2019.01)

(58) Field of Classification Search
CPC .................................................. G06F 16/2453
See application file for complete search history.

(56) References Cited

U.S. PATENT DOCUMENTS

| | | | |
|---|---|---|---|
| 5,664,172 A | 9/1997 | Antoshenkov et al. | |
| 8,577,911 B1 | 11/2013 | Stepinski et al. | |
| 9,201,905 B1 * | 12/2015 | Kelsey | G06F 16/27 |
| 11,132,504 B1 | 9/2021 | Mont-Reynaud et al. | |
| 11,282,020 B2 | 3/2022 | Panuganty | |

(Continued)

OTHER PUBLICATIONS

"Final Office Action", U.S. Appl. No. 16/425,686, dated Sep. 9, 2021, 22 pages.

(Continued)

*Primary Examiner* — Mohammad S Rostami
(74) *Attorney, Agent, or Firm* — FIG. 1 Patents

(57) ABSTRACT

Techniques are described for differentiation of search results for accurate query output. Generally, such techniques provide intelligent grouping and output of search results by considering contextual factors that relate different search results. For instance, data records that are aggregated in response to a query are inspected to identify attributes (e.g., data types) and attribute values to determine contextual relationships between attributes. The contextual relationships are utilized to differentiate the data records into different groups for query output, thus enabling an accurate characterization of query output not enabled by conventional search technologies.

20 Claims, 91 Drawing Sheets

(56) References Cited

U.S. PATENT DOCUMENTS

| | | | |
|---|---|---|---|
| 11,341,126 B2 | 5/2022 | Panuganty et al. | |
| 11,468,105 B1* | 10/2022 | Patnaik | G06F 16/3326 |
| 11,651,043 B2 | 5/2023 | Panuganty | |
| 2003/0018799 A1 | 1/2003 | Eyal | |
| 2005/0071323 A1 | 3/2005 | Gabriel et al. | |
| 2005/0071328 A1 | 3/2005 | Lawrence | |
| 2005/0097087 A1 | 5/2005 | Punaganti Venkata et al. | |
| 2005/0203878 A1 | 9/2005 | Brill et al. | |
| 2005/0240580 A1 | 10/2005 | Zamir et al. | |
| 2008/0243785 A1 | 10/2008 | Stading | |
| 2008/0319971 A1 | 12/2008 | Patterson | |
| 2009/0019002 A1 | 1/2009 | Boulis | |
| 2009/0265324 A1 | 10/2009 | Mordvinov et al. | |
| 2010/0125562 A1 | 5/2010 | Nair et al. | |
| 2010/0125563 A1 | 5/2010 | Nair et al. | |
| 2010/0191740 A1 | 7/2010 | Lu et al. | |
| 2010/0198812 A1 | 8/2010 | Athsani et al. | |
| 2011/0022590 A1 | 1/2011 | Yu | |
| 2011/0145234 A1 | 6/2011 | Hu | |
| 2011/0302172 A1 | 12/2011 | Chandrasekar et al. | |
| 2013/0343720 A1 | 12/2013 | Abecassis | |
| 2014/0108445 A1 | 4/2014 | Oztekin | |
| 2014/0136504 A1 | 5/2014 | Shum et al. | |
| 2014/0143817 A1 | 5/2014 | Yeh | |
| 2014/0149401 A1* | 5/2014 | Liu | G06F 16/319 707/723 |
| 2014/0156641 A1 | 6/2014 | Tripoli et al. | |
| 2014/0164352 A1 | 6/2014 | Denninghoff | |
| 2014/0195026 A1 | 7/2014 | Wieder | |
| 2014/0344265 A1 | 11/2014 | Boucher et al. | |
| 2015/0086174 A1 | 3/2015 | Abecassis et al. | |
| 2015/0127565 A1 | 5/2015 | Chevalier et al. | |
| 2015/0178392 A1 | 6/2015 | Jockisch et al. | |
| 2015/0286747 A1 | 10/2015 | Anastasakos et al. | |
| 2015/0296228 A1 | 10/2015 | Chen et al. | |
| 2015/0339754 A1 | 11/2015 | Bloem et al. | |
| 2015/0379077 A1 | 12/2015 | Grosse et al. | |
| 2016/0012111 A1 | 1/2016 | Pattabhiraman et al. | |
| 2016/0044115 A1 | 2/2016 | Hill et al. | |
| 2016/0078131 A1 | 3/2016 | Venugopal et al. | |
| 2016/0103837 A1 | 4/2016 | Lee et al. | |
| 2016/0147887 A1 | 5/2016 | Breno et al. | |
| 2016/0171050 A1 | 6/2016 | Das | |
| 2016/0188667 A1 | 6/2016 | Maughan et al. | |
| 2016/0196336 A1 | 7/2016 | Allen et al. | |
| 2017/0039638 A1* | 2/2017 | Lane | G06Q 40/04 |
| 2017/0060860 A1* | 3/2017 | Imbruce | G06F 16/951 |
| 2017/0060868 A1* | 3/2017 | Rais Ghasem | G06F 16/243 |
| 2017/0090858 A1 | 3/2017 | Paris | |
| 2017/0091202 A1 | 3/2017 | Yiu et al. | |
| 2017/0161373 A1 | 6/2017 | Goya et al. | |
| 2017/0193107 A1* | 7/2017 | Imbruce | G06F 16/9535 |
| 2017/0242653 A1 | 8/2017 | Lang et al. | |
| 2017/0308264 A1 | 10/2017 | Osotio et al. | |
| 2018/0006837 A1 | 1/2018 | Cartwright et al. | |
| 2018/0025089 A1 | 1/2018 | Chin et al. | |
| 2018/0032610 A1 | 2/2018 | Cameron et al. | |
| 2018/0032620 A1* | 2/2018 | Kasravi | G06F 16/9535 |
| 2018/0060339 A1 | 3/2018 | Chen et al. | |
| 2018/0150533 A1 | 5/2018 | Mathur | |
| 2018/0024698 A1 | 8/2018 | Kasravi et al. | |
| 2018/0246938 A1 | 8/2018 | Kasravi et al. | |
| 2018/0246983 A1 | 8/2018 | Rathod | |
| 2018/0260630 A1 | 9/2018 | Cao et al. | |
| 2018/0268022 A1 | 9/2018 | Rose | |
| 2018/0268080 A1* | 9/2018 | Christian | G06F 16/90335 |
| 2018/0268253 A1 | 9/2018 | Hoffman et al. | |
| 2018/0276273 A1 | 9/2018 | Mittal et al. | |
| 2018/0300510 A1 | 10/2018 | Lam et al. | |
| 2018/0349362 A1 | 12/2018 | Sharp et al. | |
| 2018/0349499 A1 | 12/2018 | Pawar et al. | |
| 2019/0018692 A1 | 1/2019 | Indyk et al. | |
| 2019/0034793 A1* | 1/2019 | Kataria | G06N 3/048 |
| 2019/0042079 A1 | 2/2019 | Choi | |
| 2019/0102681 A1 | 4/2019 | Roberts et al. | |
| 2019/0109809 A1 | 4/2019 | Wang et al. | |
| 2019/0124049 A1 | 4/2019 | Bradley et al. | |
| 2019/0126002 A1 | 5/2019 | Brimmer | |
| 2019/0138660 A1* | 5/2019 | White | G06F 16/3329 |
| 2019/0163783 A1 | 5/2019 | Abrashkevich et al. | |
| 2019/0258671 A1 | 8/2019 | Bou et al. | |
| 2019/0259040 A1 | 8/2019 | Athannassov | |
| 2019/0289417 A1 | 9/2019 | Tomlin et al. | |
| 2019/0347063 A1 | 11/2019 | Liu et al. | |
| 2019/0384762 A1 | 12/2019 | Hill et al. | |
| 2019/0385219 A1 | 12/2019 | Ouyang | |
| 2020/0034357 A1 | 1/2020 | Panuganty et al. | |
| 2020/0034764 A1 | 1/2020 | Panuganty | |
| 2020/0065342 A1 | 2/2020 | Panuganty | |
| 2020/0117737 A1* | 4/2020 | Gopalakrishnan | G06F 16/9535 |
| 2020/0210647 A1 | 7/2020 | Panuganty et al. | |
| 2020/0401593 A1 | 12/2020 | Panuganty et al. | |
| 2022/0284013 A1 | 9/2022 | Panuganty et al. | |

OTHER PUBLICATIONS

"Non-Final Office Action", U.S. Appl. No. 16/399,554, dated Aug. 5, 2021, 15 pages.

"Non-Final Office Action", U.S. Appl. No. 16/232,934, dated Jul. 1, 2021, 25 pages.

"Final Office Action", U.S. Appl. No. 16/399,554, dated Jan. 18, 2022, 22 pages.

"Non-Final Office Action", U.S. Appl. No. 17/006,812, dated Mar. 1, 2022, 13 pages.

"Non-Final Office Action", U.S. Appl. No. 16/791,469, dated Mar. 30, 2022, 19 pages.

"Notice of Allowance", U.S. Appl. No. 16/425,686, dated Jan. 28, 2022, 8 pages.

"Supplemental Notice of Allowability", U.S. Appl. No. 16/425,686, dated Feb. 16, 2022, 2 pages.

"Non-Final Office Action", U.S. Appl. No. 16/425,686, dated Mar. 3, 2021, 19 pages.

"Non-Final Office Action", U.S. Appl. No. 16/232,934, dated Dec. 24, 2020, 19 pages.

"Restriction Requirement", U.S. Appl. No. 16/399,554, dated Mar. 26, 2021, 5 pages.

"Non-Final Office Action", U.S. Appl. No. 16/232,934, dated May 11, 2022, 30 pages.

"Notice of Allowance", U.S. Appl. No. 16/399,554, dated Apr. 15, 2022, 8 pages.

"Final Office Action", U.S. Appl. No. 16/232,934, dated Oct. 25, 2021, 29 pages.

U.S. Appl. No. 16/791,469, "Final Office Action", U.S. Appl. No. 16/791,469, dated Sep. 7, 2022, 20 pages.

U.S. Appl. No. 17/006,812, "Final Office Action", U.S. Appl. No. 17/006,812, dated Sep. 21, 2022, 16 pages.

U.S. Appl. No. 16/232,934, "Notice of Allowance", U.S. Appl. No. 16/232,934, dated Feb. 28, 2023, 8 pages.

U.S. Appl. No. 16/791,469, "Non-Final Office Action", U.S. Appl. No. 16/791,469, dated Feb. 28, 2023, 13 pages.

U.S. Appl. No. 17/006,812, "Non-Final Office Action", U.S. Appl. No. 17/006,812, dated Feb. 15, 2023, 19 pages.

U.S. Appl. No. 16/791,469, "Notice of Allowance", U.S. Appl. No. 16/791,469, dated Aug. 4, 2023, 8 pages.

U.S. Appl. No. 17/006,812, "Notice of Allowance", U.S. Appl. No. 17/006,812, dated Oct. 19, 2023, 8 pages.

* cited by examiner

Today's Headlines

Headline Search

Trending | Hostile Takeover Bid | New Product | Stock AB Soars ← 4306

Sales in Q3 2019 were 1.50% higher than Q2 2019, with the respective values at $459,771 and $452,976

08:48 AM Nov 21 2019

2019 week 33 has sales of $51k that are $16,021 higher than normal. It represents 11.2% of total sales.

08:07 AM Nov 21 2019

A significant portion of $753,207 (15%) of sales this FY is from August 2019, and Mideast 11:59 PM Nov 20 2019

A significant portion $136,606 (0.36%) of your $38.43M Sales previous 7 quarters is from 2019-Aug-27.

11:51 PM Nov 20 2019

May 2018 has sales of $187M, that are $3.81M lower than normal. It represents 8.51% of total sales 09:37 PM Nov 20 2019

SHOW MORE

DIFFERENTIATION OF SEARCH RESULTS FOR ACCURATE QUERY OUTPUT

RELATED APPLICATIONS

This application is a continuation-in-part and claims priority to U.S. patent application Ser. No. 17/006,812 entitled "Dynamic Phase Generation And Resource Load Reduction For A Query" and filed 29 Aug. 2020, which in turn is a continuation-in-part and claims priority to U.S. patent application Ser. No. 16/791,469 entitled "Automated Summarization of Extracted Insight Data" and filed 14 Feb. 2020, which in turn is a continuation-in-part and claims priority to U.S. patent application Ser. No. 16/425,686 entitled "Dynamic Playback Of Synchronized Narrated Analytics Playlists" and filed 29 May 2019, which in turn is a continuation-in-part and claims priority to U.S. patent application Ser. No. 16/232,934 entitled "Leveraging Analytics Across Disparate Computing Devices" and filed Dec. 26, 2018, which in turn claims priority under the benefit of 35 U.S.C. § 119 to U.S. Provisional Application No. 62/702,728, filed on Jul. 24, 2018, the disclosures of which are incorporated by reference herein in their entirety.

BACKGROUND

Today's connected environment provides users with access to massive collections of data covering a wide variety of topics and subject matter. Navigating data collections to locate data of particular interest, however, is extremely challenging. For instance, a typical search of the Internet for a simple topic returns millions of search results. Further, many of the search results may only be tangentially relevant to information that a user hopes to obtain via the search. Thus, a user is faced with the options of manually sorting through huge collections of search results and/or performing multiple searches using different search terms and phrases to attempt to obtain data of interest. These options not only waste a user's time and lead to user frustration, but also waste system resources utilized by the user, such as client device resources, network resources, data source resources (e.g., cloud storage resources), and so forth. Thus, current electronic data search methodologies are inefficient from user and system resource perspectives.

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

FIG. 43B illustrates an example implementation of a user interface;

DETAILED DESCRIPTION

Figure 1:
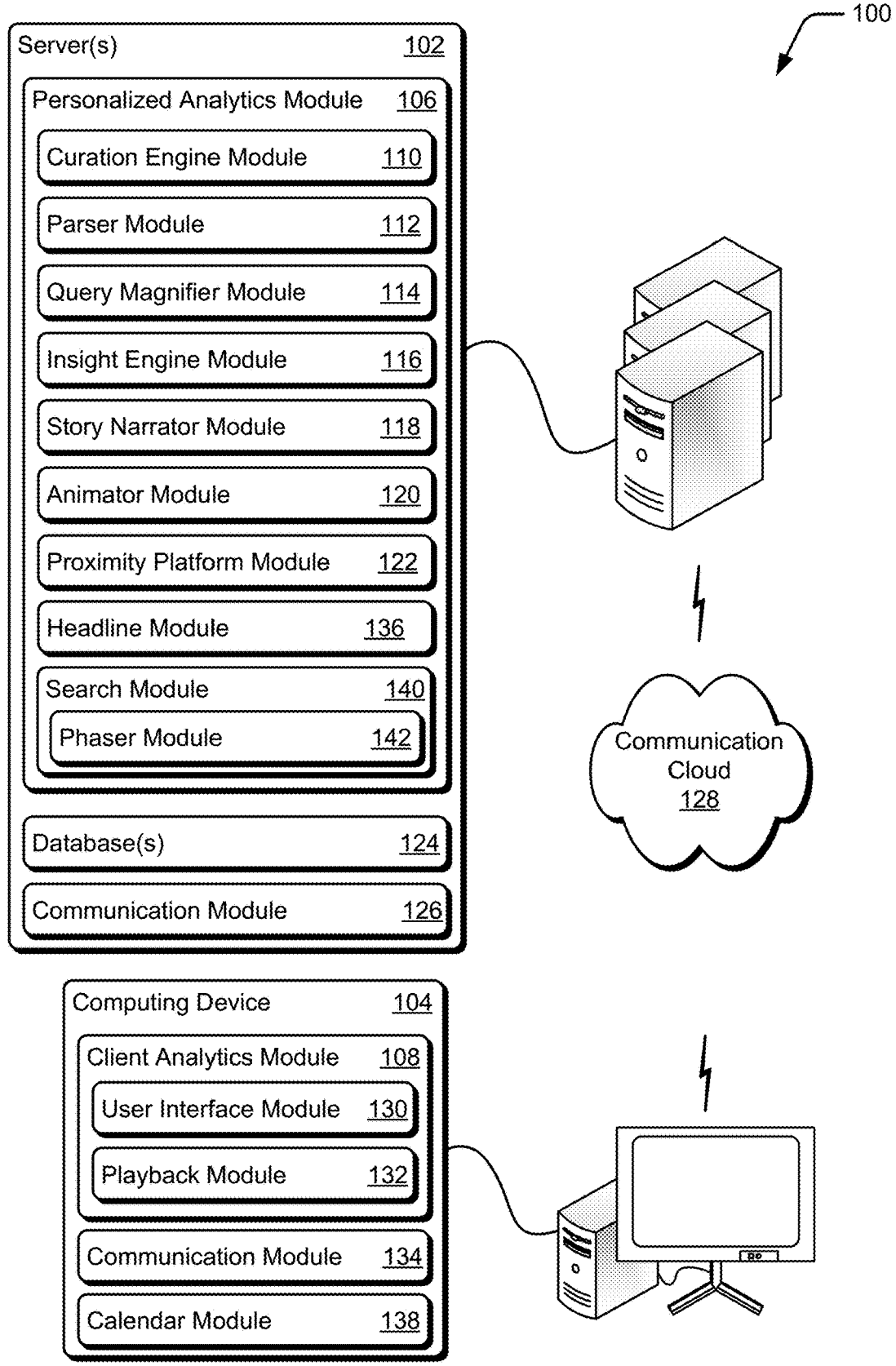
FIG. 1 is an overview of a representative environment in which automated generation of narrated analytics playlists can be utilized in accordance with one or more implementations.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The interconnectivity of computing devices helps organizations share information acquired at one computing device with other computing devices in the organization. This advantageously enables users to make informed decisions through the use of current and shared data that would otherwise be difficult for one person to accumulate and maintain. However, processing large quantities of data across an organization poses certain challenges. For example, having multiple sources of data oftentimes corresponds to the data being acquired in multiple formats, such as each source providing the respective data in a respective format that is from data originating from other sources. To illustrate a first data source may correspond to geospatial data, a second data source may correspond to unstructured text data, a third data source may correspond to social media data, a fourth data source may correspond to log files, etc. In some scenarios, the different data formats are incompatible, thus necessitating either a conversion of the data into a common data format and/or employing additional data processing techniques. Processing data from different sources can be cumbersome and time-consuming to a user such that by the time the data is processed in its entirety, the data is out-of-date and/or invalid. To illustrate, consider computer-based data sources that capture millions of events per second (e.g., constantly changing business information, data exchanges between devices, real-time data logs, etc.). The volume of this data coupled with a user manually converting the various data formats becomes a formidable problem. As another example, consider non-traditional databases that can be accessed, such as databases configured to address large amounts of structured and unstructured data. These types of non-traditional databases can accommodate large amounts of data that are less predictable in structure/formatting (e.g., inconsistent data structures), thus complicating how data is accessed and processed.

Computer-based data sources further compound this issue by capturing not only a data point and/or event, but additional characteristics about the data point, such as number-based characteristics, string-based characteristics, date-based characteristics, time-based characteristics, location-based characteristics, etc. In various scenarios, the characteristics are expressed in different formats from one another. Accordingly, the volume of data accumulated by an organization from varying computer-based data sources, the speed at which the computer-based data is accumulated, as well as the differing formats in which the data can be stored, makes extracting accurate, current, and reliable insights from the data manually by a user insurmountable and difficult.

Techniques described herein provide automated generation of a narrated analytics playlist. Various implementations curate data from multiple data sources, where curating the data includes identifying attributes and relational data models. One or more implementations base the curating upon anecdotal data associated with a user. In response to receiving a trigger event to perform a query analysis, one or more implementations identify keywords to use in the query analysis, and extract information from the curated data based, at least in part on the one or more keywords. The extracted information is then analyzed to identify insights. In turn, one or more implementations generate a narrated analytics playlist using the insights. Some implementations utilize machine-learning algorithms to curate, extract and/or process data to generate insights. Various implementations abstract the data used to teach the machine-learning algorithms and share the abstracted data to other devices.

Various implementations modify playback of a narrated analytics playlist in a personalized analytics system. In some implementations, audible input is received during playback of the narrated analytics playlist. The audible input can be used to control the behavior of a playback module playing out the narrated analytics playlist. Alternately or additionally, user input can be received, where the user input corresponds to modifying an original scene included in the narrated analytics playlist. Some implementations generate synchronized audible output that be output with the modified original scene of the narrated analytics playlist. Alternately or additional, implementations can automatically determine to visually apply an auto-pointer to portions of the narrated analytics playlist. In generating the narrated analytics playlist, implementations can calculate a respective playback duration of each scene in a plurality of scenes to include in the narrated analytics playlist, and generate the narrated analytics playlist based on the calculating.

Techniques are also described for automated summarization of extracted insight data. Such summarizations are referred to herein as "headlines" that present an overview of available instances of insights, such as via text, images, animations, and so forth. In at least one implementation, headlines can be generated to summarize narrated analytics playlists that are available for output to a user. By way of example, curated data is generated for different users, such as based on anecdotal data that describes user attributes and behaviors. The curated data can then be analyzed using different criteria to identify insight data that corresponds to the criteria. Some criteria, for example, are based on performance metrics of interest to a user, examples of which are presented in detail below. Thus, by applying the various criteria, different distinct instances of insights can be identified from large sets of curated data. Summarization data can then be generated for each insight instance to provide a headline for each insight. In at least one implementation, insights and/or headlines can be generated in response to different trigger events, such as events created based on explicit user input and/or implied from user behaviors and/or system-related events. Headlines may then be output, such as in a headline section of a graphical user interface. A user may interact with a headline to cause output of corresponding insight data, such as a narrated analytics playlist generated based on the insight data.

Various implementations may also curate headlines, such as by ranking headlines and removing duplicate headlines. For instance, after a set of headlines are generated, the headlines may be ranked based on their relative correspondence to and/or impact on a metric of interest, such as different Key Performance Indicators (KPIs). Thus, those headlines with greater impact may be ranked highest and thus presented before lower ranked headlines to enable users to identify headlines that may be of greater value to particular tasks and/or goals. Further, headlines may be compared to one another to identify headlines that include and/or pertain to duplicate subject matter. Where duplicate headlines are identified, a duplicate headline can be removed to avoid presenting duplicate content to a user. Still further, headlines that correspond to commonly known insights can be filtered out to avoid presenting users with information that is widely known and thus likely to be of little interest to a user.

Accordingly, the techniques described herein provide a significant improvement over conventional techniques for generating headlines. For instance, some traditional techniques employed to generate headlines are antiquated and rely on individual users to manually create headline captions for broad consumption by large demographics of users. Such traditional mechanisms generate headlines that do not provide insight or meaning that users seek. Furthermore, most of the traditional technologies merely draw data from known sources and try to re-present such information to a user. However, there is an absence of insights and meaning associated with the data and a user will be simply presented with event data that is not tied to insights generated specifically for the user. Thus, conventional techniques are system resource intensive and often require user supervision to generate headlines. In contrast, techniques described herein reduce the burden on system resources required to generate headlines, such as network, processor, and memory resources. For instance, by utilizing user-specific attributes (e.g., metrics of interest) to generate insight data for generating headlines, the described techniques provide user targeted headlines and avoids presenting superfluous headlines that may be of little or no interest. Further, by filtering out duplicate and commonly known headlines, system resources used to manage and present such headlines are conserved. Thus, by conserving such resources, the resources can be made available to other system tasks, which improves system performance.

Techniques are also described for dynamic phase generation and load reduction for a query. A query, for instance, is based on user input of a query in a natural language (NL) form, e.g., an NL query. Generally, an NL query may include multiple terms and/or phrases that make up a complex query, such as a sentence in a human-readable language. Accordingly, to enable a query result to be generated, the NL query is parsed into multiple logical sections that each represent portions of the NL query, such as terms, phrases, tokens, and so forth. A set of query contexts are then determined for the multiple logical sections. A query context, for example, represents a type of data requested by a particular logical section of an NL query and/or a criteria to be used for generating a search phase based on the particular logical section. A wide variety of different types of query contexts are enabled such as for complex data aggregation, sorting, filtering, and so forth, as part of generating a query response for an NL query.

Based on the logical sections and the query contexts determined from the logical sections, a set of search phases are generated that are executable to determine a query result for the NL query. Generally, a search phase represents an individual subquery that is individually executable to generate subquery result (a "phase result") that contributes along with other phase results to generating an overall query result. For instance, for a particular set of search phases generated for an NL query, a first search phase can search a data source to extract a particular set of data (e.g., utilizing a database query such as a structured query language (SQL) database query), a second search phase can perform a first type of processing on the extracted data to generate processed data, and a third search phase can perform further processing on the processed data to generate a search result for the NL query. Thus, search phases can utilize a variety of different data sources to enable for a wide variety of different complex searches to be accommodated, such as local data sources, remote data sources, output from other search phases, etc. The search result can then be interpreted into a query result for output, such as by aggregating various types of data (text strings, images, charts, video, etc.) that convey the search result in a human-understandable form.

Generally, by enabling multiple search phases to be generated for a query, complex queries can be characterized as sets of individually executable subqueries that each have their own respective data source and data handling criteria. This enables techniques described herein to handle complex queries that conventional search techniques are unable to understand and execute. Further, by dynamically and automatically generating and executing search phases for a query, the described techniques conserve user and system resources that are typically wasted by conventional search techniques. For instance, complex searches utilizing conventional search techniques put excess computational load on search resources (e.g., databases), and thus the techniques describes herein can reduce this load on such resources.

Techniques are also described for differentiation of search results for accurate query output. Generally, such techniques provide intelligent grouping and output of search results by considering contextual factors that relate different search results. For instance, a query performed on a collection of data (e.g., a database) returns a query result including a set of data records with various attributes, such as data fields (e.g., categories) with respective values. Generally, the query result can be sorted in various ways, such as into groups of data records that share a common value for a particular attribute. For example, a search for "sales by city" locates sales numbers for various cities and provides query output identifying the sales numbers. In such a scenario however, conventional search technologies may return search results that are inaccurate, such as by failing to consider contextual factors that indicate relationships between data attributes in the set of search results. For instance, in a search for "sales by city," a conventional search algorithm may output a single result for a city of "Springfield" even though there are multiple cities with this name.

Accordingly, techniques for differentiation of search results for accurate query output are described herein that consider various contextual factors and relationships between data attributes to accurately differentiate query results. For instance, in response to a query utilizing a query term (e.g., an NL query from a user), a set of data is aggregated that pertains to the query term. The set of data is inspected to identify a set of data records that share a common value for a first attribute. The set of data records is then iteratively processed to identify a second attribute of the set of data records that represents a contextual qualifier for the first attribute, and to determine that values for the second attribute vary among the set of data records. With reference to the example above, for instance, the first attribute is a "city" data field with a value of "Springfield," and the second attribute is a "state" data field populated with different state values for states that have a city named "Springfield." Generally, a "contextual qualifier" represents data that provides context for other data. For instance, with reference to data attributes of a data record, a second attribute describes different contexts for a first attribute, such as an environment, a type, a physical description, a price, a market, and so forth, for the first attribute.

In at least one implementation, a contextual qualifier represents a hierarchical classification pertaining to a query result, such as pertaining to a common value for an attribute shared by a set of data records aggregated in response to a query term. For instance, in the context of the "Springfield" example mentioned above, a contextual qualifier represents a hierarchical classification of "city" (Springfield), "state" (e.g., Massachusetts, Missouri, etc.), "country" (USA), etc. Thus, query results can be sorted based on their hierarchical classifications, such as to generate different data subsets that each represent a different hierarchical classification of a query result.

According to various implementations, attributes that represent contextual qualifiers for other attributes are identified in different ways. For instance, anecdotal data for a user is utilized to identify attributes that reflect observed user behaviors and/or preferences, such as to identify attributes of likely interest to a user for user in differentiating the set of data records. In another example, an entity-relationship model that describes relationships between entities and attributes is utilized to identify related attributes for differentiating data records. Further, machine learning models that are trained to predict relevant attribute relationships are utilized to identify related attributes for data differentiation.

Continuing the example above, the identified second attribute exhibits values the differ among the set of data records. Accordingly, different subsets of data records are generated with each subset included data records with equivalent values for the second attribute. Each subset is then utilized to generate a query result, such as by aggregating content that depicts the subsets of data records, and outputting the content as a query result. In this way, implementations for differentiation of search results for accurate query output provide a technical solution to a technical problem encountered in conventional search technologies that typically fail to consider attribute contexts and relationships when aggregating and presenting query results, thus resulting in inaccurate query output. The described techniques are thus able to conserve system and user resources that would otherwise be expended in attempting to obtain correct query results utilizing conventional search technologies.

Consider now an example environment in which various aspects as described herein can be employed.

Example Environment

FIG. 1 illustrates an example environment 100 that includes an example system that can be used to implement automated summarization of extracted insight data in accordance with one or more implementations. Environment 100 includes server(s) 102 and computing device 104 that, in concert, provide personalized analytics directed towards a particular user profile and/or workspace, such as a narrated analytics playlist. While computing device 104 is illustrated here as a desktop computing device, any other suitable type of computing device can be utilized, such as a mobile phone, a tablet, a laptop, a smart watch, and so forth. Here, the terminology "personalized analytics" is used to denote output information that is generated from a combination of input data and user information. For example, the personalized analytics can include various types of output information (e.g., text, charts, graphs, tables, narrated text, narrated audio, animated video, podcasts, playlists with audio, slides, and so forth) that are based upon user anecdotal data, user preferences, user calendar information, user-defined schedules, etc.

Servers 102 include personalized analytics module 106 that acquires data, processes the data to curate the acquired data, generates queries for various types of analytics, generates video playlists, generates a natural language narration for the playlists, determines what analytics to include within the playlist, and so forth. Computing device 104 includes client analytics module 108 to access personalized analytics module 106 and/or various features provided by the personalized analytics module 106. Generally, the term module is used to denote any combination of software, hardware, and/or firmware that can be configured to provide the corresponding functionality such that personalized analytics module 106 and/or client analytics module 108 can be implemented using any of these combinations. In various implementations, client analytics module 108 corresponds to a client application that renders a user interface on a corresponding display device of computing device 104, and communicates over a network to a server application, such as personalized analytics module 106. Alternately or additionally, client analytics module 108 represents a standalone application that includes the functionality of personalized analytics module 106 onto a same device. In one or more implementations, servers 102 represents server(s) that distribute various aspects of the personalized analytics module across the multiple devices and/or provide cloud-based services to multiple client devices. Utilizing cloud-based services to deploy narrated analytic playlists and/or the generation of narrated analytic playlists provides a user with on-demand self-service access to the personalized analytics system, broad network access to the personalized analytics system, resource pooling across the cloud, rapid elasticity and/or adaptiveness to a user's changing operating environment, and measured service.

Here, the phrase "cloud-based services" is used to generally to denote any suitable type of cloud-based service and/or deployment mechanism across a network, such as cloud-based services that follow, by way of example and not of limitation, a Software as a Service (SaaS) model, a Platform as a Service (PaaS) model, an Infrastructure as a Service (IaaS) model, and so forth. Accordingly, the various implementations described herein can be deployed and/or implemented using any one or combination of these models to provide various aspects of narrated analytic playlists. As an example, various implementations can deploy narrated analytics playlists and/or the generation of narrated analytic playlists using a private cloud that is specific to an organization, a community cloud that is shared across several organizations, a public cloud that is available to the general public, a hybrid cloud that is a composition of different cloud models to enable data and application portability, and so forth. In some scenarios, the differing cloud-based services utilize different types of stack architectures that employ multiple interconnected layers (e.g., application layers, networking layers, workload layers, hardware layers, software layers, management layers, virtualization layers, etc.). Various implementations can integrate aspects of the personalized analytics system into any one and/or combination of layers utilized by the cloud-based services. To illustrate, one or more of the various components and/or modules further described herein can be communicatively coupled to a workload layer of a cloud computing environment to distribute the corresponding processing, such as transaction processing, software development, data analytics processing, mapping processing, navigation processing, etc.

Personalized analytics module 106 includes curation engine module 110, parser module 112, query magnifier module 114, insight engine module 116, story narrator module 118, animator module 120, and proximity platform module 122 that work in concert to provide personalized analytics in accordance with one or more implementations. Some combinations of these modules communicate with one another to exchange information, such as by defining data structures according to a set of rules to provide a mechanism for cross-entity data sharing, as well as predictable and repeatable processing by the different entities, to achieve expected results. For example, the set of rules can outline what type of information the data included in the data structure describes, an amount of data stored within the data structure, a format in which the data is stored within the data structure and so forth. By following these rules, a first entity can create and store a data structure such that a second entity can successfully access and interpret the data included in the data structure. A data structure can include any suitable type of structure in which data can be stored, defined, and/or retrieved, such as an array, a string, a container, a list, a stack, a queue, a tree, a graph, a heap, a bit field, a bitmap, an object, a matrix, a linked-list, function parameters, a file, and so forth. Alternately or additionally, other rules can be employed that define a behavior of the personalized analytics module, such as rules that determine a prioritization of the data sources used to acquire curated data, rules that determine data manipulation based on a desired operation, condition-based rules, validation-based rules, mapping rules that can be used to translate a first data structure to a second data structure, and so forth.

Curation engine module 110 acquires information about data, such as various attributes associated with the data, and generates metadata to retain and describe the acquired attributes and/or information. Any suitable type of data can be analyzed by curation engine module 110, such as user calendars, organization databases, user workspaces, podcast interactions, video interactions, user interface interactions, queries, enterprise data, enterprise applications, existing reports, user activities, user preferences, user dislikes, and so forth. Accordingly, servers 102 includes databases 124 to generally represent any suitable source of data and/or information. Alternately or additionally, databases 124 represent storage for data generated by the personalized analytics module, such as curated data. Some implementations trigger the curation and/or acquisition of the information based upon a user query, a scheduled query, an automated query, a calendar item identified during a scheduled query, an identified idle period, and so forth. To illustrate, a user query pertains to an explicit input query entered at an interface of the personalized analytics system, such as through a text box. A scheduled query pertains to a scheduled and/or delayed query that triggers queries based on a schedule, either as a one-time query, a periodic-query, and so forth. An automated query pertains to a query that is triggered by the personalized analytics module identifying an event and/or without an explicit input associated with a query, such as a query triggered on a scan of a calendar event, keyword identification from communication content (e.g., email, text messages, instant messages, etc.), and so forth. Accordingly, data curation can be triggered in multiple different ways. The curation of data can alternately or additionally include generating drill path content. Here, drill path content corresponds to additional and/or secondary information associated with the primary topic of the data being curated, such as time-based information, location-based information, product-based information, etc. Accordingly, a drill-up path corresponds to a higher-level perspective of the primary topic associated with the data, such as comparison charts with associated sibling topics, to provide contextual information about the primary topic. A drill-down path corresponds to a lower-level/additional detailed information about the primary topic, such as specific points in time, location, demographics, etc.

As part of the curation process, some implementations identify additional and/or similar vocabulary associated with curated information, such as alternate wording that corresponds to the primary topic being curated. The alternate wording can then be used to acquire additional information that is then included and/or referenced in the metadata. In various scenarios, curation engine module 110 curates data by applying machine learning algorithms, data mining algorithms, and/or Principal Component Analysis (PCA) algorithms to identify data relationships between the acquired and/or curated data. For example, the curation engine module 110 can utilize machine-learning algorithms and/or portions of machine-learning algorithms to label sets of data, compare sets of data for similarities, group sets of data based on the similarities, and so forth. To illustrate, some implementations utilize similarity comparison algorithms to compare similarity scores between various subsets of data. However, it is to be appreciated that alternate or additional algorithms can be utilized as well, such as those further described herein with respect to at least the insight engine module 1114.

In various implementations, the curation engine module 110 employs an iterative process to curate the data. Overtime, as more data is curated and analyzed, the iterative process updates corresponding metadata, data models, drill-down activities, and so forth, generated by the curation engine module 110, such as improved relevancy metric of the associated data, improving relational data, etc. In turn, these updates make data extraction, data access, and/or data analysis associated with the curated data more efficient relative to earlier versions of the curated data, thus improving the system's overall operation (e.g., faster access, more accurate data extraction, faster data analysis, etc.). Accordingly, various implementations of the curation engine module 110 update the curated data and/or the corresponding metadata to reflect various findings from iterative analyses. In some implementations, the curation engine module 110 generates relational data models based on the curated data, and then stores the curated data in a database, such as in databases 124, according to the relational data models. Alternately or additionally, the curation engine module 110 utilizes machine-learning algorithms to identify what data sets are accessed and/or utilized more relative to other data sets, and prioritizes the data sets based upon the respective usage. In turn, the curation engine module 110 uses this prioritization to govern how the data sets are updated, such as by updating the higher priority data sets more frequently relative to other data sets, updating the higher priority data sets ahead of other data sets, updating the curated data based upon a prioritization of the databases and/or data sources, etc. This can improve how a corresponding computing device performs by updating the curated data that is utilized more, rather than adding a latency by updating less used and/or obscure data.

Parser module 112 receives an input query, and analyzes the input query to identify keywords and/or context information associated with the query. In various implementations, the parser module analyzes an input string associated with the input query to generate a canonical query (e.g., a query that includes identifying information, such as tags, keyword identification information, etc.). For example, the parser module can tag and tokenize the input string as further described herein.

Query magnifier module 114 receives the canonical query, and augments the query with supplemental information, alternate wording, and/or additional query subject matter. For instance, in some implementations, the query magnifier module generates multiple versions of the input query that reflect variations of a particular keyword, include user preferences, add related subject matter, additional context parameters, and so forth, to use to extract information from the curated data. To illustrate, consider a scenario in which a user manually submits an input query string to the personalized analytics system. In turn, the query magnifier module generates variations of the query, such as queries with alternate keywords, queries with related topics, queries with time constraints, etc., that can be utilized to extract information from the curated data. This can include using anecdotal data associated with a user profile to generate the variations of the query.

Insight engine module 116 uses the various queries generated by the query magnifier module to extract curated information. The insight engine module then analyzes the extracted data to identify insights relevant to a particular user profile, organization profile, and/so forth. This can include utilizing machine-learning algorithms to make predictions from the extracted data, identify trends, identify patterns, generate insights from the trends and/or patterns, and so forth. Here, an insight pertains to factual information identified from the data (e.g., plain inferences of the data for a particular need) and/or inferred information identified from the data (e.g., outliers, anomalies, trends, indicators, market segmentations, etc.). As one example, consider a scenario in which the answer to an input query of "what did orange juice sales do this month" is "sales for orange juice went down". An example insight generated by the personalized analytics system extrapolates on that input query by providing factual information that can provide more context about the result, such as "apple juice sales doubled over the same time period" or "the highest orange juice sales occurred in Alaska". Various implementations of the insight engine module apply machine-learning algorithms and/or models to determine the insights and/or combine the results of multiple data extractions into insights that are used as a basis for generating a narrated analytics playlist. This can include using and adjusting hyper-parameters associated with the machine-learning algorithms, such as that further described herein with respect to at least FIG. 15.

Story narrator module 118 receives an output from the insight engine module 116, and determines how to describe and/or articulate the output. As one example, in response to receiving an insight from the insight engine that corresponds to chartable data, story narrator module 118 determines to include a chart and a descriptive narrative of the chart within the narrated analytics playlist. In various scenarios, the descriptive narrative not only describes the information include in the chart, but alternately or additionally provides contextual information that helps drive an interpretation of the chart information. As one skilled in the art will appreciate, various implementations utilize a story generator algorithm to generate the descriptive narrative. Accordingly, as further described herein, such as with respect to at least FIGS. 11 and 16, story narrator module 118 identifies how to augment the insights identified by the insight engine module with additional information, such as visual information (e.g., charts, graphs, etc.), descriptive information, markup language information, metadata additions to the narrated analytics playlist, audible information, etc., such as by generating a script that outlines and/or includes this information.

Animator module 120 generates a narrated analytics playlist based on one or more scripts received from the story narrator module. Animator module 120 bundles visual and audible information into a playlist, such as by generating synthesized speech from descriptive narrative information generated by the story narrator module, identifying images to add to the playlist, etc. The animator module can generate any suitable type of a narrated analytics playlist with any suitable type of data, such as a slide presentation, a video clip, audible data, visual data, metadata, markup text, and so forth.

Figure 20A:
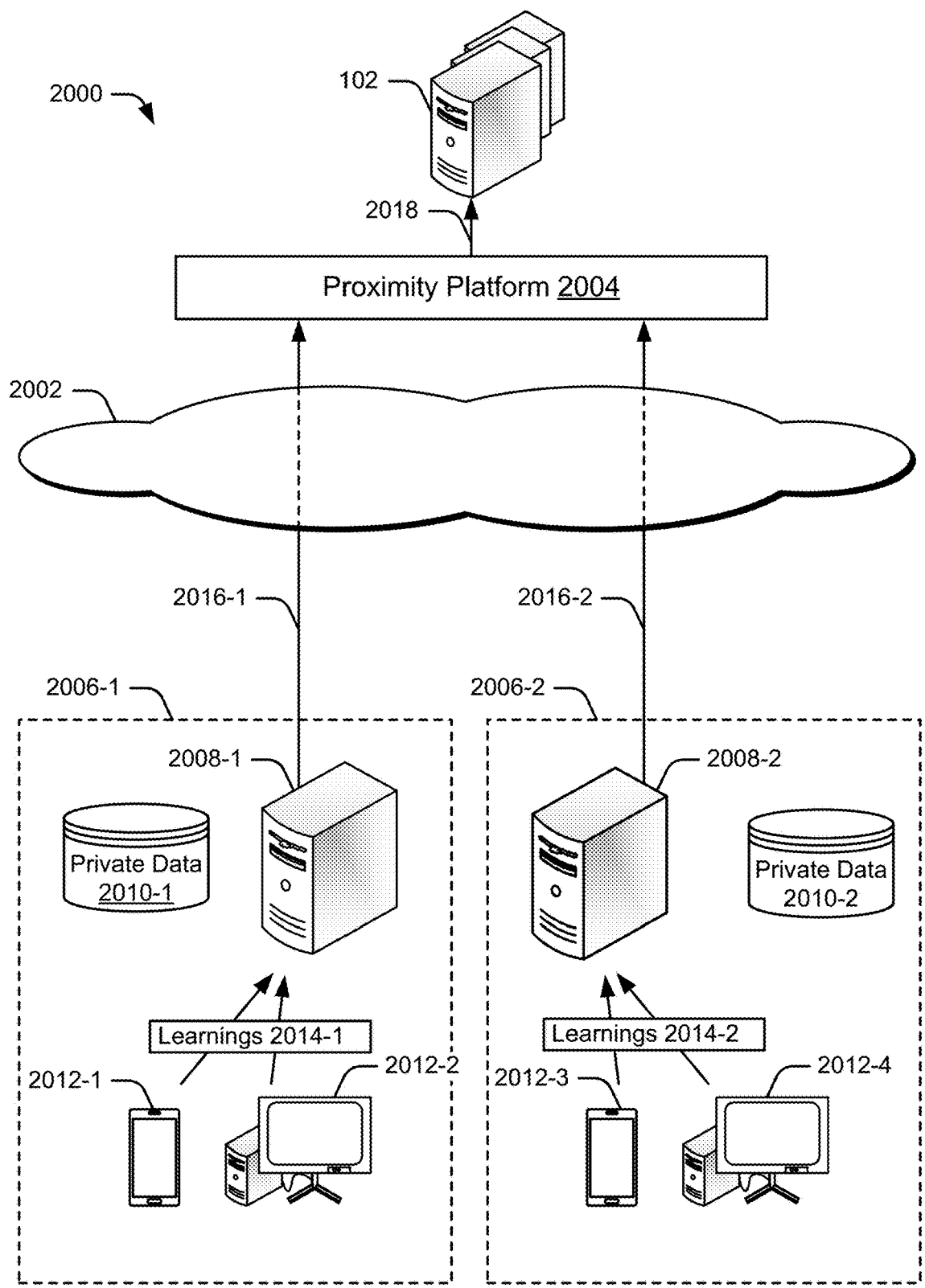
FIGS. 20A and 20B illustrate an example of a proximity platform in accordance with one or more implementations.
Figure 20B:
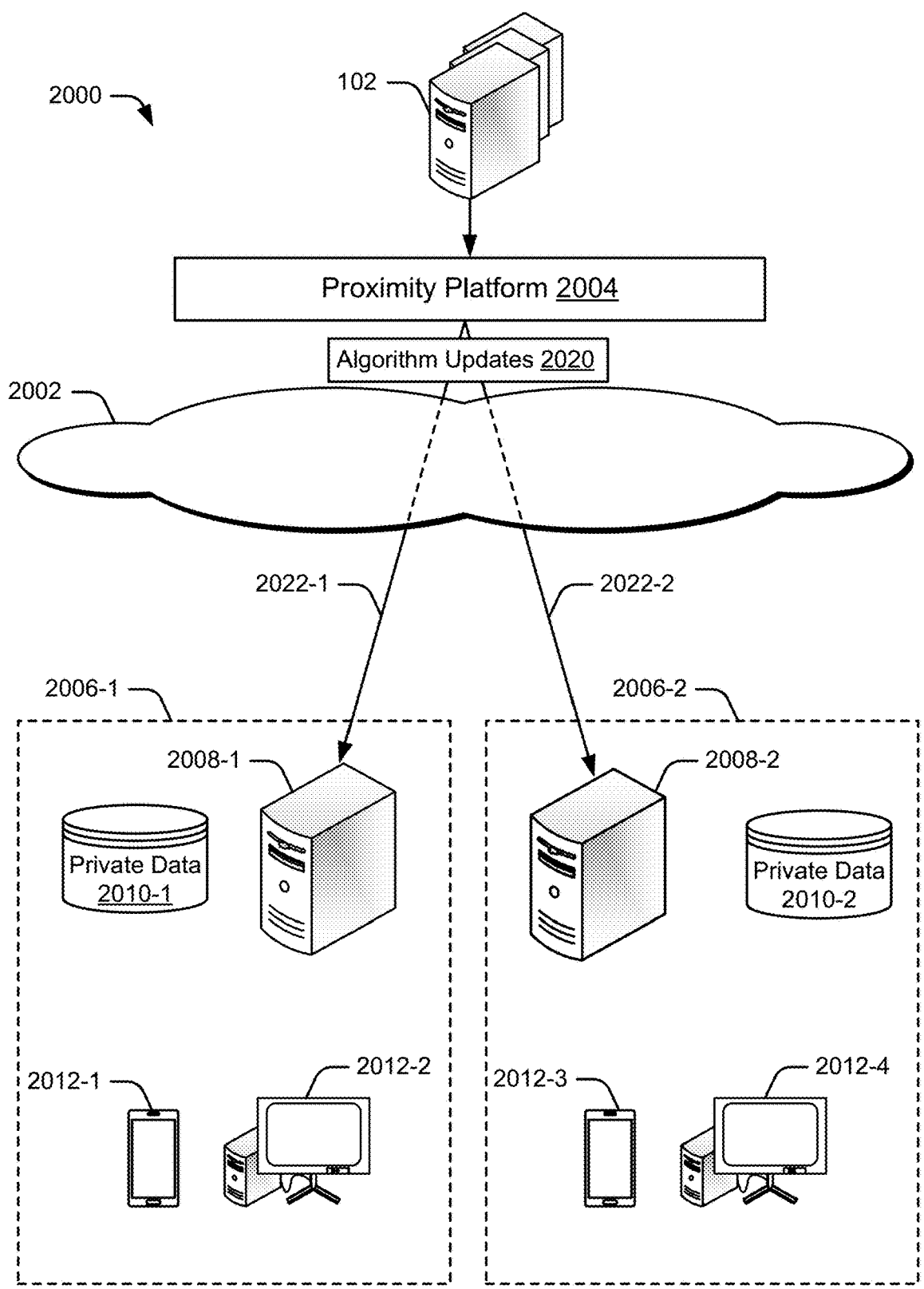

The proximity platform module 122 provides data abstraction to enable personalized analytics module 106 to apply learned information from various sources to other sources without exposing the source-specific data that contributed to the learning, such as by using techniques described with respect to at least FIGS. 20A and 20B. As an example, consider a scenario in which personalized analytics module 106 supports multiple computing devices, each of which is associated with a respective customer organization. Accordingly, each respective user profile has private data curation, private relational data models, and so forth, which is used to enhance and/or educate various machine-learning algorithms. Various implementations of proximity platform module 122 extract the respective machine learning information, model updates and the model parameters and/or anecdotal data from each respective user profile without accessing the private curated data and relational data models. As one example, proximity platform module 122 extracts the hyper-parameters used by the various machine-learning algorithms employed by personalized analytics module 106 of FIG. 1 for a first client device, and applies the hyper-parameters to a second client device using transfer learning methods. Alternately or additionally, proximity platform module 122 extracts anecdotal information from the first client device, and utilizes the anecdotal information at the second client device. As further described herein at least with respect to FIGS. 20A and 20B, this allows the proximity platform module 122 to incorporate machine-learning information and/or anecdotal data into the personalized analytics system, such as by way of extracting and sharing hyper-parameters, thus modifying the system behavior based upon the learned information and improving how results are generated and/or delivered to other computing devices accessing the system without exposing the curated data of the first client device.

Servers 102 also include communication module 126 to communicate with external devices. Here, communication module 126 generally represents any suitable combination of hardware, software, and/or firmware that are configurable to facilitate the exchange of information, such as images, addresses, audio, video, commands, queries, messaging, narrated analytics playlists, and so forth. Some implementations of communication module 126 include one or more protocol stacks associated with a network over which data is exchanged, firmware that drives hardware to generate signals and/or process messages used in maintaining a wireless and/or wired communication session, etc. Alternately or additionally, some implementations of communication module 126 include computer networking ports, such as a Transmission Control Protocol (TCP) port, a User Datagram Protocol (UDP) port, a File Transfer Protocol (FTP) port, a Hypertext Transfer Protocol (HTTP) port, an Internet Message Access Protocol (IMAP) port, and so forth. Various implementations of communication module 126 include physical communication ports, such as a serial port, a parallel port, a Universal Serial Bus (USB) port, a keyboard port, a display port, an audio port, etc. In various implementations, servers 102 use communication module 126 to connect with other devices over communication cloud 128, such as computing device 104.

Communication cloud 128 generally represents any suitable type of communication network that facilitates a bi-directional link between various computing devices. Accordingly, communication cloud 128 can include multiple interconnected communication networks that comprise a plurality of interconnected elements, such as a wireless local area network (WLAN) with Ethernet access, a wireless telecommunication network interconnected with the Internet, a wireless (Wi-Fi) access point connected to the Internet, an Internet of Things (IoT) network, and so forth. In this example, communication cloud 128 connects servers 102 with computing device 104.

Computing device 104 includes client analytics module 108 that generally represents user access some or all of the functionality provided by personalized analytics module 106. In some implementations, client analytics module 108 represents a stand-alone client application that interfaces into personalized analytics module 106. Alternately or additionally, client analytics module 108 represents a browser that remotely logs onto a website hosted by servers 102. Further, while client analytics module 108 and personalized analytics module 106 are illustrated as residing on separate devices, some implementations combine some or all the respective module functionality into a single computing device as further described herein. In various implementations, computing device 104 uses client analytics module 108 to access cloud-based services provided by servers 102 to obtain narrated analytics playlists as further described herein. In this example, client analytics module 108 includes user interface module 130 to provide user access into features provided by personalized analytics system, such as playback of a narrated analytics playlist, inputting a search query, providing user feedback, requesting reports, accessing a dashboard and/or corresponding reports, scheduling data curation, scheduling data analysis, adding databases for data curation, and so forth. Client analytics module 108 also includes playback module 132. While illustrated here as being separate from user interface module 130, alternate or additional implementations integrate playback module 132 with user interface module 130 without departing from the scope of the claimed subject matter.

Playback module 132 receives a narrated analytics playlist, and outputs the content for consumption. This can include playing out audio, rendering video and/or images, displaying text-based content, and so forth. As one example, a user can interact with a particular narrated analytics playlist via controls displayed by playback module 132, such as pausing playback, skipping content in the playlist, requesting drill-up content and/or drill-down content, inputting a search query during playback of content, etc. In various implementations, the playback module includes feedback controls, such as controls corresponding to giving explicit positive feedback and/or explicit negative feedback of the content being played out at a particular point in time.

Computing device 104 also includes communication module 134 to facilitate communications over communication cloud 128. As one example, computing device 104 can use communication module 134 to communicate with personalized analytics module 106. Accordingly, similar to that described with respect to communication module 126, communication module 134 generally represents any suitable combination of hardware, software, and/or firmware that is configurable to facilitate data exchanges with other devices.

Further to techniques for automated summarization of extracted insight data described herein, the personalized analytics module 106 includes a headline module 136, which is representative of functionality to generate "headlines" pertaining to data obtained and/or generated by the personalized analytics module 106. A headline, for instance, represents a summarization of attributes of insights generated by the insight engine module 116. The headline module 136 can generate headlines in various ways, such as by extracting and aggregating (e.g., concatenating) keywords from instances of insights. Further, and as detailed below, headlines can be provided to the story narrator module 118 and the animator module 120 for output, such as in relation to instances of narrated analytics playlists.

In at least one implementation, the headline module 136 generates headlines in response to different trigger events, such as based on calendar information obtained from a calendar module 138 of the computing device 104. The calendar module 138 generally represents functionality to manage calendar events pertaining to the computing device 104, such as for a user profile of a user that interacts with the computing device 104. For instance, a user may interact with a user interface presented by the calendar module 138 to schedule different events, such as meetings, social events, task reminders, and so forth. Thus, the calendar module 138 can track calendar events expressly created by users, and can generate notifications of the calendar events. Additionally, the calendar module 138 can track calendar data in the form of temporal data that describes user interactions with the computing device 104, such as user access to the client analytics module 108 to interact with content generated by the personalized analytics module 106. Such temporal data, for instance, describes time-based parameters for different user activities, such as time(s) of day that a user typically interacts with the client analytics module 108. Calendar data managed by the calendar module 138 can be provided to the personalized analytics module 106, such as for generating trigger events that trigger generation of insights by the insight engine module 116, narrated analytics playlists by the story narrator module 118, headlines by the headline module 136, and so forth.

The personalized analytics module 106 further includes a search module 140 which is representative of functionality to perform various aspects of dynamic phase generation and load reduction for a query described herein. The search module 140, for instance, includes a phaser module 142 and a differentiator module 144. Generally, the phaser module 142 is representative of functionality to generate multiple search phases for a query (e.g., a natural language query) such that the individual search phases can be executed to generate a query response for the query. Further, the differentiator module 144 is representative of functionality to differentiate query results into different result sets based on relating contextual attributes of the query results. As further detailed below, the search module 140 may also leverage functionality of the parser module 112, the query magnifier module 114, and the insight engine module 116 to perform various query processing.

Figure 2:
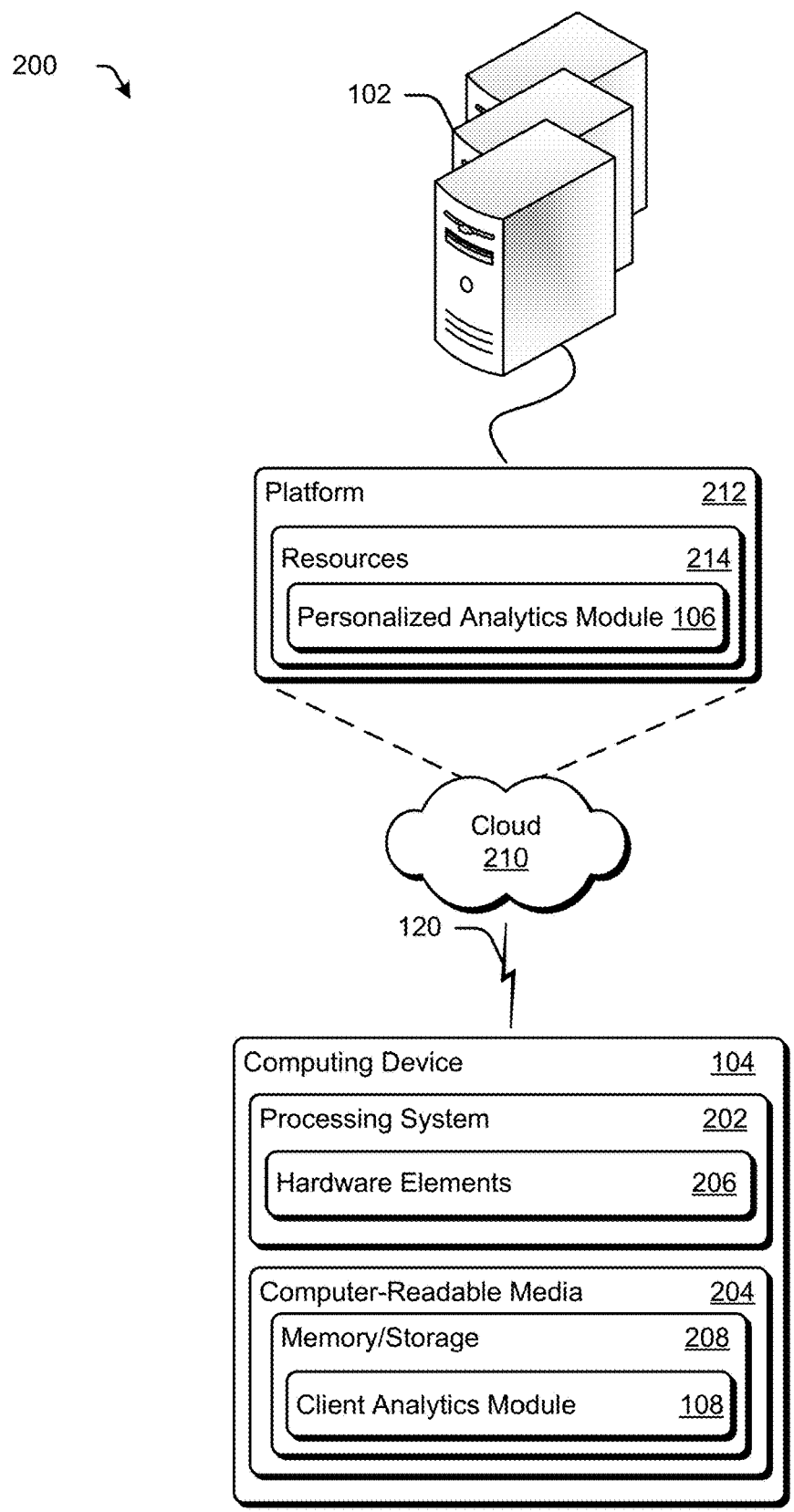
FIG. 2 illustrates an example environment in which cloud-based services can be used to provide features corresponding to the automated generation of narrated analytics playlists in accordance with one or more implementations.

Consider now FIG. 2 that illustrates an example environment 200 in accordance with one or more implementations. In various implementations, the example described with respect to FIG. 2 can be considered a continuation of the example described with respect to FIG. 1.

Environment 200 includes servers 102, computing device 104, and communication cloud 128 of FIG. 1, where computing device 104 includes a processing system 202, and one or more computer-readable media 204. Processing system 202 is representative of functionality to perform one or more operations using hardware. Accordingly, the processing system 202 is illustrated as including hardware elements 206 that may be configured as processors, functional blocks, and so forth. This may include implementation in hardware as an application specific integrated circuit or other logic device formed using one or more semiconductors. The hardware elements 206 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 204 is illustrated as including memory/storage 208. The memory/storage 208 represents memory/storage capacity associated with one or more computer-readable media. The memory/storage 208 may include volatile media (such as random-access memory (RAM)) and/or nonvolatile media (such as read only memory (ROM), Flash memory, optical disks, magnetic disks, and so forth). The memory/storage 208 may include fixed media (e.g., RAM, ROM, a fixed hard drive, and so on) as well as removable media (e.g., Flash memory, a removable hard drive, an optical disc, and so forth). The computer-readable media 204 may be configured in a variety of other ways as further described below. Here, client analytics module 108 of FIG. 1 is illustrated as residing within memory/storage 208, but alternate or additional implementations implement client analytics module 108 using combinations of firmware, hardware, and/or software without departing from the scope of the claimed subject matter, such as hardware elements 206.

Example environment 200 enables multiple devices to be interconnected through servers 102, where servers 102 can be local to the multiple devices, remote from the multiple devices, or any combination thereof. In one or more implementations, servers 102 are configured as a cloud of one or more server computers that are connected to the multiple devices through a network, the Internet, or other data communication link. This interconnected architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In various implementations, the interconnected architecture allows the personalized analytics system to increase a quality of a service by implementing workload management optimizations or recommendations based on observed data, performing dynamic operations on different servers (e.g., curating data on a first server and analyzing curated data on a second server), basing the dynamic operations on a flow of requests through the system to offload work to idle servers, etc. Alternately or additionally, the interconnected architecture allows the personalized analytics system to scale and/or manage resources to optimally tailor experiences to all client devices receiving cloud-based services. Here, "optimally tailor experiences" denotes the personalized analytics system balancing how the cloud-based services are provided to each client device based on meeting the needs of each client device using the resources available through the cloud. In at least one embodiment, a class of target devices is created and experiences are tailored to the generic class of devices. A class of devices may be defined by physical features, types of usage, or other common characteristics of the devices. In various implementations, scaling and/or managing the resources includes measuring the available resources of the personalized analytics system to make a determination on how to distribute the resources. For example, a number of high-volume data transactions occurring at a given point in time can add higher volumes of input into the personalized analytics system, which can affect the performance of any single server included in the personalized analytics system. By measuring performance indicators, such as storage usage, network bandwidth, memory usage, and so forth, the personalized analytics system can determine to add resources to support data curation, relational data modeling, insight analysis and/or generation, query augmentation, parameter extraction and distribution, playlist generation, etc. Various implementations utilize a workload layer of the cloud-based services to provide functionality of the personalized analytics system, such as mapping operations, transaction processing operations, data curation operations, query magnifications and/or augmentations, story augmentation, anecdotal information collection, insight analysis and/or generation, machine-learning parameter extraction and/or distribution, etc.

The cloud 210 includes and/or is representative of a platform 212 for resources 214. The platform 212 abstracts underlying functionality of hardware (e.g., servers) and software resources of the cloud 210. Resources 214 may include applications and/or data that can be utilized while computer processing is executed on servers that are remote from the computing device 104. For example, resources 214 can include personalized analytics module 106 of FIG. 1.

The platform 212 may abstract resources and functions to connect computing device 104 with other computing devices. The platform 212 may also serve to abstract scaling of resources to provide a corresponding level of scale to encountered demand for the resources 214 that are implemented via the platform 212. Accordingly, in an interconnected device embodiment, implementation of functionality described herein may be distributed throughout the system. For example, the functionality may be implemented in part on the computing device 104 as well as via the platform 212 that abstracts the functionality of the cloud 210.

Having described example operating environments in which various aspects of narrated analytics playlists can be implemented, consider now a discussion of generating narrated analytics playlists in accordance with one or more implementations.

Narrated Analytics Playlists

Data mining examines data to identify various types of information, such as anomalies, patterns, trends, etc. The process of mining data can involve accessing one or more data sources in a particular manner to extract the desired information. To illustrate, a database can be programmatically accessed to return an average value, a weighted sum, a maximum value in a numeric sequence, sorted data, etc. As the complexity of the requested information increases, so, too, does the access to the database. Accordingly, data mining can be difficult for users who are not knowledgeable on how to locate and/or extract the desired information. For instance, a businessperson who desires sales trend information for a particular product may not understand the schema and/or interfaces employed by a database storing the corresponding data.

As another complication, the information extracted by data mining can sometimes lose context data that helps the user understand the information. For instance, in generating a sales trend chart from data, the sales chart may indicate a downward sales trend for a particular region, and lose context data that indicates the downward sales trend for that particular region is a minimal relative to other regions. Thus, the loss of context data can adversely impact how the information generated by data mining is interpreted. The ability to extract information, as well as interpret the extracted data, is further compounded when large volumes of data from varying sources are used, thus making manual processing cumbersome and/or insurmountable to various users.

As further described herein, computer-based resources compile large quantities of data in varying formats and at accelerated rates that a human is incapable of compiling manually. This makes processing the computer-based data by a user infeasible, since a user processing the data would be time-consuming and/or impossible to complete. Further, if a user simply processed a portion of the computer-based data, this creates potentially out-of-date, inaccurate, and/or misleading results since not all data points are considered. Accordingly, the volume of computer-based data accumulated by an organization from varying data sources, the speed at which data is accumulated by these data sources, as well as the differing formats in which the data can be stored, makes extracting accurate, current, and reliable insights from the data by a user insurmountable and difficult.

Techniques described herein provide automated generation of narrated analytics playlists. Various implementations curate data from various data sources, where curating the data includes identifying attributes and relational data models. One or more implementations base the curating upon anecdotal data associated with a user profile. In response to receiving a trigger event to perform a query analysis, one or more implementations identify keywords to use in the query analysis, and extract information from the curated data based, at least in part on the one or more keywords. The extracted information is then analyzed to identify one or more insights. In turn, one or more implementations generate a narrated analytics playlist using the one or more insights.

Figure 3:
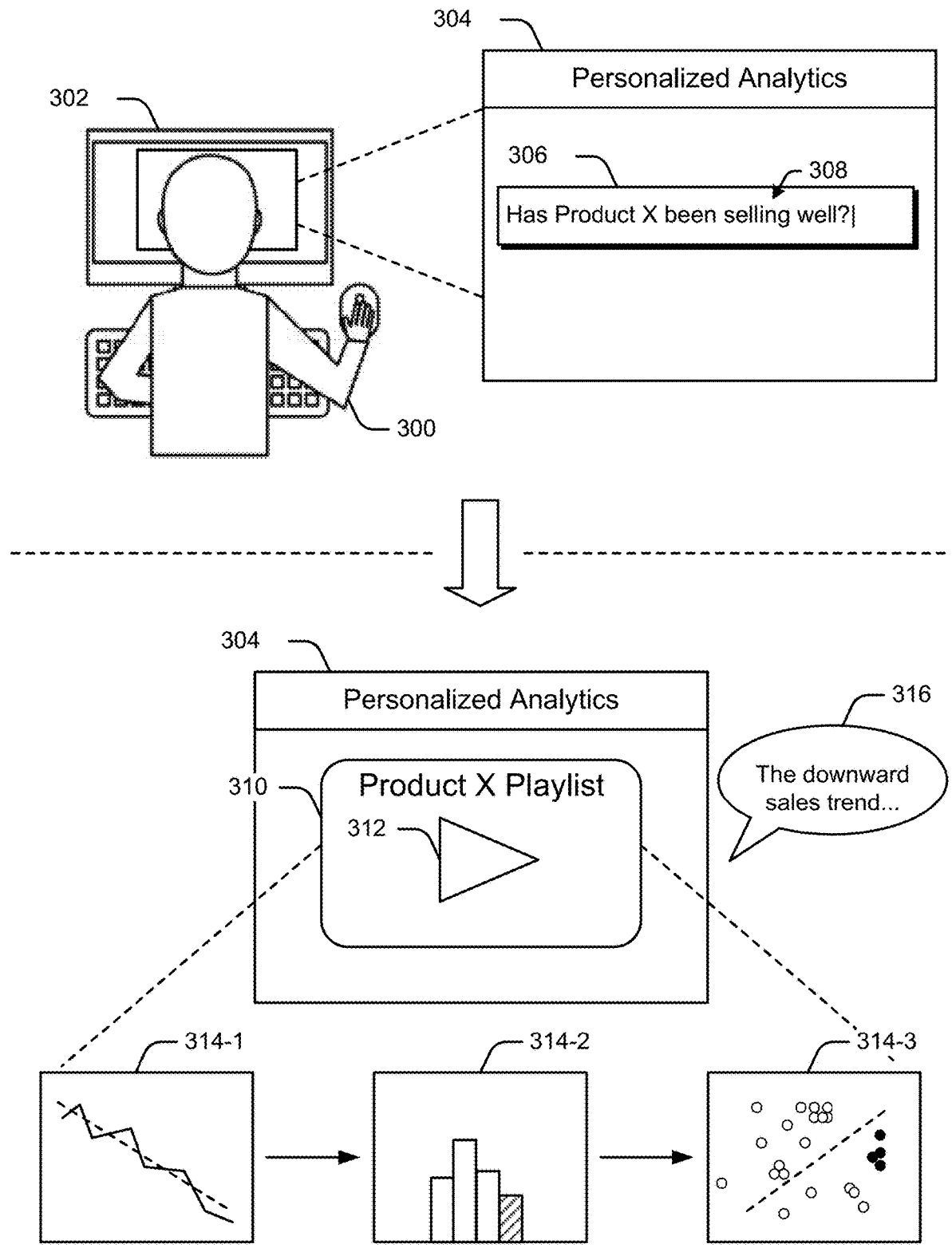
FIG. 3 illustrates an example of generating a narrated analytics playlist in accordance with one or more implementations.

To demonstrate, consider now FIG. 3 that illustrates an example of generating a narrated analytics playlist in accordance with one or more implementations. In various scenarios, the example described with respect to FIG. 3 can be considered a continuation of one or more examples described with respect to FIGS. 1 and 2. FIG. 3 illustrates an example progression of events over an arbitrary time period. Here, the progression begins in the upper portion of FIG. 3 and then moves to the lower portion of FIG. 3. It is to be appreciated that the progression of events described with respect to FIG. 3 is for discussion purposes, and that any other ordering, omission, and/or addition to the events can occur without departing from the scope of the claimed subject matter.

The upper portion of FIG. 3 includes user 300 that accesses a personalized analytics system using computing device 302. While computing device 302 is illustrated here as a desktop computer, other types of computing devices include a mobile phone, a tablet, a laptop, a smart watch, a home assistant device, and so forth. In various implementations, user 300 log onto the personalized analytics system using a specific identification and password that distinguishes a particular workspace associated with user 300 from other workspaces, such as through an account associated with a particular user profile and/or workspace. To illustrate, the user can create single or multiple workspaces, where each workspace has a specific identification and password that can be used to identify the respective workspace and/or interactions with the respective workspace. In turn, logging onto the system with the specific identification and password accesses the corresponding workspace. It is to be appreciated that user 300 can access the personalized analytics system in any suitable manner, such as through a web browser that accesses a remote server, through a client application that communicates with a server application over a network, a stand-alone application, etc.

As user 300 interacts with the personalized analytics system, some implementations collect anecdotal data about the user and/or the user's various interactions, such as user location information, user preferences, user preferred queries, last known user interaction, user preferred product information, user preferred insight information, and so forth. In turn, the collected anecdotal data can be stored and/or associated with the particular workspace and/or user profile. When the particular workspace becomes the active workspace, the personalized analytics system uses the corresponding anecdotal data to generate insights and/or narrated analytics playlists directed to the particular user profile and/or particular workspace. This can include using the anecdotal data to determine how to represent the insights when incorporating the insights into a narrated analytics playlist, a language style to use, types of content to include in the playlist (e.g., preferred content associated with the user profile, content relevant to an associated organization profile, content relevant to an associated job, etc.).

Some implementations share anecdotal data across multiple workspaces, such as workspaces identified as being associated with a same user and/or same user profile. For instance, the personalized analytics system can collect anecdotal data for the same user profile across multiple workspaces, and use the anecdotal data in each respective workspace of the user profile. Collecting and/or generating the anecdotal data can be achieved in any suitable manner. As one example, various implementations collect user interactions with the personalized analytics system, and then process the user interactions using predictor functions, machine-learned algorithms, etc., to determine the user's affinities. To illustrate, the personalized analytics system can gather data points corresponding to user interactions with various types of charts displayed by the system, and feed the data points to a machine-learning algorithm to determine that the user has an affinity towards pie charts, dislikes bar charts, and so forth. Any suitable type of machine-learning algorithm can be utilized, such as collaborative filtering algorithms, object ranking algorithms, label ranking, instance ranking, and so forth. Some of the machine learning modules utilized employ supervised learning techniques that train a machine-learning algorithm with background knowledge, and then feed the observed data points into the machine-learning algorithm as a way to identify these affinities. The training, as well as iterative updating of the machine-learning algorithms as new data is processed, improve the efficiency of the algorithms to converge on a result faster over time. Thus, utilizing machine-learning algorithms improves the execution times of a corresponding computing device and/or personalized analytics system. Portions of the machine-learning algorithm can be distributed within the personalized analytics system to improve the system response time, such as through the use of a workload layer of a cloud-based service. Alternately or additionally, portions of the algorithm can be run locally on a user device to improve response time by minimizing data transfer between the user device and a cloud-based service. It is to be appreciated that the examples described here are for illustrative purposes, and other types of machine-learning algorithms and/or distribution methods can be utilized without departing from the scope of the claimed subject matter, such as preference elicitation models, multiple-criteria decision analysis models, statistic-based predictive models, and so forth.

In FIG. 3, the personalized analytics system displays, by way of computing device 302, user interface 304 that includes an interactive control in the form of search box 306. In turn, user 300 enters an input search query 308 that triggers a query analysis as further described herein. While the example described with respect to FIG. 3 generally illustrates a search box, other types of interfaces can be utilized to access and input search queries to the personalized analytics system, such as a search box at a stand-alone application and/or web-application, a search box via a web browser interface, a microphone communicatively coupled to computing device 302 and/or a home assistant device to receive audible input, a camera communicatively coupled to computing device 302 and/or a home assistant device to receive video input, etc. Various implementations of the personalized analytics provide time information associated with how long the query analysis process will take (e.g., how long until a result is returned by the personalized analytics system). This can occur automatically and/or in response to the personalized analytics system receiving input that requests the time information.

Moving to the lower portion of FIG. 3, and in response to receiving input search query 308, user interface 304 displays a narrated analytics playlist 310 generated by the personalized analytics system. In one or more implementations, the narrated analytics playlist 310 is output via playback module 132 of FIG. 1. Narrated analytics playlist 310 includes various insights identified by the personalized analytics system that are based off of input search query 308 and/or anecdotal data associated with a user profile and/or workspace associated with user 300.

User interface 304 includes playback control 312 that can be actuated to initiate playback of narrated analytics playlist 310. Here, narrated analytics playlist 310 includes a series of images in a video format, further illustrated here as image 314-1, image 314-2, and image 314-3, respectively, to show the progression of images and/or audio. Accordingly, narrated analytics playlist 310 includes audible output 316 that corresponds to a narrated description of the content rendered in images 314-1 through 314-3. Each respective image of the playlist (e.g., images 314-1 through 314-3) corresponds to an insight identified by the personalized analytics system. Various implementations include supplemental information and/or insights within the narrated analytics playlist, such as drill-up information, drill-down information, location-based information, time-based information, product-based information, etc. Alternately or additionally, the playback module renders controls that can be actuated to initiate the generation of the supplemental information using data included in the narrated analytics playlist. In other words, the personalized analytics system provides user 300 with not only the requested information associated with input search query 308, but additionally identifies supplemental information and/or provides the user with an ability to generate the supplemental information, such as supplemental insights.

Figure 4:
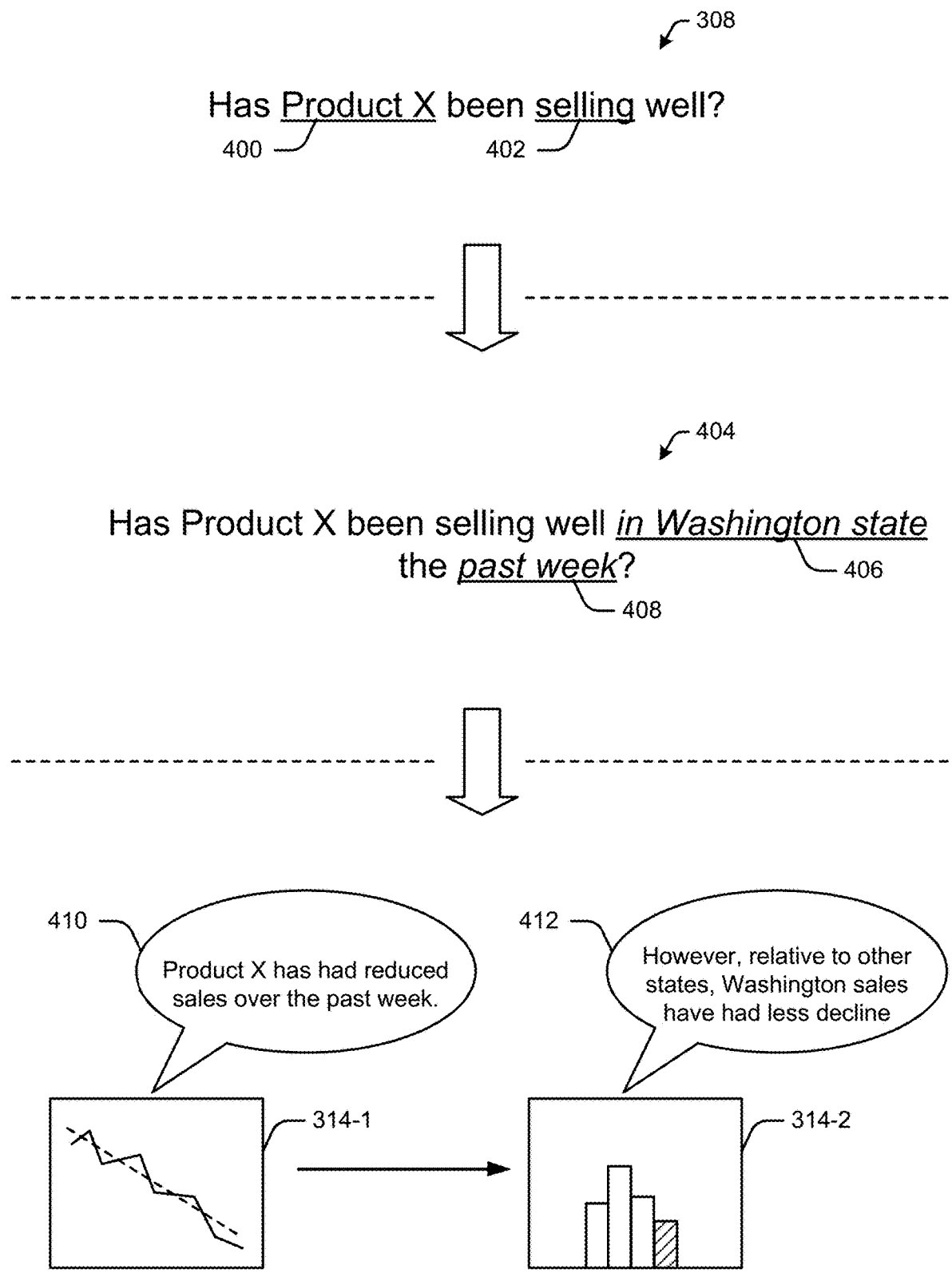
FIG. 4 illustrates an example of augmenting a query with contextual parameters in accordance with one or more implementations.

Various implementations augment queries with additional parameters scope in or add boundaries on how curated data is extracted and/or analyzed. This simplifies the complexity of inputs queries, since the personalized analytics system can process broad input queries by adding contextual parameters that help bound the request. To demonstrate, consider now FIG. 4 that illustrates adding contextual parameters to a query in accordance with one or more implementations. In various scenarios, the example described with respect to FIG. 4 can be considered a continuation of one or more examples described with respect to FIGS. 1-3. FIG. 4 illustrates an example progression of events over an arbitrary time period. Here, the progression begins in the upper portion of FIG. 4, moves to the middle portion of FIG. 4, and then progresses to the lower portion of FIG. 4. It is to be appreciated that the progression of events described with respect to FIG. 4 is for discussion purposes, and that any other ordering, omission, and/or addition to the events can occur without departing from the scope of the claimed subject matter.

The upper portion of FIG. 4 includes input search query 308 from FIG. 3. While input search query 308 includes a text-based question (e.g., has Product X been selling well?), it is to be appreciated that this is for discussion purposes and that any other combination of words, images, and/or audio can be utilized as a search query without departing from the scope of the claimed subject matter. Various implementations analyze the combination of words included in input search query 308, and determine to add contextual parameters to the query. For example, during the analysis, the personalized analytics system identifies contextual words included in the search query that correspond to topics of interest to focus an analysis on, such as through the use of natural language processing algorithms. In FIG. 4, the personalized analytics system identifies contextual word 400 (e.g., "Product X") and contextual word 402 (e.g., "selling") as topics to base a query analysis off of. While input search query 308 includes these topical words that can help direct a query analysis, the query string lacks contextual information and/or boundaries that help reduce the scope of the query, such as a time span for the sales data, a region over which to gather sales information, and so forth. Accordingly, various implementations identify contextual parameters to include in a query, such as through the use of a query magnifier module as described with respect to at least FIGS. 11 and 14.

Moving to the middle portion of FIG. 4, the personalized analytics system generates a modified query 404 that has been augmented to include contextual parameter 406 and contextual parameter 408. Here, contextual parameter 406 corresponds to location and/or region data, while contextual parameter 408 provides a time range over which to analyze data. The contextual parameters can be identified in any suitable manner, such as through the use of anecdotal data associated with a user profile and/or workspace associated with user 300. For instance, the anecdotal data of the active workspace and/or active user profile can include location information associated with user 300, sales regions assigned to user 300, a time metric of when the last sales report for Product X was generated, etc. In turn, the personalized analytics system determines contextual parameters that help bound the query used to extract curated data for analysis. While the example described with respect to FIG. 4 adds location and time contextual parameters, it is to be appreciated that other types of parameters can be included as well, such as a search history, organization information, a drill-down or drill-up path, traits corresponding to a particular product, subject domain insights, user interaction with related products, and so forth.

Moving to the lower portion of FIG. 4, playlist image 314-1 and playlist image 314-2 correspond to insights generated from the query analysis based on modified query 404. For example, image 314-1 corresponds to a sales trend over a time span corresponding to contextual parameter 408 and/or a region corresponding to contextual parameter 406. Image 314-2 corresponds to an insight associated with a comparison chart of sales in other regions relative to the one identified in contextual parameter 406, such as regions that lie on a same boundary. Adding contextual parameters to a query analysis allows the personalized analytics system to generate a result for the requested topic (e.g., image 314-1) and/or supplemental information (e.g., image 314-2) without needing to receive a second, potentially more defined, input query. To illustrate, an insight engine module, such as those discussed with respect to at least FIGS. 1, 11, and 15, uses the augmented query to extract curated data and analyze the data to generate insights and/or supplemental information as further described herein.

In FIG. 4, narration 410 describes various details about image 314-1 to provide contextual information about what the image illustrates, such as a narrative description of the charted sales over the corresponding week. Similarly, narration 412 provides a narrative description of image 314-2, such as a description that indicates the bar chart compares the sales trend for Washington State to sales trends in boundary states, and the observation that Washington State sales declined less than other states. In other words, the personalized analytics system identifies an insight corresponding to comparative sales to other states by augmenting input search query 308 using anecdotal data and without additional user input and/or user direction. While the example with respect to FIG. 4 includes a comparative sales chart based on location, it is to be appreciated that other types of insights can be identified using various machine learning algorithms, data mining algorithms, PCA algorithms, etc.

With respect to FIGS. 3 and 4, user 300 manually enters a search query into the personalized analytics system using an interactive control displayed via a user interface, where the search query is alternately referred to as a user query. In response to the user actuating the control, the personalized analytics system receives a notification of the user query trigger event, and subsequently triggers a query analysis. However, other types of events trigger events can trigger a query analysis. To further demonstrate, consider now FIGS. 5A-5C that collectively illustrate various trigger events in accordance with one or more implementations. In some scenarios, the examples described with respect to FIGS. 5A-5C can be considered a continuation of one or more examples described with respect to FIGS. 1-4.

Figure 5A:
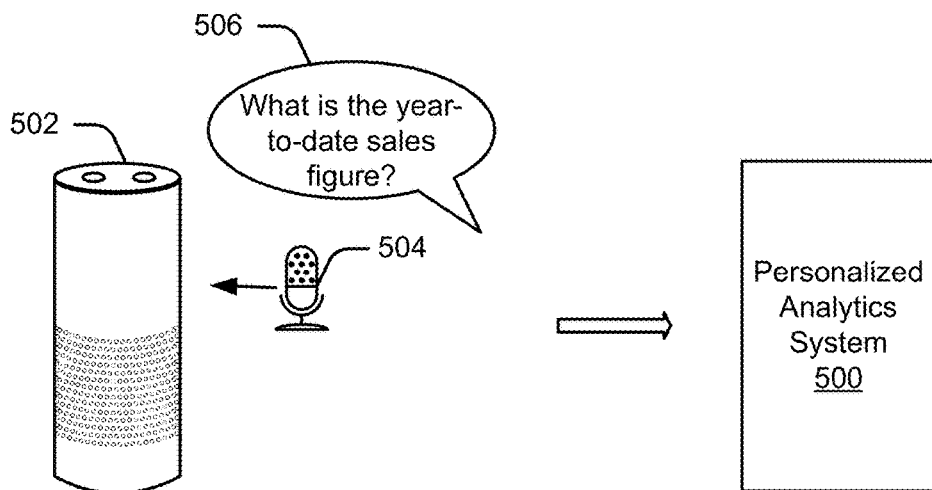
FIGS. 5A-5C illustrate various example trigger events in accordance with one or more implementations.
Figure 5A:
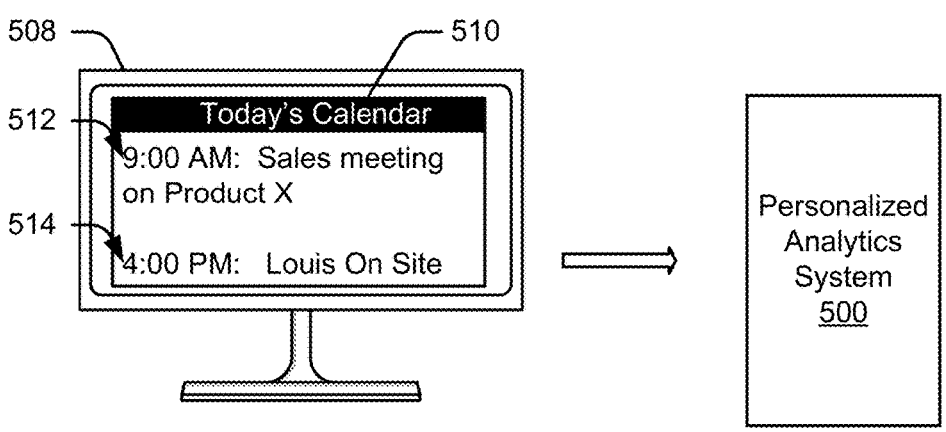

The upper portion of FIG. 5A includes a personalized analytics system 500 that, in various scenarios, is representative of the personalized analytics system described in FIG. 1, such as servers 102 and/or computing device 104. For simplicity's sake, FIGS. 5A-5C generally illustrate the personalized analytics system 500 as a black box to denote that multiple different configurations of the system can be utilized, examples of which are provided herein. The upper portion of FIG. 5A also includes home assistant device 502 that is communicatively coupled to, and/or is part of, the personalized analytics system. For example, in some scenarios, home assistant device 502 corresponds to computing device 104 of FIG. 1. Home assistant device 502 includes a microphone 504 to receive audible input trigger events associated with triggering a query analysis. Here, audible input 506 includes a query corresponding to "what is the year-to-date sales figure". In response to receiving audible input 506, the home assistant device forwards information associated with audible input 506 to the personalized analytics system 500 to trigger a query analysis, such an audio clip of audible input 506, a text conversion of the audible input, a trigger event message, etc. To illustrate, various implementations include speech-to-text algorithms that process audible input 506, and generate text-based representations of words identified via the speech-to-text algorithms. In turn, the personalized analytics system 500 receives the text-based representation and performs a search analysis, examples of which are provided herein. In other implementations, an audio clip is forwarded to the personalized analytics system 500 for processing as further described herein. Accordingly, various implementations trigger a query analysis using an audible input. While the upper portion of FIG. 5A illustrates audible support via a home assistant device, other types of devices support audible input/output as well, such as a mobile phone, a tablet, a personal computer, a smart watch, etc.

In various implementations, audible support of the personalized analytics system 500 can alternately or additionally include outputting audible prompts. To demonstrate, some implementations of home assistant device 502 output an audible prompt, such as "would you like an analysis of your helpdesk ticket queue now?" Any suitable event can trigger the output of an audible prompt, such as a threshold value being triggered (e.g., the ticket queue exceeding a predefined number of entries), a user-defined schedule, and so forth. In response to outputting the audible prompt, various implementations receive audible inputs and/or responses, such as a one-word audible reply (e.g., "Yes", "No") that triggers a query analysis based on content included in the prompt. Accordingly, various implementations include speech-to-text conversion algorithms and/or keyword extraction algorithms.

Various implementations trigger a query analysis based upon a scan of a calendar of appointments and/or a schedule. To further demonstrate, consider now the lower portion of FIG. 5A that includes personalized analytics system 500 and display device 508 that is communicatively coupled to, and/or is part of, the personalized analytics system. For example, in some scenarios, display device 508 corresponds to a display device associated with computing device 104 of FIG. 1. For simplicity's sake, the lower portion of FIG. 5A simply includes a display device, but as one skilled in the art will appreciate, various implementations drive the display of content on display device 508 via a computing device that is communicatively coupled to the display. Further, while display device 508 renders calendar information 510, it is to be appreciated that various implementations are able to scan calendar information without rendering and/or displaying the calendar information on a respective display.

In various scenarios, the personalized analytics system 500 scans calendar information 510 to identify topics and/or events of interest, such as appointments, meetings, and/or contextual words included in the appointments and/or meetings. In response to locating a topic and/or event, various implementations trigger a query analysis based upon various characteristics associated with the identified topic and/or event. For instance, calendar information 510 includes two separate events that can be used to trigger respective query analyses. Event 512 includes the contextual words "sales" and "Product X". Accordingly, in response to identifying these contextual words included in a calendar event, the personalized analytics system triggers a query analysis based upon the identified contextual words. This can include performing augmented queries based upon user information, anecdotal data, alternate wording, etc. In response to scanning event 514, the personalized analytics system identifies the word "Louis" as a contextual word based on anecdotal data that identifies Louis as a customer. In turn, the personalized analytics system automatically triggers a query analysis directed to Louis and/or any business information associated with Louis. In other words, the personalized analytics system triggers an automated query based upon the scan of the calendar information, rather than triggering the query based on explicit user input. The scan of calendar information can be initiated in any suitable manner, such as an automated scan performed by the system at system startup, in response to detecting a user logging into the system, periodically, based on a user-defined schedule, etc. Alternately or additionally, a user can manually initiate a calendar scan, such as through the actuation of a software control button. While described in the context of extracting contextual words from calendar information, alternate or additional sources can be scanned for contextual words as well, such as an Enterprise Resource Planner (ERP), Customer Relationship Management (CRM) software, Marketing Automation Platform (MAP) software, Product Information Management (PIM) software, and so forth.

Various implementations enable a user to define a schedule for triggering user-defined query analyses. To illustrate, consider now the upper portion of FIG. 5B that includes personalized analytics system 500 and display device 516. Similar to that described with respect to display device 508 FIG. 5A, display device 516 renders an example scheduler user interface for discussion purposes, but alternate implementations can trigger query analyses without the scheduler user interface being rendered. In this example, the scheduler displays two user-defined triggers schedules, where the user has defined various contextual and/or keywords to base a query analysis on and a schedule for when to perform the analysis. Here, trigger schedule 518 corresponds to a weekly analysis based on Product X, while trigger schedule 520 corresponds to a monthly analysis on Competitor Y sales. Accordingly, the personalized analytics system triggers a weekly query analysis based upon the contextual word "Product X" and a monthly query analysis based upon the contextual words "Competitor Y" and "sales". The query analysis can include augmented queries as further described herein. While not illustrated here, some implementations provide gradient results, where the personalized analytics system receives input that defines and/or adjusts an amount and/or type of information returned to a user for the query analysis, such as verbose narration, minimal narration, desired charts, desired graphs, disallowed charts, disallowed information, etc. Accordingly, various implementations trigger a query analysis using schedules and/or return gradient content based upon user-defined settings.

Figure 5B:
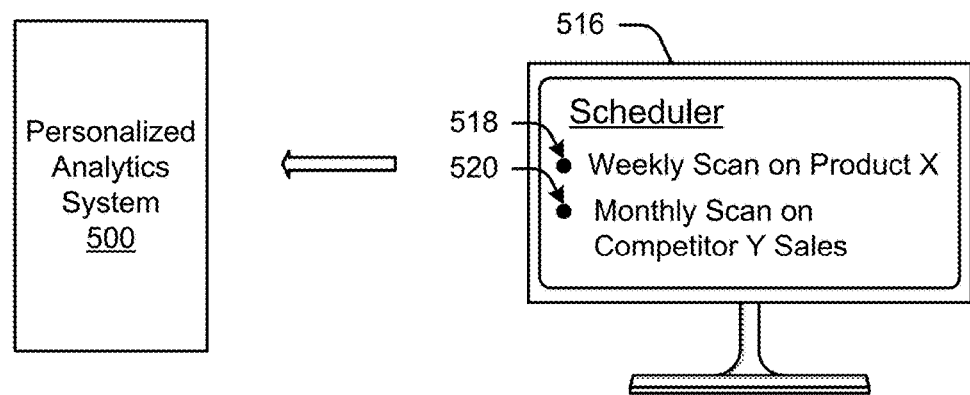
Figure 5B:
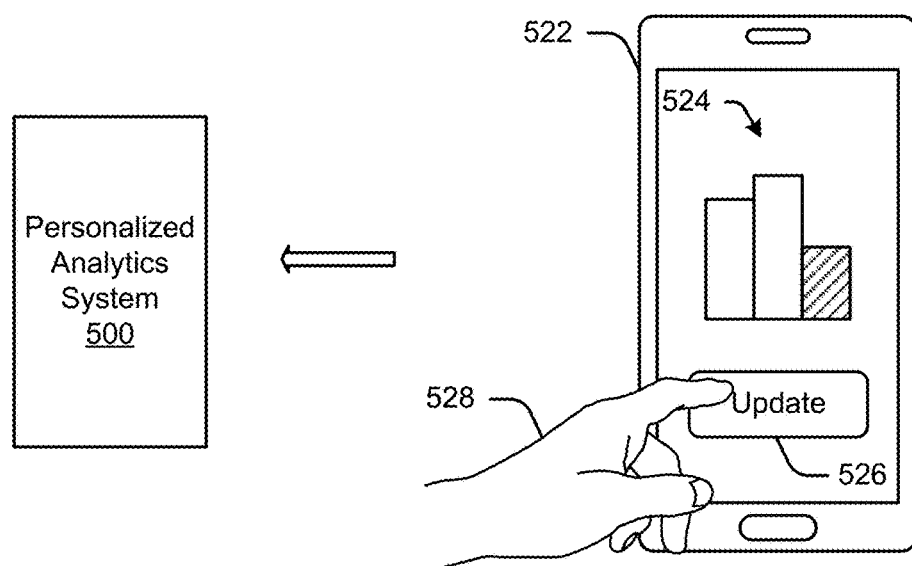

Now consider the lower portion of FIG. 5B that demonstrates another example of triggering a query analysis in accordance with one or more implementations. Here, the lower portion of FIG. 5B includes personalized analytics system 500 and mobile device 522. As in the case of home assistant device 502, display device 508, and/or display device 516, mobile device 522 can be communicatively coupled to, and/or be a part of, the personalized analytics system 500. Here, mobile device 522 displays content 524 that corresponds to information and/or an insight generated by the personalized analytics system 500. Thus, mobile device 522 is in process of outputting content corresponding to a narrated analytics playlist generated by personalized analytics system 500. In various implementations, the personalized analytics system 500 provides the ability to manually trigger a query analysis during playback of content. This is further illustrated in the lower portion of FIG. 5B, where the user interface of mobile device 522 renders control 526. In turn, user 528 actuates control 526 to trigger a query analysis associated with updating the content being currently consumed (e.g., content 524). Accordingly, the inclusion of control 526 allows for manual input that explicitly triggers the query analysis via a single user-interaction (e.g., a one-click activation).

Mobile device 522 renders control 526 during the playback of content 524, but it is to be appreciated that alternate or additional implementations provide controls and/or manual activation of a query analysis in other ways. For example, in some implementations, mobile device 522 displays a dashboard that includes multiple types of content, such as different charts and/or graphs corresponding to a same product, different charts and/or graphs where each chart or graph corresponds to a respective product, an organization chart, and so forth. Various implementations associate a control with one or all of the different types of content that can be actuated to trigger a query analysis as further described herein.

Figure 5C:
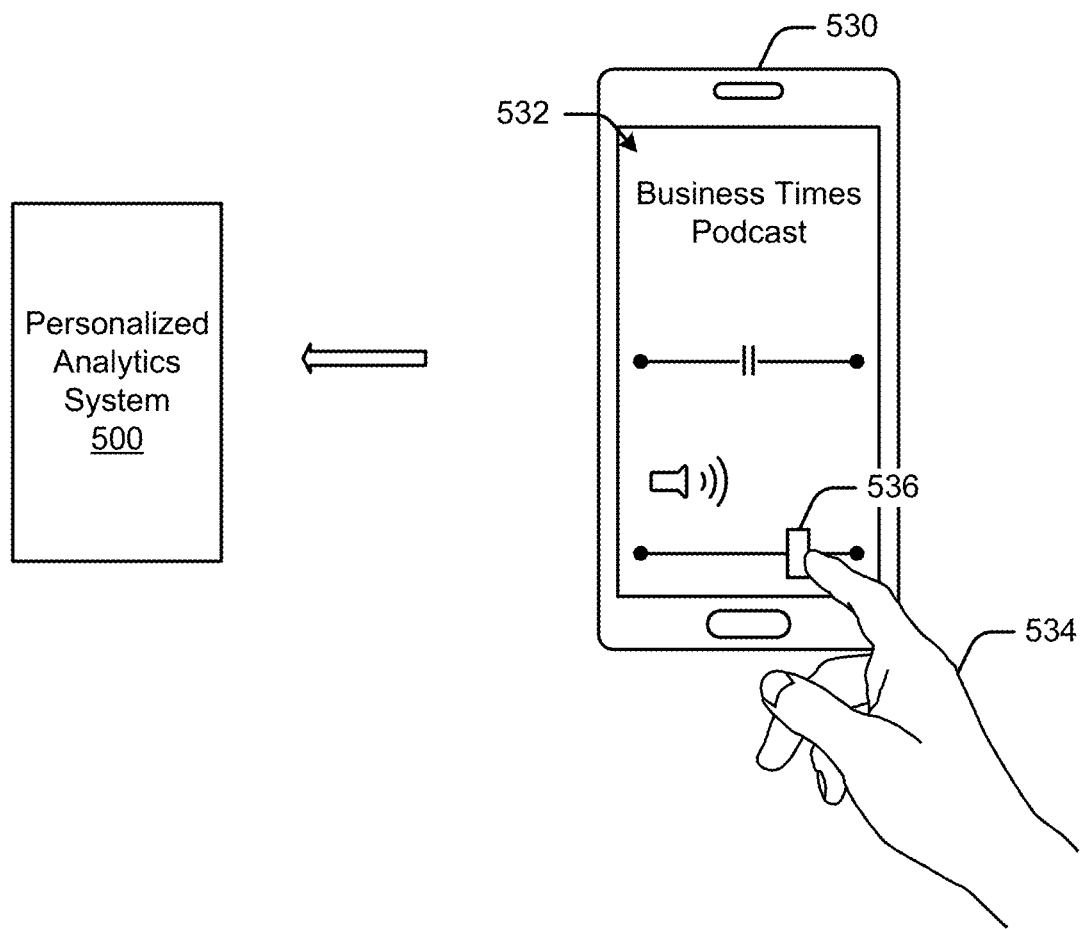

Now consider now FIG. 5C that illustrates an example of implicitly triggering a query analysis in accordance with one or more implementations. FIG. 5C includes personalized analytics system 500 and mobile device 530, where mobile device 530 is in process of playing a podcast 532. Similar to that described with respect to home assistant device 502, display device 508, display device 516, and/or mobile device 522, mobile device 530 communicatively couples to, and/or is part of, personalized analytics system 500 as further described in. Various implementations gather anecdotal data of user interactions, and implicitly trigger a query analysis based upon the anecdotal data. In other words, the personalized analytics system 500 gathers information associated with user interactions, and determines to trigger a query analysis based on interpreting the user interactions as implicit feedback.

Unlike control 526 of FIG. 5B that is explicitly dedicated to triggering a query analysis, the user interactions pertain to alternate functionality. For instance, user 534 interacts with volume control 536 at a particular point in time during the podcast to increase the volume of the audio being output. In turn, the personalized analytics system 500 collects information about the user interaction and interprets this interaction as implicit positive feedback of the content being output since the audible volume is being increased. In response to determining the user has entered implicit positive feedback, the personalized analytics system 500 identifies a topic and/or keywords associated with the feedback, and triggers a query analysis based on the identified topic and/or keywords. Thus, various implementations of the personalized analytics system 500 can trigger query analyses based off of implicit user interactions, rather than explicit user interactions as further described herein. The personalized analytics system 500 can determine the associated topic and/or keywords in any suitable manner, such as by identifying a general topic associated with the podcast, a topic being output at a point in time the implicit positive feedback is received, content being displayed on a user interface at the point in time the implicit positive feedback is received, etc.

While the personalized analytics system 500 can collect information about user interactions, various implementations alternately or additionally provide mechanisms to disable tracking user interaction and/or gathering information about the user interactions, such as through the use of software controls and/or customizable settings. This allows a user to have control over the information associated with a user profile and/or workspace, thus providing the user with privacy options. In some scenarios, the personalized analytics system 500 includes gradient privacy settings that define and/or set a level of how much information is collected, how much information is saved, what information is ignored, etc. (e.g., a first privacy level corresponding to tracking all user interactions, a second privacy level corresponding to disable tracking all user interactions, a third privacy level that tracks only user interactions with a playback module, a fourth privacy level corresponding to disabling tracking correspondences, a fifth privacy level corresponding to disabling tracking calendar appointments, etc.). To demonstrate, consider a scenario in which a client device collects and forwards information about user interactions to the personalized analytics system 500. Various implementations display a user interface at the client device that provides access to privacy settings, thus enabling a user to enter input that changes what information personalized analytics system can and cannot track. For example, the user can enter input that disables tracking all user interactions user interactions. In response to receiving the privacy setting input, the personalized analytics system 500 disables collecting information about user interactions at the client device.

Figure 6:
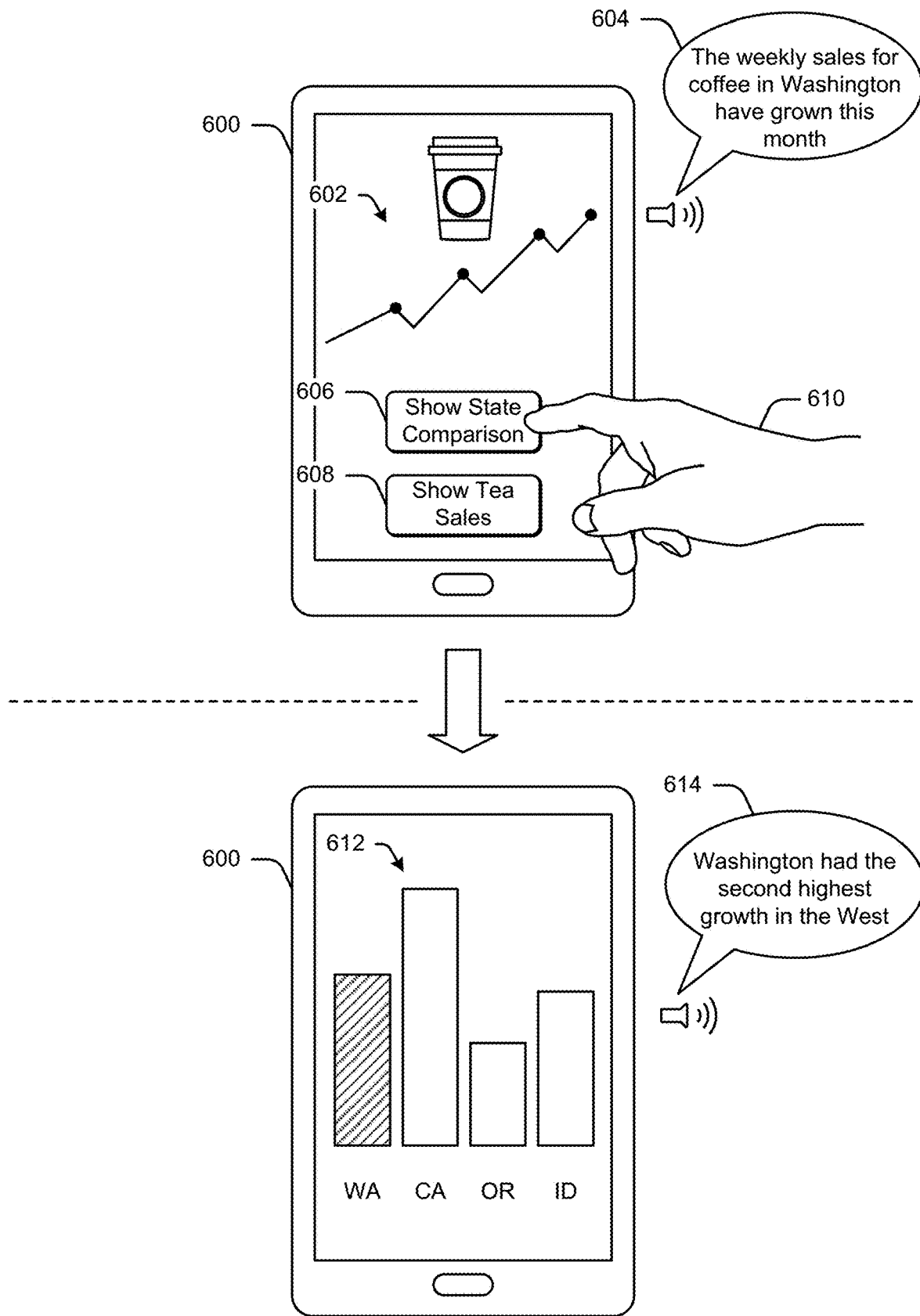
FIG. 6 illustrates generating drill path content in accordance with one or more implementations.

Various implementations alternately or additionally modify what is presented in real-time and/or while a playlist is being consumed. To further demonstrate, consider now FIG. 6 that illustrates an example of automatically generating drill-path content during playback in accordance with one or more implementations. In various scenarios, the example described with respect to FIG. 6 can be considered a continuation of one or more examples described with respect to FIGS. 1-5C. FIG. 6 illustrates an example progression of events over an arbitrary time period, where the progression begins in the upper portion of FIG. 6, followed by the lower portion of FIG. 6. It is to be appreciated that the progression of events described with respect to FIG. 6 is for discussion purposes, and that any other ordering, omission, and/or addition to the events can occur without departing from the scope of the claimed subject matter.

The upper portion of FIG. 6 includes tablet 600 that is in process of rendering and/or outputting playlist content 602. Here, playlist content 602 corresponds to a statically bundled narrated analytics playlist generated by the personalized analytics system and delivered to tablet 600 for consumption. The phrase "statically bundled content" is used to denote fixed content that includes ordered and predefined content, such as a playlist with a fixed number of charts, a fixed number of graphics, fixed narration and/or description, etc. In various implementations, tablet 600 receives statically bundled content from remote devices, such as via servers 102 of FIG. 1. Alternately or additionally, tablet 600 generates the statically bundled content via a standalone application and/or by access to cloud-based services provided by servers 102.

The content displayed by tablet 600 in the upper portion of FIG. 6 includes playlist content 602 that corresponds to a sales chart of coffee sales in the state of Washington. The statically bundled content being rendered and/or output by tablet 600 also includes audible content 604 that provides a narrative description and/or additional context information corresponding to playlist content 602. Various implementations dynamically generate content during playback of statically bundled content. In other words, the personalized analytics system 500 can receive input requests for supplemental information corresponding to the rendered and/or output content, such as drill-up or drill-down items.

To illustrate, the user interface being rendered by tablet 600 during playback of playlist content 602 includes control 606 and control 608, each of which corresponds to dynamically generating supplemental information. In FIG. 6, control 606 corresponds to dynamically generating a comparison chart based on regional information, while control 608 corresponds to dynamically generating a sales chart for a different, but related, product. In response to a control being actuated, the personalized analytics system 500 receives an input associated with the actuation and generates output content that was not included in the statically bundled information. Here, user 610 actuates control 606 to view a comparison chart that corresponds to requesting and/or generating drill-up content. One or more implementations generate drill-up or drill-down content autonomously based on machine-learning algorithms that learn and/or identify a user preference. As one non-limiting example, various implementations generate the drill-up content or drill-down content based on user-preferences that define a scope and/or amount of drilling content to present, such as through an evaluation of historical patterns associated with a user profile, trends associated with the user profile, etc. This can include analyzing the associated metadata and/or extracting additional curated data to generate the drill-up content and/or drill-down content.

Moving to the lower portion of FIG. 6, the personalized analytics system 500 interrupts the outputting of playlist content 602 to output supplemental content 612. Here, supplemental content 612 includes a comparison chart that compares sales figures of coffee in various regions. The supplemental content includes audible content 614 to provide a narrative description and/or additional context information associated with the dynamically generated content. The dynamic generation of content can be performed in any suitable manner. For example, some implementations use metadata included in the statically bundled content to generate new charts, graphs, narrative content, etc. Alternately or additionally, tablet 600 triggers a query analysis that includes a topic associated with the actuated control. Thus, in some implementations, tablet 600 receives the supplemental information from a remote computing device and/or generates the supplemental via a query analysis as further described herein. Various implementations alternately or additionally provide the ability to modify and/or customize statically bundled content and/or dynamically generated content.

Figure 7:
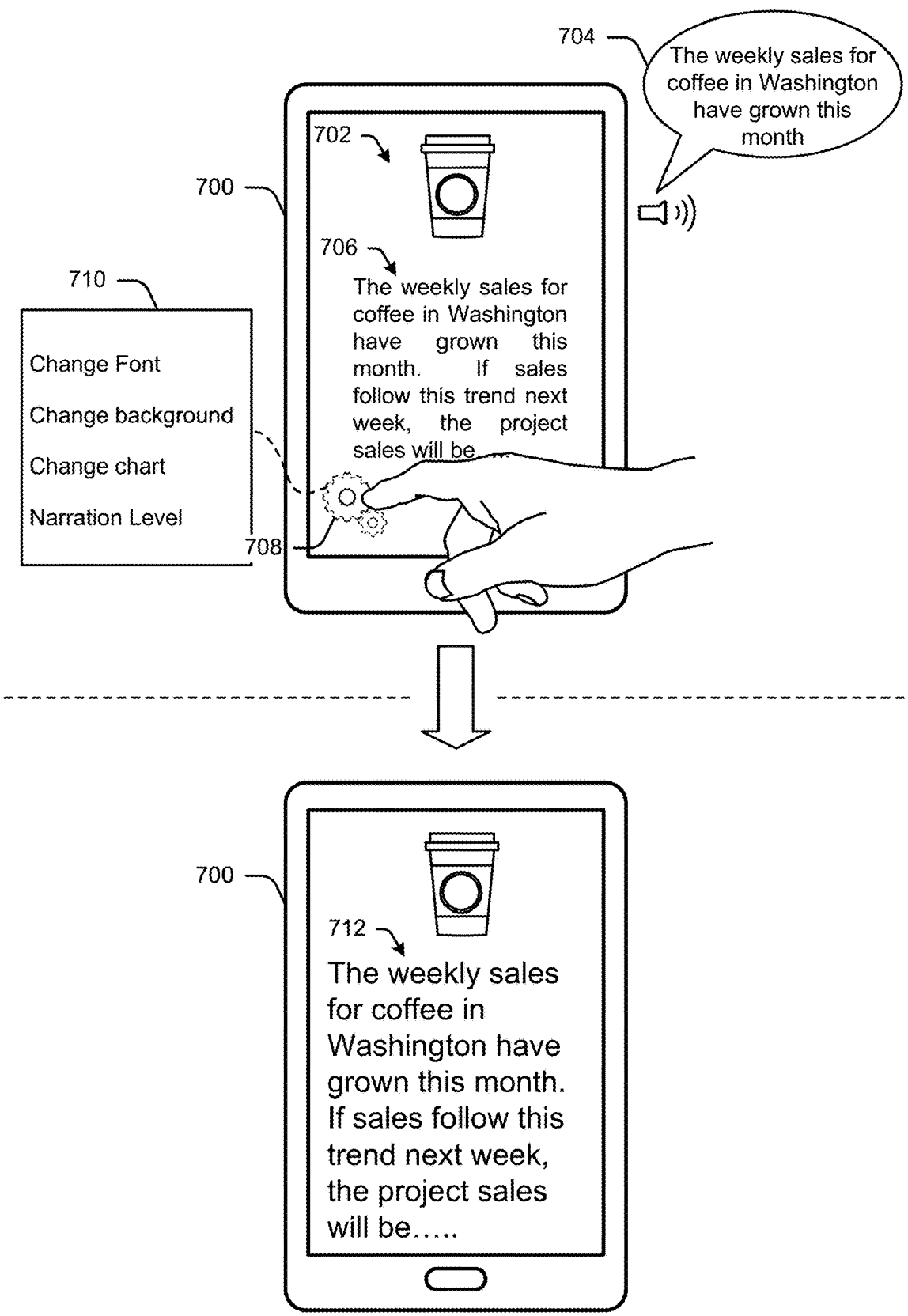
FIG. 7 illustrates an example of user-defined customizations to a personalized analytics system in accordance with one or more implementations.

To demonstrate, consider now FIG. 7 that illustrates an example of the user-defined customizations in accordance with one or more implementations. In various scenarios, the example described with respect to FIG. 7 can be considered a continuation of one or more examples described with respect to FIGS. 1-6. FIG. 7 illustrates an example progression of events over an arbitrary time period, where the progression begins in the upper portion of FIG. 7, followed by the lower portion of FIG. 7. It is to be appreciated that the progression of events described with respect to FIG. 7 is for discussion purposes, and that any other ordering, omission, and/or addition to the events can occur without departing from the scope of the claimed subject matter.

Similar to that described with respect to FIG. 6, the upper portion of FIG. 7 includes tablet 700 that is in progress of outputting playlist content 702 that includes a descriptive narrative in the form of audible output 704. The playlist content also includes text 706 that corresponds to the content included in audible output 704 that displays readable content in parallel with the corresponding audible output. The user interface displayed by tablet 700 also includes setting control 708 that, when actuated, exposes user-configurable settings, such as those illustrated in menu 710. For example, menu 710 as illustrated in FIG. 7 includes configurable settings for changing a displayed font (e.g., font type, size, color, etc.), changing a background image (e.g., image, pattern, color, etc.), changing a displayed chart (e.g., chart size, color, form, shape, preferred charts, disallowed charts, etc.), and changing a narration level (e.g., minimal narration, medium narration, verbose narration, etc.). It is to be appreciated that the settings displayed by menu 710 are merely for discussion purposes, and that various implementations include alternate or additional user-configurable settings. For example, various implementations provide the ability to customize themes that control multiple facets of what is displayed (e.g., a font type, a font size, a color pallet, cursor types, etc.), such as through the use of selectable user interface controls. In response to receiving input that defines and/or configures a setting, various implementations modify the setting and/or apply the modified setting to content in real-time while a playlist is being consumed. However, while described in the context of applying settings during output of a narrated analytics playlist, alternate or additional implementations apply the settings at times other than when a narrated analytics playlist is being output. In other words, the settings can be statically applied independent of rendering and/or outputting a playlist.

Moving to the lower portion of FIG. 7, tablet 700 displays modified text 712 based upon the modified user-defined settings. Here, modified text 712 has an increased font size relative to text 706.

Figure 8A:
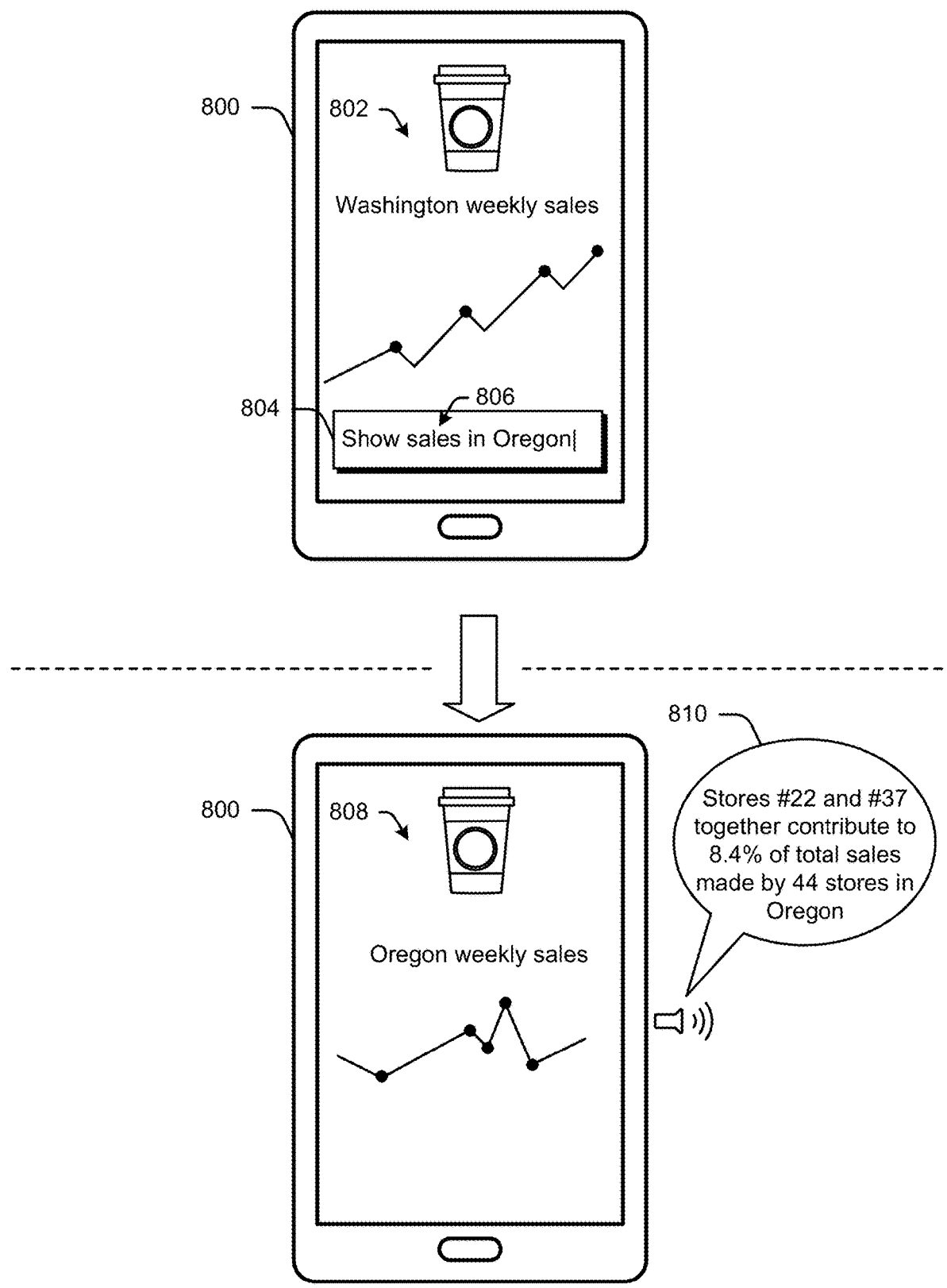
FIGS. 8A and 8B illustrate an example of analytic assistance during playback of content in accordance with one or more implementations.
Figure 8B:
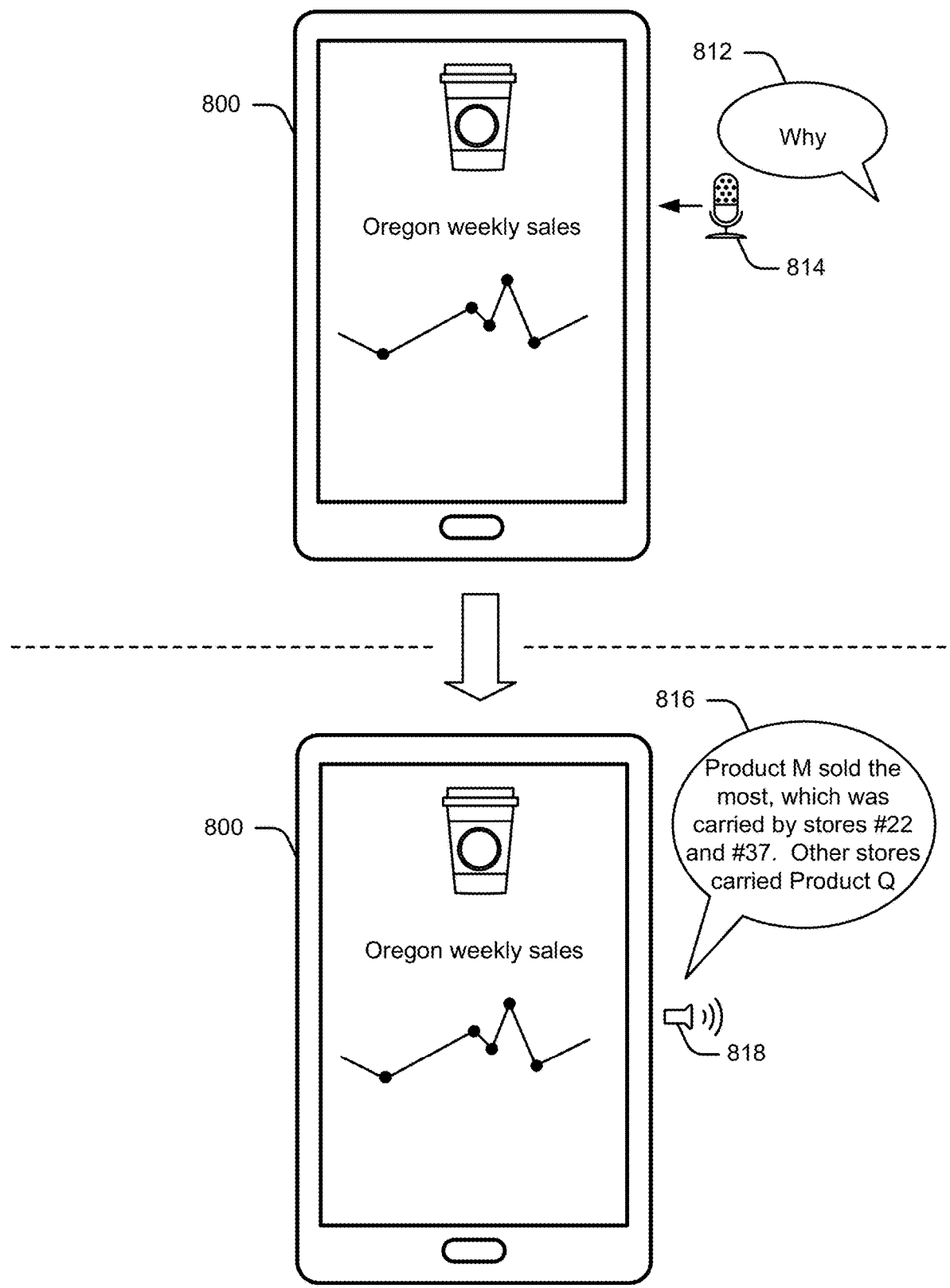

Now consider FIGS. 8A and 8B that illustrate an example of analytic assistance during playback in accordance with one or more implementations. In various scenarios, the example described with respect to FIGS. 8A and 8B can be considered a continuation of one or more examples described with respect to FIGS. 1-7. FIGS. 8A and 8B collectively illustrate an example progression of events over an arbitrary time period. Here, the progression begins in the upper portion of FIG. 8A and then moves to the lower portion of FIG. 8A. The progression then moves to the upper portion of FIG. 8B, followed by the lower portion of FIG. 8B. It is to be appreciated that the progression of events described with respect to FIGS. 8A and 8B is for discussion purposes, and that any other ordering, omission, and/or addition to the events can occur without departing from the scope of the claimed subject matter.

The upper portion of FIG. 8A includes tablet 800 that is in process of outputting playlist content 802 that corresponds to a sales chart in a region corresponding to Washington State. While not illustrated here, various implementations output a narrative description as part of the consumption of playlist content 802. The user interface displayed via tablet 800 includes a search field 804 that provides a mechanism for manually entering search keywords and/or initiating a query analysis. In this example, search field 804 includes input query string 806. In various implementations, the personalized analytics system 500 performs a query analysis based on input query string 806 and/or contextual information associated with the current content being rendered and/or output by tablet 800. For instance, input query string 806 requests sales information for a region corresponding to Oregon State. In turn, the personalized analytics system 500 augments the search by using contextual information associated with playlist content 802. In other words, the personalized analytics system 500 identifies that the playlist content corresponds to weekly coffee sales, and augments input query string 806 to search for weekly coffee sales in Oregon, even though input query string 806 does not specify "weekly" or "coffee". This allows the personalized analytics system 500 to provide the user with analytic assistance to acquire additional information not included in the statically bundled content of playlist content 802. While input query string 806 enters text-based input as a way to trigger a query analysis, alternate or additional implementations receive commands and/or queries in alternate formats, examples of which are provided herein. In response to receiving the query, the personalized analytics system 500 triggers a query analysis and/or generates modified content using metadata included with playlist content 802. In one or more implementations, the personalized analytics system 500 generates a suggested query and/or a suggested action as part of the modified content, such as alternate words to include in a query, alternate actions to initiate, etc. For instance, the personalized analytics system 500 can analyze an associated user profile using various machine-learning algorithms to identify queries with positive feedback, actions with positive feedback, preferred actions, associated keywords with a higher probability of success, and so forth, to base a suggested query and/or suggested action on, such as a suggested action to request sales information for a competitor, a suggested action to generate diagnostic information associated with a product, alternate keywords to include, etc.

To demonstrate, consider a scenario in which the personalized analytics system identifies an insight associated with customer purchasing behavior. The insight can be based on any suitable type of data, such as anecdotal data, curated data, data actively being used by the personalized analytics system during, a period of time, data at rest (e.g., data stored in a database), data in motion (e.g., data being collected in real-time), and so forth. The personalized analytics system can derive the insight using any one or combination of these data types. Some implementations alternately or additionally generate a suggested action based on the insight, such as a suggestion to conduct marketing campaigns based on the insight associated with the customer purchasing behavior.

Thus, various implementations of the personalized analytics system provide suggestions to the user, in lieu of, and/or in addition to, insights. This can include suggesting different analyses to run and/or different results to request. In some implementations, the personalized analytics system provides suggestions during output and/or the rendering of a narrated analytics playlist. Alternately or additionally, various implementations provide the suggestions after performing a query analysis (but before generating the narrated analytics playlist), when a user logs into the personalized analytics system 500, etc., in response to identifying a trigger event, etc.

Moving to the lower portion of FIG. 8A, and in response to the input query string, tablet 800 displays modified content 808 that includes audible narration content 810. Here, the audible narration content 810 provides the additional context information of "Stores #22 and #37 together contribute to 8.4% of total sales made by 44 stores in Oregon" to deliver information that explains a context to what the corresponding content indicates. In various implementations, this additional context information corresponds to an insight identified by the personalized analytics system 500.

In the upper portion of FIG. 8A, input query string 806 includes multiple keywords that are used in the query analysis. However, alternate or additional implementations support one-word query analytics as well. To further demonstrate, consider now the upper portion of FIG. 8B in which the personalized analytics system, by way of tablet 800, receives a one-word audible input 812 via microphone 814. In response to receiving the one-word audible input, the personalized analytics system identifies the current content being rendered and/or output by tablet 800 (e.g., modified content 808), and uses this information to add contextual parameters to the input query. Alternately or additionally, the personalized analytics system identifies the previously rendered content (e.g., playlist content 802) to acquire context information and/or add contextual parameters to the user input request. The personalized analytics system then performs a query analysis and/or analyzes the corresponding metadata associated with modified content 808 to generate a response to the input query.

In the lower portion of FIG. 8B, tablet 800 outputs narrative description 816 audibly via speaker 818 that corresponds to a result of the one-word input query. In some implementations, the personalized analytics system generates visual content in response to the one-word input query, such as text content, charts, graphs, videos, etc. Accordingly, various implementations receive a one-word input command, request, and/or query, and gather relevant information to identify insights and/or generate a response to the query. As further described herein, this can include identifying anecdotal data, and applying the anecdotal data in generating the response.

Figure 9:
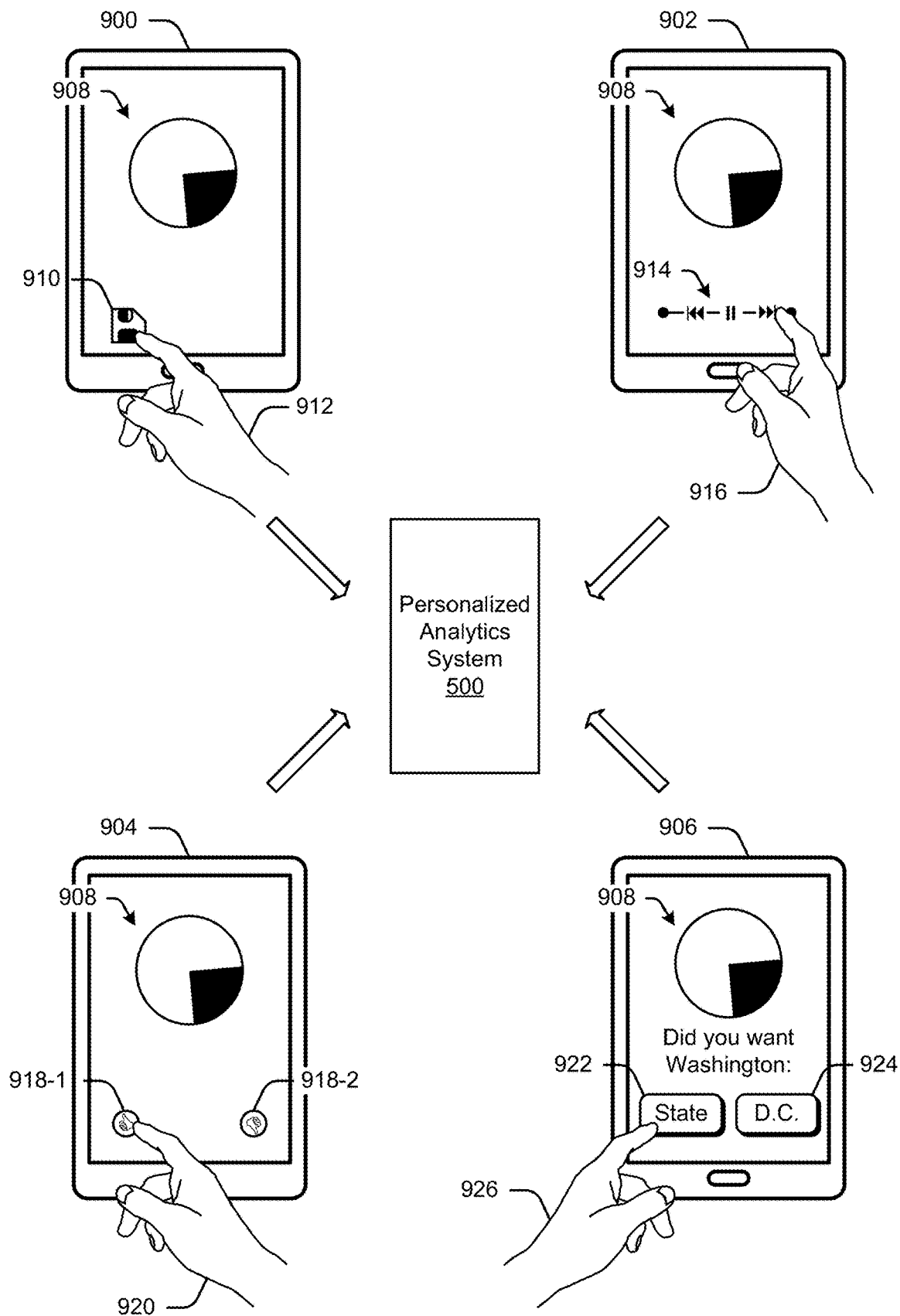
FIG. 9 illustrates an example of capturing usage analytics with respect to a user profile in accordance with one or more implementations.

Now consider FIG. 9 that illustrates examples of capturing and/or generating anecdotal data associated with a user profile and/or workspace in accordance with one or more implementations. In various scenarios, the example described with respect to FIG. 9 can be considered a continuation of one or more examples described with respect to FIGS. 1-8B.

FIG. 9 includes personalized analytics system 500 of FIG. 5 that is generally representative of the personalized analytics system described in FIG. 1, such as servers 102 and/or computing device 104. FIG. 9 also includes tablet 900, tablet 902, tablet 904, and tablet 906 that, similar to home assistant device 502, display device 508, display device 516, mobile device 522, and/or mobile device 530 of FIGS. 5A-5C, are communicatively coupled to, and/or are part of, personalized analytics system 500 as further described herein.

Tablet 900 is currently in a state of rendering and/or outputting playlist content 908, where playlist content 908 represents analytic content generated by the personalized analytics system. The user interface displayed by tablet 900 includes a control 910 that has an associated action corresponding to saving the current content being displayed and/or output. Accordingly, in response to user 912 actuating control 910, the personalized analytics system saves a screenshot of the content being rendered and/or saves a clip of the corresponding audio that is being output (not illustrated here). Various implementations identify the actuation of control 910 as implicit positive feedback, and subsequently determine to capture anecdotal data, such as identifying the content being output and/or marking the content as user-preferred content. This can include identifying a topic associated with the pie-chart as being of interest and/or identifying the pie-chart format as a user-preferred chart type. In turn, the personalized analytics system references the anecdotal data when generating future content, such as determining to render a pie-chart in a future narrated analytics playlist for the user profile associated with user 912.

As another example of capturing anecdotal data, consider now tablet 902 that also is in process of outputting playlist content 908. Here, the user interface of tablet 900 includes playback controls 914 that interface with a playback module to allow input that modifies the rendering and/or playback of playlist content 908, such as pausing the content, rewinding the content, skipping the content, etc. With respect to tablet 902, user 916 actuates a control of playback controls 914 that causes the corresponding playback module to skip outputting the current content. Various implementations of the personalized analytics system interpret this input as implicit negative feedback, and determine to collect context information to generate anecdotal data for the corresponding user profile. Similar to that described with respect to tablet 900, this can include identifying a topic associated with the current topic and/or a displayed format, and determining to avoid these topics and/or formats for a user profile associated with user 916.

While tablet 902 demonstrates an example of personalized analytics system 500 interpreting user interactions as implicit feedback, tablet 904 illustrates an example of explicit feedback. For example, the user interface of tablet 904 includes an explicit positive feedback control 918-1 and an explicit negative feedback control 918-2. Accordingly, user interaction with either controls provides the personalized analytics system with explicit feedback. In response to user 920 actuating explicit positive feedback control 918-1, personalized analytics system 500 identifies corresponding context information, and stores the information as anecdotal data as further described herein.

Various implementations identify user distinctions for ambiguous words as anecdotal data. To further illustrate, consider a scenario illustrated by tablet 906 that is in process of outputting playlist content 908. In this scenario, the personalized analytics system receives an input request for analytic assistance from the personalized analytics system, such as via an input query through a search field similar search field 804 of FIG. 8A (not illustrated here). The input query includes an ambiguous term which the personalized analytics does not have enough data to resolve, such as the term "Washington" that can refer to Washington State or Washington D.C. Various implementations prompt for input corresponding to additional context information and/or clarification, and store the additional information as anecdotal data associated with a corresponding user profile and/or workspace. For instance, the user interface of tablet 906 includes control 922 that corresponds to Washington State, and control 924 that corresponds to Washington D.C. In turn, user 926 actuates control 922 to provide additional context information that is received and stored by the personalized analytics system as anecdotal data.

Figure 10:
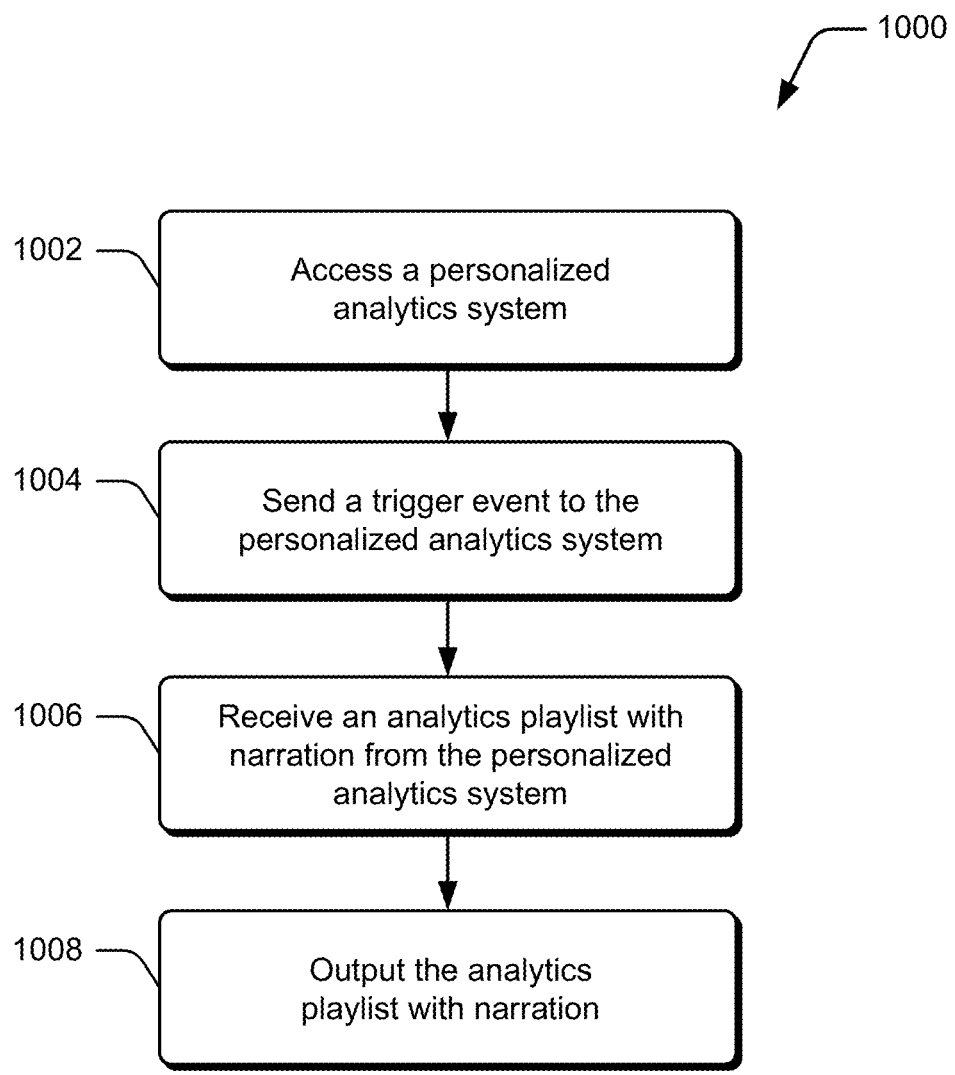
FIG. 10 illustrates a flow diagram of accessing a personalized analytics system to obtain a narrated analytics playlist in accordance with one or more implementations.

Now consider FIG. 10 that illustrates an example method 1000 that can be utilized to obtain narrated analytics playlists in accordance with one or more implementations. The method can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1, such as various modules included in personalized analytics module 106 and/or client analytics module 108. While the method described in FIG. 10 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 1002, various implementations access a personalized analytics system. For example, a client device that includes a client application of the personalized analytics system (e.g., client analytics module 108) and/or a browser can access a server application of the personalized analytics system. This can include logging on to a particular workspace associated with the personalized analytics system, such as through the use of various types of authentication procedures. Thus, accessing the personalized analytics system can include logging onto a locally executing application and/or accessing remote applications a further described herein. Any suitable type of client device can be utilized, examples of which are provided herein.

In response to accessing the personalized analytics system, various implementations send a trigger event to the personalized analytics system at 1004, where the trigger event is associated with initiating, invoking, and/or performing a query analysis, such as a query analysis performed by any combination of parser module 112, query magnifier module 114, and/or insight engine module 116. Various implementations display a control explicitly assigned to triggering a query analysis, such as a search box, a scheduler application, an analytic assistance control, etc. Alternately or additionally, various implementations display controls that, when actuated, are implicitly interpreted as a command to initiate, invoke, and/or perform a query analysis. In some implementations, the trigger event includes an input query string that is used as a basis for the query analysis, such as a search query entered into a search box. Alternately or additionally, the input query string used for the query analysis is automatically generated by the personalized analytics system, such as through the use of anecdotal data, contextual information, etc. One or more implementations process audible input to identify keywords associated with triggering a query analysis and, in response to identifying the keywords, send a trigger event to the personalized analytics system.

At 1006, one or more implementations receive a narrated analytics playlist from the personalized analytics system, where the analytics playlist includes one or more insights generated by the personalized analytics system. As one non-limiting example, client analytics module 108 of FIG. 1 can receive the narrated analytics playlist from personalized analytics module 106 over communication cloud 128. Various implementations base the insights off of the trigger event, information included in the trigger event, derived contextual information, etc. A narrated analytics playlist can include data in any suitable format, such as an audio clip, a video clip, a slideshow, metadata, addressing information, user profile identification information, etc. Various implementations statically bundle the content included in a narrated analytics playlist, including information that can be utilized to dynamically generate supplemental information as further described herein.

At 1008, one or more implementations output the narrated analytics playlist effective to output images and audio, such as through the use of playback module 132 and/or user interface module 130 of FIG. 1. Some implementations utilize a playback engine associated with the personalized analytics system such that the playback engine captures anecdotal data about user interactions with the output content. The playback engine can represent any type of playback module, such as playback module 132 of FIG. 1, playback module 1120 of FIG. 11, and/or playback module 1800 of FIG. 18. In turn, the playback engine stores the anecdotal data within the personalized analytics system for future use. As further described herein, some implementations provide analytic assistance while outputting narrated analytics playlist content, and interrupt the playback of the narrated analytics playlist content to instead output the dynamically generated insights and/or responses. As one example, the personalized analytics system can access the metadata statically bundled with the narrated analytics playlist to dynamically generate drill-up and/or drill-down content.

Having described various aspects of narrated analytics playlists, consider now a discussion of data acquisition and analysis in accordance with one or more implementations.

Data Acquisition and Analysis

Various implementations generate narrated analytics playlists by curating data and analyzing the curated data in various ways to identify insights that are relevant to a particular user profile and/or workspace. In a statistical context, incorporating more curated data, as well as anecdotal data, into the analysis increases the probability of identifying relevant and accurate insights pertaining to the user profile. However, using more data to generate analytical reports adds complexity to the analysis process, such as impacting how large volumes of data are acquired, sorted, classified, tagged, accessed, and so forth. To illustrate, acquiring, sorting, classifying, and analyzing two pieces of information utilizes less organization and effort relative to two-hundred thousand pieces of information. Further, these various steps in the analysis process factor-ally increase when the attributes of each piece increase in number as well. This additionally makes manually processing the data difficult and/or infeasible.

Various implementations employ a personalized analytics system to process, sort, classify, and/or analyze various types of data as further described herein. In turn, the personalized analytics system improves the way a corresponding computing device functions by at least improving search times and reducing memory space needs relative to past systems. For example, the data curation process can consolidate curated data using a data structure that has been designed to optimally store the data (e.g., minimal space requirements) and provide quick access to data retrieval processes (e.g., improved cross-referencing, tag keywords, relational models, etc.). As another example, the use of machine-learning technologies to analyze and identify how data is curated, to identify insights, and/or to augment the insights can enhance the speed at with these various processes are performed.

Figure 11:
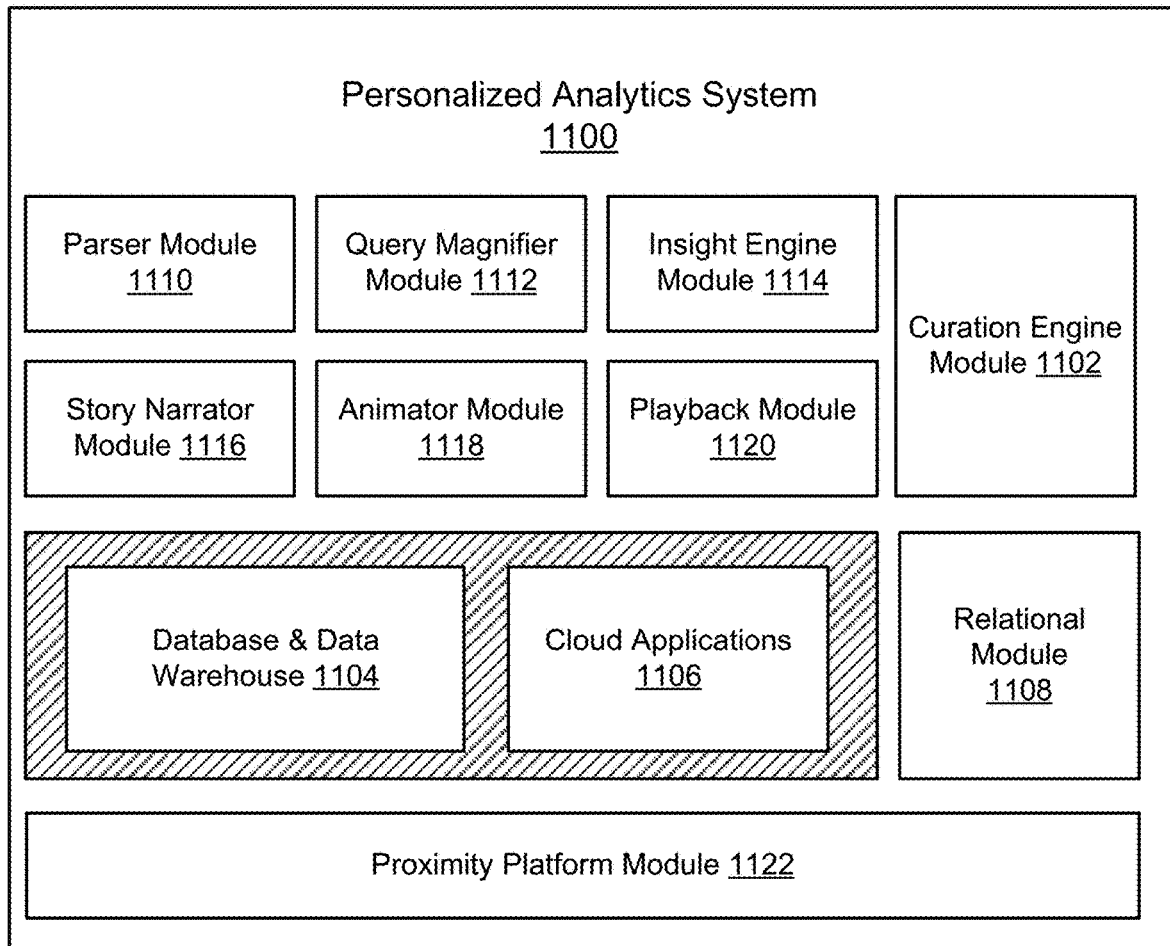
FIG. 11 illustrates an example personalized analytics system in accordance with one or more implementations.

To demonstrate, consider FIG. 11 that illustrates an example block diagram that can be utilized to generate narrated analytics playlists in accordance with one or more implementations. In various scenarios, the example described with respect to FIG. 11 can be considered a continuation of one or more examples described with respect to FIGS. 1-10.

FIG. 11 includes a personalized analytics system 1100 that can be implemented using various combinations of computing devices and/or modules, such as varying combinations of servers 102, computing device 104 of FIG. 1. The personalized analytics system 1100 includes curation engine module 1102 that generally scans data sources, such as database and data warehouses 1104 and/or cloud applications 1106, to identify source data that is subsequently curated and/or enriched by the curation engine module 1102 data as it is populated into the personalized analytics system. Any suitable type of database, data warehouse, and/or cloud application can be accessed and/or scanned for data, such as Structured Query Language (SQL) databases, enterprise data warehouses, data marts, Software-As-A-Service (SaaS) based applications, Google™ Cloud SQL databases, Amazon RedShift, Snowflake, Microsoft™ SQL database, Sage Inacct™ Netsuite™, Salesforce etc. Curation engine module 1102 can scan databases in real-time, such as in response to a query and/or trigger event, can perform scans at scheduled intervals, can perform scans offline during idle periods when no user interaction with the system is detected, etc.

In response to acquiring the source data, the curation engine module 1102 analyzes the source data to identify characteristics and/or attributes that are then added to the source data to generate curated data. Any type of characteristic and/or attribute can be identified, such as location information, organization information, product information, cross-references to other data, lifespan of the source data, categorization of the source data, updates to the source data, annotations associated with the source data, identifying whether the source data is obsolete, relationship to other source data, and so forth. In other words, the curation engine module 1102 accesses and scans various data sources for data, analyzes the data to identify various characteristics about the data, and then curates and/or augments the data with the identified characteristics, such as by updating metadata associated with the source data. Curating the source data can alternately or additionally include identifying data relationship models, drill path information, periodically updating the curated data, etc.

In various implementations, curation engine module 1102 applies and/or utilizes user-defined rules, such as rules that prioritize database access, rules that prioritize what data to update more frequently relative to other data, etc. For instance, a user can create a workspace associated with the personalized analytics system such that the user assigns each workspace to a particular database and/or data source. This directs the curation engine module 1102 to curate data from the identified data source. Alternately or additionally, the user can assign a collection of particular databases and/or data sources to the workspace. As yet another example, a user can assign a login name and password to the workspace to secure and/or restrict access to curated data so that only authorized users with valid user credentials can access to the curated data.

Some implementations of the curation engine module 1102 identify and/or generate inter-data relationship information, and store this information in relational module 1108. Alternately or additionally, relational module 1108 represents data relationships identified by the curation engine module that are used to form data structures within a corresponding database. In one or more implementations, curation engine module 1102 automatically triggers the data curation process without receiving explicit input associated with initiating the process, but alternate or additional implementations trigger the data curation process in response to receiving explicit input to initiate data curation. Access to the curated data can be restricted and/or limited to a single user profile and/or workspace, and/or can be distributed across multiple user profiles and/or workspaces, such as user profiles and/or workspaces associated with a same organization. This allows the curated data and/or analytics generated for a first user in the organization to be leveraged for analytics associated with a second user of the organization, thus improving the efficiency of the personalized analytics system across the organization since the information is shared, rather than repeatedly generated for each user profile.

Personalized analytics system 1100 also includes parser module 1110 and query magnifier module 1112 to analyze input query strings, and identify various permutations of the input query to use in extracting information from the curated data. For instance, parser module 1110 can parse input query strings into individual tokens and/or units, where the analyzed input query string originates from any suitable source, such as curation engine module 1102, user-defined schedules, event-based triggers, feedback loops from other modules included in the personalized analytics system, etc. Thus, parsing an input query string can be done in real-time based on receiving an explicit user-input query, based on receiving a trigger event, based on scheduled query interval(s), based on determining the personalized analytics system 1100 is idle (e.g., a lack of user interaction with the personalized analytics system), etc. In response to parsing the input query string into individual tokens, various implementations of the parser module further analyze the individual tokens to identify keywords, context information, etc.

Query magnifier module 1112 receives a canonical query from parser module 1110, such as the identified keywords, context information, etc., and determines whether to add additional constraints and/or contextual information to the query, such as time ranges, location information, etc. Alternately or additionally, query magnifier module 1112 identifies additional attributes associated with the canonical query, a corresponding relevance of the additional attributes, and whether to generate variations of the query using the additional attributes. In various implementations, query magnifier module 1112 accesses anecdotal data to augment the query, such as a last known query time that can influence time constraints, a user role, a user job position, a user group, past user query history, a device being used to access the personalized analytics system, a location of the user, a business department associated with the user, a language associated with the user, an organizational vocabulary, and so forth. Query magnifier module 1112 can generate queries that are likely to be of interest to the user based upon the distributed knowledge. Thus, various implementations generate new queries, where the new queries are configured to identify new and related subject matter, remove biases from the extracted information, identify efficient database query mechanisms, etc.

The newly generated queries and/or the original input query are then used by insight engine module 1114 to extract information from the curated data. Insight engine module 1114 analyzes the extracted information to identify one or more insights, such as by applying various machine-learning algorithms to the extracted information. An insight can include any suitable type of information, such as a trend, a pattern, an anomaly, an outlier, predictive behavior, a contradiction, connections, benchmarks, market segments, etc. Accordingly, an insight sometimes corresponds to an actionable finding that is based upon data analysis. For example, a rate of growth in sales for a product corresponds to a factual insight that a user can base future actions off of, such as a low rate of growth indicating a change is needed, a high rate of growth indicating that current solutions are working, and so forth. Insight engine module 1114 can apply any suitable type of machine-learning model and/or algorithm to discover an insight, such as cluster analysis algorithms, association rule learning, anomaly detection algorithms, regression analysis algorithms, classification algorithms, summarization algorithms, deep learning algorithms, ensemble algorithms, Neural Network based algorithms, regularization algorithms, rule system algorithms, regression algorithms, Bayesian algorithms, decision tree algorithms, dimensionality reduction algorithms, Instance based algorithms, clustering algorithms, K-nearest neighbors algorithms, gradient descent algorithms, linear discriminant analysis, classification and regression trees, learning vector quantization, supporting vector machines, Bagged Decision Trees and Random Forest algorithms, boosting, etc. While the various algorithms described here are described in the context of being utilized to generate insights by the insight engine module 1114, it is to be appreciated that these algorithms can alternately or additionally be employed in other modules of the personalized analytics system 1100, such as a curation engine module 1102, a parser module 1110, query magnifier module 1112, a story narrator module 1116, an animator module 1118, and so forth.

The insight engine module outputs the insights and/or any corresponding context information into a consumable format, such as a text-based form, metadata, mathematical formats, markup language, etc. In one or more implementations, insight engine module 1114 formats insights and/or contextual information as a story plot to provide a basis and/or outline for a narrated analytics playlist.

Personalized analytics system 1100 also includes story narrator module 1116 and animator module 1118 to generate a narrated analytic playlist from the identified insights. Story narrator module 1116 receives the output generated by the insight engine module 1114, and determines how to articulate, explain, and/or augment a corresponding description of the output. To illustrate, consider a scenario in which story narrator module 1116 receives, from the insight engine module, an insight that corresponds to a graph and/or data corresponding to a sales trend for a product in a particular state. In response to receiving this input, the story narrator module determines to generate a graph to visually display this information. Alternately or additionally, the story narrator module determines that supplemental information, such as sales trends for the product in neighboring states, could augment, explain, or further clarify a context associated with the sales trend in the particular state. Accordingly, in some implementations, the story narrator module includes a feedback loop to parser module 1110, query magnifier module 1112, and/or insight engine module 1114 to request additional insight information and/or request a query analysis be performed for the supplemental information. In various implementations, the story narrator module 1116 bundles and forwards information to the animator module to indicate what visual and/or audible information to include in the narrated analytics playlist. For example, the story narrator module 1116 can include charts, facts, text-based descriptive narratives, metadata, and other information corresponding to the insights, in the bundled information.

Animator module 1118 receives the bundled information, and uses the bundled information to generate audio and/or video outputs that are consumable by a playback engine, such as a narrated analytics playlist that is consumable by playback module 1120. Various implementations alternately or additionally base the narrated analytics playlist on predefined design themes, branding themes, etc. as further described herein.

Various implementations of the personalized analytics system include a playback module 1120 to output the narrated analytics playlist. In various implementations, the playback module receives a statically bundled analytics playlist from the animator module, and renders the content as output, such as by displaying images and/or outputting audible sound. Playback module 1120 can alternately or additionally include anecdotal learning functionality that tracks and learns user preferences based on user interactions, examples of which are provided herein.

The personalized analytics system 1100 also includes proximity platform module 1122. As further described herein, various modules included in the personalized analytics system incorporate machine-learning algorithms, modules, and/or models to aid in curating and/or analyzing data. Accordingly, as the machine-learning algorithms evolve, the corresponding output becomes more personalized, more relevant, and more accurate for the corresponding user profiles and/or workspaces relative to unevolved algorithms. Proximity platform module 1122 acquires the learned information and/or the evolved algorithm parameters without having visibility into the curated data and/or queries used to generate the learned information. To illustrate, consider a scenario in which a first organization has sensitive sales growth charts that plot an organization product against a competitor's product. In generating this sales growth chart, the personalized analytics system modifies various configurable parameters of a machine-learning algorithm. Proximity platform module 1122 extracts changes to the parameters and/or the absolute values of the changed parameters without visibility into the curated data and/or query analyses used to evolve the algorithm. The proximity platform can then propagate these changed parameters to a second organization or the third organization to improve how analytic playlists are generated for these organizations without exposing the first company's sensitive information. Any suitable type of parameter can be extracted and propagated by the proximity platform, such as weights used in an artificial neural network, support vectors in a support vector machine, coefficients in a linear regression or logistic regression algorithm, an assumed distribution used in a statistical analysis (e.g., Gaussian distribution, binomial distribution, degenerate distribution, etc.), and so forth. Thus, aspects of the personalized analytics system improve the performance of various devices through the distribution of these parameters without exposing or compromising the data used to generate the parameters. This can include distributing the parameters to devices that are registered to different organizations as further described herein.

Figure 12:
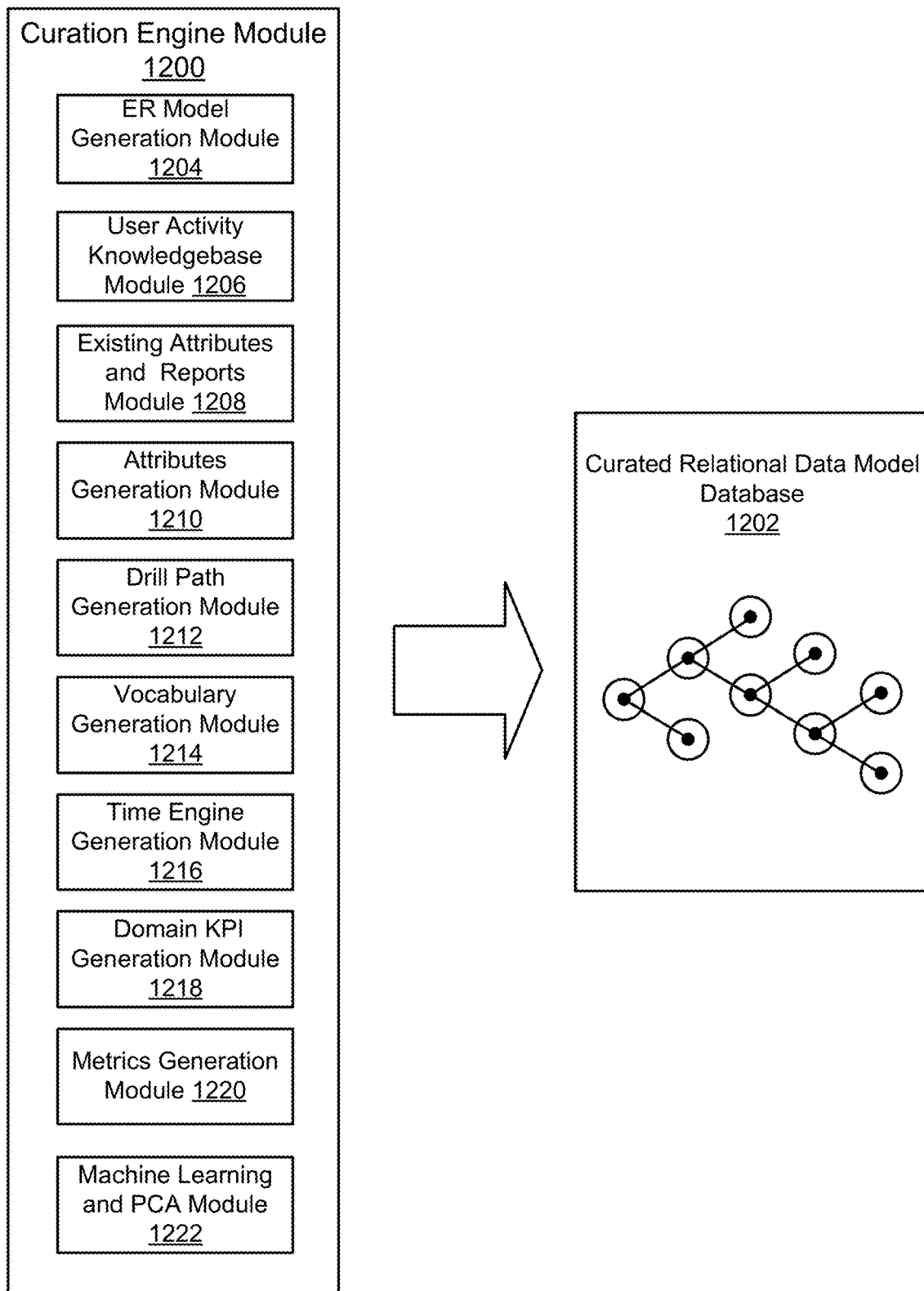
FIG. 12 illustrates an example curation engine module in accordance with one or more implementations.

Now consider FIG. 12 that illustrates a more detailed example of a curation engine module in accordance with one or more implementations. In various scenarios, the example described with respect to FIG. 12 can be considered a continuation of one or more examples described with respect to FIGS. 1-11.

FIG. 12 includes an example curation engine module 1200 that generally scans data sources to acquire and populate basic metadata about the data. This can include identifying attributes of the data and populating the metadata with the attributes. In various scenarios, curation engine module 1200 is representative of curation engine module 110 of FIG. 1 and/or curation engine module 1102 of FIG. 11. Some implementations of the curation engine module programmatically access databases, such as via an SQL interface of a database, to scan and/or analyze data to curate. The curation engine module uses the analysis to identify various attributes of the data and populate metadata with the identified attributes. In some implementations, the curation engine module identifies primary attributes associated with the data, and then identifies secondary attributes related to the primary attributes. In turn, the curation engine module updates the corresponding metadata. The curation of data and/or what data is accessible to a particular user profile and/or workspace can be based off of any suitable type of characteristic, such as characteristics associated with a particular user profile and/or organization profile, what type of software has been deployed to the particular user profile, what software features of the personalized analytics system are available to the particular user profile, what software version has been deployed, what machine-learning modules are available, etc. Thus, the curation engine module may not provide a particular user profile and/or workspace with access to all of the curated data, depending upon what level of access the user profile has been assigned.

In one or more implementations, the curation engine module 1200 bases the curation of data on a corresponding workspace associated with the particular user. As further described herein, a user can create one or more workspaces that define data source address(es) to include, database name(s), security authentication parameters for access to the workspace, read only and/or write permissions, and so forth. In various scenarios the curation engine module bases data curation on the user-defined parameters for a particular workspace. Alternately or additionally, curation engine module accesses anecdotal data associated with the workspace to influence and/or weigh what attributes of the curated data are added to the corresponding metadata. In various implementations, the curation engine module identifies related attributes of the user-defined parameters and/or anecdotal data to influence how data is curated and/or what attributes are added to the metadata in the curation process.

Curation engine module 1200 curates and adds attribute information to metadata associated with the data. In one or more implementation, the curated attributes include usage-based information, such as context information associated with input interactions, business domain information, component rankings, metric-based usage rankings (e.g., clickstream analysis, scored queries, playback rankings, etc.), knowledge graph attributes, and so forth. Alternately or additionally, the curated attributes include dictionary-based information (e.g., alternates words, synonyms, hyponyms, alternate industry words, verbiage preferences, etc.), access restrictions, data inferences (e.g., a data quality rankings, such as by applying various algorithms that determine how reliable the associated data is, an accuracy of the data determined through a verification process, a relevancy of the data relative to a particular keyword, an interpretability ranking of the data, how flexible the data is relative to a consistent taxonomy associated with context for the data, etc.), indications of whether the data is internal or external to an organization, whether the data type is commonly used, whether the data information has a common name, etc. In turn, curation engine module 1200 analyzes the curated data and/or attributes to determine and output relational data models. This can include applying machine-learning algorithms to the curated data and/or attributes to generate the relational data models stored via curated relational data model database 1202.

Curated relational data model database 1202 represents a database that includes the data relational models generated by curation engine module 1200. Generally, data relational models correspond to logical representations of information generated by assigning one or more attributes to data as further described herein. For example, a first data point can be assigned an attribute of being a parent data source, while a second data point is assigned an attribute of being a child data point of the first data point. While described here in the context of a parent/child relationship between data points, it is to be appreciated that this is merely for discussion purposes, and alternate types of relationship attributes can be modeled and/or identified. The data relational models alternately or additionally assign data types to the data. In some scenarios, curated relational data model database 1202 describes the relationships between data through the use of tables and/or data structures, where the format of the tables and/or structures describe relational information. Alternately or additionally, curated relational data model database 1202 stores the schema of the relational data model that is followed when storing curated data into a database. Other entities can then programmatically extract the relationship information from curated relational data model database 1202 through the use of one or more database interfaces, such as SQL interfaces, and a corresponding query. To identify and assign the attributes used in the curated relational data model database, curation engine module 1200 utilizes multiple types of processing and/or information.

Curation engine module includes an entity-relationship (ER) model generation module 1204 that identifies a domain or topic of interest, and then specifies a relationship model for the domain or topic. For instance, the ER model generation module 1204 can specify the relationships between different data types associated with a corporation, such as employee data types, employee attributes, customer data types, customer attributes, vendor data types, vendor attributes, etc. In various implementations, the ER model generation module 1204 uses a schema to describe the model, such as by using the schema to identify associations and dependencies between entities, where an entity can correspond to a physical object (e.g., a product), an event (e.g., a sale or service), a concept (e.g., a transaction or order), and so forth. In various implementations, the schema assigns attributes to data associations and/or entities. To illustrate, the schema can be used to assign an employee number attribute to an employee entity, a data attribute to a product sales entity, and so forth. While described here in the context of a schema, it is to be appreciated that ER models can be defined using any type of diagramming techniques and/or schemas, such as Bachman notation, Barker's notation, Unified Modeling Language (UML), Object-role modeling (ORM), Extensible Markup Language (XML) schema, etc. The relationship model generated by the ER model generation module 1204 is then used as a basis for defining a data structure for storing data in a corresponding database, such as curated relational data model database 1202.

Curation engine module 1200 also includes a user activity knowledgebase module 1206 to provide contextual information that is used in data curation as further described herein. The user activity knowledgebase includes anecdotal data associated with a particular user profile, workspace, organization profile, and so forth. While the user activity knowledgebase is illustrated here as residing within the curation engine module, it is to be appreciated that the information included in the knowledgebase can originate from any suitable data source. As one example, the user anecdotal data collected with respect to FIG. 9 can be included in user activity knowledgebase module 1206.

The curation engine module 1200 also utilizes existing attributes and reports module 1208 to identify attributes and/or build curated data. For example, the curation engine module 1200 can access existing reports, existing dashboard information, and/or existing databases to augment the existing metadata and/or create new attributes, new metadata, etc. Alternately or additionally, the curation engine module 1200 uses the existing attributes and/or reports to influence what attributes and/or reports are generated by future query analyses.

The curation engine module 1200 creates attributes for the curated data via attribute generation module 1210. In one example, the curation engine module uses ER models generated by ER model generation module 1204 to determine what attributes to identify for the data being curated and/or analyzed, and then updates the metadata with the identified attributes. Alternately or additionally, the curation engine module creates drill-up paths and/or drill-down paths via the drill path generation module 1212. To generate drill path information, various implementations identify a particular object, and use the relationship data, such as those defined by the ER model generation module 1204, to determine drill-up and/or drill-down paths. As an example, drill paths can include a breakdown of a particular attribute associated with an entity, such as a geography-based breakdown. Various implementations update the corresponding metadata to reflect the identified drill path information.

Curation engine module 1200 also includes vocabulary generation module 1214 that determines alternate wording options for the data and/or information being curated. For example, various natural language processing algorithms and/or models can be employed to identify similar wording, such as sematic matching algorithms, approximate string matching, text classifier algorithms, word2vec algorithms, latent semantic analysis, clustering algorithms, bag-of-words models, document-term matrices, automatic summarization algorithms, tagging operations, etc. Curation engine module 1200 applies the alternate wordings in the curation process as a way to identify similar data and/or entities, and then adds the information generated using the alternate wordings into the various facets of curating data. As one example, a company entitled "My Big Company" can alternately be referred to as "MBG", "My Big Co.", "Big Co.", and so forth. Vocabulary generation module 1214 discerns when information with alternate naming conventions apply to a same entity, and builds corresponding attributes and/or relationship information to combine and/or associate the information from different sources of information to a same data point and/or entity, thus further enriching the information about that entity.

In various implementations, curation engine module 1200 includes a time engine generation module 1216 that identifies and/or curates information about the data over time spans. Consider a scenario in which the curation process identifies a sales metric for a particular product. Time engine generation module 1216 augments and/or enhances the sales metric to provide more particular information about the sales metric over a span of time, such as day-to-day sales metrics over a month, a running average over a year, monthly sales metrics, etc.

The curation engine module 1200 also generates Key Performance Indicators (KPIs) through the use of domain KPI generation module 1218. Generally, a KPI denotes a performance measurement associated with a particular activity or scope (e.g., an organization, a product, a person, etc.). A KPI can correspond to any suitable type of performance metric, such as an attrition rate, a turnover rate, a quality rate, a cycle time ratio, a utilization rate, a mean time between product failures, an average time to product delivery, a cost savings metric, employee performance indicators, etc. Various implementations of the domain KPI generation module 1218 utilize user profile information to generate the performance indicators. Consider the scenario in which a user logs into a particular workspace. The particular workspace can store anecdotal information, such as domain information (e.g., organization, customer base, product focus, job title, etc.) that is then used by the domain KPI generation module to predict what business metrics may be request from that particular workspace. In turn, KPI generation module 1218 produces business metrics based upon anticipating what information is relevant to the user and/or in response to the user manually requesting the metrics. Accordingly, domain KPI generation module 1218 can include any suitable type of algorithm to generate the KPIs, such as cash flow KPIs, churn KPIs, Human Resources KPIs, benefits KPIs, project value KPIs, healthcare KPIs, etc.

Curation engine module 1200 alternately or additionally includes metrics generation module 1220 to generate other types of statistics and/or metrics not generated via domain KPI generation module 1218. Similar to domain KPI generation module 1218, metrics generation module 1220 can include any suitable number of algorithms, each of which are used to generate a corresponding metric, such as average, sum, derivatives, log percentile, ratios, and so forth. These metrics and/or statistics can be domain-specific, domain-independent, user-specific, user-independent, and so forth. In various implementations, domain KPI generation module 1218 and metrics generation module 1220 exchange information to generate a resultant metric. For instance, domain KPI generation module 1218 can request average sum information from metrics generation module 1220.

Normalizing data that is stored in a database helps remove biases and/or undesired characteristics that potentially reduce the integrity and/or quality of data stored in a database. Accordingly, curation engine module 1200 includes machine-learning (ML) and principle-component analysis (PCA) module 1222 to normalize the curated data being stored in curated relational data model database 1202. This can include identifying and removing anomalies, removing redundant data, simplifying data mapping, validating data dependencies, etc. Various implementations restructure the data stored in curated relational data model database 1202 based upon the normalization process. ML and PCA module 1222 include various statistical procedures and/or machine-learning algorithms that can be used to organize the curated data as it is stored in curated relational data model database 1202. This can include algorithms that apply First Normal Form (1NF) Rules, Second Normal Form (2NF) Rules, Third Normal Form (3NF) Rules, Boyce-Codd Normal Form (BCNF) Rules, and so forth.

Each module described with respect to curation engine module 1200 can be implemented in any suitable manner, such as through any combination of software, hardware, and/or firmware. This can include storage memory devices that store data, storage memory devices that store processor-executable instructions, and/or various types of hardware processing systems as further described herein. Further, each of the modules illustrated as residing within the curation engine module can be implemented collectively on a single device and/or in a distributed manner across multiple devices. To demonstrate, various implementations can utilize any suitable combination of servers 102 and/or computing device 104 of FIG. 1.

Figure 13:
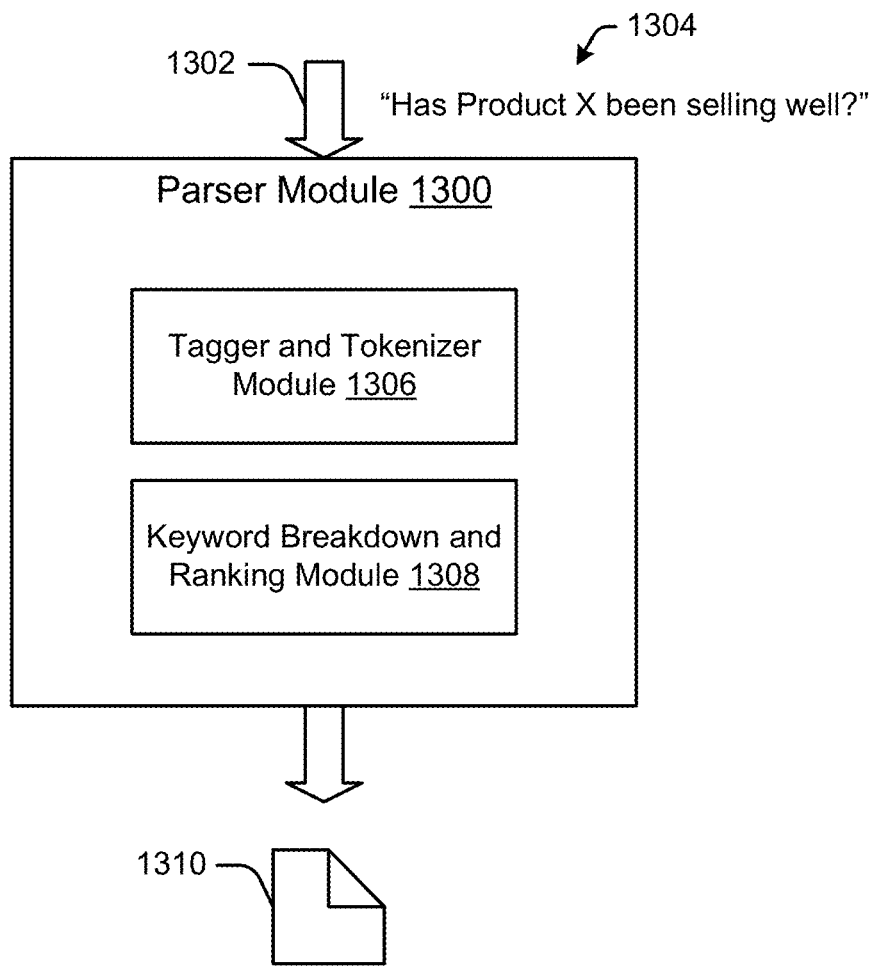
FIG. 13 illustrates an example parser module in accordance with one or more implementations.

Various implementations trigger various query analyses on the curated data generated by curation engine module 1200. FIG. 13 illustrates a more detailed example of a parser module 1300 that can receive an input query associated with a trigger event, and analyze the input query in order to initiate the analysis process. In various scenarios, the example described with respect to FIG. 13 can be considered a continuation of one or more examples described with respect to FIGS. 1-12. Thus, in some implementations, parser module 1300 is representative of parser module 112 of FIG. 1 and/or parser module 1110 of FIG. 11.

As further described herein, a personalized analytics system determines insights that are relevant to a particular user profile, workspace, and/or organization profile using curated data to generate a narrated analytics playlist relevant to a particular user profile. In some scenarios, an input query triggers the analysis process. In FIG. 13, trigger event 1302 corresponds to any suitable type of trigger event that triggers a query analysis, examples of which are provided herein. Here, trigger event 1302 includes an input query string 1304 that forms a basis for the subsequent analysis process.

Various implementations parse input query string 1304 into individual tokens and/or units via tagger and tokenizer module 1306. Accordingly, tagger and tokenizer module 1306 includes language processing algorithms to analyze a sequence of characters included in input query string 1304, to identify a grouping of characters as words, separators, commands, and so forth. To demonstrate, input query string 1304 as illustrated in FIG. 13 includes the string of characters "Has Product X been selling well?" Tagger and tokenizer module 1306 scans the string of characters to identify and classify each word, such as "Product" as a word, "selling" as an action word, etc.

Parser module 1300 also includes keyword breakdown and ranking module 1308 that receives the output of word identification and classification from tagger and tokenizer module 1306, and identifies keywords and/or contextual information to determine relevant words to base a search analysis off of. This can include using natural language processing (NLP) algorithms, word2vec algorithms, and so forth. Determining relevant keywords sometimes involves ranking identified words, and/or access ranking information generated by the curation engine, to determine whether the identified keywords are statistically likely to return successful results (e.g., results and/or words that fall within a predefined threshold associated with returning successful results). In response to identifying keywords that are statistically likely to return successful results, the keyword breakdown and ranking module 1308 assigns these words as ones to use in a query analysis. In response to identifying keywords with low success rates (e.g., a success rate that falls below a predefined threshold), the keyword breakdown and ranking module 1308 tags those keywords as candidates for replacement and/or replaces the keywords with similar words and/or phrases that have a higher success rate. Accordingly, in various implementations, keyword breakdown and ranking module 1308 generates a modified input query that includes the replacement words and/or generates additional queries relative to input query string 1304 with the replacement words. These modified input queries and/or newly generated queries are then passed to a query magnifier to augment and/or enrich the queries.

In one or more implementations, the modified input and/or newly generated queries are formatted as canonical queries that include identifying information about the input query, illustrated here as canonical query 1310. For example, using a markup language, the canonical query can include tags that identify keywords, sorted parameters, actions, timestamps, authentication tokens, etc. Thus, canonical query 1310 is representative of any suitable type of data that can be used to convey a canonical query, and can include additional information generated by the tagger and tokenizer module 1306 and/or keyword breakdown and ranking module 1308. While FIG. 13 illustrates a single canonical query output, it is to be appreciated that this is for discussion purposes, and that a parser module can generate any suitable number of canonical queries without departing from the scope of the claimed subject matter.

Figure 14:
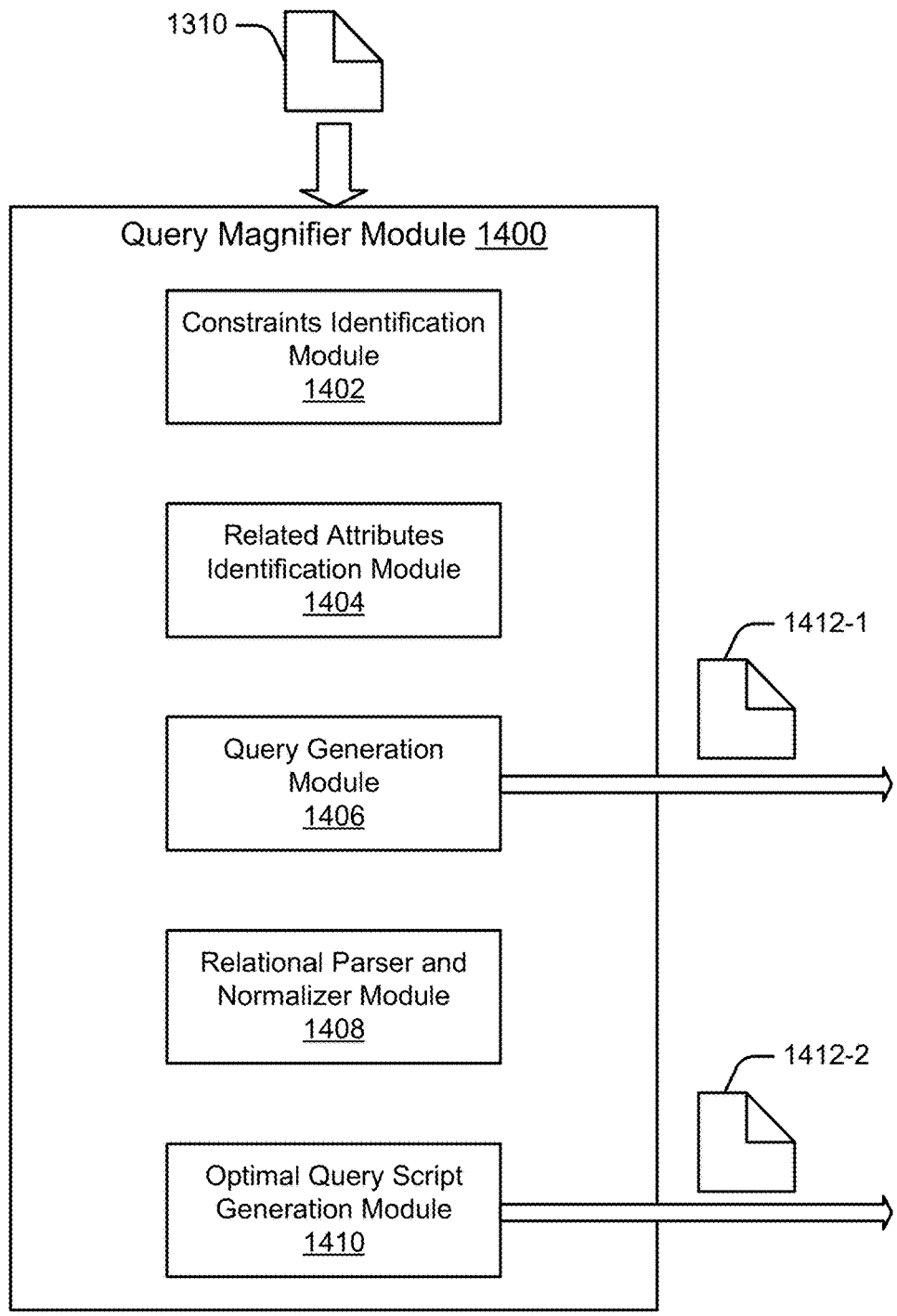
FIG. 14 illustrates an example query magnifier module in accordance with one or more implementations.

Now consider FIG. 14 that illustrates an example query magnifier module 1400 that is in accordance with one or more implementations. In various scenarios, the example described with respect to FIG. 14 can be considered a continuation of one or more examples described with respect to FIGS. 1-13. Thus, in some implementations, query magnifier module 1400 is representative of query magnifier module 114 of FIG. 1 and/or query magnifier module 1112 of FIG. 11.

Query magnifier module 1400 receives canonical query 1310 from FIG. 13 as an input, and augments the query based upon various analyses. Various implementations identify how to augment and/or add contextual parameters the query using constraints identification module 1402, related attributes identification module 1404, query generation module 1406, relational parser and normalizer module 1408, and/or optimal query script generation module 1410. While augmenting the query can include adding search constraints, user preferences, contextual parameters, alternate keywords, etc., various implementations augment the query by identifying and/or generating commands that efficiently extract information from the curated data.

Constraints identification module 1402 analyzes the canonical query to determine whether contextual information is missing from the query, examples of which are provided herein. Alternately or additionally, constraints identification module 1402 identifies new constraints to add to the query. For instance, if canonical query 1310 includes a time constraint, such as "sales over the last month", various implementations of the constraints identification module add shorter and longer time constraints to generate additional information, such as a week time constraint, a yearly time constraint, etc. The identification of additional and/or new constraints can sometimes be based off of anecdotal data, such as timeframes most often requested from a particular user profile, competitor products most often requested by the particular user profile, etc. These additions and/or modifications are then used to generate additional information. In a similar manner, related attributes identification module 1404 identifies existing attributes corresponding to the canonical query, and extrapolates the attributes to related variations, such as adding additional product categories to the input search, additional state attributes, etc. In some implementations, constraints identification module 1402 identifies subject matter that is accessible and/or inaccessible to the user profile, such as through the use of access control inclusion rules and/or access control exclusion rules, that define what a particular user profile and/or workspace can and cannot have access to in the curated data, and governs the extraction of curated data accordingly, such as by modifying search query input keywords, modifying programmatic access to sections of a database, etc.

Canonical query 1310, as well as the keyword identifications, keyword rankings, identified constraints, and/or the identified related attributes, are then fed into query generation module 1406. In turn, query generation module 1406 generates variations of each query that are then used to extract information from the curated data. These variations can be passed into the insight engine, generally indicated here as query 1412-1. Alternately or additionally, the variations are passed into relational parser and normalizer module 1408 to remove biases that may negatively impact the quality of results. The normalized queries can alternately or additionally be passed into optimal query script generator module 1410 to identify efficient database query mechanisms, such as by removing repetitive database access commands, consolidating data extraction, etc. In turn, the queries generated by optimal query script generation module 1410, generally indicated here as query 1412-2, can alternately or additionally be passed to the insight engine module for extracting information from the curated data.

Parser module 1300 and query magnifier module 1400 work in concert to generate queries that can be used to identify queries that efficiently and accurately extract curated data for insight generation, such as by identifying alternate wording with higher success rates, identifying related subject matter, and so forth. In implementations, the querying processing can be adaptive to optimize the runtime conditions of applications executing as part of a workload layer of cloud-based service. According, in various implementations, query processing operations associated with parser module 1300 and/or query magnifier module 1400 can employ batch mode adaptive joining techniques (e.g., generating execution plans for one or more specific queries) and select a plan estimated to use the lowest processing cost and memory grant feedback (e.g., a minimum memory required by the system to execute particular querying operations and/or other workload operations). In turn, this improves the efficiency of the personalized analytics system and/or the computing devices that are used to implement the personalized analytics system.

Figure 15:
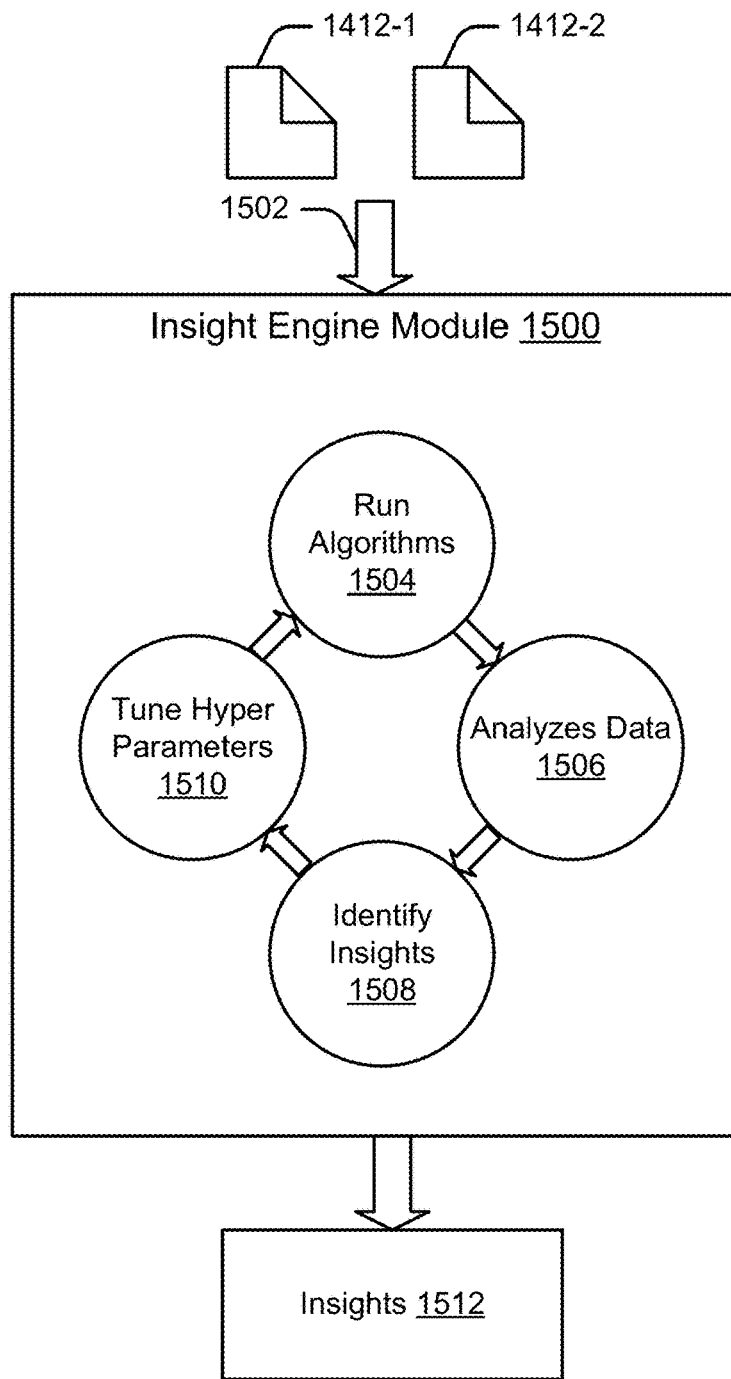
FIG. 15 illustrates an example insight engine module in accordance with one or more implementations.

Now consider FIG. 15 that illustrates an example insight engine module 1500 that is in accordance with one or more implementations. In various scenarios, the example described with respect to FIG. 15 can be considered a continuation of one or more examples described with respect to FIGS. 1-14. Thus, in some implementations, insight engine module 1500 is representative of insight engine module 116 of FIG. 1 and/or insight engine module 1114 of FIG. 11.

Insight engine module 1500 receives query 1412-1 and/or query 1412-2 of FIG. 14, and submits the queries to a database to extract information, such as curated relational data model database 1202 of FIG. 12. In turn, the insight engine module 1500 selects and runs various algorithms at 1504 on the data, such as machine-learning algorithms, to identify a result to the query. In turn, at 1506, the insight engine module analyzes the data and/or results generated by the various algorithms at 1504. The analysis results the insight engine module identifying various types of insights at 1508 as further described herein. In some scenarios, the analysis at 1506 and/or the identification of insights at 1508 cause the insight engine module 1500 to tune hyper-parameters of a corresponding algorithm at 1510. For example, in response to applying the algorithms to the extracted (curated) data, contextual data and/or anecdotal data through one or more machine-learning modules at 1504, the insight engine module 1500 generates an insight and/or prediction. The generated insight and/or prediction then evaluated during the analysis at 1506, such as by comparing the generated insight and/or prediction to actual values to evaluate an accuracy of the prediction and/or insight. The accuracy evaluation can then be used to adjust and/or tune the hyper-parameters until best values for the predictions, insights, and/or hyper-parameters are achieved. Here, the phrase "best values" is used to denote values that result in minimal accuracy error relative to other values. Some implementations extract and share the hyper-parameters with other user profiles, workspaces, and/or organization profiles, such as by way of the proximity platform as further described herein.

The process implemented by insight engine module 1500 corresponding to running algorithms at 1504, analyzing data at 1506, identifying insights at 1508, and tuning hyper parameters at 1510 can be an iterative process, and can be achieved in any suitable manner. For example, various implementations utilize the combination of a processor and processor-executable instructions that drive the behavior of the processor, hardware, firmware, or any combination thereof, to implement the algorithms, to extract the information from the curated data, etc. Examples of such implementations are further illustrated and described in FIGS. 33 and 34. Alternately or additionally, the process combines information from the multiple queries in a statistical manner. For example, consider a scenario in which the query magnifier module 1400 of FIG. 14 receives a single input query and generates "n" variations of the input query, where "n" represents an arbitrary value. Each respective query of the "n" variations can be run through the process associated with the insight engine module such that the corresponding algorithm output, data analysis, insight identification, and/or hyper-parameter tuning combines and/or collectively analyzes the outputs of each respective query. The insight engine module 1500 then outputs one or more insights 1512 that correspond to the insights identified in the process, where the insights can be described using textual output, markup output, metadata, etc. In various implementations, the insights are formatted into a story plot that provides a basic (e.g., un-augmented) outline for a playlist. These insights are then forwarded to a story narrator module for processing.

Figure 16:
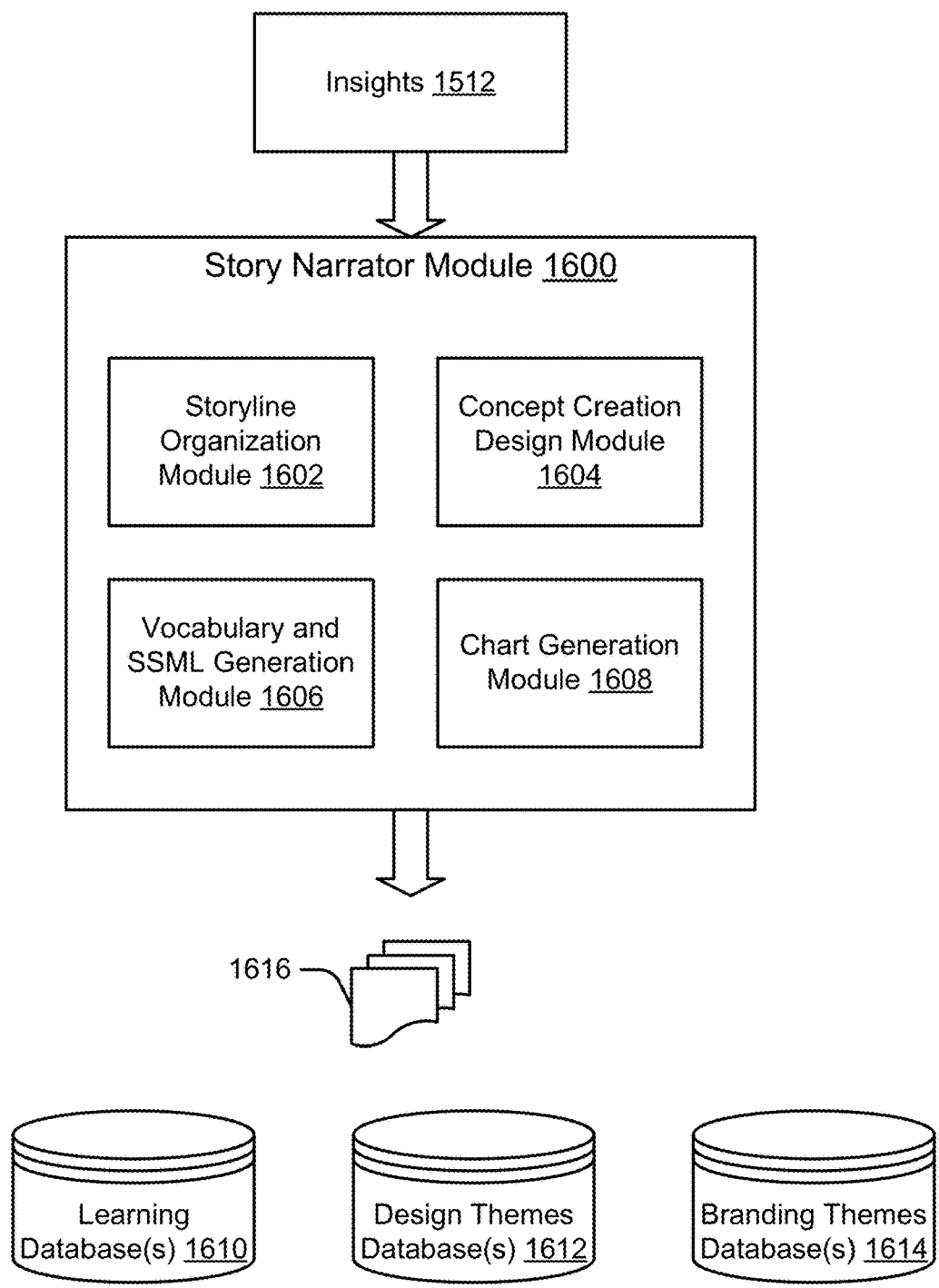
FIG. 16 illustrates an example story narrator module in accordance with one or more implementations.

Consider now FIG. 16 that illustrates an example story narrator module 1600 that is in accordance with one or more implementations. In some scenarios, story narrator module 1600 is representative of story narrator module 118 of FIG. 1 and/or story narrator module 1116 of FIG. 11. In various scenarios, the example described with respect to FIG. 16 can be considered a continuation of one or more examples described with respect to FIGS. 1-15. Story narrator module 1600 represents functionality that determines how to articulate and/or describe the insights received from the insight engine module, such as what visualizations to include in the narrated analytics playlist (e.g., charts, graphs, images, tables, etc.), what summarization of facts to include, the detailed narrative descriptions, etc. In other words, the story narrator module determines augmentation content (e.g., the visualizations, the summarizations, the charts, etc.) for the insights. In this example, story narrator module 1600 receives insights 1512 of FIG. 15. The story narrator module 1600 includes storyline organization module 1602, concept creation design module 1604, vocabulary and Speech Synthesis Markup Language (SSML) generation module 1606, and chart generation module 1608 that collectively work together to generate scripts that are used to generate narrated analytic playlists. As part of the generation process, various implementations access one or more databases that include data related to the insight(s). For example, some implementations of story narrator module 1600 access learning database(s) 1610 to acquire anecdotal data associated with a particular user profile the playlist is being designed for to determine what items to include or exclude from the playlist. Alternately or additionally, story narrator module 1600 accesses design theme database(s) 1612 to obtain formatting information for the playlist, such as colors, backgrounds, font types and size, watermarks, etc. As yet another option, story narrator module 1600 can access branding theme database(s) 1614 to acquire images, text, copyrighted images, and so forth, to include in the playlist.

Storyline organization module 1602 receives the insights and/or story plots from the insight engine, and determines an outline, plot, and/or components to include in a playlist that help explain the various insights. This can include supplemental information, contextual information, etc. In one or more implementations, the storyline organization module 1602 accesses metadata associated with the insights to identify primary attributes (e.g., main attributes associated with an insight) and/or secondary attributes (e.g., attributes of the main attributes). In turn, these attributes can be used to determine what visualizations to include in the narrated analytics playlist and/or what supplemental queries to request information to augment to the narrated analytics playlist. Some implementations of the storyline organization module 1602 apply computational algorithms to the attributes and/or corresponding text as a way to generate a corresponding plot outline. Any suitable type of computational and/or story generator algorithm can be utilized, such as Propps algorithms, Natural Language Generation (NLG) algorithms, Hidden Markov Model (HMM) algorithms, probabilistic context free grammars (PCFGs) algorithms, etc. In one or more implementations, the storyline organization module 1602 identifies one or more advertisements to include in the narrated analytics playlist, such as by analyzing anecdotal information associated with the corresponding user profile, analyzing metadata to identify relevant advertisements, etc.

Concept creation design module 1604 receives an augmented story outline from the storyline organization module 1602, and determines what additional design detail to include in the story outline, such as a design details on which chart to include, what ordering, what drill-down or drill-up information to include in the design, etc. For example, concept creation design module 1604 can analyze the augmented story outline and/or the corresponding metadata to determine related KPIs, attributes, apply entity linking algorithms, etc. In various implementations, the concept creation design module accesses learning database(s) 1610, design themes database(s) 1612, and/or branding themes database(s) 1614 to design how the plot outline is presented. In one or more implementations, the concept creation design module 1604 requests additional information from the parser module 1110, query magnifier module 1112, and/or insight engine module 1114 of FIG. 11.

Vocabulary and SSML generation module 1606 generates narrative descriptions that describe the plot outline and/or the augmented plot outline generated by the concept creation design module 1604. In various implementations, the vocabulary and SSML generation module 1606 generates multiple narrative descriptions of varying narration levels for a corresponding topic and/or playlist (e.g., minimal narration, medium narration, verbose narration) and statically bundles the multiple narrative descriptions with the narrated analytics playlist such that a recipient user profile has an ability to provide input that selects which level of narration to output during playback. Alternately or additionally, the vocabulary and SSML generation module accesses a user-defined setting that identifies a narration level, and generates a corresponding narrative description based upon the user-defined setting. This can include the vocabulary and SSML generation module 1606 accessing the metadata associated with the insights and/or augmented story outline to generate the narrative description. Accordingly, various implementations employ machine-learning algorithms that evolve grammar knowledge, language pattern algorithms, syntactic and/or structural pattern recognition algorithms, and so forth, as a way to output descriptions of the storyline plot and/or design.

Chart generation module 1608 generates visuals that are included in the corresponding playlist. In various implementations, the concept creation design module 1604 interfaces and/or communicates the desired charts to include to chart generation module 1608, such as by updating metadata to indicate the desired charts, sending commands to generate the charts, etc. In turn, the chart generation module 1608 access the corresponding metadata to obtain data used to generate the charts, graphs, images, etc. Alternately or additionally, chart generation module 1608 generates captions for charts. As an example, for a chart that illustrates monthly revenues for a calendar year (January thru August), the chart generation module 1608 can generate the captions "Revenues monthly from January 2018 to August 2018", "Monthly Revenues January-August 2018", or "Revenues January thru August 2018 monthly" based on the metadata, insights, etc. Vocabulary and SSML generation module 1606 can alternately or additionally generate short narration that describes the chart (e.g., "Peak Sales months are April 2018 and July 2018, while the year-to-date increase in sales was 4.3%") as well as long narration that describes the chart (e.g., "Monthly revenues have a consistent positive growth with April and July being the best months. The year to date sales growth is 4.3% across 8 months and the total sales being 24.3 million dollars"). Both the short narration and the long narration can be statically bundled with the narrated analytics playlist to allow a user to select more than one narration mode, thus enhancing the user experience. In some implementations, the chart generation module extracts summary points from a chart to use as short-narrations that can be displayed by the personalized analytics system as bulleted points.

Collectively, these modules generate scripts 1616 which are then delivered to an animator module to generate the narration analytics playlist. Scripts 1616 can include any suitable type of information, such as charts, narrative descriptions, storyline plots, design information, etc. In various implementations, scripts 1616 indicates not only what type of information is included in the narrated analytics playlist, but what order the information is presented in, when information is output simultaneously (e.g., audible output simultaneously with particular graphics), when to transition from a first piece of information to a second piece of information, and so forth. This can be achieved in any suitable manner, such as by marking transition and/or trigger points with flag data, identifying a time duration for each piece of information, etc.

Figure 17:
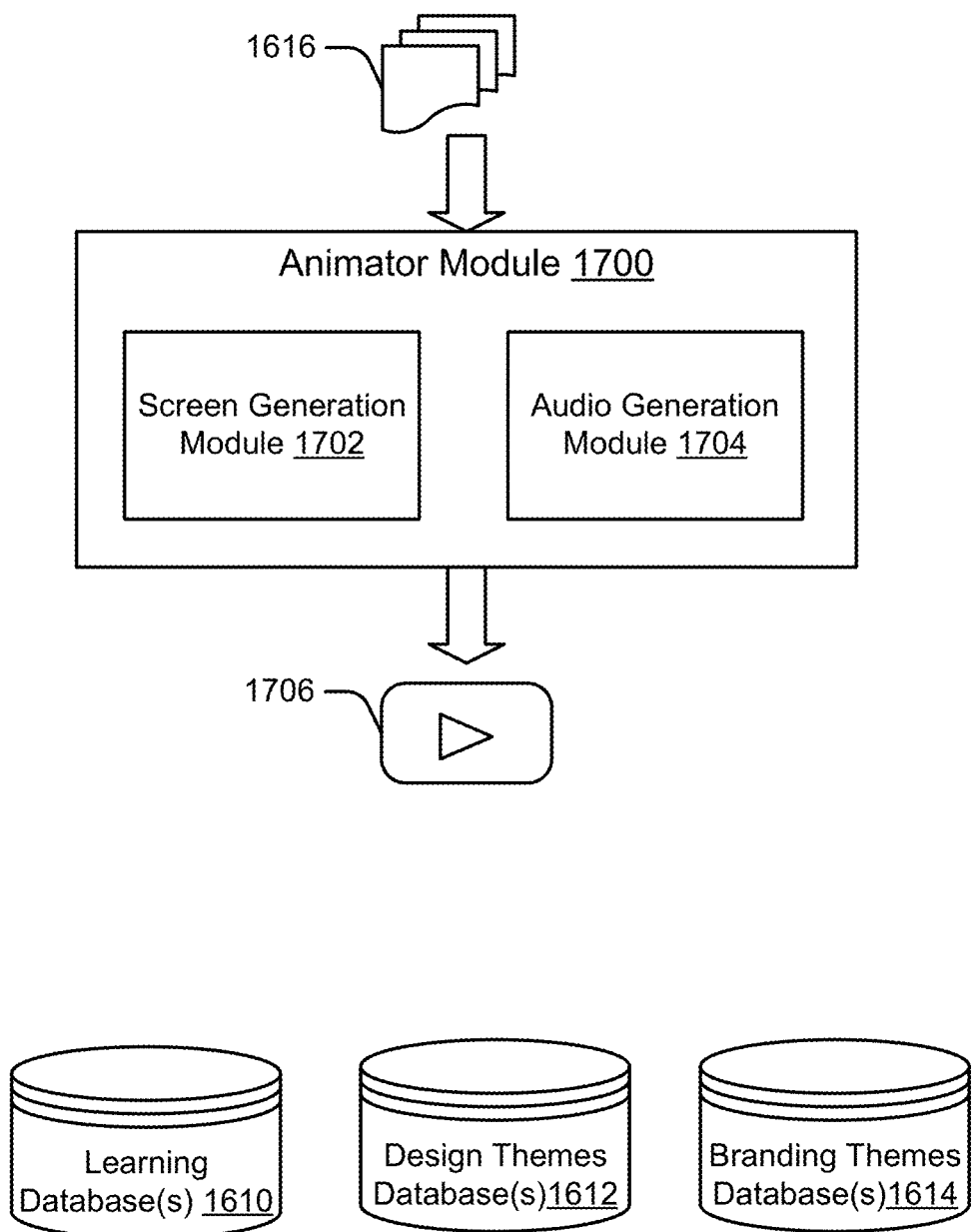
FIG. 17 illustrates an example animator module in accordance with one or more implementations.

Now consider FIG. 17 that illustrates an example animator module 1700 in accordance with one or more implementations. In some scenarios, animator module 1700 is representative of animator module 120 of FIG. 1 and/or animator module 1118 of FIG. 11. In various scenarios, the example described with respect to FIG. 17 can be considered a continuation of one or more examples described with respect to FIGS. 1-16.

Animator module 1700 receives scripts 1616 of FIG. 16, and generates a corresponding playlist from the scripts. Accordingly, animator module 1700 includes screen generation module 1702 and audio generation module 1704.

Screen generation module 1702 generates visual content that is included in the playlist. This can include accessing learning database 1610, design themes database(s) 1612, and/or branding themes database(s) 1614 of FIG. 16 to identify images, colors, formatting, user preferences, etc. to include in the visual content. For example, screen generation module 1702 can analyze an input script and identify keywords, such as product information, company information, location information, etc. In turn, screen generation module 1702 accesses corresponding databases to obtain images related to these keywords.

Audio generation module 1704 converts the descriptions generated by vocabulary and SSML generation module 1606 of FIG. 16 into an audible form. One or more implementations include text-to-speech algorithms to generate audible output. In scenarios in which the statically bundled content includes multiple narrative descriptions, the audio generation module 1704 selects one of the narrative descriptions, such as the verbose narrative description, to convert into audible output. The audible output description can be in any suitable language, such as a default language (e.g., English) and/or a user-defined language (e.g., French, German, Mandarin), where audio generation module 1704 includes machine-learning algorithms corresponding to the selected language. In some implementations, the audible output can be customized via alternate or additional user-defined settings, such as a gender-voice setting, output pace setting, verbal tone, etc. Collectively, these modules output a narrated analytics playlist 1706 that provides information corresponding to an input query in a video form. In turn, various playback engines can render the corresponding images and/or output the corresponding audio.

Figure 18:
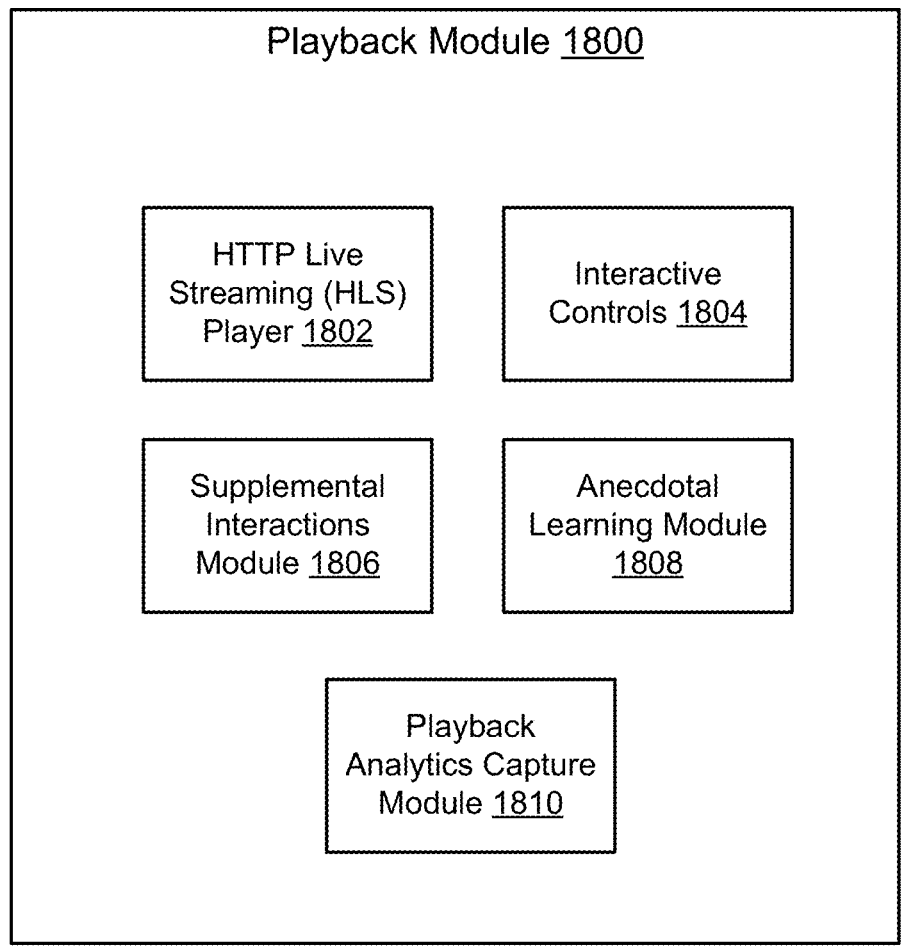
FIG. 18 illustrates an example playback module in accordance with one or more implementations.

FIG. 18 illustrates an example playback module 1800 in accordance with one or more implementations. In some scenarios, playback module 1800 is representative of playback module 132 of FIG. 1 and/or playback module 1120 of FIG. F11. In various scenarios, the example described with respect to FIG. 18 can be considered a continuation of one or more examples described with respect to FIGS. 1-17.

Playback module 1800 generally represents functionality that outputs images and/or audio corresponding to a narrated analytics playlist. In this example, playback module 1800 includes an HTTP Live Streaming (HLS) player 1802, interactive controls 1804, supplemental interactions module 1806, anecdotal learning module 1808, and playback analytics capture module 1510.

HLS player 1802 renders and/or outputs playlist contents. In various implementations, HLS player 1802 streams content corresponding to a narrative analytics playlist over a network connection, such as a network connection to servers 102 of FIG. 1. HLS player 1802 can be implemented as a stand-alone application, as a player that is integrated into a web browser, as a client application that connects to a server application, etc. In response to receiving content, the HLS player renders images as specified by the content. Alternately or additionally, the HLS player outputs synchronized audio.

Interactive controls 1804 provide user-accessible controls that modify playback of content. For example, interactive controls 1804 visually render software controls that pause, start, stop, forward, and/or rewind the playback of content. Interactive controls 1804 can alternately or additionally include audio controls, such as software controls that increase, decrease, and/or mute audio output levels. In some implementations, interactive controls 1804 provide navigation features, such as file navigation.

Similar to interactive controls 1804, supplemental interactions module 1806 provides user-accessible controls. Here, the user-accessible controls correspond to interactions with the personalized analytics system, such as a search query to trigger a query analysis, a chart request, a request for drill-up content and/or drill-down content, etc. Accordingly, various implementations allow for the generation of supplemental information during the playback of a narrated analytics playlist as further described herein.

Anecdotal learning module 1808 tracks information corresponding to user interactions with and/or input to playback module 1800, such as interactions with interactive controls 1804 and/or supplemental interactions module 1806. Alternately or additionally, anecdotal learning module 1808 gathers contextual information about when these interactions happen, what content is currently being output, whether the interaction can be implicitly and/or explicitly identified as positive feedback, negative feedback, etc. In various implementations, the information tracked by anecdotal learning module 1808 is stored with curated data and/or forwarded to cloud-based services as further described herein.

Playback analytics capture module 1810 enables the playback module to capture screen content, such as through control 910 of FIG. 9. Various implementations of playback analytics capture module 1810 not only capture screen content and/or audible content when initiated, but alternately or additionally capture additional information about the captured content, such as metadata, insight information, etc. In some scenarios, playback analytics capture module 1810 triggers a query analysis based upon the captured content and/or the additional information as further described herein.

Figure 19:
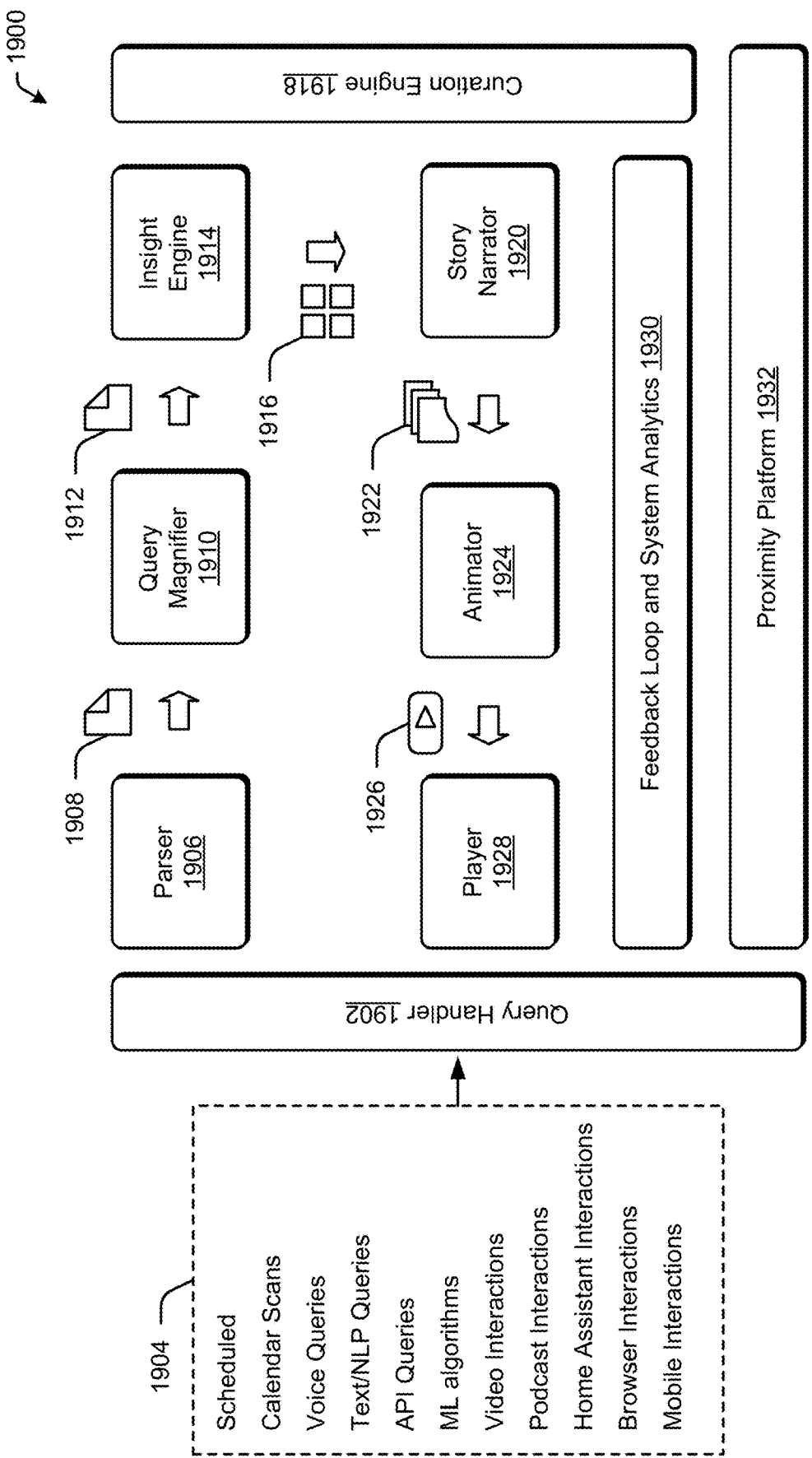
FIG. 19 illustrates an example of a personalized analytics system in accordance with one or more implementations.

To further demonstrate how various modules interact with one another to provide narrated analytic playlists, consider now FIG. 19 that illustrates an example block diagram 1900 in accordance with one or more implementations. In some scenarios, block diagram 1900 can be considered a continuation of one or more examples described with respect to FIGS. 1-18.

Block diagram 1900 includes query handler 1902 that generally handles any type of query input and/or query trigger into the personalized analytics system. In one or more implementations, query handler 1902 represents a library of callable application programming interfaces (APIs) that can be used by other software, hardware, and/or firmware module to trigger the analytics process and/or input a query string. Alternately or additionally, query handler 1902 includes audible interfaces, touch screen interfaces, programmatic interfaces, image processing, audio processing, and so forth, which enable query handler to receive and identify query inputs. In various implementations, query handler 1902 and/or other modules of the personalized analytics system are implemented on various devices of an IoT network (e.g., Zibgee, Z-wave, Thread, Weave, etc.). This allows the personalized analytics system to perform various functionality in a distributed manner and/or on devices that are dedicated to a particular purpose. Thus, various implementations utilize an IoT device dedicated to performing functionality associated with query handler 1902. As another example of utilizing IoT devices, a first device of the IoT can be a computing device dedicated to collecting data which is then transferred to a second device of the IoT associated with curating the data (e.g., curation engine module 110 of FIG. 1, curation engine module 1102 of FIG. 11, and/or curation engine module 1200 of FIG. 12). Continuing on, trigger events 1904 represent example events that trigger a query analysis and/or the generation of a narrated analytics playlist in accordance with one or more implementations. Here, trigger events 1904 include scheduled trigger events that correspond to user-defined schedules that indicate when to generate a narrated analytics playlist and/or perform the analysis associated with generating the narrated analytics playlist. Trigger events 1904 also include calendar scan trigger events that represent trigger events automatically generated by the personalized analytics system in response to a scan of a user's calendar as further described herein. Voice query trigger events and text/NLP query trigger events correspond to manual input to the personalized analytics system, such as audible input with an explicit query request, text strings input into a search field, etc. Trigger events 1904 also include programmatic trigger events, generally represented here as API query trigger events, that enable the personalized analytics system to receive a query request and/or trigger event programmatically. In a similar manner, ML algorithm-based trigger events correspond to programmatic trigger events generated by a machine-learning algorithm requesting more information, such as a machine-learning algorithm employed in the concept creation design module 1604 of FIG. 14 requesting more information, a machine learning algorithm employed in the insight engine module 1500 of FIG. 15 requesting more information, etc. Video interactions trigger events, podcast interactions trigger events, and home assistance device interactions trigger events correspond to implicit trigger events corresponding to the personalized analytics system identifying implicit feedback via video playback, via audible playback, and/or via home assistant interactions. Alternately or additionally, the video interactions, podcast interactions, and/or home assistant device interactions can include explicit feedback, examples of which are provided herein. Trigger events 1904 also include browser interactions trigger events and mobile interactions trigger events that correspond to the personalized analytics system implicitly triggering a query analysis and/or generation of a narrated analytics playlist in response to identifying implicit feedback when interacting with a browser and/or a mobile device. Query handler 1902 includes any combination of software, firmware, and/or hardware that enables these various types of trigger events to interface with the personalized analytics system to trigger and/or initiate a query as further described herein.

In response to receiving any of the trigger events 1904, the personalized analytics system forwards the corresponding input query to parser 1906 for analysis. In response to analyzing the input query, parser 1906 outputs a canonical query 1908 that is utilized as an input to query magnifier 1910. Canonical query 1908 can be formed using any suitable type of data structure that can be utilized to store information, examples of which are provided herein.

Query magnifier 1910 receives the canonical query 1908, and augments the query and/or generates variations of the query with additional subject matter (e.g., context information, additional constraints, alternate and/or related attributes, preferences, etc.). Thus, query magnifier 1910 outputs augmented queries 1912, which can alternately or additionally represent raw data identified during the analysis process. Augmented queries 1912 can include optimized database access instructions that pull information from a database in a more efficient manner (e.g., faster, less data, more concise data, more informative data, etc.) relative to un-optimized database access instructions. Augmented queries 1912 can be formed using any suitable type of data structure that can be utilized to store information, examples of which are provided herein.

Augmented queries 1912 are input to insight engine 1914 which, in turn, pulls information from a database and analyzes the data to not only find an answer to a query, but alternately or additionally identify one or more insights 1916 associated with the query, examples of which are provided herein. Some implementations of the insight engine format insights 1916 as a story plot that provides a basic outline, without augmentation, for a playlist. Various implementations of insight engine 1914 extract and analyze data curated by curation engine 1918 as further described herein. Insights 1916 can be formed using any suitable type of data structure that can be utilized to store information, examples of which are provided herein.

Story narrator 1920 receives the one or more insights 1916 and generates scripts 1922 that can be utilized to generate a narrated analytics playlist. As further described herein, scripts 1922 can include an outline of events to include in the narrated analytics playlist, a text form of a narrated description, a chart, keywords, and so forth. In one or more implementations, scripts 1922 correspond to an augmented version of the story plot and/or insights received from the insight engine. Various implementations include the answer to the query, as well as the identified insights associated with the query, in a same script such that the narrated analytics playlist includes narrated videos that describe the answer, as well as the insight(s). Scripts 1922 can be formed using any suitable type of data structure that can be utilized to store information, examples of which are provided herein.

Scripts 1922 are provided to animator 1924, which uses the scripts and/or corresponding metadata to identify what images and audio to include in the narrated analytics playlist. For example, animator 1924 can generate synthetic speech to include in the playlist based upon the text included in the scripts, can pull branding information, chart images, etc. Thus, animator 1924 generates narrated analytics playlist 1926, which is consumable by player 1928 to render images and/or output synchronized audio. In various scenarios, player 1928 corresponds to playback module 132 of FIG. 1, playback module 1120 of FIG. 11, and/or playback module 1800 of FIG. 18. Various implementations of player 1928 capture playback analytics and learnings, which are then stored in feedback loop and system analytics 1930 and/or uploaded into proximity platform 1932. In various implementations, feedback loop and system analytics 1930 is representative of databases 124 of FIG. 1. Alternately or additionally, player 1928 represents a third-party playback engine that is external to the personalized analytics system. Accordingly, various implementations generate narrated analytics playlist 1926 in formats that are compatible with multiple different types of playback engines. Playlist 1926 can be formed using any suitable type of data structure that can be utilized to store information, examples of which are provided herein.

While player 1928 is described here as generating playback analytics and learning that is stored in feedback loop and system analytics 1930, alternate or additional modules within the personalized analytics system generate and/or upload various types of analytics and learnings to the feedback loop and system analytics 1930 and/or proximity platform 1932. Thus, feedback loop and system analytics 1930 corresponds to data, algorithms, and/or information learned by the personalized analytics system that is subsequently utilized in future data curation and/or future insight generation. The playback analytics and learning can include various hyper-parameters used by machine-learning algorithms in various modules of the personalized analytics system that are shared with other shared systems by way of proximity platform 1932.

To further demonstrate, consider now FIGS. 20A and 20B that illustrate an example of utilizing a proximity platform to share learned information in accordance with one or more implementations. In various scenarios, the example described with respect to FIGS. 20A and 20B can be considered a continuation of one or more examples described with respect to FIGS. 1-19.

FIGS. 20A and 20B collectively illustrate an example progression of events over an arbitrary time period. Here, the progression begins in FIG. 20A and then moves to FIG. 20B. It is to be appreciated that the progression of events described with respect to FIGS. 20A and 20B is for discussion purposes, and that any other ordering, omission, and/or addition to the events can occur without departing from the scope of the claimed subject matter.

FIG. 20A illustrates an example environment 2000 that includes servers 102 of FIG. 1 that provide cloud-based services 2002 associated with a personalized analytics system to various devices and/or organizations. Here, the personalized analytics system includes proximity platform 2004. While illustrated separately from cloud-based services 2002 and servers 102, this is merely for discussion purposes and it is to be appreciated that alternate or additional implementations integrate portions or all of the proximity platform functionality into the cloud-based services and/or servers 102 without departing from the scope of the claimed subject matter.

In this example, the personalized analytics system provides services to two separate and disparate organizations: organization 2006-1 and organization 2006-2 respectively. Accordingly, each organization has a respective server to access the cloud-based services, identified here as private server 2008-1 and private server 2008-2. Similarly, each organization also has respective private data, labeled here as private data 2010-1 and private data 2010-2. Thus, private data 2010-1 corresponds to data accessible to devices associated with organization 2006-1, such as client device 2012-1 and the client device 2012-2 but inaccessible to devices associated with other organizations, such as client device 2012-3 and client device 2012-4 of organization 2006-2. Similarly, private data 2010-2 corresponds to data accessible to client device 2012-3 and client device 2012-4, but inaccessible to client device 2012-1 and client device 2012-2. Thus, the various computing devices included in organization 2006-1 are disparate and unrelated to the various computing devices of organization 2006-2.

As each client device accesses the personalized analytics system, various implementations collect anecdotal data and/or evolve machine-learning algorithms as further described herein. Since the personalized analytics system as illustrated in FIG. 17a supports multiple organizations, it is desirable to apply the anecdotal and/or evolved machine-learning algorithms at a system level (e.g., at servers 102). For example, applying the machine-learning algorithms evolved at organization 2006-1 at organization 2006-2 (and vice versa) allows the personalized analytics system return information more relevant to each organization. However, it is undesirable to share the private data used to evolve the machine-learning algorithms. In other words, to protect the privacy of each organization, it is desirable to share learned information across organization, but keep private data 2010-1 inaccessible to devices external to organization 2006-1, and private data 2010-2 inaccessible to devices external to organization 2006-2.

Various implementations forward learned information to the personalized analytics system without exposing private data. To illustrate, consider learnings 2014-1 that generally corresponds to various types of anecdotal data, machine-learning algorithm observations, reinforcement learning information, hyper-parameters, etc., generated by client device 2012-1 and/or client device 2012-2. These learnings are forwarded by the respective client devices to private server 2008-1, as further indicated here by the directional arrows. Private server 2008-1 then forwards learnings 2014-1 to proximity platform 2004, indicated here by directional arrow 2016-1, such as through the use of cloud-based services 2002. Similarly, client device 2012-3 and client device 2012-4 forward respective learnings 2014-2 to private server 2008-2 which, in turn, forwards the learnings to the proximity platform 2004, indicated here by directional arrow 2016-2. The proximity platform 2004 then integrates the learning information into the personalized analytics system, generally indicated here with arrow 2018. In some implementations, the proximity platform 2004 executes operations represented by a logical format language that is separate from underlying languages of systems utilized by each client device and/or organization. Using the logical format language allows the proximity platform to communicate with several varied underlying technologies and language formats (e.g., disparate technologies) used by each organization. To illustrate, with respect to FIG. 20A, organization 2006-1 can employ a first technology to support various devices (e.g., private server 2008-1, client device 2012-1, and/or client device 2012-2) and organization 2006-2 can employ a second, different technology to support various devices (e.g., private server 2008-2, client device 2012-3, and/or client device 2012-4). Even though these organizations utilize different technologies, the organizations can both interact with a same proximity platform 2004 via the logical format language, which allows the proximity platform to abstract and/or protect each organization's private data from the other.

Moving to FIG. 20B, and in response to integrating the learning information into the personalized analytics system, various implementations generate updates to one or more machine-learning algorithms, such as by forwarding hyper-parameters to each server of the system (e.g., private server 2008-1, private server 2008-2, etc.). Alternately or additionally, proximity platform 2004 integrates the information into cloud-based services 2002. In FIG. 20B, proximity platform 2004 forwards algorithm updates 2020 to both private server 2008-1 and private server 2008-2, as generally indicted by the directional arrow 2022-1 and arrow 2022-2. Thus, the personalized analytics system is able to extract learned information about various user profiles and/or workspaces of the system and forward the learned information without exposing private data. In other words, by extracting and sharing learned information, such as the non-limiting example of sharing machine-learning algorithm hyper-parameters from a first system to a second system, the proximity-platform provides the personalized analytics system with the ability to change the second system's behavior (e.g., impact a prediction outcome, adjust parameters of a model applied to similar data of a different client device, etc.) without compromising the security of the first system. The changed system behavior can include efficiency improvements (e.g., faster insight determination times, faster data extraction, faster data curation, etc.). As one non-limiting example, a set of hyper-parameters can be adjusted or tuned to generate optimal hyper-parameter values to improve efficiency, such as by using grid search techniques, random search technique, Bayesian optimization technique, as part of the tuning algorithms. In various implementations, the personalized analytics system determines which of the hyper-parameters are relevant for tuning based on a predictive learning model or target outcome. In turn, the optimal hyper-parameter values can be distributed to different systems. Accordingly, the personalized analytics system can leverage the learned efficiencies across disparate computing devices without exposing the data used to generate the efficiencies.

Figure 21:
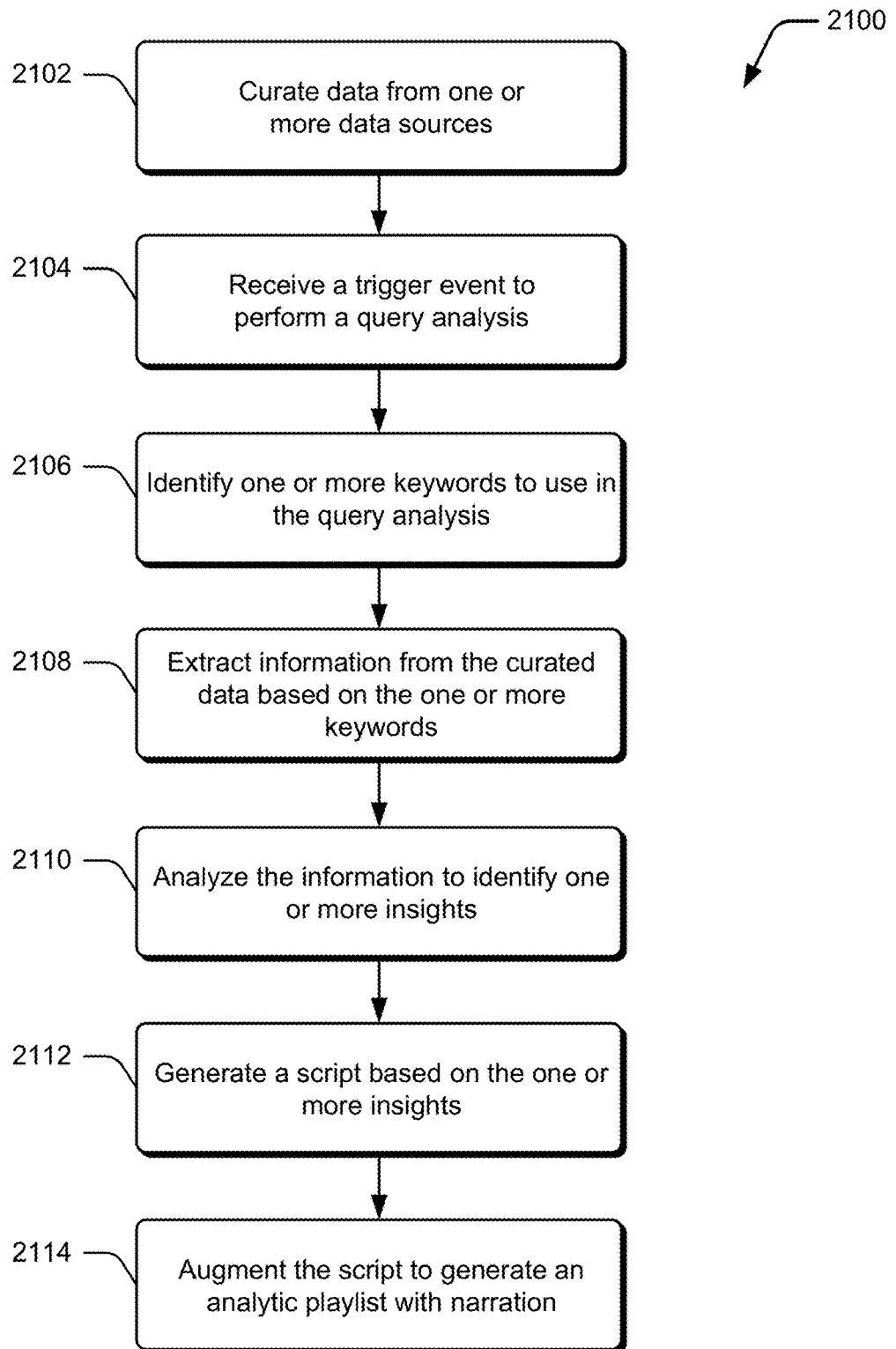
FIG. 21 illustrates a flow diagram of generating a narrated analytics playlist in accordance with one or more implementations.

FIG. 21 illustrates an example method 2100 that can be utilized to generate narrated analytics playlists in accordance with one or more implementations. The method can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1. While the method described in FIG. 21 illustrates these steps in a particular order, it is to be appreciated that any specific order or hierarchy of the steps described here is used to illustrate an example of a sample approach. Other approaches may be used that rearrange the ordering of these steps. Thus, the order steps described here may be rearranged, and the illustrated ordering of these steps is not intended to be limiting.

At 2102, various implementations curate data from one or more data sources, such as through the use of curation engine module 110. In some implementations, the personalized analytics system identifies data sources to scan based on user-defined data sources, such as database addresses assigned to a particular workspace via explicit input to the personalized analytics system. Alternately or additionally, various implementations scan applications for data to curate, such as SaaS applications. The curation of data can be in response to input corresponding to a manual trigger request and/or occur automatically, such as at scheduled intervals, during idle periods of system inactivity (e.g., no active input), and so forth. To curate the data, one or more implementations identify attributes and/or relational information between the data that is then stored in metadata. The personalized analytics system oftentimes generates relational data models during the curation process, and applies the relational data models when storing the curated data in a database. In some implementations, the curation of data includes identifying drill-path information, and storing the drill-path information as part of the curated data. Alternately or additionally, one or more implementations utilize anecdotal data to influence the curation process.

At 2104, the personalized analytics system receives a trigger event to perform a query analysis (e.g., personalized analytics module 106). The trigger event can be received in any suitable manner, such as via an explicit input and/or interaction to perform the query analysis and/or an implicit input and/or interaction that is used to trigger the query analysis. Alternately or additionally, the trigger event can originate from a scheduler and/or from calendar scans as further described herein.

In response to receiving the trigger event, various implementations identify one or keywords to use in the query analysis at 2106, such as by using parser module 112 and/or query magnifier module 114. This can include utilizing keywords included in an input query string and/or deriving keywords from anecdotal data associated with a user profile and/or workspace, accessing metadata, using word ranking information, etc. For instance, various implementations identify contextual words included in the input query string, such as by using a tagger and tokenizer module, and then find similar words to the contextual words that have a higher success rate of returning results.

One or more implementations extract information from the curated data based upon the one or more keywords at 2108, such as by using insight engine module 116, parser module 112 and/or query magnifier module 114. In some implementations, the exact words included in the input string are utilized to extract information, while in alternate or additional implementations, the personalized analytics system augments the keywords with contextual parameters. Sometimes the augmentation is based upon anecdotal data. The personalized analytics system can also identify and use alternate words to extract additional information, and then collectively analyze the different variations of extracted information to identify insights. This can include generating multiple queries with alternate wording, using primary and secondary attributes, and so forth. Accordingly, at 2110, one or more implementations analyze the extracted information and/or the additional information to identify one or more insights (e.g., insight engine module 116). Any suitable type of insight can be identified, examples of which are provided herein. In turn, the personalized analytics system generates a script based upon the one or more insights at 2112.

At 2114, and in response to receiving the script, one or more implementations augment the script to generate narrated analytics playlists. In various implementations, the personalized analytics system applies a computational algorithm to the script to identify what components and/or visualizations to include in a playlist that help explain the various insights. One or more implementations augment the script with narrative description(s) using various types of machine-learning algorithms, such as grammar-based algorithms, language pattern algorithms, syntactic algorithms, etc. In turn, the textual description generated by these machine-learning algorithms can be converted into an audible output, such as through the use of various text-to-speech algorithms. The visualizations and audible output are then statically bundled to form a narrated analytics playlist. In one or more implementations, metadata is combined and/or statically bundled the narrated analytics playlist as well.

Having described an example of generating narrated analytics playlists, consider now a discussion of using voice control in a personalized analytics system that is in accordance with one or more implementations.

Voice Control

Figure 22:
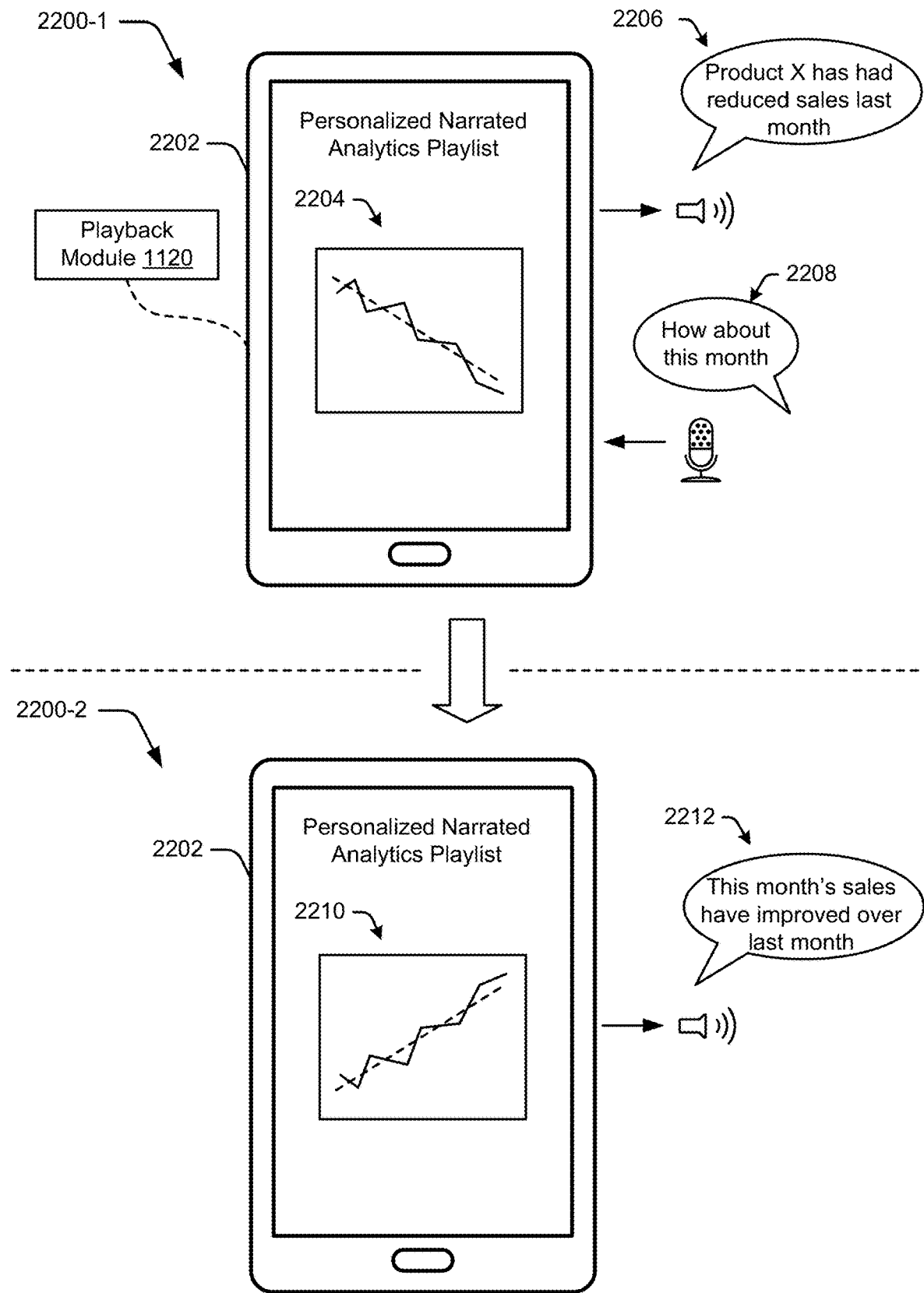
FIG. 22 illustrates an example environment that illustrates aspects of voice control in a personalized analytics system in accordance with one or more implementations.

FIG. 22 illustrates an example environment 2200 in which a progression of events implements aspects of voice control of a personalized analytics system, such as voice control of narrated analytics playlist playback and/or voice control for query input that is in accordance with one or more implementations. These events occur in an example environment 2200 that includes a computing device 2202 that is in the form of a tablet. The example environment 2200 is represented at two arbitrary points in time that are labeled as example environment 2200-1 and example environment 2200-2. Collectively, example environment 2200-1 and example environment 2200-2 embody example environment 2200. In various scenarios, the example described with respect to FIG. 22 can be considered a continuation of one or more examples described with respect to FIGS. 1-21.

In environment 2200-1, computing device 2202 is in progress of playing back a narrated analytics playlist 2204, such as via playback module 1120 of FIG. 11. In implementations, the narrated analytics playlist has been customized for a particular user by including content and/or insights that have been identified as being relevant to the user based on anecdotal information. Accordingly, narrated analytics playlist 2204 renders insights, such as a sales chart, and outputs an audible description 2206 that describes the rendered insight. In implementations, the playback module 1120 includes voice control features that influence playback of a narrated analytics playlist. Alternately or additionally, the voice control features can be used to initiate an input query and/or a trigger event.

In response to viewing narrated analytics playlist 2204, and/or hearing the audible description 2206, a user verbalizes an audible input 2208. In turn, the playback module 1120 identifies that audible input has been received, and pauses the playback of narrated analytic playlist 2204. The playback module 1120 can alternately or additionally include speech-to-text algorithms that convert audible input 2208 into a text string. The playback module 1120 can analyze the text string to search for control keywords associated with modifying the playback of narrated analytic playlist 2204, such as "stop", "pause", "skip", "go back", "rewind", "replay", "forward", "wait", etc. In response to identifying control keywords, the playback module 1120 modifies the playback accordingly. In some implementations, such as for controls that pause and/or stop the playback, the playback can be resumed after expiration of a timer that monitors user input.

In some implementations, the playback module 1120 identifies audible input 2208 as an input query for additional information related to the currently output content. In turn, the playback module 1120 can generate a result for the requested information based upon metadata as further described herein. Alternately or additionally, the playback module 1120 can forward the audible input query to other modules in the personalized analytics system for further analysis, such as parser module 1110 of FIG. 11. Here, the audible input corresponds to an input query for sales information, where the input query specifies a particular time scope.

In example environment 2200-2, the narrated analytics playlist has been modified to include new content 2210 that represents a reply and/or insight corresponding to audible input to 2208. The new content can alternately or additionally include descriptive content 2212 that is illustrated here as being output inaudible form. Thus, various implementations allow for voice control of a narrated analytics playlist. Alternately or additionally, the playback module can initiate input queries via audible input.

In the example environment 2200, computing device 2202 outputs content that has been customized for a particular user in both visual and audible form. In various implementations, input can be analyzed based on the particular user as well. Consider a scenario in which audible input 2208 includes an ambiguous word, such as "August" which can be interpreted as a name of a person or as a name of a calendar month. Various implementations attempt to interpret ambiguous words based upon anecdotal information about the user. For example, an analysis of the anecdotal information can identify that the user has an account manager, customer, and/or coworker with the name "August". In turn, playback module 1120 and/or other modules of the personalized analytics system can interpret the ambiguous word as a user name, rather than a calendar month. This helps improve a contextual interpretation of the audible input, thus improving the accuracy of the generated insight and/or response to the audible input. In other words, the personalized analytics system can allow for vocabulary customizations and/or word interpretations based on anecdotal information and/or learned information from a proximity platform. Various implementations prioritize the anecdotal information and/or learned information such that input queries are interpreted based on the anecdotal information and/or learned information. Thus, the term "August" can be interpreted as a month for a first user, as a street name for a second user, as a person for a third user, and so forth, based upon the customized interpretations.

Figure 23:
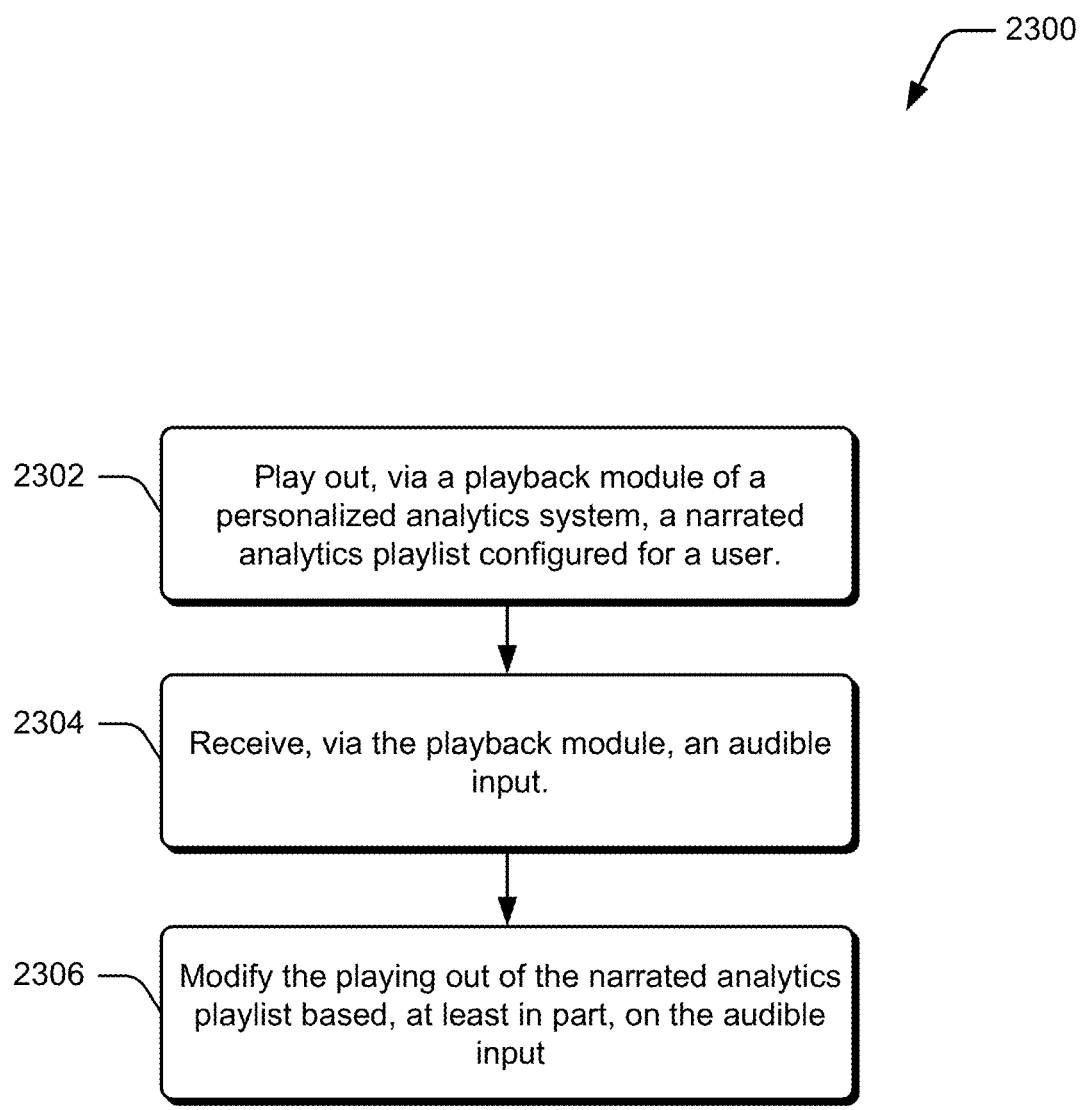
FIG. 23 illustrates an example method that can be used to control playback using audible input in a personalized analytics system in accordance with one or more implementations.

Now consider FIG. 23 that illustrates an example method 2300 that can be utilized to control playback of a narrated analytics playlist using audible input that is in accordance with one or more implementations. The method can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1, such as various modules included in personalized analytics module 106 and/or client analytics module 108. While the method described in FIG. 23 illustrates these steps in a particular order, it is to be appreciated that any specific order or hierarchy of the steps described here is used to illustrate an example of a sample approach. Other approaches may be used that rearrange the ordering of these steps. Thus, the order of the steps described here may be rearranged, and the illustrated ordering of these steps is not intended to be limiting.

At 2302, a narrated analytics playlist is output via a playback module of a personalized analytics system. For example, playback module 1120 plays out narrated analytics playlist 2204 by rendering content and outputting audible descriptions as further described herein.

At 2304, an audible input is received via the playback module. Playback module 1120, for example, receives audible input 2208 via a microphone of computing device 2202. Accordingly, the received audible input is different from audible content associated with narrated analytics playlist 2204. In some implementations, playback module 1120 identifies an ambiguous word in the audible input based, at least in part, on using speech-to-text algorithms that convert the audible input to text. Alternately or additionally, playback module 1120 resolves the ambiguous word using anecdotal information associated with the user.

In response to receiving the audible input, the playing out of the narrated analytics playlist is modified based, at least in part, on the audible input. For example, playback module 1120 pauses playback of narrated analytics playlist 2304. This can include playback module 1120 analyzing audible input 2208 to identify a playback control keyword in the audible input, and modifying the playing out of the narrated analytics playlist based on the playback control keyword. As another example, playback module 1120 analyzes audible input 2208 to identify that the audible input includes an input query to the personalized analytics system. In response to identifying the audible input includes an input query, the playback module 1120 modifies the playing out of the narrated analytics playlist to include new content that addresses the input query, such as by generating the new content using metadata associated with the narrated analytics playlist and/or querying the personalized analytics system for the new content. In implementations, the playback module resumes the playing out of the narrated analytics playlist after expiration of a timer.

Having described using voice control in a personalized analytics system, consider now a discussion of auto-point features in a personalized analytics system that is in accordance with one or more implementations.

Auto-Point Features During Playback

A playback module, such as via playback module 1120 of FIG. 11, can receive a narrated analytics playlist, and output the content of the playlist by rendering images and/or outputting audio. As further described herein, the playback module 1120 oftentimes receives metadata with the narrated analytics playlist that allows the playback module 1120 to modify content dynamically based upon user input. For instance, with reference to FIG. 6, a playback module 1120 dynamically generates a comparison chart in response to receiving user input. The comparison chart can be generated by the playback module 1120 using the metadata received with the narrated analytics playlist and/or by the playback module 1120 submitting an input query to the personalized analytics system. Various implementations can alternately or additionally generate audible content for the newly generated images and/or scenes (e.g., images and/or scenes not inherently included in the narrated analytics playlist) to provide lip synching with the new content. Here, the phrase "lip synching" is used to denote audible output whose content is coordinated with a corresponding image. In other words, lip synching corresponds to outputting a synchronized audible output in which the audible description in the audible output corresponds to a currently rendered image and/or scene. Thus, if a user interacts with a narrated analytics playlist in such a way that new content is generated and/or rendered by a playback module, coordinated audio that describes the new content is output as well. In implementations, the narrated analytics playlist has been customized for a particular user by including content and/or insights that have been identified as being relevant to the user.

Figure 24:
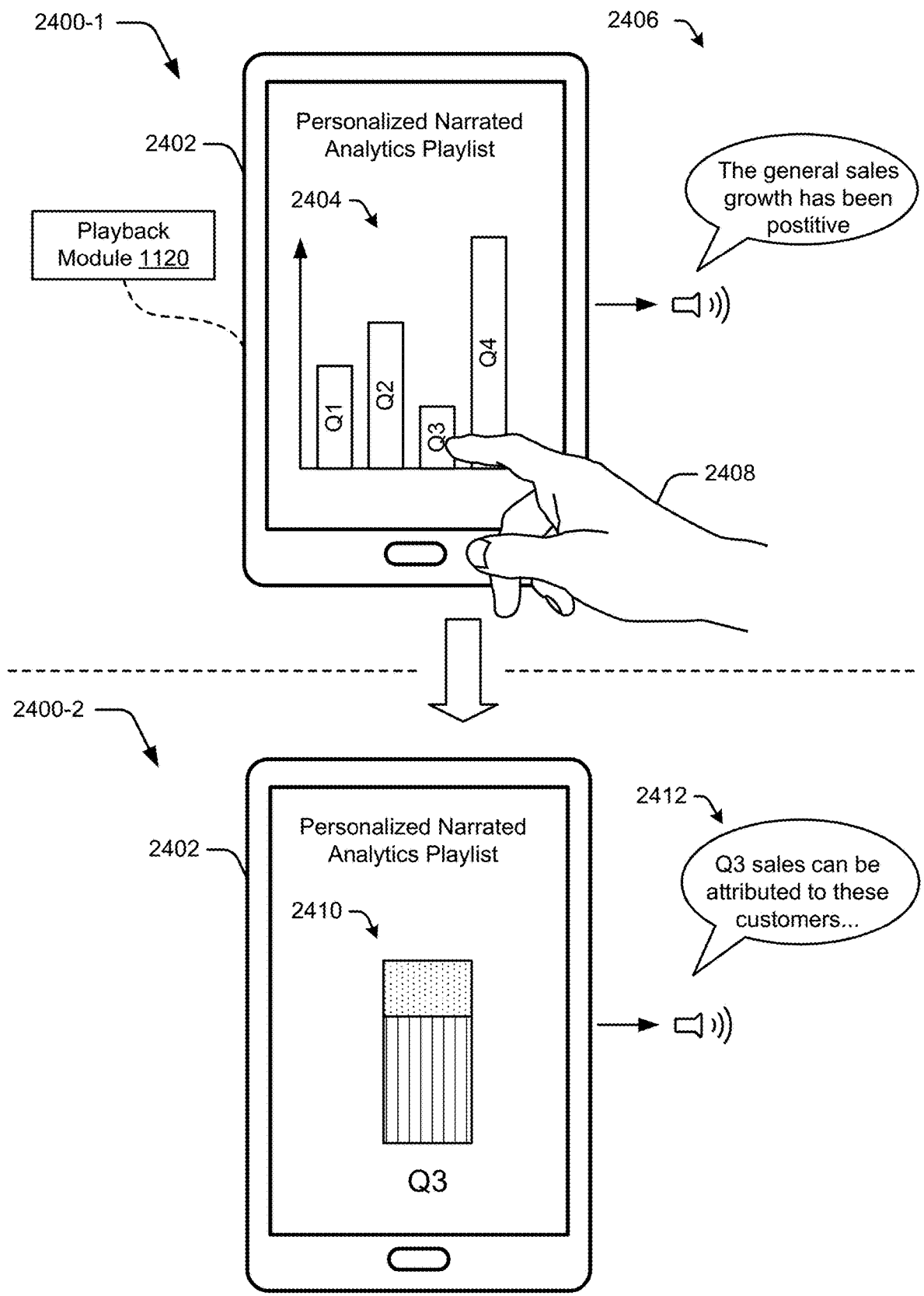
FIG. 24 illustrates an example environment in which aspects of lip synching in a personalized analytics system can be utilized in accordance with one or more implementations.

To further illustrate, consider now FIG. 24 that illustrates an example environment in which a progression of events implements aspects of lip synching in a personalized analytics system that is in accordance with one or more implementations. These events occur in an example environment at two arbitrary points in time that are labeled as example environment 2400-1 and example environment 2400-2. Example environments 2400-1 and 2400-2 include a computing device 2402 that is in the form of a tablet. In various scenarios, the example described with respect to FIG. 24 can be considered a continuation of one or more examples described with respect to FIGS. 1-23.

In environment 2400-1, computing device 2402 is in progress of playing back a narrated analytics playlist 2404, such as via playback module 1120 of FIG. 11. In implementations, the narrated analytics playlist has been customized for a particular user by including content and/or insights that have been identified as being relevant to the user based on anecdotal information. Accordingly, narrated analytics playlist 2404 renders insights, such as a bar chart that illustrates sales growth over four quarters, and outputs an audible description 2406 that describes the rendered insight.

In response to viewing narrated analytics playlist 2404, and/or hearing the audible description 2406, a user 2408 enters touch input to computing device 2402 that selects a portion of an original scene included in the narrated analytics playlist that is currently being rendered (e.g., user input that selects a particular bar chart). While illustrated here as touch input, it is to be appreciated that other types of input can be utilized as well, such as audible input, keyboard input, etc. In response to receiving the user input, playback module 1120 determines to generate new content. For example, playback module 1120 can interpret the user input as a zoom command to zoom in on the selected bar, and determine to visually zoom in on the selected bar. While described in the context of a zoom command, it is to be appreciated that playback module 1120 can interpret the user input as other commands that modify what is being visually displayed, such as a highlight command that creates a spotlight effect on a selected portion of the displayed content, a pan command (e.g., left, right, up, down) that moves and/or centers a selected portion of the displayed content on a display device, a focus command that makes a selected portion of the displayed content in focus while visually blurring other portions of the displayed content, a magnify command that focuses on, and displays additional details corresponding to, a selected portion of the displayed content, and so forth. In turn, playback module 1120 can perform the corresponding command, and generate new audible content synchronized to the modified visual display.

Moving to example environment 2400-2, the narrated analytics playlist corresponds to a modified version of narrated analytics playlist 2404 that includes new visual content 2410. More particularly, visual content 2410 corresponds to a zoomed in view of the content selected by user 2408, where the zoomed in view includes additional information not rendered in environment 2400-1. In implementations, the additional information and/or the scene corresponding to visual content 2410 is automatically generated by playback module 1120 without user involvement. This can be achieved in any suitable manner, such as by processing metadata received and/or bundled with the original narrated analytics playlist (e.g., narrated analytics playlist 2404) as described in the example with reference to FIG. 6. For instance, playback module 1120 can generate visual content 2410 only from the metadata and without further communications and/or queries to the personalized analytics system. Alternately or additionally, the playback module 1120 can query the personalized analytics system for the new content and/or additional details related to content selected via the user input.

Various implementations generate new audible descriptions that correspond to the new content. In the example environment 2400-2, playback module 1120 outputs audible content 2412 that corresponds to a newly generated description based on visual content 2410. In other words, playback module 1120 can generate and/or output audible content that describes the portion in more detail relative to a description of the original scene. Thus, in response to receiving user input that modifies the content and/or scenes output in the narrated analytics playlist, various implementations generate new audible content that describes the modified content and/or scenes such that the playback module 1120 outputs lip synched audible content that describes the modified content and/or scenes.

Figure 25:
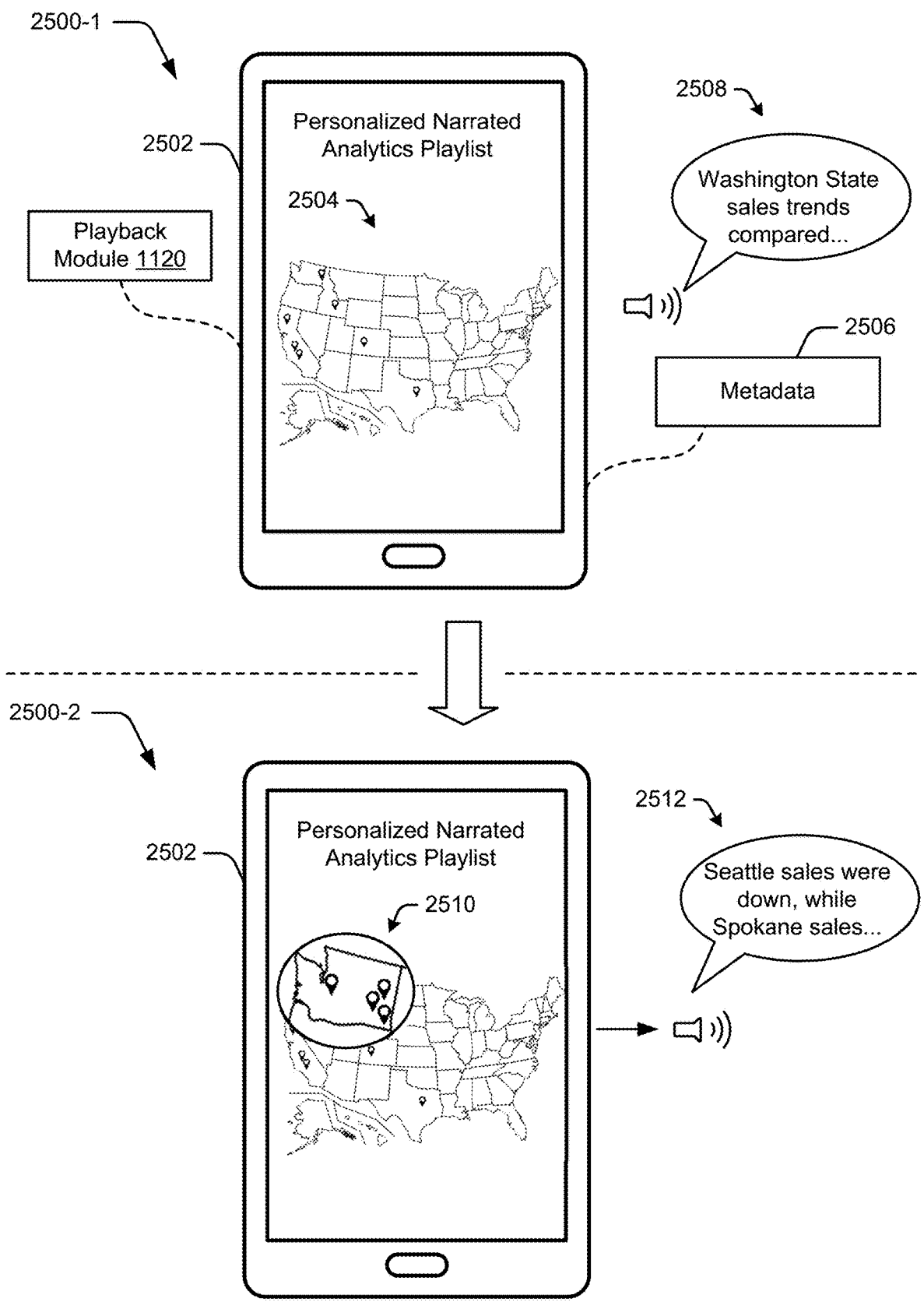
FIG. 25 illustrates example environments in which aspects of auto-pointers can be utilized in a personalized analytics system in accordance with one or more implementation.

Various implementations can automatically apply visual enhancements to the narrated analytic playlists, where the visual enhancements can alternately be referred to as auto-pointing. To demonstrate, consider now FIG. 25 that illustrates an example environment in which a progression of events implements aspects of auto-pointers in a personalized analytics system that is in accordance with one or more implementations. These events occur at two arbitrary points in time that are labeled as example environment 2500-1 and example environment 2500-2, respectively. Example environments 2500-1 and 2500-2 include a computing device 2502 that is in the form of a tablet, but it is to be appreciated that any other suitable computing device can be utilized, examples of which are provided herein. In various scenarios, the example described with respect to FIG. 25 can be considered a continuation of one or more examples described with respect to FIGS. 1-24.

In environment 2500-1, computing device 2502 is in progress of playing back a narrated analytics playlist 2504, such as via playback module 1120 of FIG. 11. In implementations, the narrated analytics playlist has been customized for a particular user by including content and/or insights that have been identified as being relevant to the user based on anecdotal information. The narrated analytics playlist includes metadata 2506 that generally represents any combination of information associated with narrated analytics playlist 2504. Metadata 2506, for instance, can include tags that correspond to content being rendered, text description of content being rendered, descriptions of charts, etc. In this example, narrated analytics playlist 2504 renders a map of the United States that includes sales information across various regions. Various implementations can analyze metadata 2506 and determine to render an auto-pointer based upon the content being rendered, the audio being output, user anecdotal information, and/or an analysis of the metadata.

To illustrate, consider environment 2500-1 in which playback module 1120 renders visible content of narrated analytics playlist 2504 and outputs audible content 2508 that describes a portion of the visible content. Playback module 1120 can analyze audible content 2508, either in real-time while being output or some arbitrary point in time prior to being output, to identify keywords and/or items of interest to a user, such as through the use of natural language processing algorithms, machine learning algorithms, indexing algorithms, user anecdotal information, and so forth, as further described herein. This can include playback module 1120 applying speech-to-text algorithms to audible content 2508 during playback and/or prior to playback to generate text data. Playback module 1120 can alternately or additionally analyze metadata 2506 based upon the identified keywords and/or items of interest identified from the audible content, and determine to apply an auto-pointer to the rendered content. For example, the playback module can analyze the metadata to identify a location of the visual content that will be visually enhanced via an auto-pointer.

Moving to example environment 2500-2, the rendered content of the narrated analytics playlist includes a visual auto-pointer 2510 that corresponds to magnifying a particular portion of the rendered content to a size that is larger relative to a default visual size of the particular portion. While illustrated in this example as a magnification visual enhancement, it is to be appreciated that the auto-pointer can utilize other types of visual enhancements as well, such as highlights, panning, focusing, and so forth. In implementations, the rendered content within auto-pointer 2510 can include additional detail relative to the visual content rendered without the visual enhancement. Alternately or additionally, playback module 1120 can generate additional audio content 2512 that provides additional audible description of the content being visually enhanced by the auto-pointer. Thus, playback module 1120 can automatically determine to add an auto-pointer to visual content associated with a narrated analytics playlist based upon an analysis of the corresponding audio content and/or metadata.

In automatically determining to apply an auto-pointer to a narrated analytics playlist, some implementations of playback module 1120 can update the metadata with new tags based upon learned information. For instance, consider a scenario in which the playback module identifies a keyword in audible content, such as the name of a city (e.g., "Seattle"). Playback module 1120 can scan the metadata and identify and/or match the city name to a word included in a chart title. To illustrate, consider metadata that includes content that describes a chart, such as title information:

title: {text: 'Monthly Average Sales in Seattle Vs Spokane}, or axis information:

xAxis: {categories: ['Jan', 'Feb', 'Mar', 'Apr', 'May', 'Jun', 'Jul', 'Aug', 'Sep', 'Oct', 'Nov', 'Dec']}, Playback module 1120 can scan this metadata information to identify content that matches to keywords extracted from the audio. In turn, playback module 1120 can generate tag information that includes the city name, and update the metadata with the newly generated tag information. While described in the context of matching one keyword to one chart title, alternate or additional implementations can determine what tag information to generate based upon matching a keyword to multiple instances of information in the metadata. Various implementations can alternately or additionally apply ranking algorithms to newly generated tag information, and selectively update the metadata with a portion of the newly generated tag information, such as by adding a threshold number of the newly generated tag information based on rank. As machine learning algorithms perform the processes of identifying keywords in audio, matching the keywords to content included in the metadata, and determining when to generate tag information, the processes improve over time from the learned information, thus improving the overall computing performance as further described herein.

Similar to that described with respect to auto-pointers, the tag generation process can be performed in real-time as a narrated analytics playlist is being played out and/or prior to the output. For example, the playback module 1120 can perform the tag generation process (and/or the auto-pointer determination process) before any consumption of the narrated analytics playlist. As another example, the tag generation process (and/or the auto-pointer determination process) can be performed in an iterative fashion where X seconds of playlist data is analyzed prior to output by the playback module 1120, where X is an arbitrary value. In other words, during playback of a narrated analytics playlist, the playback module 1120 can "look ahead" at X seconds worth of content to perform the tag generation process (and/or the auto-pointer determination process).

Figure 26:
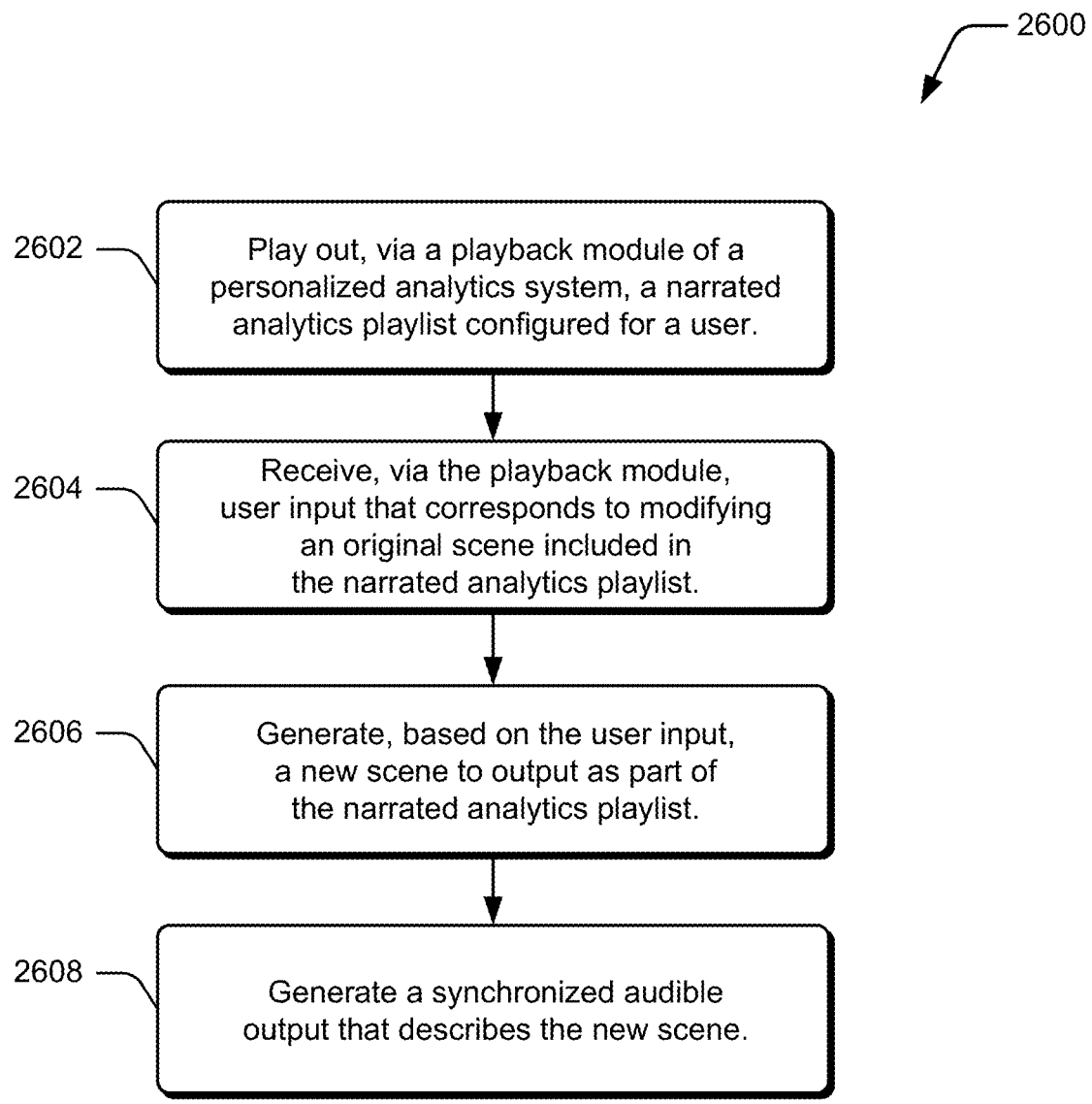
FIG. 26 illustrates an example method that can be used to dynamically generate lip synched content in accordance with one or more implementations.

Now consider FIG. 26 that illustrates an example method 2600 that can be utilized to dynamically generate lip synched content in a personalized analytics system that is in accordance with one or more implementations. The method can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1, such as various modules included in personalized analytics module 106 and/or client analytics module 108. While the method described in FIG. 26 illustrates these steps in a particular order, it is to be appreciated that any specific order or hierarchy of the steps described here is used to illustrate an example of a sample approach. Other approaches may be used that rearrange the ordering of these steps. Thus, the order of the steps described here may be rearranged, and the illustrated ordering of these steps is not intended to be limiting.

At 2602, a narrated analytics playlist configured for a user is played out via a playback module of a personalized analytics system. For example, playback module 1120 plays out narrated analytics playlist 2404 by rendering content and outputting audible descriptions as further described herein.

At 2604, user input that corresponds to modifying an original scene included in the narrated analytics playlist is received. Playback module 1120, for example, receives touch input via a display device of computing device 2402. However, other types of user input can be received, such as audible input, keyboard input, etc. In various implementations, the user input corresponds to an input command, such as a zoom in command, a zoom out command, an object selection command, and so forth. Some implementations receive user input that corresponds to selecting a portion of the original scene.

In response to receiving the user input, a new scene to output as part of the narrated analytics playlist is generated at 2606, where generating the new scene is based on the user input. To illustrate, playback module 1120 generates new content using metadata received with the narrated analytics playlist, where the new scene corresponds to a selected portion of the original scene. Alternately or additionally, the playback module queries the personalized analytics system for additional content. Thus, in some implementations, playback module 1120 generates the new content using data local to the playback module (e.g., the metadata), while in alternate or additional implementations, the playback module requests the new content from an entity remote from, and/or communicatively coupled to, the playback module (e.g., the personalized analytics system).

In response to generating the new scene, an audible output that describes the new scene is generated at 2608. This can include playback module 1120 generating the audible input from metadata and/or by querying the personalized analytics system. Generating the audible output includes generating audible content that describes a selected portion of the original scene in more detail relative to a description of the original scene that is included in the original narrated analytics playlist.

Figure 27:
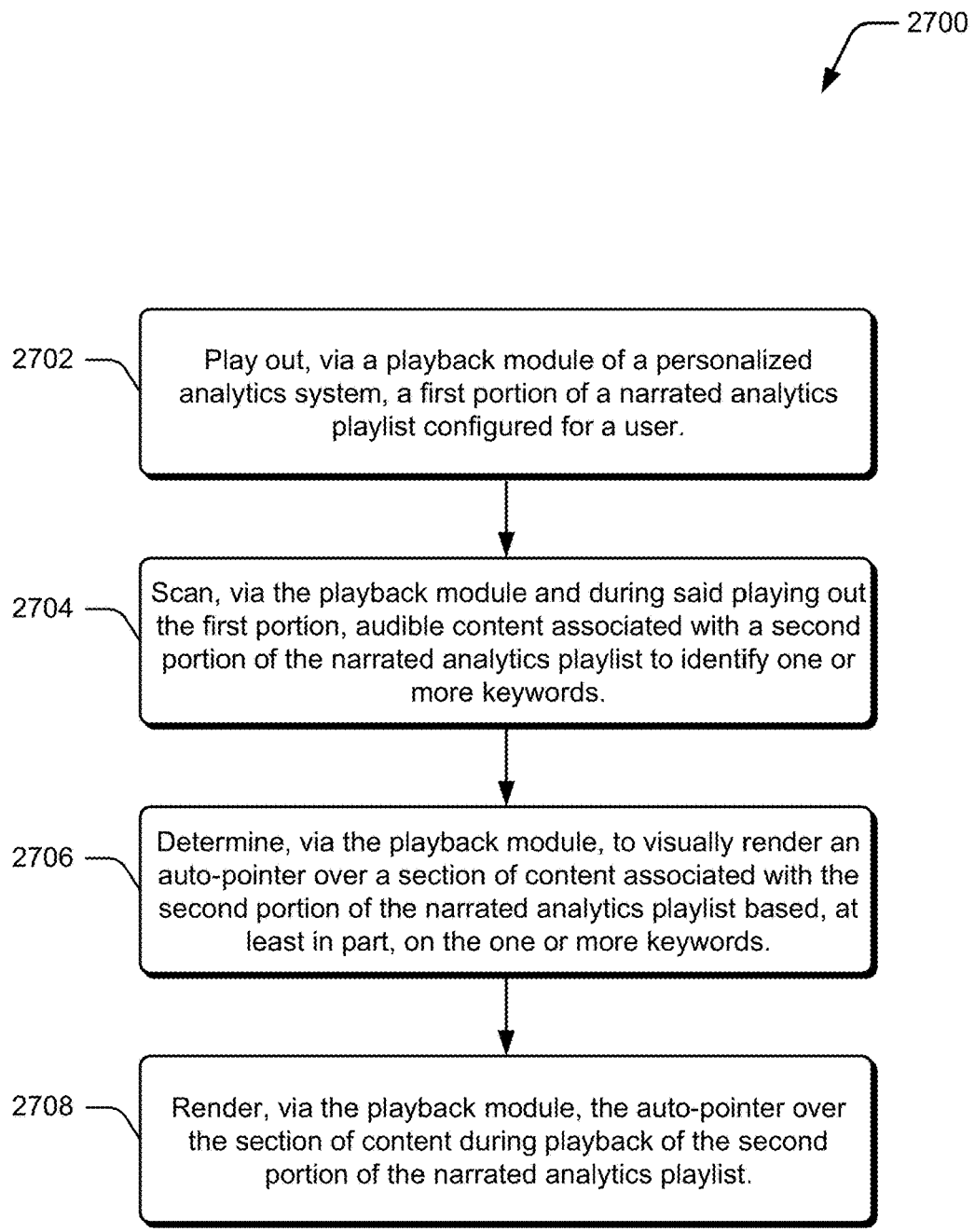
FIG. 27 illustrates an example method that can be used to dynamically apply auto-pointers to content included in a narrated analytics playlist in accordance with one or more implementations.

FIG. 27 illustrates an example method 2700 that can be utilized to dynamically apply auto-pointers to content included in a narrated analytics playlist that is in accordance with one or more implementations. The method can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1, such as playback module 132. While the method described in FIG. 27 illustrates these steps in a particular order, it is to be appreciated that any specific order or hierarchy of the steps described here is used to illustrate an example of a sample approach. Other approaches may be used that rearrange the ordering of these steps. Thus, the order of the steps described here may be rearranged, and the illustrated ordering of these steps is not intended to be limiting.

At 2702, a first portion of a narrated analytics playlist configured for a user, is played out via a playback module of a personalized analytics system. For example, playback module 1120 of FIG. 11 plays out narrated analytics playlist 2504 of FIG. 25. This includes visually rendering content and/or audibly outputting descriptions associated with the visually rendered content as further described herein.

During the playing out of the first portion of the narrated analytics playlist, one or more implementations scan audible content associated with a second portion of the narrated analytics playlist to identify one or more keywords at 2704. Playback module 1120, for instance, scans ahead in narrated analytics playlist 2504 (e.g., future content to be rendered visually and/or audibly output), such as by scanning a predetermined amount of content that is sequential and/or adjacent to the first portion of content currently being played out. Some implementations scan audible content associated with the second portion of the narrated analytics playlist using natural language processing algorithms, machine learning algorithms, and so forth. This can include scanning the audible content based on user anecdotal information to identify keywords relevant to a particular user. Alternately or additionally, the playback module scans metadata associated with the second portion of the narrated analytics playlist to match the one or more keywords to information included in the metadata. For instance, the metadata can include information that identifies a location of visual content associated with the one or more keywords.

At 2706, one or more implementations determine to visually render an auto-pointer over a section of content associated with the second portion of the narrated analytics playlist based, at least in part, on the one or more keywords. Playback module 1120, for example, determines to visually render auto pointer 2510 over visual content associated with narrated analytics playlist based upon said scanning. For instance, the playback module 1120 identifies visual content that corresponds to, and/or is synchronized with, audible output, and determines to visually enhance the visual content with an auto-pointer. Some implementations base the determination to render the auto-pointer on a relevancy metric, such as by identifying content that has a correlation to user anecdotal information within or above a threshold value. The determination to visually render an auto-pointer can occur automatically and without user interaction to initiate the rendering of the auto-pointer (e.g., the determination is based on analyses of content, audio, etc.).

Accordingly, and in response to determining to visually render the auto-pointer, one or more implementations render the auto-pointer over the section of content during playback of the second portion of the narrated analytics playlist at 2708. This can include visually magnifying, panning, centering, highlighting, and/or focusing in on content as further described herein.

Having described auto-pointer features in a personalized analytics system, consider now a discussion of image inputs to a personalized analytics system that is in accordance with one or more implementations.

Image Inputs to a Personalized Analytics System

Figure 28:
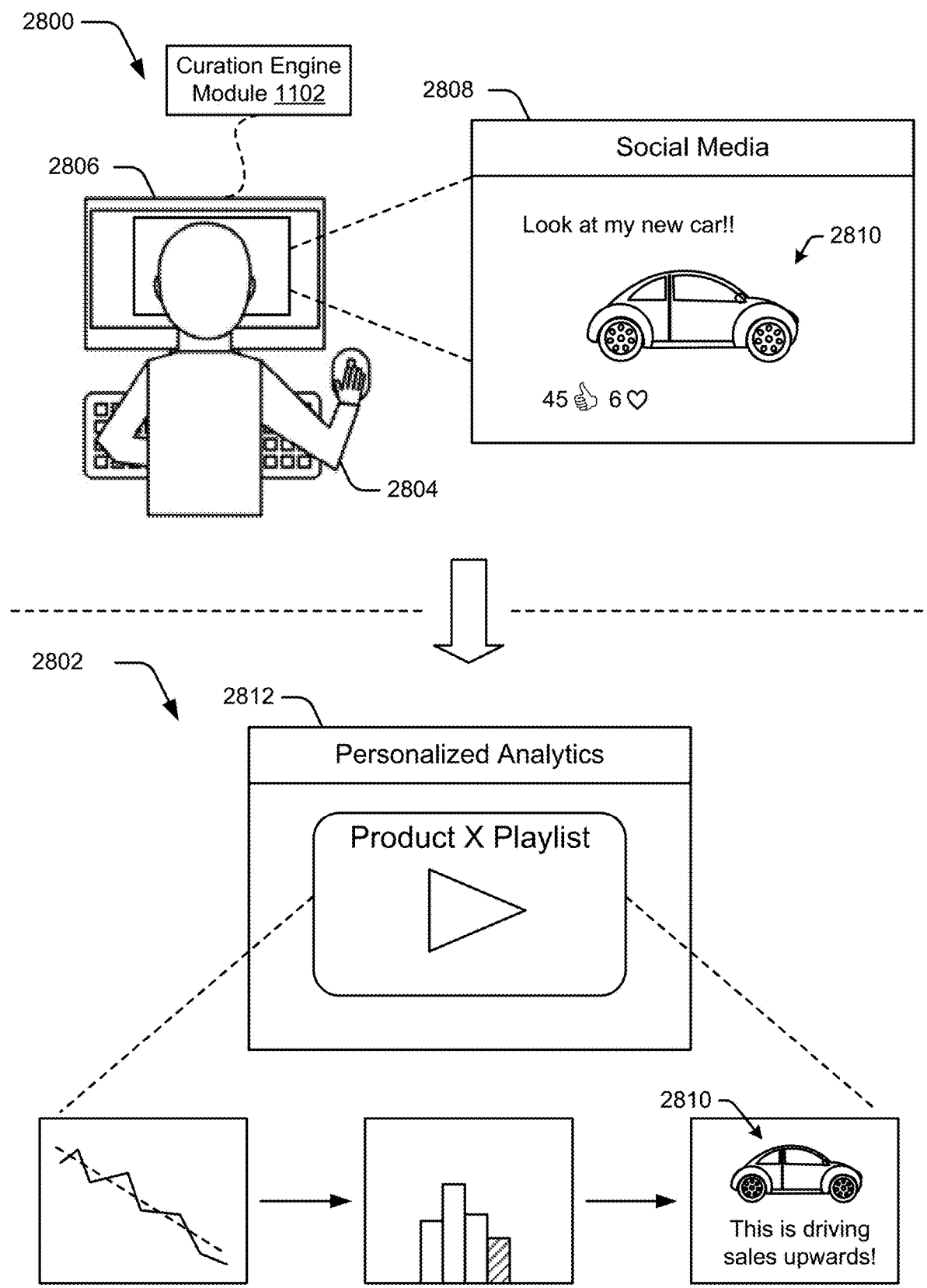
FIG. 28 illustrates example environments in which a personalized analytics system utilizes images scanned from social media in accordance with one or more implementations.

Various implementations receive and/or scan images as input to the personalized analytic system. To illustrate, consider now FIG. 28 that illustrates example environment 2800 and example environment 2802 that, collectively, demonstrate features of the personalized analytics system in which images are scanned from social media. In various scenarios, the features described with respect to FIG. 28 can be considered a continuation of one or more examples described with respect to FIGS. 1-27.

In example environment 2800, user 2804 interacts with computing device 2806. More particularly, user 2804 has navigated to a social media website 2808 that is associated with the user. Accordingly, the interactions can include logging on to the social media web site and/or interacting with content managed by the social media web site. In this example, a user 2804 has uploaded image 2810 as part of their user profile content. In implementations, the personalized analytics system scans a user's social media for images and/or videos. For example, curation engine module 1102 of FIG. 11 can scan the social media website 2808 in response to the personalized analytics system identifying the user interactions. Alternately or additionally, the curation engine module 1102 scans the social media during idle periods when the user is not interacting with computing device 2806. Thus, the scanning of social media for images and/or video can be triggered in response to identifying user interaction with the social media, and/or in response to identifying that a computing device is idle. In some implementations, the user directs the personalized analytics system to the social media content by registering the social media addresses with the personalized analytics system. Alternately or additionally, the user inputs authentication information that authorizes the personalized analytics system to scan the social media content.

Implementations of the personalized analytics system acquire images and/or videos from the user's social media, and incorporate the images into a narrated analytic playlist. In example environment 2802, narrated analytics playlist 2812 represents a narrated analytics playlist generated for user 2804. Based upon the acquisition of image 2810 from the user's social media website, the personalized analytics system incorporates the image into the narrated analytics playlist, thus making the presentation more personalized and directed to user 2804. In environment 2800, the curation engine module 1102 selects image 2810 based on the user uploading the image and/or the image being part of the user's profile content, but images can be selected based on other types factors as well, such as public social media images tagged with attributes associated with user 2804 (e.g., a same city, a same company, a same industry, etc.). For example, the curation engine module can correlate public social media content to anecdotal information associated with the user, and select an image that has a high correlation to the user.

Figure 29:
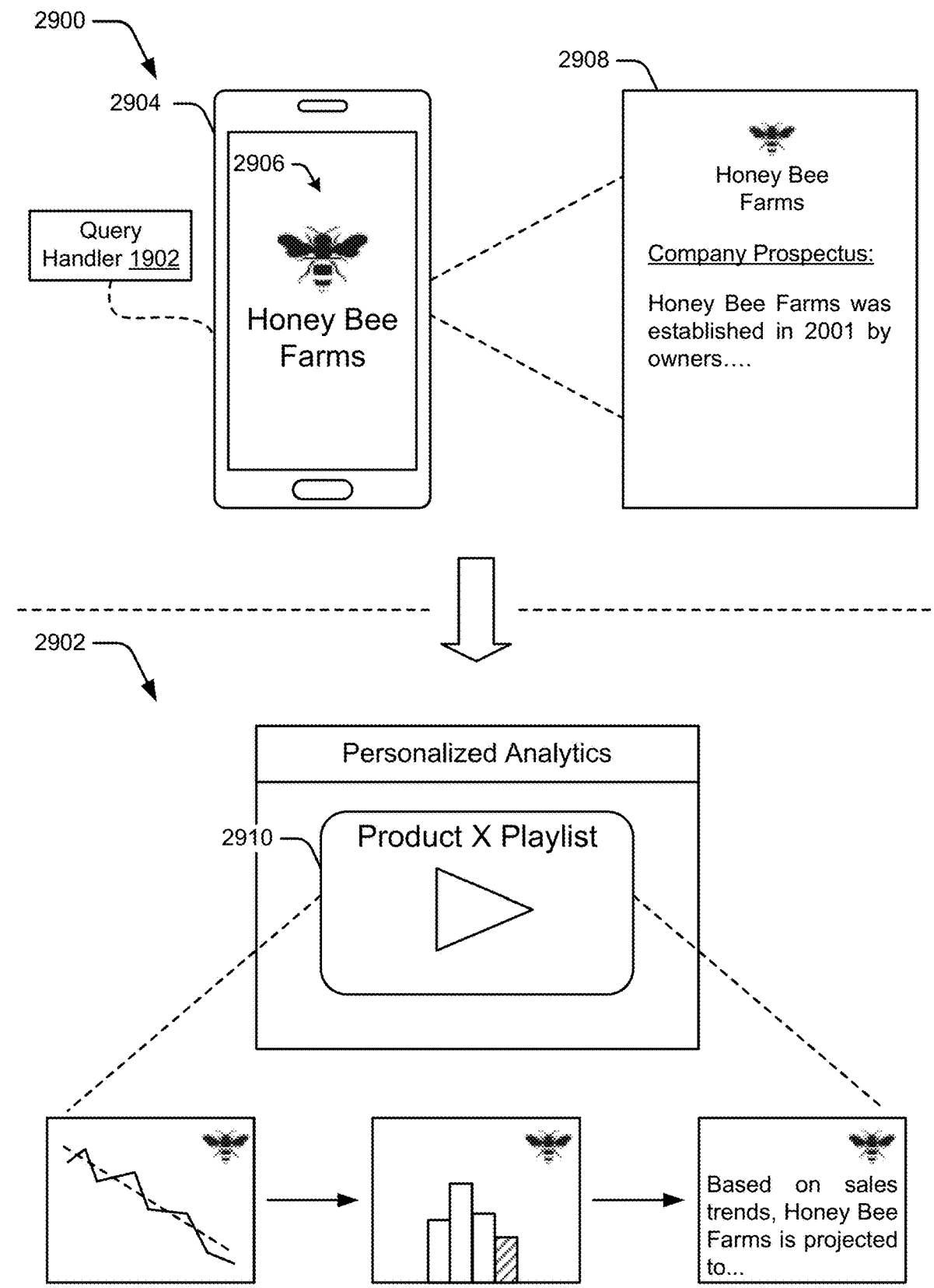
FIG. 29 illustrates example environments in which images can trigger the generation of a narrated analytics playlist in accordance with one or more implementations.

Consider now FIG. 29 that illustrates example environment 2900 and example environment 2902 that, collectively, describe features of the personalized analytics system in which input images can trigger the generation of a narrated analytics playlist. In various scenarios, the example described with respect to FIG. 29 can be considered a continuation of one or more examples described with respect to FIGS. 1-28.

Environment 2900 includes a mobile device 2904 that is communicatively coupled to a personalized analytics system. For example, mobile device 2904 can include a client device application that accesses the personalized analytics system via cloud-based services provided by a server. Alternately or additionally, mobile device 2904 can include a standalone application that implements features of the personalized analytics system. In this example, mobile device 2904 has captured an image 2906 that includes a company logo. For example, mobile device 2904 can capture image 2906 off of document 2908 using a camera of the mobile device. In various implementations, the camera is accessed via the client device application and/or the standalone application such that the personalized analytics system receives image 2906 as an input. Alternately or additionally, a user manually submits image 2906 to the personalized analytics system. In turn, image 2906 can be submitted to query handler 1902 of FIG. 19 and/or curation engine module 1102 of FIG. 11 (not illustrated here).

In implementations, receiving an image input can trigger the generation of a narrated analytics playlist. For instance, the query handler 1902 and/or the curation engine module 1102 can include image processing algorithms that analyze image 2906 to extract text from the image (e.g., "Honey Bee Farms"). Alternately or additionally, the query handler 1902 and/or the curation engine module 1102 correlate the extracted text to identify a company logo that matches the extracted text. As yet another example, the query handler 1902 and/or the curation engine module 1102 can include image matching algorithms that attempt to match the image to a company logo, identify similar images, extract tags from the similar images, etc. In response to identifying information about the image, such as a company name, a company logo, company location, etc., the personalized analytics system can trigger the generation of a narrated analytics playlist based on the input image. Accordingly, environment 2902 includes a narrated analytics playlist 2910 that includes insights based on the identified company (e.g., Honey Bee Farms).

Figure 30:
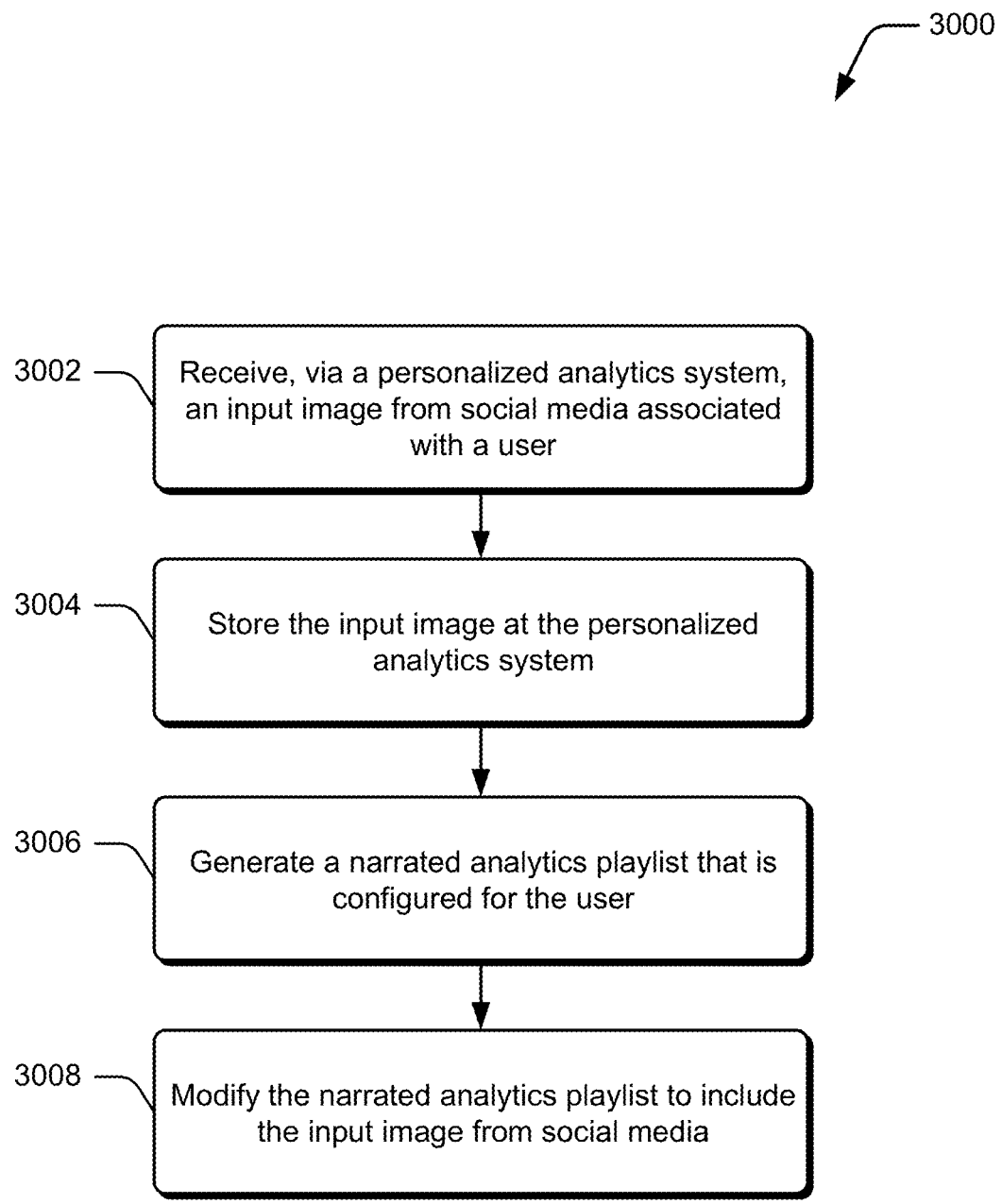
FIG. 30 illustrates an example method which can be utilized to incorporate social media content into a narrated analytics playlist in accordance with one or more implementations.

Now consider FIG. 30 that illustrates an example method 3000 that can be utilized to incorporate social media content into a narrated analytics playlist in accordance with one or more implementations. The method can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1, such as various modules included in personalized analytics module 106 and/or client analytics module 108. While the method described in FIG. 30 illustrates these steps in a particular order, it is to be appreciated that any specific order or hierarchy of the steps described here is used to illustrate an example of a sample approach. Other approaches may be used that rearrange the ordering of these steps. Thus, the order of the steps described here may be rearranged, and the illustrated ordering of these steps is not intended to be limiting.

At 3002, an input image from social media associated with a user is received via a personalized analytics system. For example, curation engine module 1102 can scan social media website 2808 to extract image 2810 as the input image. The social media can correspond to any type of social media, such as a social media networking application or website, a social media feed, a social media photo sharing application or website, a social media video sharing application or website, etc. In some implementations, video inputs are received as the input image. In at least one implementation, curation engine module 1102 receives an address to the social media as user input, and registers the address as a source of data. In turn, the curation engine module 1102 accesses the address during a data curation process. This can include the curation engine module 1102 receiving authentication information associated with the social media, and using the authentication information to access the social media. Sometimes curation engine module 1102 accesses and analyzes public social media content to identify at least one image that correlates to anecdotal information associated with the user. In turn, the curation engine module 1102 select the public content as the input image.

In response to the receiving, one or more implementations store the image at the personalized analytics system at 3004. For instance, curation engine modules 1102 stores the input image as curated data and/or anecdotal information associated with the user.

At 3006, a narrated analytics playlist that is configured for the user is generated. For instance, the personalized analytic system 500 of FIG. 5 can generate narrated analytics playlist using various techniques as further described herein.

One or more implementations modify the narrated analytics playlist to include the input image from social media at 3008. For example, story narrator module 1116 of FIG. 11 modifies narrated analytics playlist 2812 to include the input image 2810 based on the narrated analytics playlist being generated for user 2804.

Having described image inputs to a personalized analytics system, consider now a discussion of calculating playback duration for a narrated analytics playlist that is in accordance with one or more implementations.

Calculating Playback Duration for a Narrated Analytics Playlist

A narrated analytics playlist can include multiple different scenes, each of which presents information about a particular insight. Accordingly, the duration of time to play out the narrated analytics playlist can depend upon how many insights are included in the playlist. The duration of time can alternately or additionally depend upon how much information is included in each scene. Various implementations select a number of insights to include in a narrated analytics playlist based upon a desired play out duration for the narrated analytics playlist. For example, the personalized analytics system can have an arbitrary playback duration threshold value, such as 3 minutes, that is used to determine what and/or how many insights to include in the narrated analytics playlist. The playback duration threshold value can be based upon a predetermined value and/or based on anecdotal information (e.g., a first user only watches playlists with a 2-minute duration, a second user likes playlists with a 5-minute duration, etc.). Thus, the playback duration threshold value can be a fixed value or a dynamic value that is based on an associated user. In turn, the personalized analytics system can calculate and/or evaluate a playback duration of a narrated analytics playlist based upon the included content, such as by comparing the calculated playback duration to the playback duration threshold.

Figure 31:
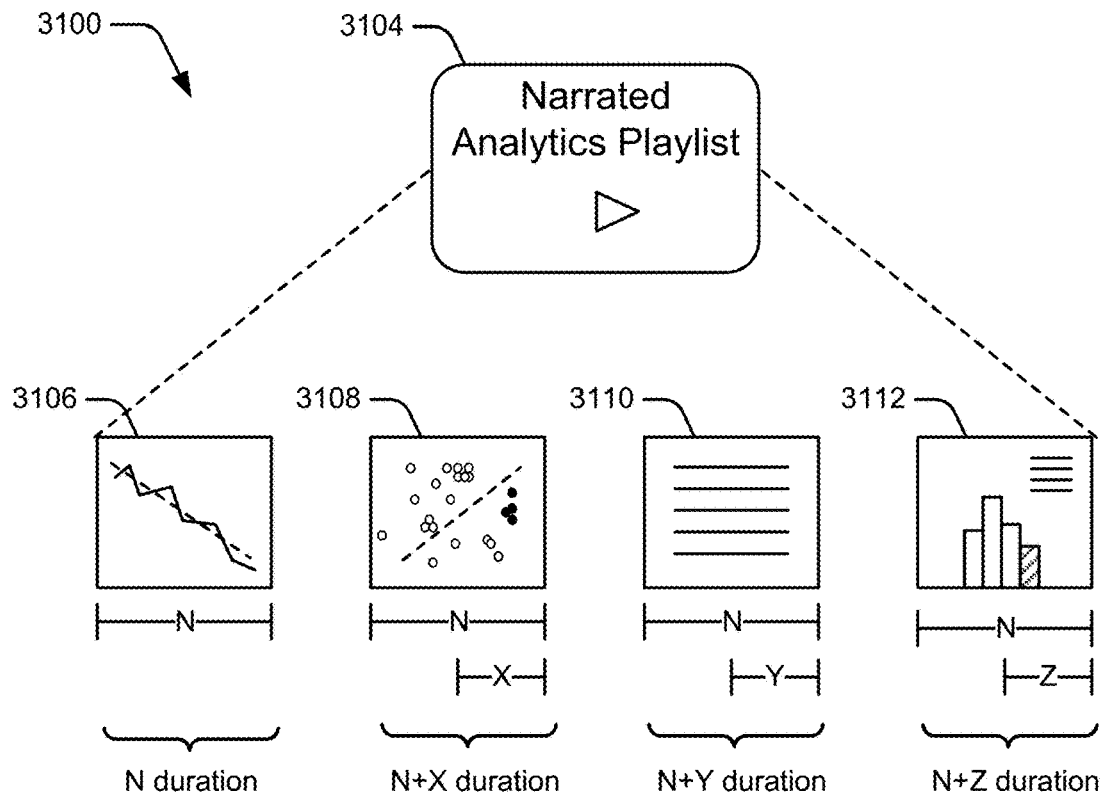
FIG. 31 illustrates example environments that illustrate features of calculating a playback duration for a narrated analytics playlist in accordance with one or more implementations.
Figure 31:
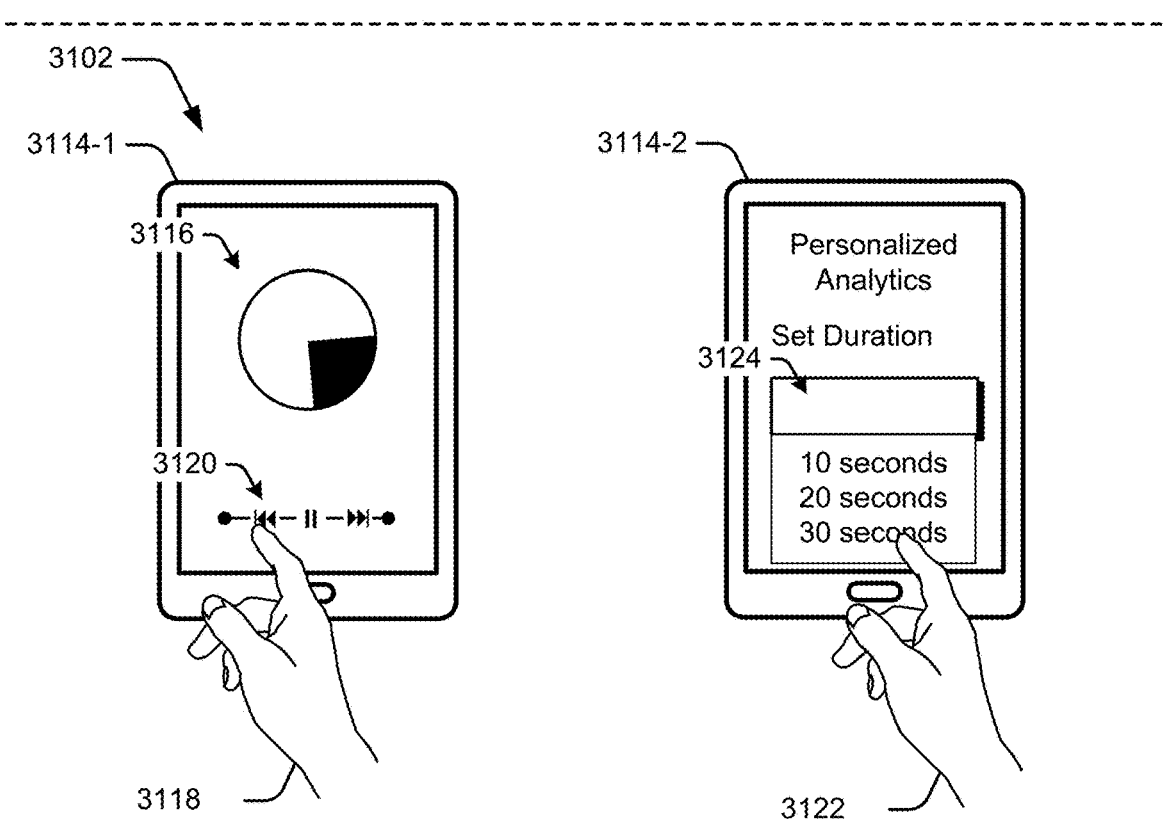

FIG. 31 illustrates example environment 3100 and example environment 3102 that, collectively, describe features of the personalized analytics system in which playback duration for a narrated analytics playlist is calculated. In various scenarios, the example described with respect to FIG. 31 can be considered a continuation of one or more examples described with respect to FIGS. 1-30.

Environment 3100 includes a narrated analytics playlist 3104 that can correspond to a generated narrated analytics playlist and/or a potential narrated analytics playlist that the personalized analytics system is evaluating. Here, the narrated analytics playlist includes four different scenes: scene 3106, scene 3108, scene 3110, and scene 3112. Alternately or additionally, the personalized analytics system has identified these scenes as potential scenes to include in the narrated analytics playlist. Various implementations calculate a playback duration based upon the content of a scene.

Scene 3106, for example, corresponds to a chart representation of an insight. Various implementations evaluate scene 3106 to identify a corresponding complexity, and determine a playback duration based upon the corresponding complexity. To illustrate, scene 3106 illustrates a sales trend chart that includes actual data points and an average of the data points. The personalized analytics system determines that the complexity of this particular chart corresponds to a default complexity, such as by identifying the chart illustrates two metrics and determining that the number of chart metrics (e.g., two) falls below a complexity threshold value. Accordingly, and based on the complexity of scene 3106, the personalized analytics system assigns scene 3106 a duration of "N" seconds, where N represents an arbitrary default playback duration assigned to scenes, such as 10 seconds, 12 seconds, and so forth. In other words, the duration calculation and/or duration assignment configures narrated analytics playlist 3104 to playout the scene for "N" seconds before transitioning to scene 3108.

Moving to scene 3108, the personalized analytics system determines that scene 3108 has more complexity relative to scene 3106. For instance, relative to scene 3106, scene 3108 includes more metrics and/or objects that translate into a longer playback duration. In other words, more complex scenes are assigned longer playback durations to allow a user time to comprehend the visual representation and/or to allow for a longer verbal description to play out. Accordingly, if the respective complexity falls above the playback complexity threshold value, the personalized analytics system assigns the more complex scenes a playback duration that adds an additional playback duration to the default the default playback duration. Thus, the personalized analytics system calculates and/or assigns scene 3108 a playback duration of "N+X" seconds, where X is an arbitrary playback duration. Alternately or additionally, a scene may have verbose text relative to other scenes, such as scene 3110 relative to scene 3106 and/or scene 3108.

Various implementations determine an amount of textual description associated with a scene, whether rendered visually or output audibly, and calculate and/or assign the scene additional playback duration time relative to the default playback time. In environment 3100, the personalized analytics system calculates and/or assigns scene 3110 a playback duration of "N+Y" seconds, where Y is an arbitrary playback duration, based upon an amount of text description associated with scene 3110. As yet another example, the personalized analytics system can identify scenes that include a combination of visual content objects and text description, such as scene 3112, and calculate and/or assign and the scene a playback duration of "N+Z" seconds, where Z is an arbitrary playback duration. Thus, based upon these various assignments and/or calculations, the personalized analytics system can calculate the total playback duration of narrated analytics playlist 3104 as being:

$$N+(N+X)+(N+Y)+(N+Z)=4N+X+Y+Z$$

The calculation of playback duration based on content can adjust a play out duration of a scene to provide users with more time to absorb more complex content. Alternately or additionally, the total duration calculation can also be compared to the playback duration threshold value to determine if the current configuration of narrated analytics playlist 3104 meets the playback duration specification, or if adjustments are needed (e.g., remove insights, simplify text, etc.).

One or more implementations calculate the playback duration for scenes of a narrated analytics playlist based upon user input. To further illustrate, consider now environment 3102 that includes examples of user input that can influence the calculated duration of scenes for a narrated analytics playlist in accordance with one or more implementations. Environment 3102 includes computing device 3114 that is illustrated as a tablet with a touchscreen interface. Computing device 3114-1 corresponds to the tablet at a first point in time, while computing device 3114-2 corresponds to the tablet at a second point in time.

Computing device 3114-1 is in progress of playing out a scene 3116 of a narrated analytics playlist. During the playback of scene 3116, user 3118 interacts with rewind control 3120. Various implementations identify this user behavior as input requesting more play out time, and determine to dynamically increase the playback duration of scene 3116. The determination to dynamically increase the playback duration can be based upon a single user interaction with the rewind control and/or multiple interactions with the rewind control. Thus, the playback duration of a narrated analytics playlist and/or a particular scene within the narrated analytics playlist can be based upon user interactions. In some implementations, the personalized analytics playlist modifies the corresponding narrated analytics playlist such that future playbacks will render scene 3116 for the duration calculated based on the user interaction with rewind control 3120.

Computing device 3114-2 displays a configuration screen associated with the personalized analytics system. Here, user 3122 modifies the value of a default playback duration by interacting with control 3124. Accordingly, various implementations set the playback duration for a scene based on configuration settings and/or user configuration input.

Some implementations determine a number of insights to include in a narrated analytics playlist based upon advertisements. Consider an example in which a narrated analytics playlist includes an advertisement with an advertisement duration of 10 seconds. The selection of the advertisement to include in the narrated analytics playlist can be based on any suitable type of information, such as a correlation between the advertisement content and anecdotal information. The inclusion of the advertisement can affect the total playback duration of the narrated analytics playlist. Accordingly, various implementations determine a number of insights to include based upon the total playback duration, whether an advertisement is being included in the narrated analytics playlist, and/or the advertisement duration of the advertisement. For instance, if no advertisement is being included in a narrated analytics playlist directed to a particular input query, the personalized analytics system can determine to include four insights to achieve a desired playback duration for the narrated analytics playlist. However, for the same input query, the personalized analytics system can determine to include three insights when an advertisement is being included in the narrated analytics playlist. The personalized analytics system can alternately or additionally select the three insights based upon respective complexities and/or playback durations. Thus, the inclusion of an advertisement can affect how the personalized analytics system configures a narrated analytics playlist (e.g. how many insights to include, what insights to include, etc.). In some implementations, the personalized analytics system can determine to include an advertisement in the narrated analytics playlist if the total playback duration falls below a playback duration threshold and/or additional free time (e.g. unused) has been identified.

Various implementations remove insights and/or scenes from the narrated analytics playlist based upon the playback duration threshold value. To illustrate, consider an example in which the personalized analytics system determines to include X scenes that correspond to various insights, where X is an arbitrary number. The personalized analytics system can calculate the total playback duration for the scenes as further described herein, and compare the total playback duration to the playback duration threshold value. If the total playback duration is under and/or meets the playback duration threshold value, various implementations determine to include all of the X scenes in the narrated analytics playlist. However, if the total playback duration exceeds the playback duration threshold value, one or more implementations determine to exclude some of the X scenes from the narrated analytics playlist.

To determine which scenes to exclude from the narrated analytics playlist, one or more implementations rank each respective scene of the X scenes, such as by computing a "value to business" ranking using machine learning algorithms. As one example, the machine learning algorithms can correlate scene content to the input query, and generate a value ranking based upon the correlation. However, other types of ranking algorithms can be applied as well. In turn, the personalized analytics system can determine to identify which of the scenes have lower rankings relative to other scenes, and determine to exclude N of the lowest ranking scenes from the narrated analytics playlist as a way to adjust the total playback duration. As another example, the personalized analytics system determines which scenes of the X scenes to exclude from the narrated analytics playlist based on anecdotal information, such as by removing scenes that the anecdotal information indicates the user is less likely to watch relative to other scenes. Accordingly, the personalized analytics system can determine which scenes to exclude based upon ranking information and/or anecdotal information associated with a user.

Figure 32:
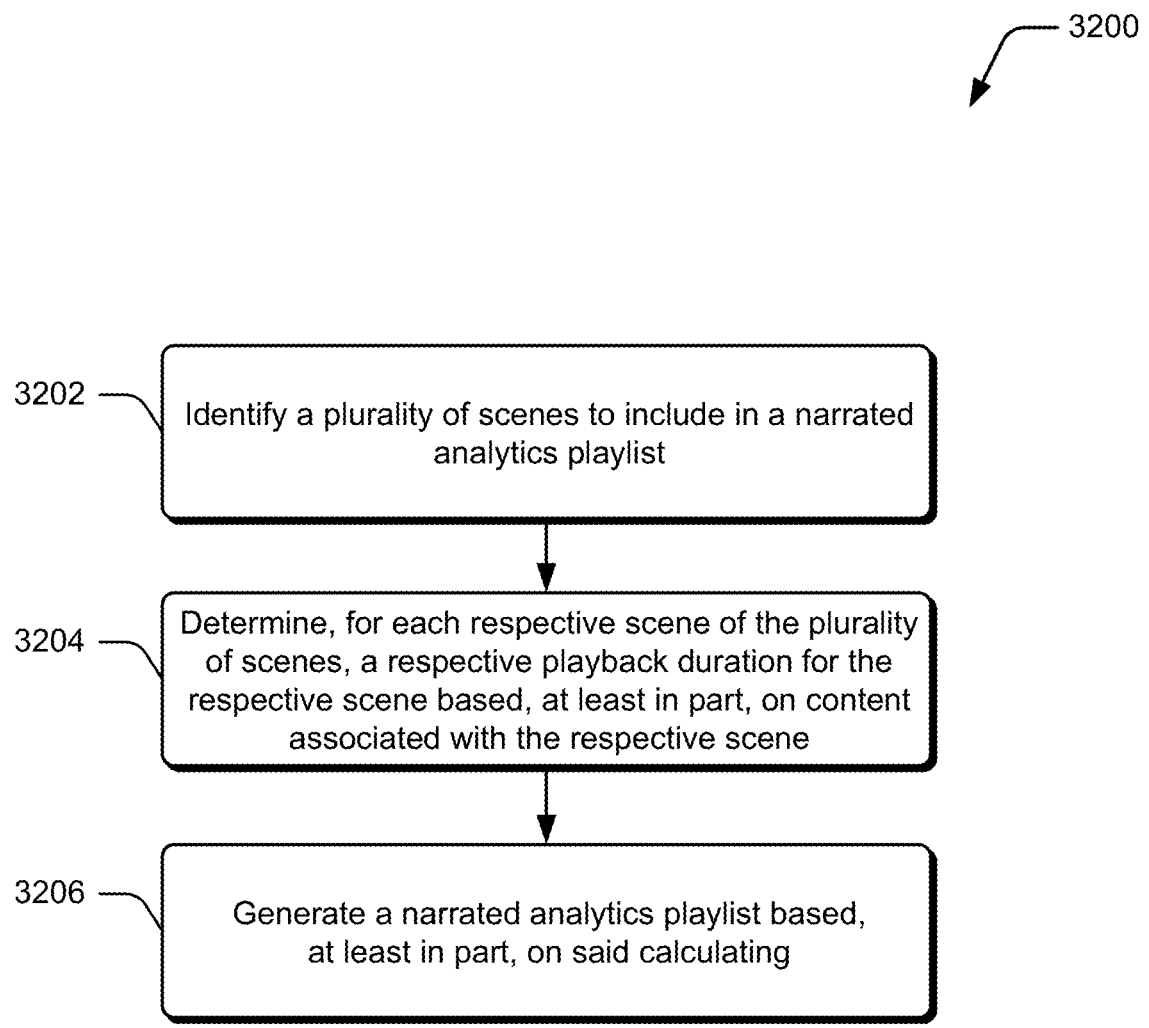
FIG. 32 illustrates an example method that can be utilized to determine a respective playback duration for a scene in a narrated analytics playlist in accordance with one or more implementations.

Now consider FIG. 32 that illustrates an example method 3200 that determines a respective playback duration for each scene in a narrated analytics playlist in accordance with one or more implementations. The method can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1, such as various modules included in personalized analytics module 106 and/or client analytics module 108. While the method described in FIG. 32 illustrates these steps in a particular order, it is to be appreciated that any specific order or hierarchy of the steps described here is used to illustrate an example of a sample approach. Other approaches may be used that rearrange the ordering of these steps. Thus, the order of the steps described here may be rearranged, and the illustrated ordering of these steps is not intended to be limiting.

At 3202, a plurality of scenes to include in a narrated analytics playlist is identified. For example, story narrator module 1116 of FIG. 11 identifies scene 3106, scene 3108, scene 3110, and scene 3112 of narrated analytics playlist 3104 based upon input from insight engine module 1114 as further described herein.

In response to identifying the plurality of scenes, a respective playback duration for each respective scene of the plurality of scenes is determined based, at least in part, on content associated with the respective scene at 3204. For example, story narrator module 1116 determines a respective playback duration for scene 3106, scene 3108, scene 3110, and scene 3112 of narrated analytics playlist 3104. In implementations, story narrator module 1116 identifies a respective complexity of the respective scene, and assigns the respective scene the respective playback duration based on the respective complexity. The respective complexity can be identified in any manner, such as by identifying an amount of text associated with the respective scene, identifying a number of content objects associated with the respective scene, a type of chart included in the scene, etc. If the respective complexity falls below a playback complexity threshold value, the story narrator module assigns the respective scene a default playback duration as the respective playback duration. If the respective complexity falls above the playback complexity threshold value, the story narrator module assigns the respective playback duration a value that corresponds to the default playback duration combined with an additional playback duration.

At 3206, a narrated analytics playlist is generated based, at least in part, on said calculating. Story narrator module 1116, for instance, generates the narrated analytics playlist using the respective playback durations calculated at 3202. Alternately or additionally, the story narrator module calculates a total playback duration associated with the plurality of scenes, and compares the total playback duration to a playback duration threshold value as a way determine if the narrated analytics playlist meets a playback duration specification. In some implementations, story narrator module 1116 determines to modify the plurality of scenes to meet the playback duration specification.

Having described calculating playback duration for a narrated analytics playlist, consider now a discussion of generating headlines in accordance with one or more implementations. Generally, the various implementations described below may be combined in various ways with the implementations described above, such as by combining and executing the different systems and functionalities described throughout this disclosure to realize the implementations discussed below.

Headlines Based on Extracted Insights

Figure 33:
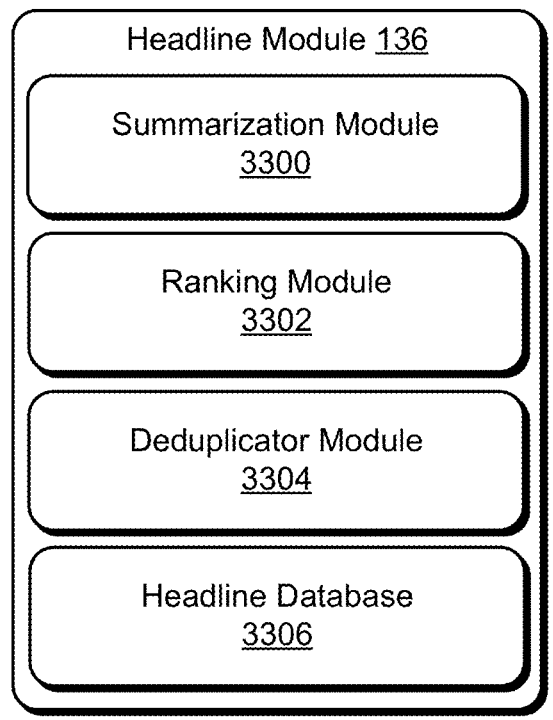
FIG. 33 illustrates details concerning the headline module for generating headlines in accordance with one or more implementations.

As part of various aspects for generating headlines, FIG. 33 depicts additional details concerning the headline module 136. To illustrate, the headline module 136 includes a summarization module 3300, a ranking module 3302, a deduplicator module 3304, and a headline database 3306. The summarization module 3300 represents functionality for extracting headlines from larger sets of data, such as anecdotal data, insight data, narrated analytics playlists, and so forth. In at least one implementation, the summarization module 3300 extracts keywords related to data sets in various ways, such as query keywords obtained from the parser module 112 (e.g., based on user-generated queries), topic information (e.g., metadata) from a data set, user input identifying keywords of interest, and so forth.

The ranking module 3302 represents functionality for ranking headlines generated by the summarization module 3300. The summarization module 3300, for instance, generates a set of headlines to be made available for output at a particular time, and the ranking module 3302 ranks the headlines based on a particular set of ranking criteria. The set of headlines can then be output based on their ranking, such as in descending ranked order. In implementations where a large group of headlines are generated and ranked, only those headlines that meet a particular ranking criteria may be output. Further details concerning headline ranking are discussed below.

The deduplicator module 3304 represents functionality for identifying and removing duplicate headlines. For instance, the deduplicator module 3304 compares headline candidates generated by the summarization module 3300 to determine if any of the headline candidates are duplicates of one another. If duplicate headline candidates are identified, the deduplicator module 3304 can remove the duplicate headline candidates prior to the headline candidates being marked as headlines for output. In at least one implementation, where two headline candidates are identified as duplicates of one another, the lowest ranked headline candidate can be removed.

To enable efficient storage and retrieval of headline data, the headline database 3306 is maintained by the headline module 136. Generally, the headline database 3306 stores various types of data pertaining to headlines, such as headline content and headline metadata. In at least one implementation, the headline database 3306 is arranged as a relational database that arranges and stores headline data based on relationships between headlines and/or data utilized to generate headlines, such as curated data, insight data, and so forth. The headline database 3306, for instance, may be implemented in conjunction with the curated relational data model database 1202 to arrange headline data based on various relational models, examples of which are described with reference to FIG. 12.

Figure 34:
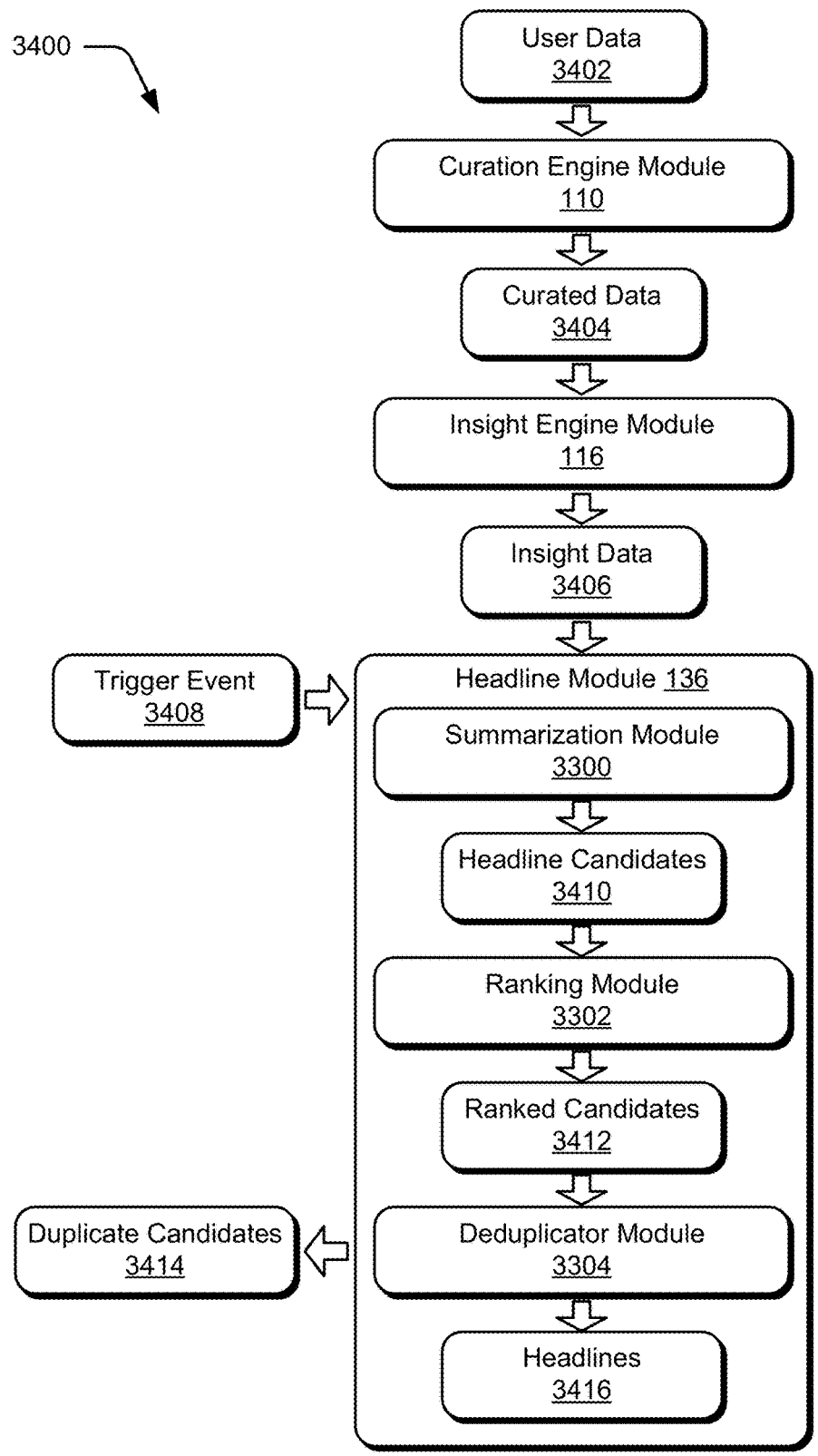
FIG. 34 illustrates a system that is operable to provide an overview of techniques for automated summarization of extracted insight data in accordance with one or more implementations.

FIG. 34 depicts a system 3400 that is operable to provide an overview of techniques for automated summarization of extracted insight data described herein. In the system 3400, the curation engine module 110 takes user data 3402 as input and generates curated data 3404 based on the user data 3402. Generally, the user data 3402 can take various forms, such as anecdotal data observed and/or generated by the personalized analytics module 106. Example ways for generating the curated data 3404 are detailed previously.

The insight engine module 116 then takes the curated data 3404 as input and generates insight data 3406, which is generally representative of insights generated according to the techniques described above. In at least some implementations, the insight data 3406 includes different discrete instances of insights that are individually usable for different purposes, such as generating narrated analytics playlists, generating headlines, and so forth. Generally, the insight data 3406 can be generated in response to various events and stored for various usage purposes, such as in the database 124. The insight data 3406, for instance, can be generated on a temporal basis, such as periodically, based on time events observed in user behaviors, scheduled calendar events, and so forth.

Further to the system 3400, the headline module 136 detects a trigger event 3408 indicating that the headline module 136 is to generate a set of headlines. Generally, the trigger event 3408 can take various forms, such as a periodic event indicating that headlines are to be generated on a predefined periodic basis, a temporal event generated based on a previously-observed user activity, a detected calendar event, and so forth. Example ways for generating and configuring the trigger event 3408 are discussed below. Based on the trigger event 3408, the headline module 136 takes the insight data 3406 as input, and the summarization module 3300 processes the insight data 3406 to generate headline candidates 3410. Generally, each headline candidate 3410 represents a summarization of information described in different portions of the insight data 3406. The ranking module 3302 then processes the headline candidates 3410 to generate ranked candidates 3412, which represent the headline candidates 3410 ranked based on a set of ranking criteria. In at least one implementation, the ranking criteria pertain to a set of performance metrics associated with a particular user profile. A user, for instance, identifies a set of performance metrics that relate to the user data 3402. Accordingly, the ranking module 3302 analyzes the headline candidates to determine their relative correspondence to the performance metrics, and assigns a ranking value to each headline candidate 3410 based on its relative correspondence. For instance, headline candidates with the highest correspondence with the performance metrics are given a higher-ranking value than those with lower correspondence. Accordingly, the ranked candidates 3412 represent the headline candidates 3410 arranged in order of their respective ranking values, such as highest to lowest.

Continuing, the deduplicator module 3304 compares the ranked candidates 3412 to identify and remove duplicate candidates 3414 from the ranked candidates 3412. Generally, the duplicate candidates 3414 represent ranked candidates 3412 that are duplicates of other ranked candidates. The deduplicator module 3304 may identify duplicates in various ways, such as based on semantic and/or textual comparison of the ranked candidates. As further detailed below, the deduplicator module 3304 can employ a matching algorithm that generates identifiers for headline candidates and compares the identifiers to identify headline candidates with similar identifiers. For instance, when two duplicate headline candidates are identified, one of the duplicates is removed. In an implementation where deduplication is performed on the ranked candidates 3412, a duplicate ranked candidate with a lower ranking is removed. Although deduplication is discussed with reference to the ranked candidates 3412, deduplication may alternatively or in addition be performed on the headline candidates 3410 and prior to ranking by the ranking module 3302.

Accordingly, the headline module 136 generates headlines 3416 that represent the ranked candidates 3412 with the duplicate candidates 3414 removed. Further, the headlines 3416 can be arranged in ranked order, such as for output based on their order from the ranked candidates 3412. The headlines 3416 can be used for various purposes, such as provided to the story narrator module 118 and/or the animator module 120 for output as part of an analytics experience, e.g., a narrated analytics playlist.

Figure 35:
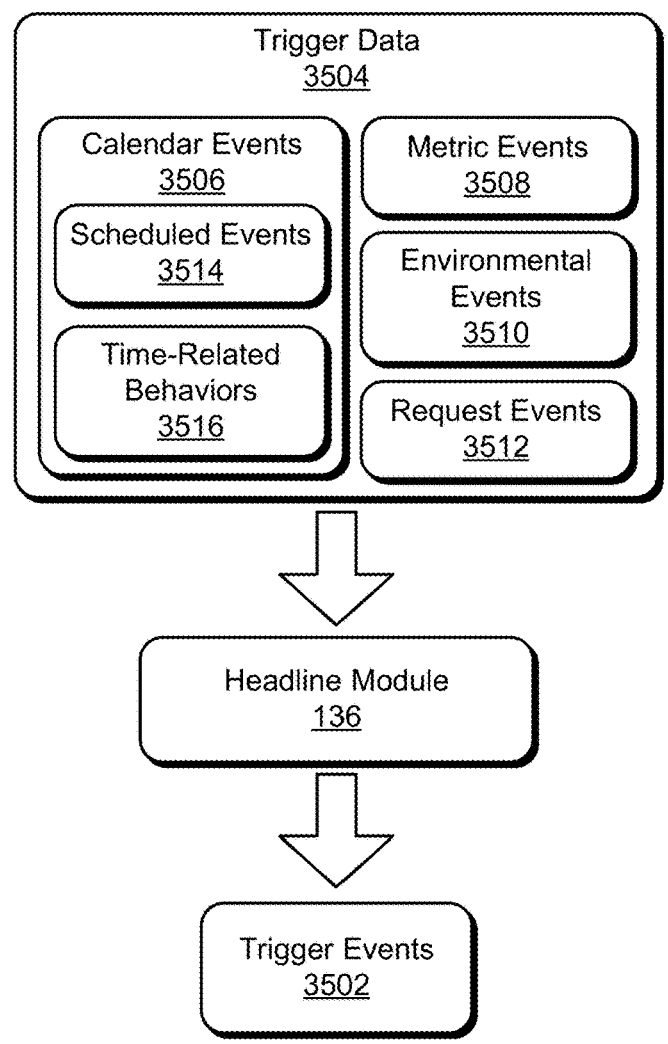
FIG. 35 illustrates an example scenario for generating trigger events for headlines in accordance with one or more implementations.

FIG. 35 depicts an example scenario 3500 for generating trigger events 3502. Generally, the trigger events 3502 are based on trigger data 3504 indicating that headlines are to be generated for various purposes. In this particular example, the headline module 136 takes various types of trigger data 3504 as input, and generates the trigger events 3502 based on the input data. Examples of the trigger data 3504 used to generate the trigger events 3502 include calendar events 3506, metric events 3508, environmental events 3510, and request events 3512. The calendar events 3506 generally represent time-related events, such as generated and/or observed by the calendar module 138. In this particular example, the calendar events 3506 include scheduled events 3514 and time-related behaviors 3516. The scheduled events 3514 represent events that are scheduled for specific days and times, such as meetings, conferences, academic events, social events, and so forth. In at least one implementation, a user can interact with functionality provided by the calendar module 138 to generate the scheduled events 3514. Additionally, the scheduled events 3514 can be pushed to the calendar module 138 from other users, such as a different user that sends an electronic invitation to a user of the computing device 104 to participate in a particular event. Accordingly, a trigger event 3408 can be generated based on the scheduled events 3514, such as to generate headlines prior to (e.g., at a predefined time interval prior to) a scheduled event 3514, and/or to generate headlines that are pertinent to subject matter of a scheduled event 3514.

The time-related behaviors 3516 represent data that describes different behaviors that exhibit temporal trends and/or temporal commonalities. For instance, the time-related behaviors 3516 are based on user behaviors that are observed over time and that demonstrate some type of consistent temporal pattern, such as user behaviors that are observed to occur within a consistent time range over a period of time. As one example, consider that a user typically interacts with the computing device 104 at a particular time and/or time range during the day (e.g., between 9:00-9:15 am) during the work week to access the client analytics module 108 and consume content generated by the personalized analytics module 106. Accordingly, the time-related behaviors 3516 can reflect this behavior, and a trigger event 3408 can be generated based on this behavior. For instance, a trigger event 3408 can be generated based on the time-related behaviors 3516, such as to generate headlines prior to (e.g., at a predefined time interval prior to) a previously-observed time-related behavior 3516.

The metric events 3508 represent data that pertains to events that occur that are pertinent to defined metrics (e.g., KPIs), such as metrics selected by a user as metrics of interest. For instance, consider that a user identifies a metric of interest as "sales of Product A in Region B." Accordingly, a metric event 3508 can represent a significant event that is detected that pertains to this metric of interest. For instance, if a significant fluctuation in the sales of Product A in Region B is observed, this fluctuation can cause a trigger event 3408 to be generated. Thus, the metric events 3508 can represent phenomena that pertain to defined metrics of interest and that are observed to occur outside of a typically observed and/or a user-defined range of values.

The environmental events 3510 represent data that describes different events that occur in relation to an environment of interest, such as a physical environment in which the computing device 104 is located, a system environment of the computing device 104, and/or a system environment pertaining to the personalized analytics module 106. For instance, consider that the computing device 104 includes sensors for detecting various environmental conditions, such as light, sound, temperature, vibrations, motion, user proximity and/or identity, and so forth. Accordingly, environmental events 3510 can describe different environmental conditions to be used as trigger events 3502, such as changes in light levels (e.g., when lights are turned on in a surrounding environment), temperature fluctuations that exceed a specified threshold, voice recognition that identifies specific users, user presence detection based on motion, biometric user detection (e.g., facial recognition), and so on.

As another example, environmental events 3510 can include events that pertain to a system environment of the computing device 104, such as changes in power state (e.g., a power on event, a hibernation event, and so forth), changes in network state (e.g., connection to a particular type and/or instance of a network, a change (e.g., increase) in available network bandwidth), changes in device resource state (e.g., an increase in available processor and/or memory resources), and so forth. Still further, environmental events 3510 can include system environment pertaining to the personalized analytics module 106. For instance, the personalized analytics module 106 may receive notifications of various system events that may affect headline-related attributes, such as significant fluctuations in performance metrics for defined metrics of interest. Accordingly, trigger events 3502 can be defined for different environmental events 3510.

Continuing, the request events 3512 represent data that describes different requests for headlines, such as user input to request that headlines be generated. The request events 3512, for instance, may represent dynamic events that occur, such as on-demand requests by a user for headlines. Alternatively or in addition, the request events 3512 represent scheduled requests for headlines, such as user input to request that headlines be generated on a scheduled basis. For instance, a user may interact with the client analytics module 108 to request that headlines be generated on specific days, times, on a periodic reoccurring basis, and so forth.

Accordingly, the different events defined as part of the trigger data 3504 can be used to generate the trigger events 3502, which represent events used to trigger generation of headlines.

Figure 36:
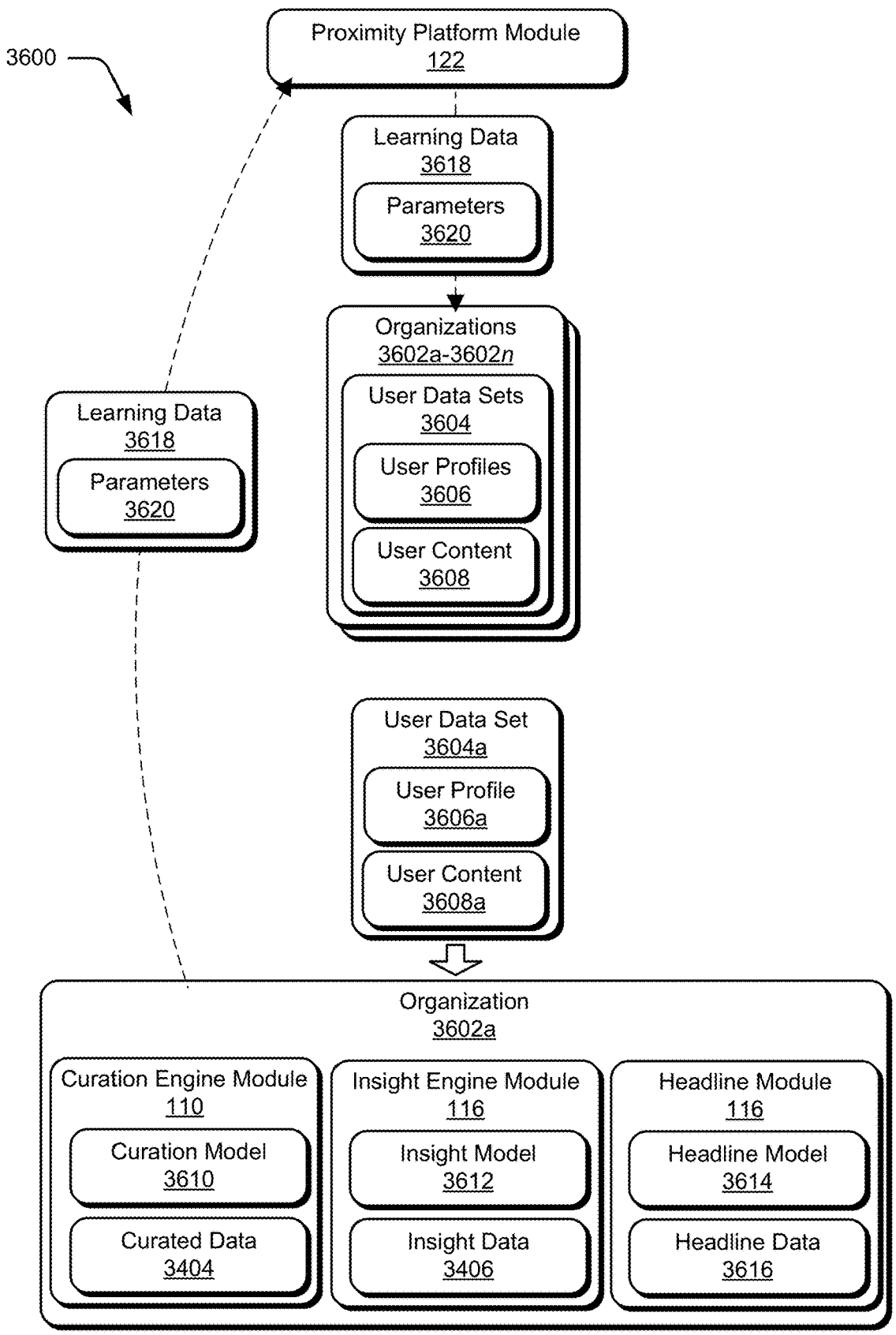
FIG. 36 illustrates an example scenario for utilizing machine learning for generating different types of data pertaining to headlines in accordance with one or more implementations.

FIG. 36 depicts an example scenario 3600 for utilizing machine learning for generating different types of data pertaining to headlines. In the scenario 3600, different organizations 3602 maintain different user data sets 3604 for different users affiliated with the respective organizations 3602. Further, the user data sets 3604 each include user profiles 3606 and user content 3608. The user profiles 3606 generally represent data that describes user-profile specific attributes, such as user preferences, user settings, user behaviors on associated systems, user permissions, and so forth. In at least one implementation, the user profiles 3606 identify, for individual user profiles, performance metrics of interest to individual users, such as KPIs of interest that are manually and/or automatically selected for individual user profiles 3606. The user content 3608 represents content that is obtained from various sources and that is tailored to individual user profiles 3606. The user content 3608, for instance, can be obtained by querying different data sources with user-specific content queries, such as the database and data warehouses 1104 and/or cloud applications 1106. Thus, for each user data set 3604, the user content 3608 can reflect content that is relevant to user attributes identified in the user profiles 3606.

In the scenario 3600, an organization 3602a utilizes a user data set 3604a for a particular user to generate insight data 3406 that is usable for various purposes, such as generating headlines to be served to a particular user. To do this, the curation engine module 110 takes the user content 3608a as input and processes the user content 3608a to generate the curated data 3404. Example ways for curating data are presented in detail above. In this particular example, the curation engine module 110 leverages a curation model 3610, which represents a machine learning model (and/or set of models) that is trained to process the user content 3608 and generated the curated data 3404. In at least one implementation, the data from the user profile 3606a is utilized to generate training data that is used to train the curation model 3610. For instance, user preferences and user behaviors identified in the user profile 3606a are used to train the curation model 3610 to extract data of interest from the user content 3608a and generated the curated data 3404.

The insight engine module 116 then takes the curated data 3404 as input and processes the curated data 3404 to generate the insight data 3406. In this particular example, the insight engine module 116 leverages an insight model 3612, which represents a machine learning model (and/or set of models) that is trained to process the curated data 3404 and generate the insight data 3406. In at least one implementation, the data from the user profile 3606a is utilized to generate training data that is used to train the insight model 3612. Further, the insight model 3612 can be trained to recognize certain types of insights, such as analogies, anomalies, outliers, segmentations, etc.

To generate headlines based on the insight data 3406, the headline module 136 leverages a headline model 3614 to generate headline data 3616. Generally, the headline model 3614 represents a machine learning model (and/or set of models) that is trained to process the insight data 3406 and generate the headline data 3616. The headline model 3614 can be trained in various ways, such as using portions of the user data set 3604a. For instance, data from the user profile 3606a that describes user interactions with headlines can be used to train the headline model 3614 to extract headlines of interest from the insight data 3406. This can include data describing which types of headlines are more frequently accessed by a user, such as specific subject matter represented in frequently accessed headlines. Generally, by training the headline model 3614 to process the insight data 3406 and extract headlines of interest, the headline model 3614 is able quickly identify headlines from the insight data 3406, which lowers system latency time (e.g., of the server 102 and/or the computing device 104) and increases device performance, such as by increasing processing speed.

As detailed above such as with reference to FIGS. 15, 20A, 20B, algorithms that are utilized as part of generating curated data and insights can be tuned and evolve to provide for more accurate and relevant output. Accordingly, as the organization 3602a applies and evolves the curation model 3610, the insight model 3612, and the headline model 3614 over time, the organization 3602a generates learning data 3618 that describes attributes of the models as evolved over time. In at least one implementation, the learning data 3618 includes data that describes changes to the different models that are made based on user feedback, such as positive and/or negative feedback regarding headlines that are presented to a user. The learning data 3618, for instance, includes model parameters 3620 that describe parameters of the respective models, such as weights used in an artificial neural network, hyper-parameter values, support vectors in a support vector machine, coefficients in a linear regression or logistic regression algorithm, an assumed distribution used in a statistical analysis (e.g., Gaussian distribution, binomial distribution, degenerate distribution, etc.), and so forth.

To enable the learning data 3618 to be utilized by others of the organizations 3602, the learning data 3618 is propagated to the proximity platform module 122. Prior to this, however, the organization 3602a extracts personalized data from the learning data 3618, such as data that may provide visibility into values of the user data set 3604*a*, curated data 3404, the insight data 3406, and/or the headline data 3616. Accordingly, the proximity platform module 122 can distribute the learning data 3618 among the organizations 3602 for use in tuning their algorithms without exposing sensitive data utilized by the organization 3602*a* as part of generating the insight data 3406. Similarly, others of the organizations 3602 can generate their own respective sets of learning data that are obtainable by the organization 3602*a* from the proximity platform module 122 for use in tuning and evolving the curation model 3610, the insight model 3612, and/or the headline model 3614.

Figure 37A:
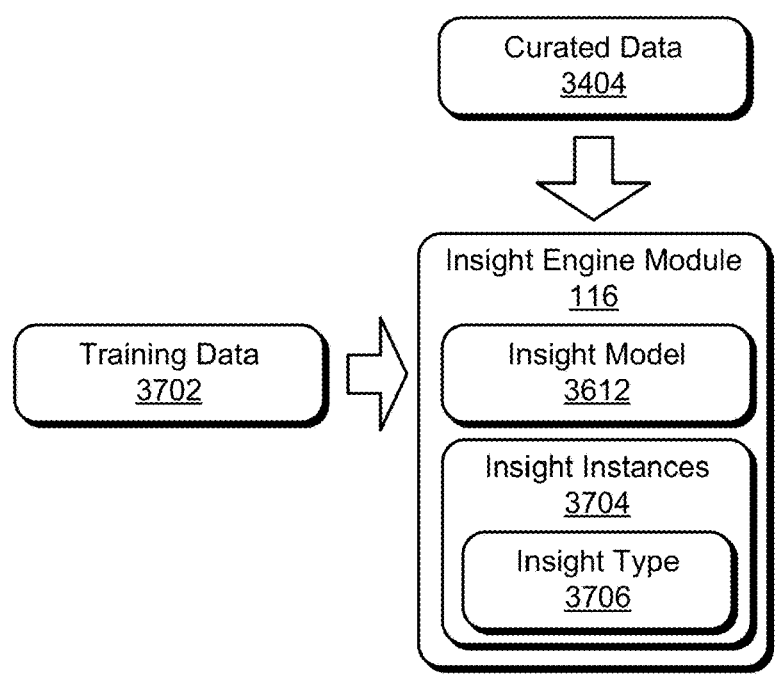
FIG. 37A depicts a scenario for generating insights for use in generating headline candidates.

FIG. 37A depicts a scenario 3700A for generating insights for use in generating headline candidates. In the scenario 3700A, the insight model 3612 is trained using training data 3702 to predict and/or categorize different types of insights. Generally, the training data 3702 can be aggregated from a variety of different data sources, such as the user data sets 3604, the curated data 3404, the learning data 3618, and so forth. The training data 3702, for instance, trains the insight model 3612 to process the curated data 3404 and to identify and categorize different insights from the curated data 3404. In at least some implementations, the insight model 3612 is implemented as a multi-layered architecture (e.g., a layered neural network) where individual layers perform specific tasks, such as feature extraction, feature prediction, feature ranking, and so forth.

Consider, for example, that the insight model 3612 takes the curated data 3404 as input and performs feature extraction to identify insight instances 3704 from the curated data 3404. Generally, the insight instances 3704 represent individual collections of related data that each describe potential data of interest, such as metrics of interest identified for a particular user. Further, the insight model 3612 generates a predicted insight type 3706 for each of the insight instances 3704. As mentioned previously, various types (e.g., categories) of insights can be defined (e.g., analogies, anomalies, outliers, segmentations) and the insight model 3612 can be leveraged to predict a likelihood that individual features extracted from data (e.g., the curated data 3404) correspond to particular types of insights.

For instance, consider the notion of "outliers" and "anomalies," which generally represent data sets that deviate from expected data points and/or data patterns. To identify outliers/anomalies, the insight model 3612 generates probability values ("p-values") that estimate the probability of occurrence of a particular observation obtained from an extracted data feature. If a p-value for a particular observation is above a particular threshold, this may indicate that the observation is expected based on part observations (e.g., from the training data 3702), and thus is not an outlier/anomaly. However, if a p-value for a particular observation is below a threshold value (e.g., 0.05), this indicates that the observation is below a threshold probability and thus represents an outlier or an anomaly. Further, as part of generating headlines generated from outlier/anomaly insights, those observations with the lowest p-value can selected as headlines.

Consider another example for segmentation insights. Generally, segmentation (e.g., clusters) insight can be predicted by the insight model 3612 based on a purity of each segment/cluster. For instance, segmentation is performed by grouping data samples (e.g., from the curated data 3404) which are similar to each other. Further, the insight model 3612 calculates the similarity of data samples within a group or segment using a metric called a "silhouette" whose values are between −1 and 1. A segment insight is said to be pure if the silhouette value for the segment is above a threshold, e.g., is close to 1. For purposes of selecting headlines from segmentation insights, those headlines with the highest silhouette values can be selected.

In another example, analogies can be identified based on occurrences over defined time-series. For instance, univariate time series analogies represent analogy headlines identified based on maximum and minimum growth rates of metrics of interest. Multivariate time series analogies represent analogy headlines identified based on growth of a highest-ranking headline attribute. Generally, a headline can be made up of different headline attributes (e.g., words, phrases, values) that each represent a particular parameter, such as a metric, user preference, and so forth.

In another example, growth rate headlines can be identified based on growth rates of various metrics over time. For instance, univariate growth rate headlines represent headlines identified based on maximum and minimum growth rates for a headline over a particular time period. Multivariate growth headline represent headlines identified based on growth for a highest-ranking headline attributes of a period of time.

In a further example, headlines can be generated directly from time series analyses. For instance, a univariate time series analysis headline can be generated based on an observed slope where a particular observed time series trend is not flat. A "seasonal" univariate time series analysis headline can be generated where an observed trend is not flat, and the headline can be generated to include a maximum correction calculated as part of the trend.

Multivariate time series analyses headlines can also be generated. For instance, if an identified trend of a highest-ranking headline attribute of a headline attribute is not flat, the slope of the headline candidate can be used to generate a headline. Further, if a trend of the highest-ranking attribute is not flat, the maximum correction calculated as part of the trend can be used to generate a headline.

These example insight and headline types are presented for purposes of example only, and it is to be appreciated at implementations described herein can utilized a variety of different insight and headline categorizations for generating headlines.

Figure 37B:
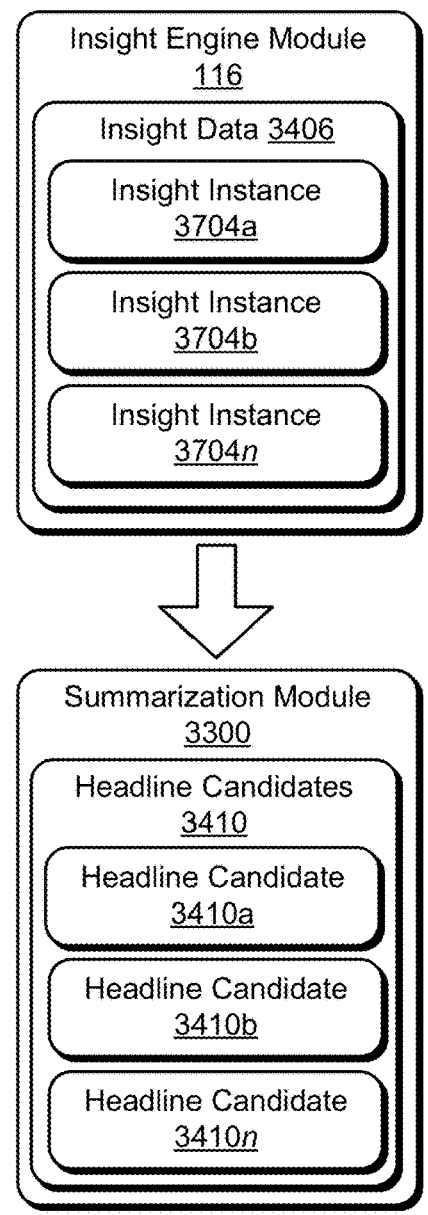
FIG. 37B depicts a scenario for generating headline candidates for use in generating headlines.

FIG. 37B depicts a scenario 3700B for generating headline candidates for use in generating headlines. In the scenario 3700, the insight engine module 116 parses the insight data 3406 into insight instances 3704*a*-3704*n*. One example way for generating the insight instances 3704 is described above and leverages the insight model 3612. Generally, each insight instance 3704 represents a body of content data that pertains to a particular subject matter that is determined by the insight engine module 116 to represent an insight of potential interest to a user. Each insight instance 3704, for example, is separately usable for different purposes, such as generating a headline 3416 and/or a narrated analytics playlist. Further, each insight instance 3704 can include different types of content, such as text, images, audio, animations, and so forth.

In at least some implementations, the insight instances 3704 are identified based on performance metrics (e.g., KPIs) of potential interest to a user, such as based on explicit user input to identify the performance metrics, and/or based on metrics of interest implied from user behaviors. For instance, the insight engine module 116 may interact with the KPI generation module 1218 to identify performance metrics of interest for use in generating insight instances upon which headlines are based. Examples of different performance metrics are discussed above with reference to the curation engine module 1200.

Further to the scenario 3700, the summarization module 3300 processes the insight instances 3704a-3704n and generates headline candidates 3410a-3410n that each represent a potential headline that describes attributes of a respective insight instance 3704. Generally, the headline candidates 3410 represent a summarization of content included in respective insight instances 3704 and can be generated in various ways. For instance, the summarization module 3300 can apply various types of processing to the insight instances 3704 to generate the headline candidates, such as keyword extraction, image processing and recognition, audio processing and recognition, natural language processing and phrase generation, and so forth.

Consider, for example, that the insight instance 3704a pertains to a change in a performance metric of interest to a user, such as sales of Product A in Region B. The insight instance 3704a may include various content relating to this performance metric, such as sales statistics over a period of time, store statistics for locations in Region B that sell Product A, text-based reports generated to describe different trends pertaining to the performance metric, and so forth. Accordingly, the summarization module 3300 parses the insight instance 3704a to generate the headline candidate 3410a as a summarization of the insight instance 3704a as it affects the performance metric. The headline candidate 3410a, for example, includes content such as text, images, audio, and so forth, that summarizes the insight instance 3704a. Thus, the remaining headline candidates 3410 further represent summarizations of their respective insight instances 3704.

Figure 38A:
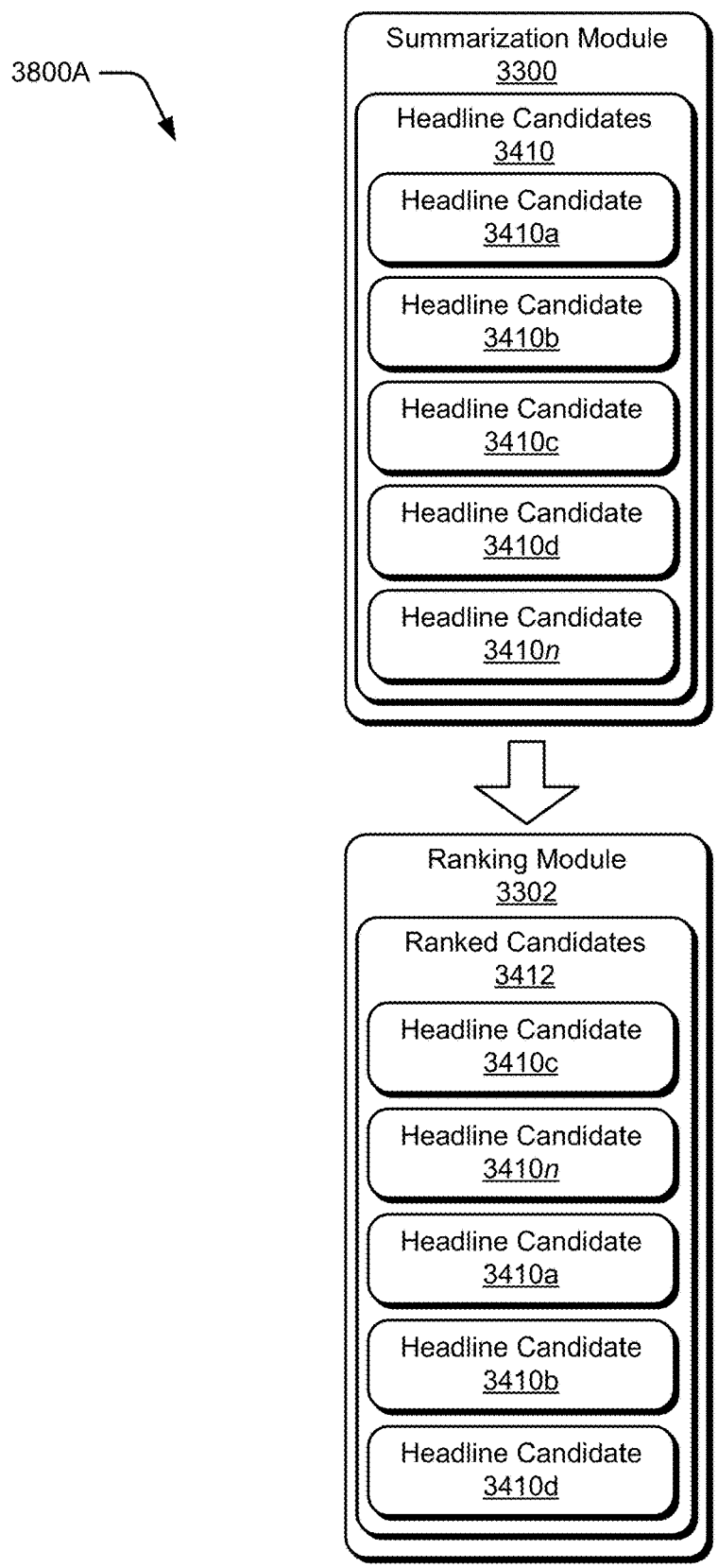
FIG. 38A depicts a scenario for ranking headline candidates.

FIG. 38A depicts a scenario 3800A for ranking headline candidates. In the scenario 3800, the summarization module 3300 maintains the headline candidates 3410, such as generated previously. The ranking module 3302 processes the headline candidates 3410 to generate the ranked candidates 3412. Generally, the ranking module 3302 can employ different types and combinations of ranking algorithms to rank the headline candidates. For instance, the ranked candidates 3412 represent the headline candidates 3410 as ranked based on their relative correlation with a defined performance metric. For instance, consider that a performance metric of interest is defined as topline sales of a particular organization. Further, consider that the headline candidate 3410a describes that sales of Product A in Region B increased topline sales of the organization by 1.5%, and the headline candidate 3410n describes that sales of Product C in Region D increased topline sales of the organization by 3.0%. Accordingly, since headline candidate 3410n has a greater impact on topline sales, it is ranked above headline candidate 3410a in the ranked candidates 3412. Similarly, the other headline candidates 3410 are ranked based on their impact on a performance metric and/or set of performance metrics. This is not to be construed as limiting, however, and a variety of other ranking algorithms may additionally or alternatively be utilized, such as filtering algorithms, object ranking algorithms, instance ranking algorithms, playback rankings, scored queries correlating to metrics of interest (e.g., KPIs) and associated headlines, click-stream analysis for metrics of interest and drill-path info related to headlines, knowledge graph attributes that correlate with metrics of interest and headlines, metric-based usage rankings, headline quality rankings, curated attributes correlations to headlines (e.g., preferred verbiage of a user), data inferences correlating to headline keywords, contextual rankings of metrics of interest to headlines, etc.

Figure 38B:
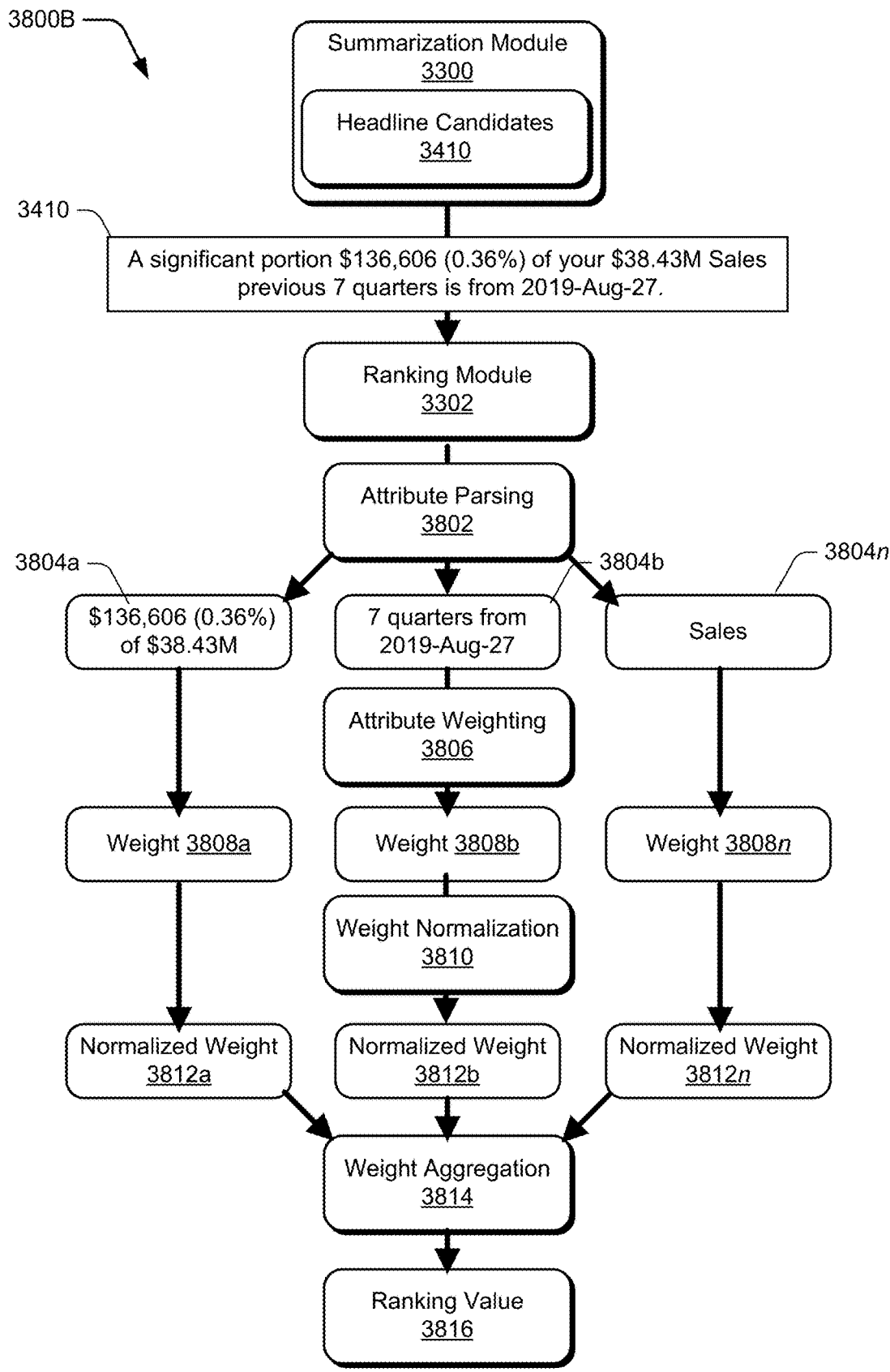
FIG. 38B depicts a scenario describing details in an example implementation for ranking headlines.

FIG. 38B depicts a scenario 3800B describing details in an example implementation for ranking headlines, such as for generating the ranked candidates 3412. In the scenario 3800B, the ranking module 3302 receives a headline candidate 3410 from the summarization module 3300. The ranking module 3302 then performs attribute parsing 3802 on the headline candidate 3410 to generate a set of headline attributes 3804 from the headline candidate 3410. Generally, the headline attributes 3804 represent different portions of the headline candidate (e.g., words, phrases, values, etc.) that represent pre-defined headline parameters, such as attributes that correspond to metrics of interest, values for metrics, sentiment values, and so forth. Thus, the ranking module 3302 parses the headline candidate into the different headline attributes Q including headline attributes 3804a, 3804b, and 3804n.

The ranking module 3302 then performs attribute weighting 3806, which applies a weighting algorithm to generate a raw weighting value 3808 for each headline attribute 3804. One example weighting algorithm utilizes, for each headline attribute 3804, a sum of: (parameter value+weight of the parameter+a personalization factor+a time relevance element+a model diagnostic output). Generally, each of these values can be system and/or user defined, such as to correspond to specific user preferences and/or metrics of interest. Further, the values applied may be based on specific insight types from which a headline is generated. For instance, the parameter value can be specified to indicate a relative value for a particular instance of a parameter, such as based on a magnitude (e.g., numerical value) associated with an instance of a parameter. The weight of parameter can correspond to a weighting value applied to a parameter, such as based on impact of the parameter on a metric of interest. Generally, different weighting values can be defined for different parameters.

Continuing, the personalization factor can represent a value that is determined based on relative correspondence of a headline attributes to user-specific information, such as user preferences expressly identified by a user, and/or user-observed behaviors. The time relevance element represents a value that quantifies a temporal relevance for a headline attribute, such as how recently the headline attribute was generated, and/or a relative recency of a time period to which a headline attribute pertains to. The model diagnostic output represents a value that quantifies a relative correspondence of a headline attribute to a specified category, such as a category on insight used to generate headlines. In at least one implementation, the model diagnostic output can be based on a value output by the insight model 3612, such as a probability value indicating a probability that a particular insight used to generate a headline corresponds to a particular insight type. Accordingly, the different values generated for each attribute 3804a-3804n are used (e.g., summed) to generate weighting values 3808a-3808n for the respective attributes 3804.

The ranking module 3302 then performs weight normalization 3810 on the weighting values 3808a-3808n to generate respective normalized weights 3812a-3812n. For instance, an average weighting of the weighting values 3808a-3808n is calculated, and is used to normalize the weighting values 3808a-3808n to generate the respective normalized weights 3812a-3812n. The ranking module 3302 then performs weight aggregation 3814 to aggregate (e.g., sum) the normalized weights 3812a-3812n to generate a ranking value 3816. The ranking value 3816, for instance, can be compared with ranking values for other headlines to rank the headline candidate 3410 relative to the other headlines. Accordingly, the process described in the scenario 3800B can be performed for each headline candidate of a set of headline candidates to generate a ranking value for each headline candidate, and the ranking values can be utilized to arrange the headline candidates in a ranked order such as described in the scenario 3800A.

Figure 39:
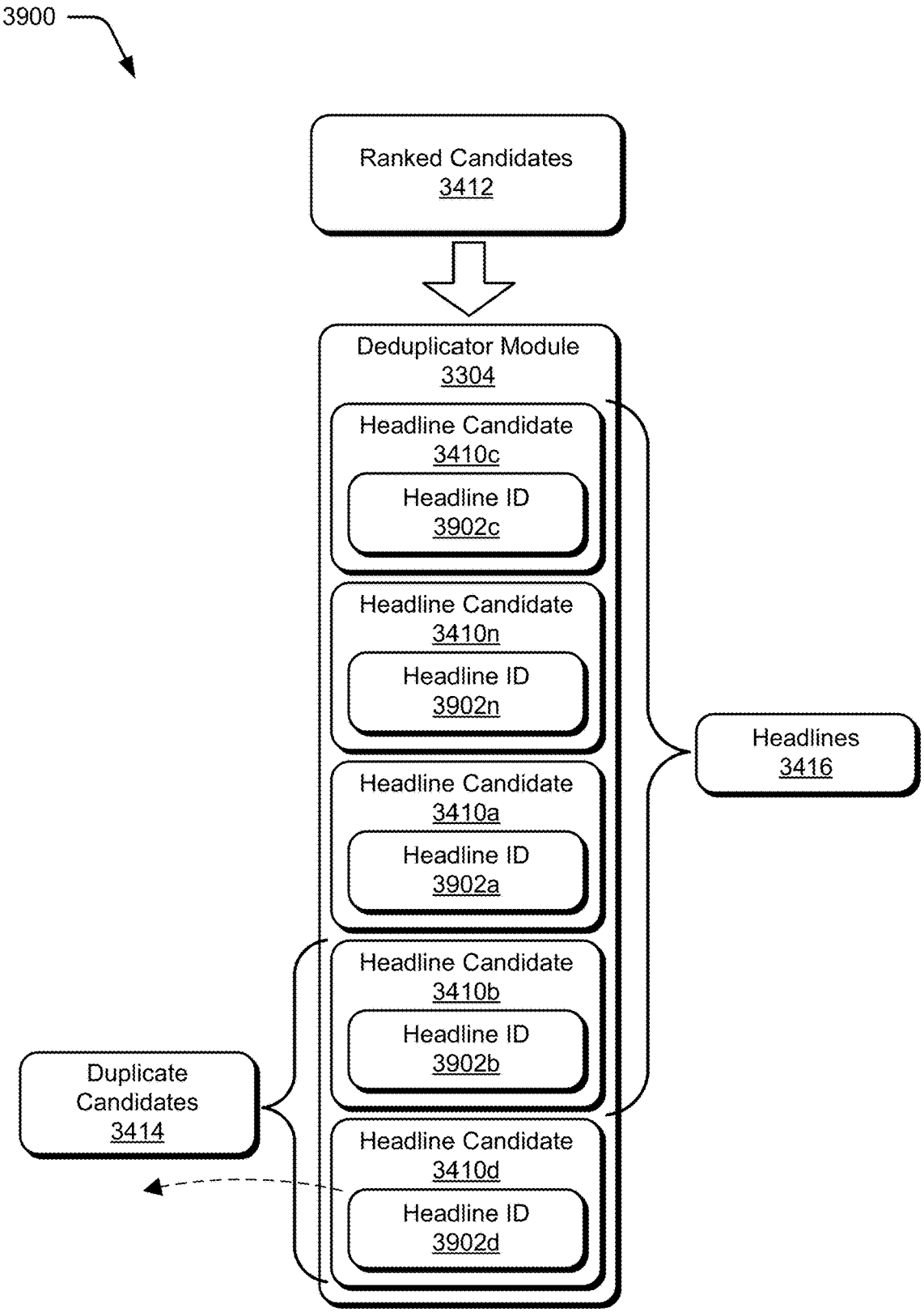
FIG. 39 illustrates an example scenario for deduplicating headline candidates in accordance with one or more implementations.

FIG. 39 depicts a scenario 3900 for deduplicating headline candidates. In the scenario 3900, the deduplicator module 3304 process the ranked candidates 3412 to identify the headlines candidates 3410b, 3410d as duplicate candidates 3414. The deduplicator module 3304, for instance, compares attributes of the different ranked candidates 3412, and determines that the headline candidates 3410b, 3410d have matching attributes.

In at least one implementation, to compare headline candidates and identify duplicates, a headline identifier ("ID") 3902 is generated for each headline candidate 3410. For instance, the headline candidates 3410 are of different types depending on an insight type used to generate the headline candidate. Generally, different insight types can be defined, such as "analogies," "anomalies," "outliers," "segmentations," and so forth. Thus, for each insight type, different parameters can be used to generate a respective the headline ID 3902. These parameters may include measure name, measure value, dimension name, dimension value, and so forth, captured by the insight type. These parameters can then be used to generate a headline ID 3902 for each headline candidate 3410, and the headline IDs 3902 can be compared to identify matching headline IDs 3902. For instance, for each headline candidate 3410, the parameters are combined into a formula and a hash code of the formula is saved as a headline ID 3902 for the respective headline candidate. Thus, the hash codes for different headline candidates 3410 can be compared to identify matching hash codes, indicating duplicate headlines.

Figure 40:
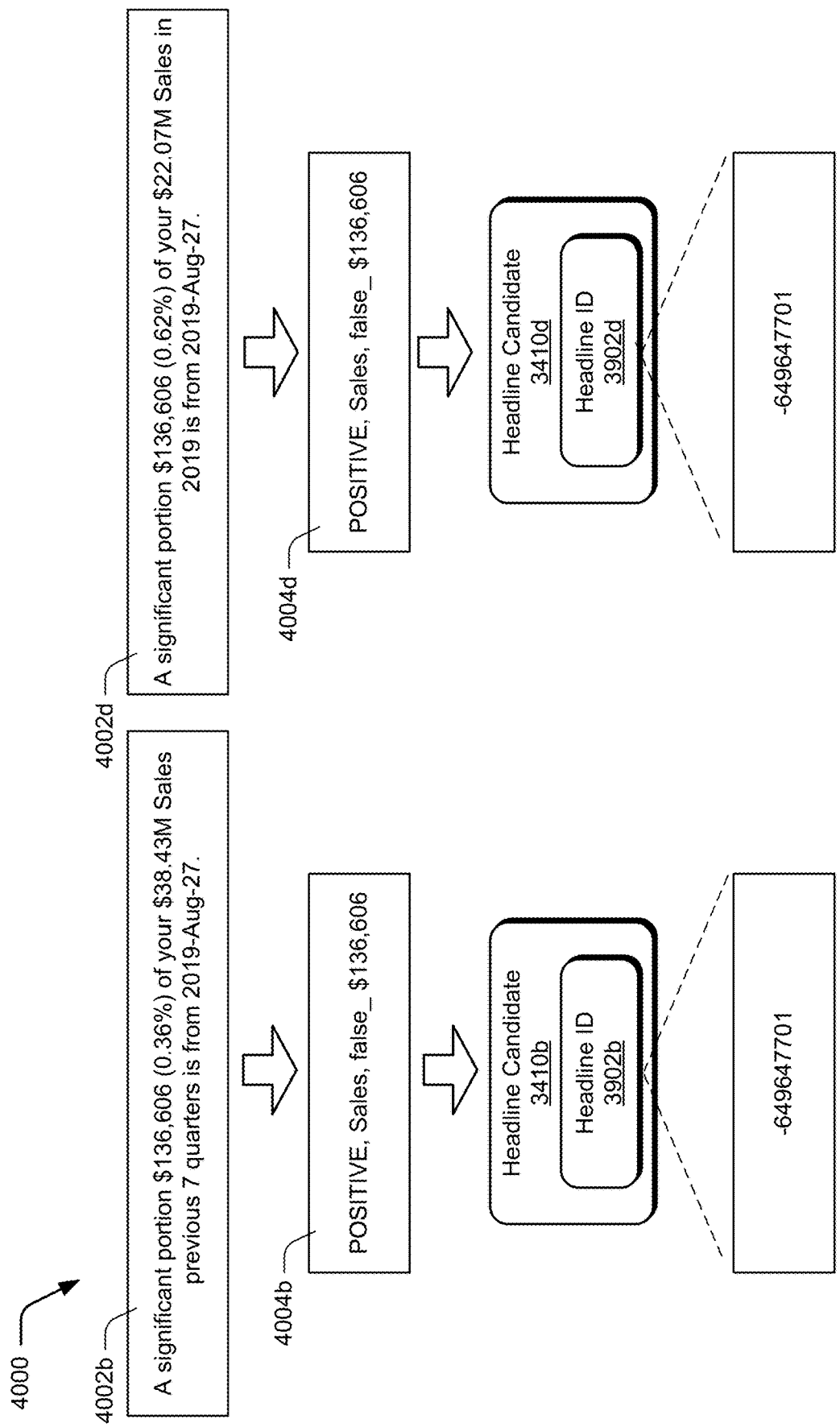
FIG. 40 illustrates an example scenario depicting an example way for generating and comparing headlines IDs for headline deduplication in accordance with one or more implementations.

For instance, consider FIG. 40, which depicts a scenario 4000 illustrating an example way for generating and comparing headlines IDs. In this particular non-limiting example, the headline candidates 3410b, 3410d represent "outlier" insight types, and headline IDs for the headline candidates can be generated based on the following Headline Formula:

{{sentiment}}_{{measure}}_{{isGrowth}}_{{msrValue}}

The headline candidate 3410b includes headline content 4002b and the headline candidate 3410d includes headline content 4002d, which each represent different respective text strings extracted from insight data from which the headline candidates 3410b, 3410d were generated. By applying the Headline Formula mentioned above to the headline content 4002b, 4002d, ID text values 4004b, 4004d are extracted from the headline content 4002b, 4002d, respectively. For instance, for each headline content 4002b, 4002d, the "sentiment" value is "POSITIVE," the "measure" value is "Sales," the "isGrowth" value is "false," and the msrValue is "$136,606." The ID text values 4004b, 4004d are then hashed to generate the headlines IDs 3902b, 3902d, respectively. As illustrated, the headline IDs 3902b, 3902d are duplicates, and thus the headline candidates 3410b, 3410d are identified as duplicate headline candidates.

Returning to the scenario 3900, since the headline candidates 3410b, 3410d are identified as duplicates, the headline candidate 3410d is discarded and/or removed from consideration for generating headlines. In at least one implementation, the headline candidate 3410b is retained for use as a headline since it is ranked higher than the headline candidate 3410b. Thus, the remaining headline candidates are marked as the headlines 3416 for further processing.

Figure 41A:
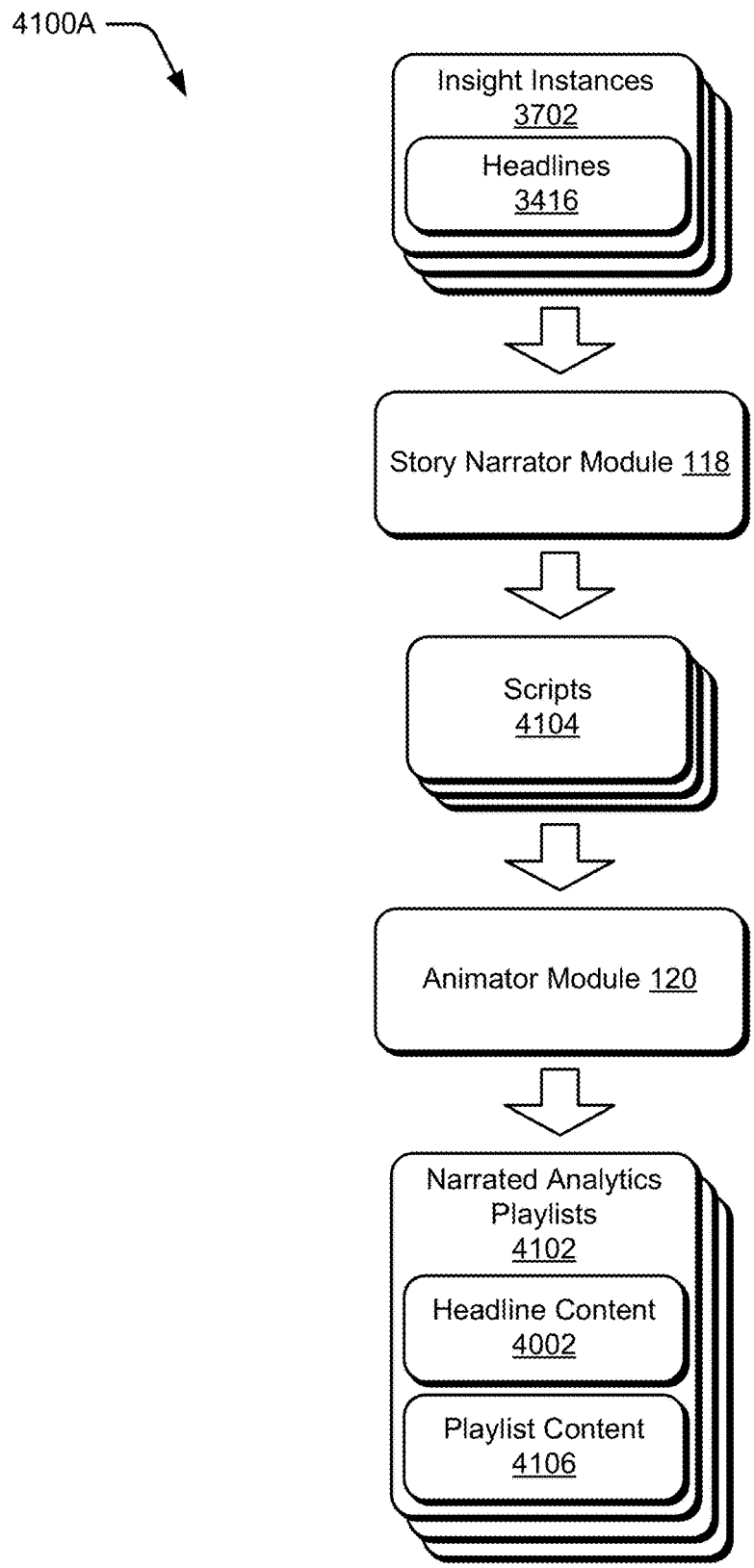
FIG. 41A illustrates an example scenario for generating a narrated analytics playlist including insight content and a headline in accordance with one or more implementations.

FIG. 41A depicts a scenario 4100A for generating a narrated analytics playlist including insight content and a headline. In the scenario 4100A, the story narrator module 118 and the animator module 120 cooperate to generate narrated analytics playlists 4102 based on insight instances 3704 and headlines 3416 for each insight instance. For example, the insight instances 3704 with the respective headlines 3416 are input to the story narrator module 118, which processes the insight instances and the headlines to generate scripts 4104. Example functionality and operation of the story narrator module 118 is discussed above, such as with reference to FIG. 16. The story narrator module 118, for instance, determines how to articulate and/or describe the insight instances 3704 with the headlines 3416 received from the insight engine module 116, such as what visualizations to include in the narrated analytics playlists 4102 (e.g., charts, graphs, images, tables), what detailed narrative descriptions to include, and so forth. For example, the story narrator module 118 determines augmentation content for the insight instances 3704, such as graphics, charts, audio scripts, and animations. The story narrator module 118 then generates the scripts 4104 to describe this augmentation content.

Generally, the scripts 4104 can include descriptions of any suitable type of information, such as charts, narrative descriptions, storyline plots, design information, and so forth. In various implementations, the scripts 4104 indicate not only what type of information is to be included in the narrated analytics playlists 4102, but also what order the information is presented in, when information is output simultaneously (e.g., audible output simultaneously with particular graphics), when to transition from a first piece of information to a second piece of information, and so forth. This can be achieved in any suitable manner, such as by marking transition and/or trigger points with flag data, identifying a time duration for each piece of information, and so on.

The animator module 120 obtains the scripts 4104 and generates the narrated analytics playlists 4102 based on the scripts 4104. Example functionality and operation of the animator module 120 is described above, such as with reference to FIG. 17. Generally, this includes generating and/or obtaining various types of content for inclusion in the narrated analytics playlists 4102 as specified in the scripts 4104, such as visuals (images, charts, videos, animations, and so forth), audio (e.g., audio files generated based on the scripts 4104), and so on. Thus, each narrated analytics playlist 4102 includes the various content for output, as well as instructions for outputting the content, such as content ordering and timing.

The narrated analytics playlists 4102, for instance, each include respective headline content 4002 and playlist content 4106, as specified in the scripts 4104. Generally, the headline content 4002 represents content such as text and images that convey information describing the headlines 3416. The playlist content 4106 includes content that represents the respective insight instances 3704 used to generate each narrated analytics playlist. The headline content 4002, for instance, represents a summary of subject matter included in each insight instance 3704, and the playlist content 4106 includes detailed information describing each insight instance 3704. As described below, the narrated analytics playlists 4102 can be output in various ways.

In at least some implementations, the playlist content 4106 includes content generated via a drill-up path and/or a drill-down path defined based on a respective headline. For instance, the drill path generation module 1212 (introduced above with reference to FIG. 12) leverages relationship data defined by the curated relational data model 1202 to define different drill paths to provide different perspectives on related content used to generate the playlist content 4106. A drill-up path, for instance, corresponds to a higher-level perspective of subject matter pertaining to a headline, such as comparison charts with associated related topics, to provide contextual information about the primary subject matter. A drill-down path corresponds to more granular and/or detailed information about primary subject matter, such as specific points in time, location, demographics, etc.

Figure 41B:
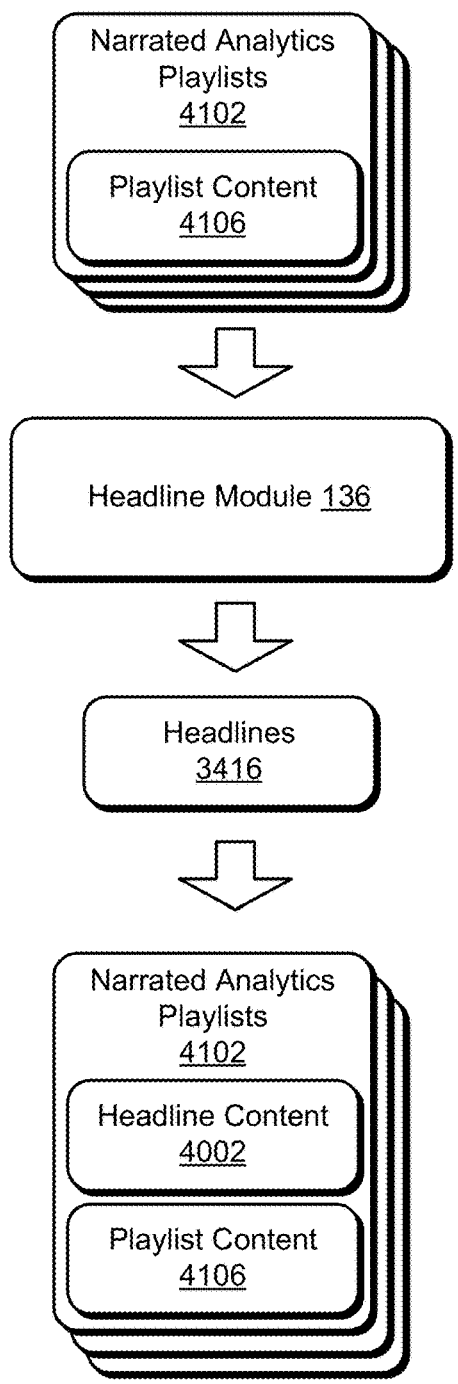
FIG. 41B illustrates an example scenario for generating a headline based on a narrated analytics playlist in accordance with one or more implementations.

In an alternative or additional implementation, headlines may be generated based on previously-compiled narrated analytics playlists. For instance, FIG. 41B depicts a scenario 4100B that demonstrates such an implementation. In the scenario 4100B, the headline module 136 receives previously-generated narrated analytics playlists 4102 that include playlist content 4106. Example ways for generating narrated analytics playlists are detailed above, such as with reference to FIGS. 15-19. The narrated analytics playlists 4102 include playlist content 4106, such as content generated based on various insights. The headline module 136 processes the narrated analytics playlists 4102 to generate headlines 3416, which each represent a summarization of playlist content 4106 from a respective narrated analytics playlist 4102. Example ways for generating the headlines 3416 are detailed throughout, and include headline ranking, headline deduplication, and so forth. Accordingly, the headlines 3416 are inserted as headline content 4002 into respective narrated analytics playlists 4102, which can then be output for user consumption, such as described below.

Figure 42:
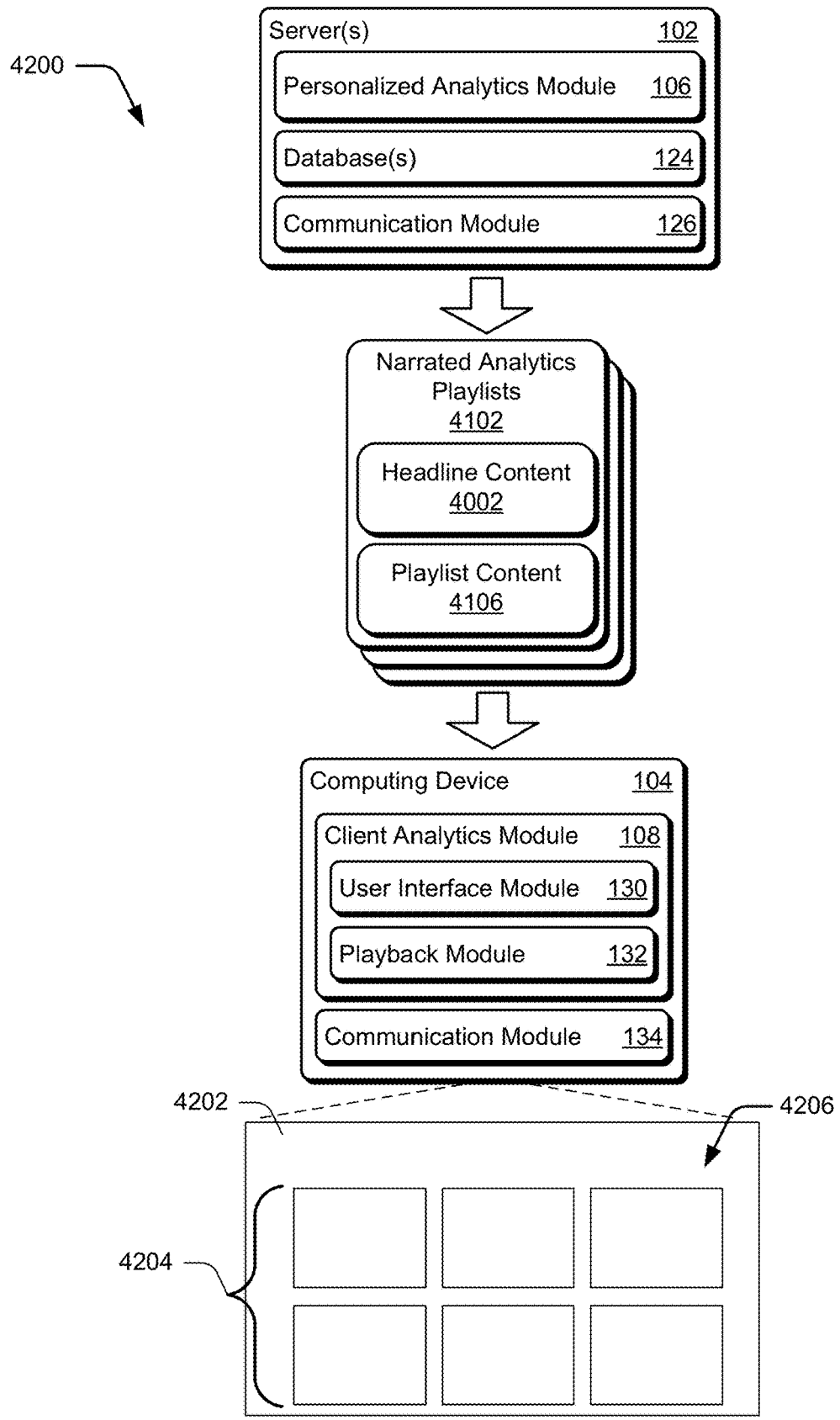
FIG. 42 illustrates an example scenario for outputting headlines included as part of narrated analytics playlists in accordance with one or more implementations.

FIG. 42 depicts a scenario 4200 for outputting headlines included as part of narrated analytics playlists. In the scenario 4200, the computing device 104 obtains the narrated analytics playlists 4102 from the server 102. The personalized analytics module 106, for instance, causes the narrated analytics playlists 4102 to be communicated to the computing device 104, such as via data communication over the communication cloud 128 between the communication module 126 of the server 102 and the communication module 134 of the computing device 104.

Continuing, the client analytics module 108 leverages the user interface module 130 to generate and output a user interface 4202, and the playback module 132 outputs the narrated analytics playlists 4102 in the user interface 4202. As part of outputting the narrated analytics playlists 4102, headline indicia 4204 populated with the headline content 4002 are output in a headlines region 4206 of the user interface 4202. Generally, each headline indicia 4204 represents a graphical representation of a different respective analytics playlist 4102. As further detailed below, the headline indicia 4204 are each selectable to cause playlist content 4106 associated with a respective narrated analytics playlist 4102 to be output.

Figure 43A:
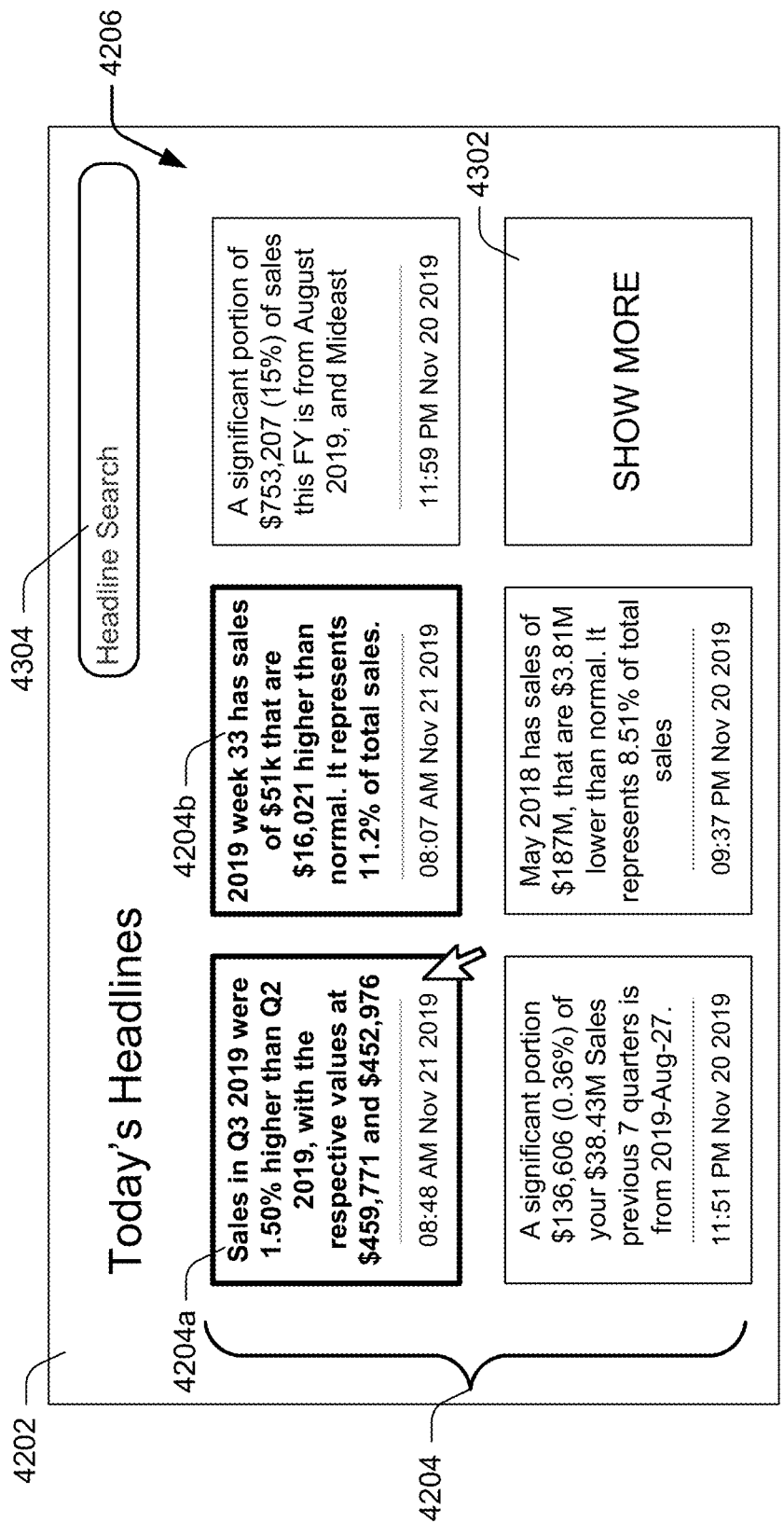
FIG. 43A illustrates an example implementation of a user interface.

FIG. 43A illustrates an example implementation of the user interface 4202 for the client analytics module 108. As mentioned above, each of the headline indicia 4204 is displayed in the headline region 4206 of the user interface 4202, and is populated with headline content 4002. Further, the headline indicia 4204 are arranged according to the ranking of the headlines 3416, as discussed above. For instance, a headline indicia 4204a is populated with a highest-ranking headline, and the remaining headline indicia are arranged in descending order of headline ranking. Notice also that headline indicia 4204a, 4204b are visually distinguished from the other headline indicia 4204. In at least some implementations, visual attributes of headline indicia 4204 can be configured based on their relative impact on various criteria, such as user-defined metrics and/or impact on business metrics such as sales, traffic, conversions, and so forth. For instance, headline indicia 4204 that have a greater impact on such metrics can be visual emphasized as compared with other less impactful headline indicia, such as by increasing a size of such headline indicia, changing their color, shape, and/or design, animating such headline indicia, and so forth.

The user interface 4202 also includes a continue control 4302, which is selectable to cause additional headline indicia 4204 to be displayed. For instance, selecting the continue control 4302 causes additional headline content 4002 to be retrieved and displayed in respective headline indicia 4204, such as to supplement or replace the currently-displayed headline indicia. In at least one implementation, the additionally retrieved headline content 4002 is retrieved based on the ranking order of respective headlines. For instance, headline content 4002 for headlines ranked beneath the currently displayed headlines is retrieved and displayed based on a selection of the continue control 4302.

Figure 44:
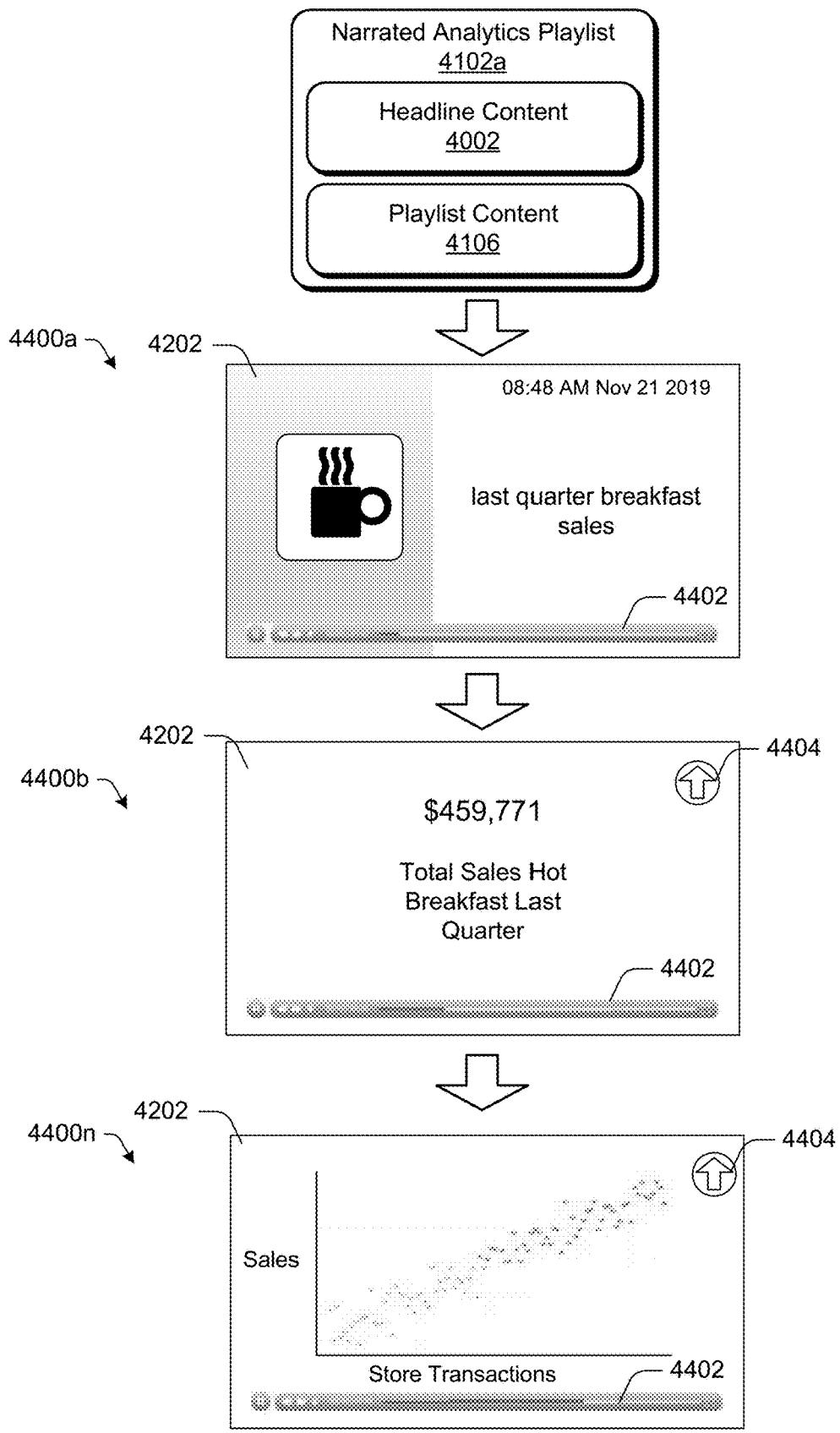
FIG. 44 illustrates an example implementation for outputting a narrated analytics playlist in accordance with one or more implementations.

To enable headlines to be generated based on user searches, the user interface 4202 includes a search bar 4304. A user, for instance, can enter a search query into the search bar 4304, and the personalized analytics module 106 can perform a search (e.g., a query analysis) of various relevant data and generate headlines based on search results. The headlines generated based on the search, for instance, can be populated to respective headline indicia 4204 in the user interface 4202. Generally, the search can be performed on various data sets, such as curated data 3404, insight data 3406, the headline candidates 3410, and so forth. Example ways for performing a search query analysis are described in detail above, such as with reference to FIG. 2100, and may be leveraged to generate headlines based on an input search query. Alternatively, or in addition to utilizing input to the search bar 4304, a headline search query may be initiated in other ways, such as via audible input to the computing device 104 that is utilized to initiate a headline search query at the personalized analytics module 106. Continuing, a user selects the headline indicia 4204a, which causes playlist content 4106 from a narrated analytics playlist 4102 associated with the headline indicia 4204a to be output, as depicted in FIG. 44, discussed in detail below.

FIG. 43B depicts an example implementation of the user interface 4202 introduced above. In this particular implementation, the user interface 4202 is populated with trending headlines 4306, which generally represent that represent highly-ranked headlines that are identified based on correspondence of content of the headlines to metrics of interest, such as defined for specific users. The trending headlines 4306 can be generated based on a variety of criteria, such as keywords extracted from headlines based on various ranking criteria of the headlines, keywords that a user is known to have shown interest, keywords with occurrences in multiple headlines, user's click activity of these trending words, and so forth.

In at least one implementation, subject matter used to generate the trending headlines 4306 can be obtained from online news sources, such as publicly available online news sources that generate and publish current events related to a variety of different topics. Thus, each of the trending headlines 4306 is selectable to obtain addition information, such as to navigate to a news source that can provide additional information about a respective trending headline.

Figure 43C:
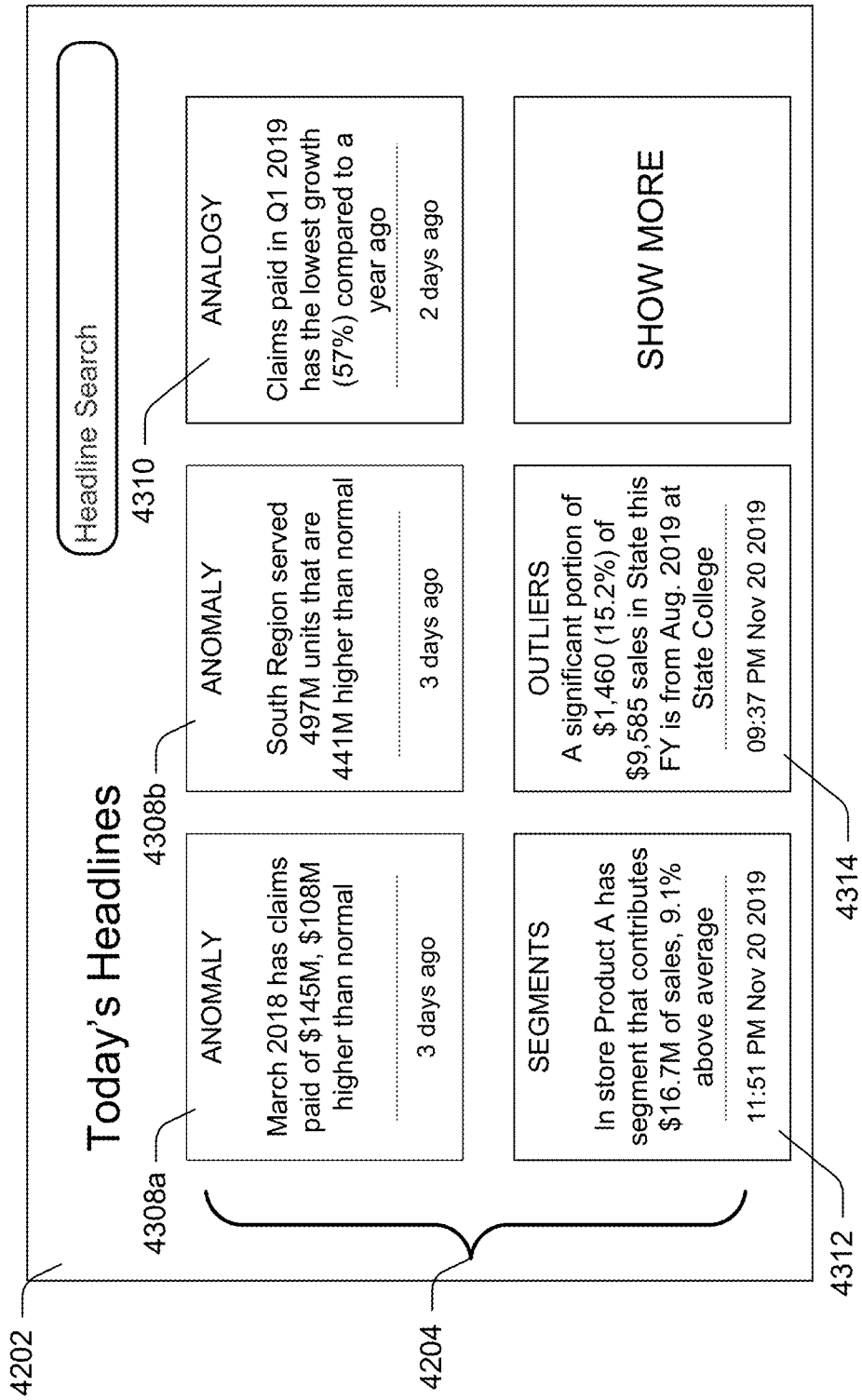
FIG. 43C depicts an example implementation of a user interface that identifies different headline types for headlines.

FIG. 43C depicts an example implementation of the user interface 4202 that identifies different headline types for headlines, such as based on insight types utilized to generate the headlines. In this particular example, the headline indicia 4204 of the user interface 4202 includes anomaly headlines 4308a, 4308b, an analogy headline 4310, a segment headline 4312, and an outlier headline 4314. Different aspects of these headline types are discussed throughout, and specific about attributes of these headline types are provided below in the discussion of the method 4800. Thus, implementations enable specific headline types to be identified to enable a user to select a headline type of interest, and/or for use in sorting headlines by headline type.

Figure 43D:
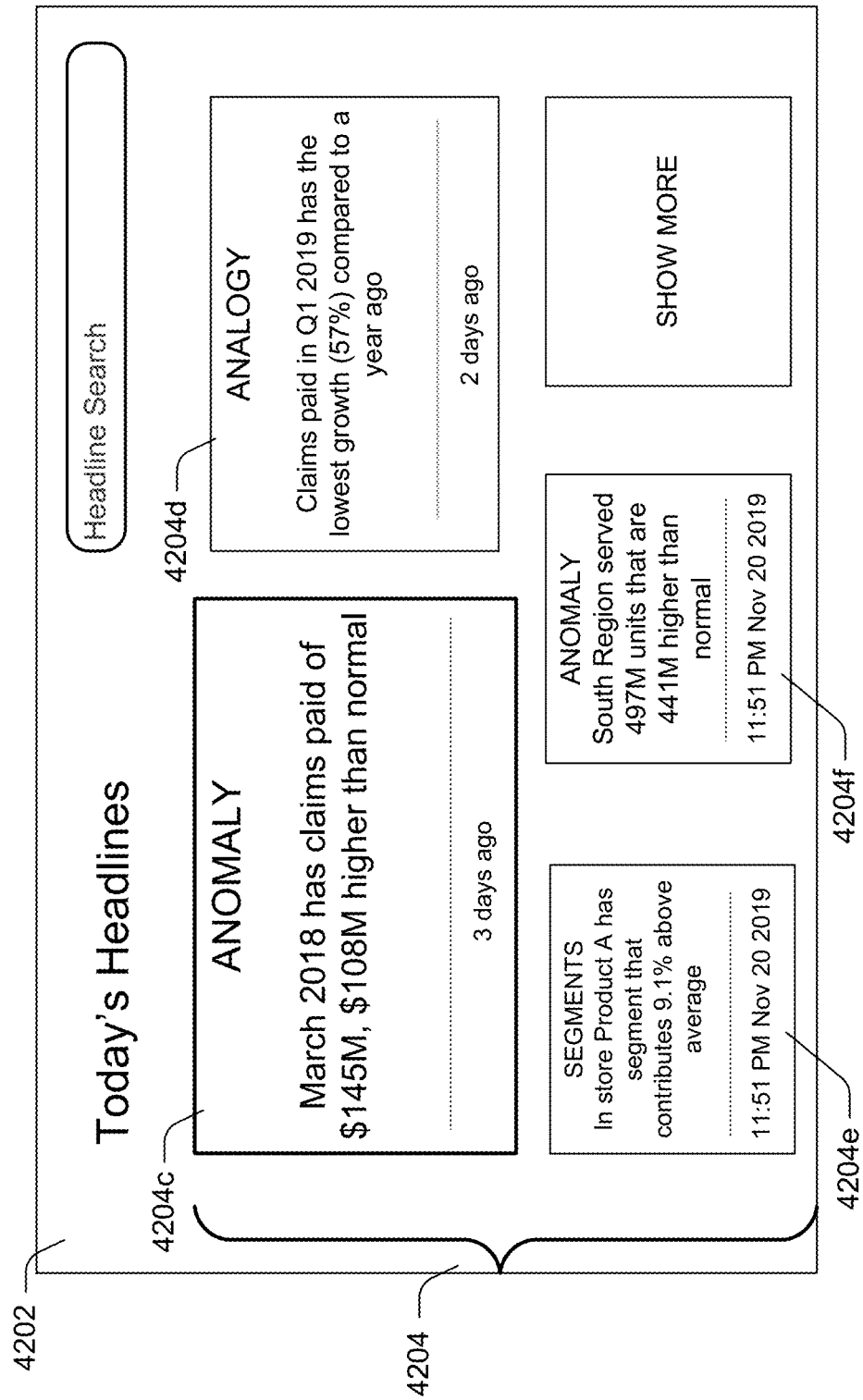
FIG. 43D depicts an example implementation of a user interface in which headline indicia are sized based on their relative headline ranking.

FIG. 43D depicts an example implementation of the user interface 4202 in which headline indicia are sized based on their relative headline ranking. For instance, a headline indicia 4204c is larger than the other headline indicia, thus indicating that a headline included in the headline indicia 4204c is of higher importance than the other headlines, e.g., is ranked higher. Further, a headline indicia 4204d is smaller than the headline indicia 4204c, indicating that the respective headline is ranked lower than the headline of the headline indicia 4204c. The user interface 4202 also illustrates headline indicia 4204e, 4204f, which are smaller than the headline indicia 4204c, 4204d, indicating that the headline indicia 4204e, 4204f are ranked below the headline indicia 4204c, 4204d.

Figure 43E:
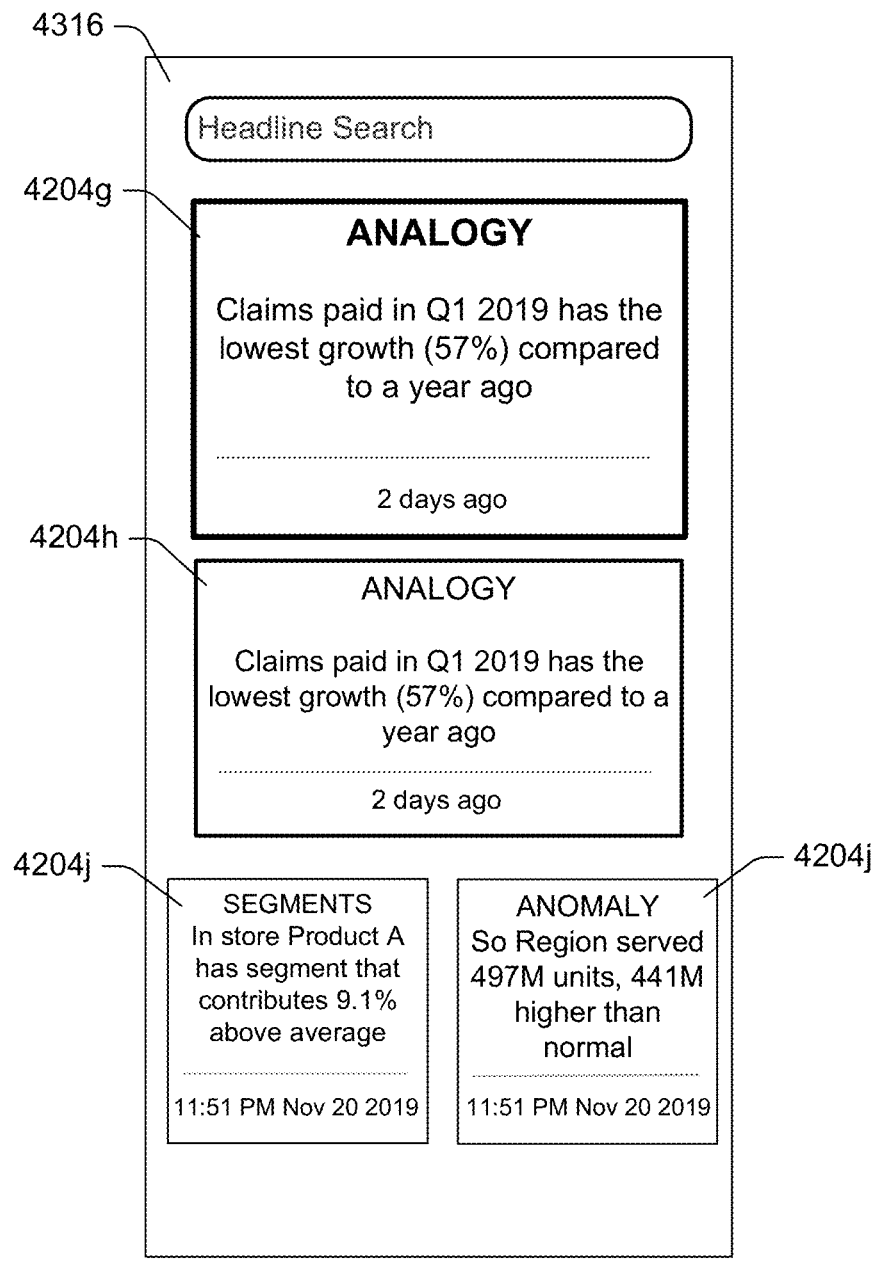
FIG. 43E illustrates an example implementation of a user interface.

FIG. 43E depicts a user interface 4316 which, in some implementations, represents a variation on the user interface 4202. The user interface 4316, for instance, is configured to enable headline indicia to be displayed on a particular device form factor, e.g., a mobile device such as a mobile phone. As illustrated, the user interface 4316 includes headline indicia of different sizes, which indicates a relative ranking of the respective headlines. For instance, a headline indicia 4204g is the largest, indicating that it is ranked higher than the other headlines. Further, a headline indicia 4204h is smaller than the headline indicia 4204g, and is thus ranked lower. Finally, headline indicia 4204j and 4204k are even smaller, indicating a lower rank than the other illustrated headlines. While the differentiation in the ranking of these headline indicia is depicted used their respective size, it is to be appreciated that a variety of other output modalities may be utilized to indicate relative headline ranking, such as color, text formatting, user interface position, content animation, and so forth.

In FIG. 44, a narrated analytics playlist 4102a is output in the user interface 4202 in response to selection of the headline indicia 4204a as discussed with reference to FIG. 43A. Generally, the narrated analytics playlist 4102a includes various types of playlist content 4106, such as text, images, animations, graphs, and so forth. Detailed examples of which are discussed above. Depicted in FIG. 44 are playlist portions 4400a, 4400b, and 4400n, which represent different snapshots of playlist content 4106 that is output during playback of the narrated analytics playlist 4102a. During playback of the narrated analytics playlist 4102a, a navigation control 4402 is output that is configured to receive user input to perform various navigation operations relative to playback of the narrated analytics playlist 4102a, such as pausing, skipping forward/backward, resuming playback, and stopping playback. Further, the navigation control 4402 includes a progress indicator indicating a relative playback progress of the narrated analytics playlist. In addition, a return control 4404 is displayed, which is selectable to navigate to other pages presented by the client analytics module 108, such as to return to display of the headlines region 4206.

Figure 45:
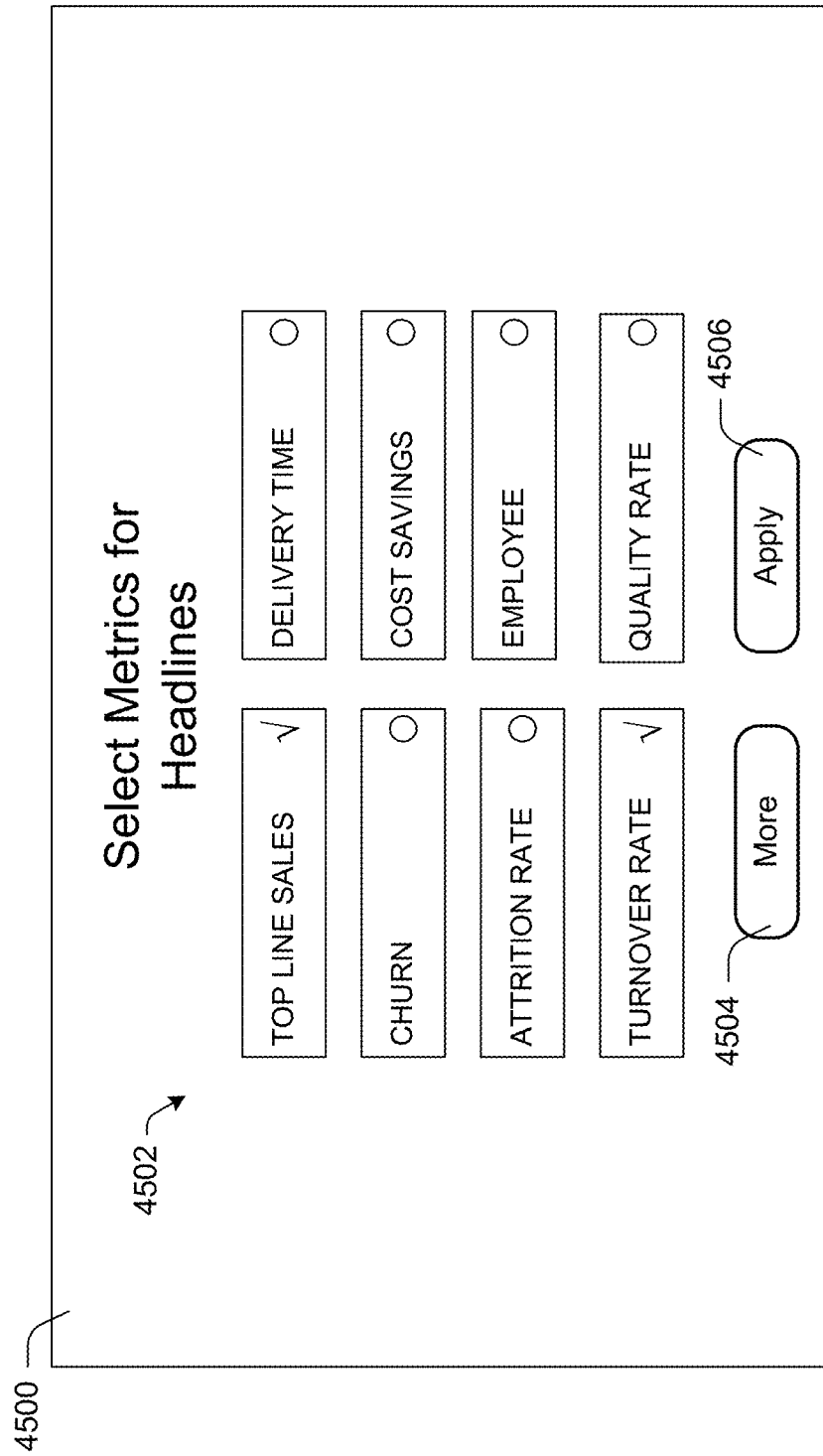
FIG. 45 illustrates an example implementation of a metrics user interface in accordance with one or more implementations.
Figure 46:
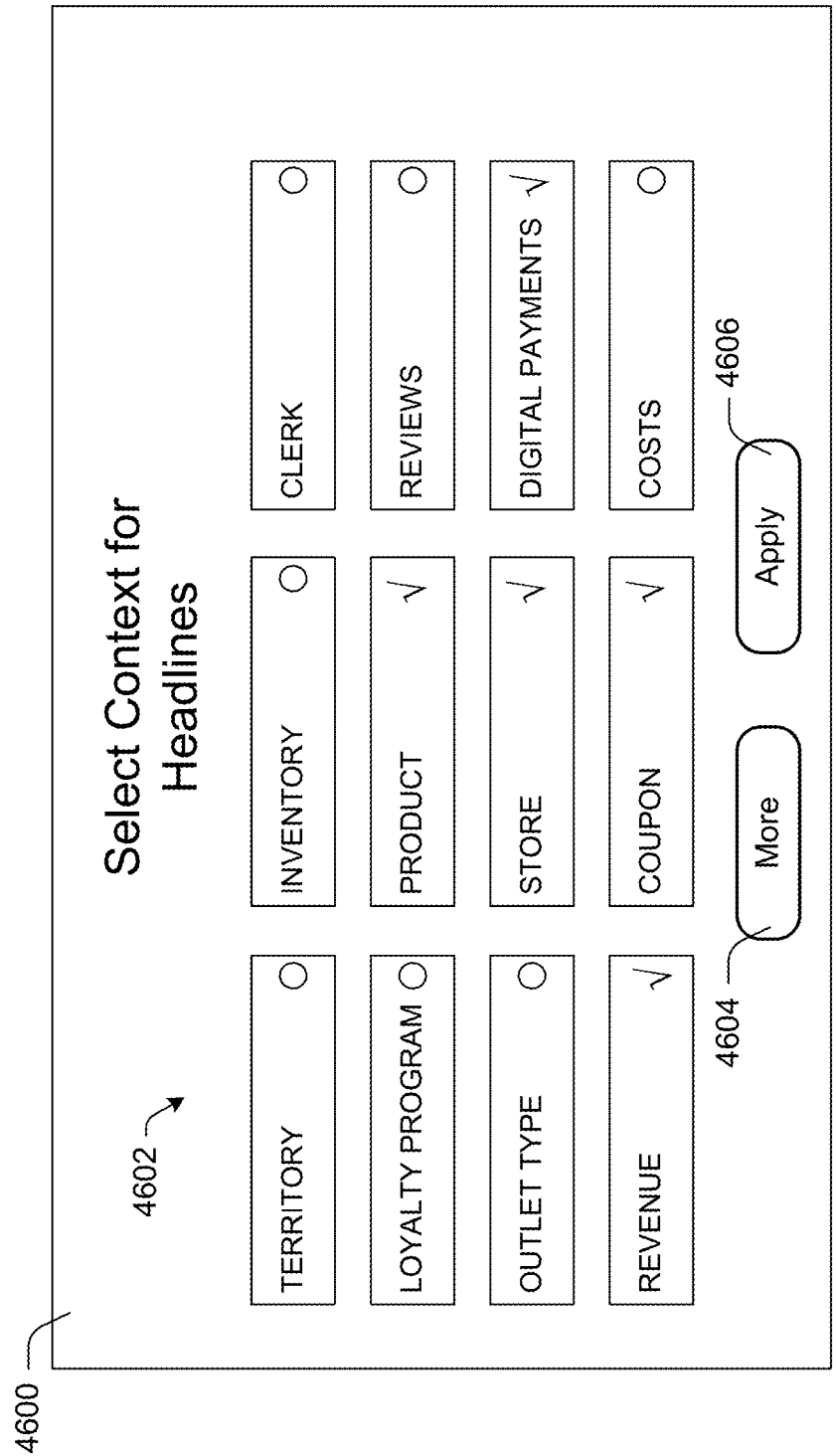
FIG. 46 illustrates an example implementation of a context user interface in accordance with one or more implementations.
Figure 47:
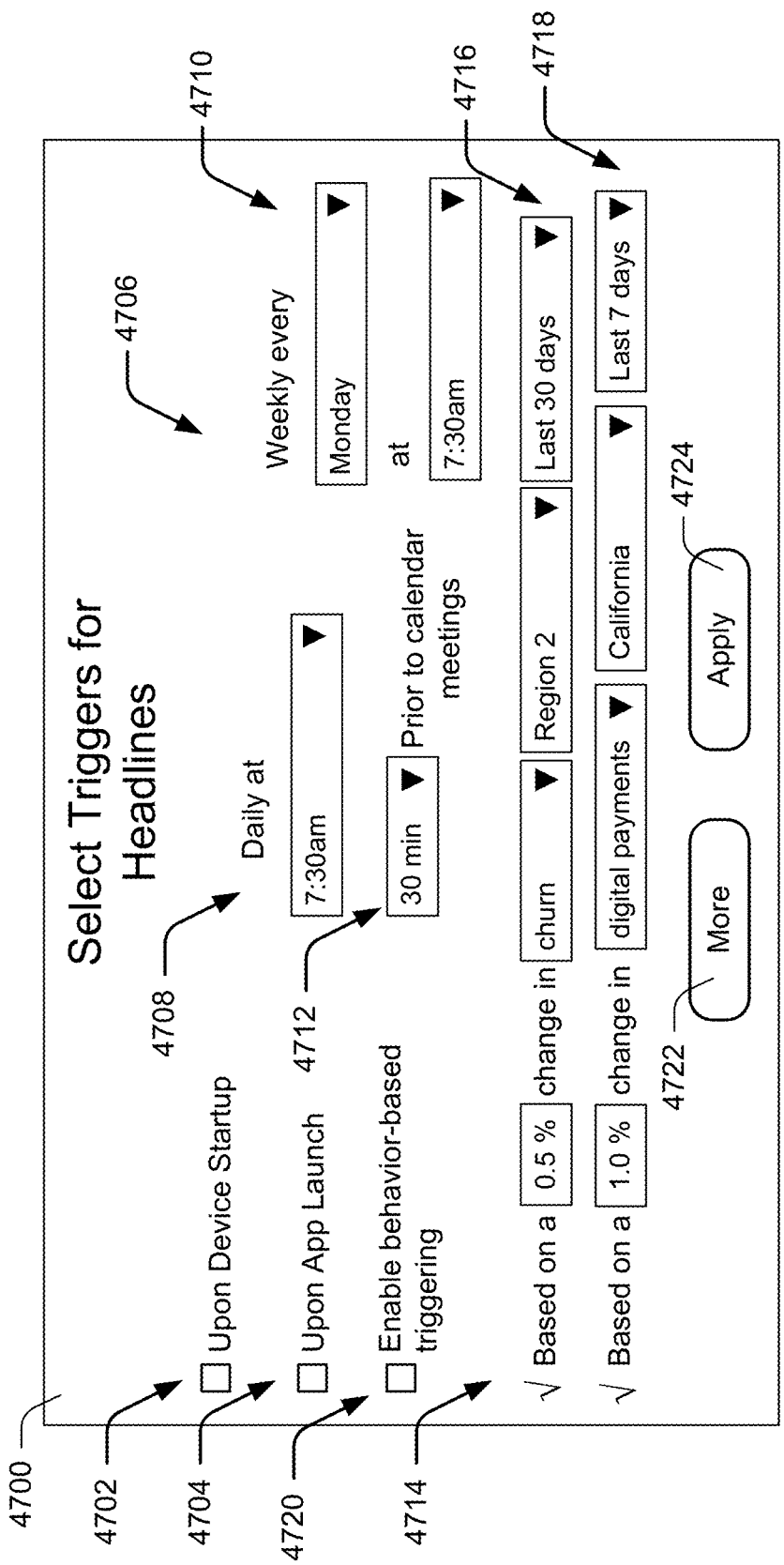
FIG. 47 illustrates an example implementation of a trigger user interface in accordance with one or more implementations.

As discussed above, various attributes pertaining to generating headlines are user configurable to provide customized headline experiences. Accordingly, FIGS. 45-47 depict different user interfaces that expose functionality for headline configuration. The user interface module 130 of the client analytics module 108, for example, presents these different user interfaces to enable a user to configure different attributes of headline generation. For instance, FIG. 45 illustrates a metrics user interface 4500 that includes a metrics region 4502, a more control 4504, and an apply control 4506. The metrics region 4502 is populated with different metrics (e.g., performance metrics and/or KPIs) that are selectable for use in generating headlines. As discussed above, the selected metrics can be utilized as parameters for generating headlines of interest for a user. The more control 4504 is selectable to cause additional different selectable metrics to be presented in the metrics region 4502, and the apply control 4506 is selectable to cause metrics selected from the selected metrics region 4502 to be applied in generating headlines. The headline module 136, for instance, utilizes the selected metrics as parameters for identifying insights of interest to a user, which in turn are used for generating headlines, as described above.

FIG. 46 illustrates a context user interface 4600 that enables different context information to be specified for generating headlines. The context user interface 4600, for instance, includes a context region 4602, a more control 4604, and an apply control 4606. Generally, the context region 4602 includes different instances of context information that are selectable to identify context information of interest to a user for purposes of generating headlines. The more control 4604 is selectable to cause additional different selectable context information to be presented in the context region 4602, and the apply control 4606 is selectable to cause context information selected from the selected context region 4602 to be applied in generating headlines. The headline module 136, for instance, utilizes the selected context information as parameters for identifying insights of interest to a user, which in turn are used for generating headlines, as described above. In at least some implementation, insights of interest are identified based on determined how the selected context information affects metrics of interest, such as selected from the metrics user interface 4502.

Continuing, FIG. 47 illustrates a trigger user interface 4700 that enables different trigger events and parameters to be configured for generating headlines. The trigger user interface 4700, for instance, includes different selectable trigger events, as well as configurable parameters for different trigger events. For instance, a startup option 4702 is selectable to specify a trigger event that corresponds to a device startup event, such as a power on event and/or a log in event of the computing device 104. Further, an app launch option 4704 is selectable to specify a trigger event that corresponds to launching a particular application, such as the client analytics module 108.

The trigger user interface 4700 includes a scheduling region 4706 that enables trigger events to be scheduled based on specific times and/or other schedule-related events. For instance, a daily option 4708 enables a user to specify a specific time for headlines to be generated on a daily basis. A weekly option 4710 enables a user to identify a specific day and/or days on which headlines are to be generated, as well as specific times on the selected day(s). A calendar event option 4712 enables a user to select specific time frames relative to scheduled calendar events (e.g., meetings) at which time headlines are to be generated.

As discussed above with reference to the scenario 3500, trigger events may also be specified based on events that affect specified metrics and/or context relating to metrics of interest. Accordingly, the trigger user interface 4700 includes an event region 4714 that enables a user to identify different trigger parameters for metrics and/or context information of interest. For instance, a metric field 4716 enables a user to identify parameters pertaining to metrics of interest to be user for triggering headline generation. In this example, a user can select particular instances of metrics, such as metrics identified in the metrics user interface 4500. A user can also specify headline generation parameters related to a selected metric of interest, such as an amount of change in the metric, a location for monitoring the metric (e.g., a business and/or geographical location), a time parameter, and so forth.

The event region 4714 also includes a context field 4718 that enables a user identify context information of interest for generating headlines, and parameters pertaining to the context information. Different examples of context information are discussed above, such as with reference to the context user interface 4600. In addition to selecting context information (in this example, "digital payments"), a user can specify headline generation parameters relative to a selected context, such as an amount of change in the selected context item, a location for monitoring the context item (e.g., a business region and/or geographical location), a time parameter, and so forth.

The trigger user interface 4700 also includes a behavioral trigger control 4720, which is selectable to enable and disable behavior monitoring for purposes of generating behavioral-based triggering of headline generation. For instance, based on user selection to enable the behavioral trigger control 4720, the headline module 136 monitors user behaviors pertaining to interactions with various types of content and/or functionalities, such as headlines, narrated analytics playlists, and so forth. Detected user behaviors can be utilized to generate trigger events for generating headlines, such as based on various time-based and/or system-based user behaviors. The behavioral trigger control 4720 is also deselectable to disable behavioral monitoring, such as based on a user opting out of behavioral monitoring for purposes of generating headlines.

Further, the trigger user interface 4700 includes a more control 4722 and an apply control 4724. The more control 4722 is selectable to cause additional different selectable trigger event options to be presented, and the apply control 4724 is selectable to cause trigger events and events parameters selected from the trigger user interface 4700 to be applied in generating headlines. For instance, selected trigger events and parameters can be saved as part of the trigger data 3504 for use by the headline module 136 for triggering headline generation.

Now consider a number of different methods that can be performed further to implementations discussed herein, such as for performing aspects of automated summarization of extracted insight data. The methods can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1, such as various modules included in personalized analytics module 106 and/or client analytics module 108. While the methods illustrate steps in a particular order, it is to be appreciated that any specific order or hierarchy of the steps described may be implemented. For instance, other approaches may be used that rearrange the ordering of these steps. Thus, the order of the steps described here may be rearranged, and the illustrated ordering of these steps is not intended to be limiting.

Figure 48:
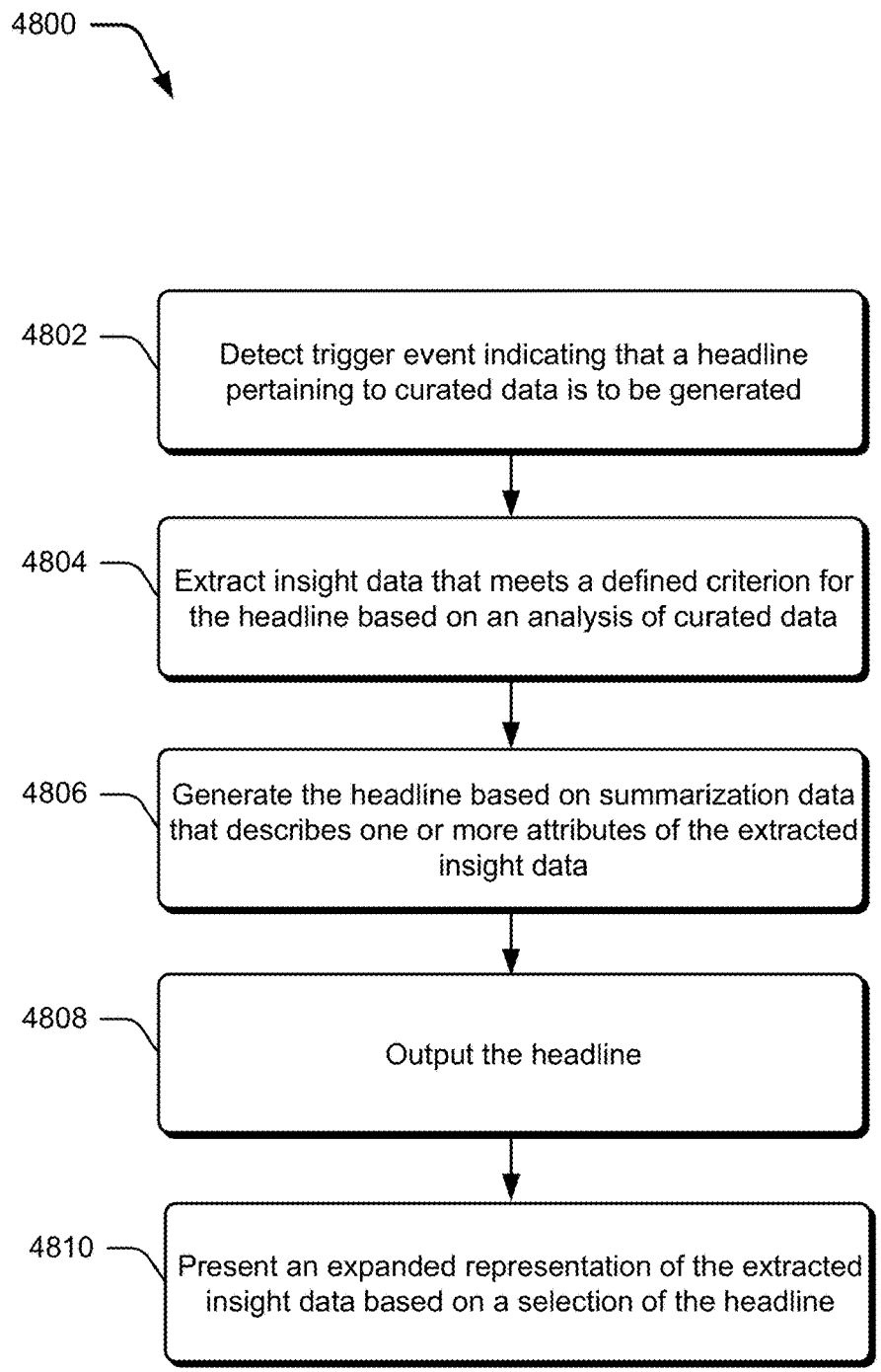
FIG. 48 illustrates an example method for generating headlines in accordance with one or more implementations.

FIG. 48 illustrates an example method 4800 for generating headlines in accordance with one or more implementations. At 4802, a trigger event is detected indicating that a headline pertaining to curated data is to be generated. The headline module 136, for instance, detects a trigger event. Examples of different trigger events are detailed above, and include user specified trigger events and trigger events generated based on observed user behaviors, environmental conditions, changes in various metrics and context information, and so forth.

At 4804, insight data that meets a defined criterion for the headline is extracted based on an analysis of curated data. Generally, the curated data is generated based on various types of user data, such as described above with reference to the scenario 3600. Further, different criteria can be specified for identifying insights within curated data. In at least some implementations, the criteria correspond to different conditions and/or changes in conditions observed in curated data, such as conditions pertaining to performance metrics (e.g., KPIs) of potential interest to a user. The following are some example criteria (e.g., insight types) that can be utilized for identifying a particular set of data as an insight for purposes of generating headlines:

Analogies—an analogy is based on comparison of different data sets pertaining to a metric and/or context of interest, such as the example metrics (e.g., KPIs) discussed above. Consider, for instance, that a user identifies "Monthly Sales" as a metric of interest. Based on this metric, an analogy can be identified by comparing monthly sales, such as sales between consecutive months, sales between the same month over different years, and so forth. An analogy may also be based on a threshold difference identified in a comparison. For example, a threshold change in monthly sales (+/−n %) may cause an insight to be identified. One example of analogy compares sales across different time periods, e.g., "While Q4 2019 Hot Breakfast Sales has shrunk by −40.10% compared to a quarter ago; it is growing by 10.02% compared to the same quarter a year ago."

Anomalies—an anomaly represents a set of data points and/or a data pattern relating to a metric and/or context of interest that deviate from an expected pattern. For instance, where "Monthly Sales" is a metric of interest, a group of stores that deviate from an average and/or mean monthly sales can represent an anomaly. One example of an anomaly is "Small Size Coffee sales of $3.86 M, comes from Lake Merritt that are 40% higher than normal. This sale represents 33.2% of total coffee sales in Lake Merritt."

Outliers—an outlier represents a data point relating to a metric and/or context of interest that deviates significantly from other data points in a set of data points. A threshold deviation, for instance, is defined for a set of data points, and an outlier represents a data point that deviates from the data points by greater than the threshold deviation. One example of an outlier is "A significant portion $161,018 (11.8%) of your $1.37 M Sales for the past 3 years is from November 2018, and Product A."

Segmentation—segmentation represents a group of data points relating to a metric and/or context of interest that deviate from another group of data points. For instance, multiple different segments of users can be defined, such as based on attributes of respective users in each segment. Segments that deviate by a threshold amount from other segments can be identified as candidates for insights. One example of a segmentation is "A higher value cluster of $28.30 average breakfast sale comes from Stores #23 and #47 in San Jose, contributing to 20.65% total Breakfast Sales in those stores."

In an example implementation, different threshold deviations can be defined for each of the different insight types, such as based on user input to the personalized analytics module 106. The personalized analytics module 106 can compare data points/patterns relating to different insights to a respective, and those data points/patterns that deviate by at least the threshold deviation can be tagged as a respective insight type, e.g., an analogy, an anomaly, an outlier, a segment, and so forth. Accordingly, a set of curated data that is identified as corresponding to one of these categories can be labeled as an insight.

Returning to the method 4800, at 4806 the headline is generated based on summarization data that describes one or more attributes of the extracted insight data. The summarization module 3300, for instance, processes the insight data to identify content such as keywords, images, and audio that can be utilized to summarize the insight data. The summarization module 3300, for example, can apply various types of processing to the insight instances 3704 to generate the headline candidates, such as keyword extraction, image processing and recognition, audio processing and recognition, natural language processing and phrase generation, and so forth. The headlines candidates can then be processed to identify headlines for output, such as via ranking, deduplication, etc.

In at least some implementations, headlines can be generated based on correlation to particular insight types and specific intended audiences, such as user types and/or roles associated with the headlines. For instance, headlines for an enterprise user may be generated based on in-depth analysis of data such as median and standard deviation from values of interest, e.g., based on identified analogies. Headlines for an executive user, however, can include information about new business segments and high and low growth areas over time. Thus, which headlines are generated and which insights that are used to generate headlines may be adapted based on how the headlines pertain to users' primary goals and/or responsibilities, such as in an enterprise environment.

In at least one implementation, data pertaining to generated headlines can be structured and stored in various ways, such as to enable efficient retrieval and presentation of headlines. For instance, the headline database 3306 stores headlines based on various relational models and attributes. By way of example, for a particular headline, the headline database 3306 includes metadata that points to data source(s) used to generate the headline, such as curated data, insight instances, and so forth. The metadata may also identify objects and/or entities to which headlines correspond to, such as physical objects (e.g., products), specific events (e.g., services, sales), concepts of interest (e.g., transactions, orders), metrics of interest (e.g., KPIs), timelines (e.g., headlines pertaining to insight data compiled over a period of time), and so forth.

At 4808 the headline is output. Detailed ways for outputting headlines are discussed above, and in at least some implementations, include generating a narrated analytics playlist that includes headline content describing a headline, as well as playlist content that represents a more detailed version of insight data used to generate the headline.

At 4810, an expanded representation of the extracted insight data is presented based on a selection of the headline.

A user, for instance, selects the headline, and the playback module 132 initiates playback of playlist content associated with the headline.

Figure 49:
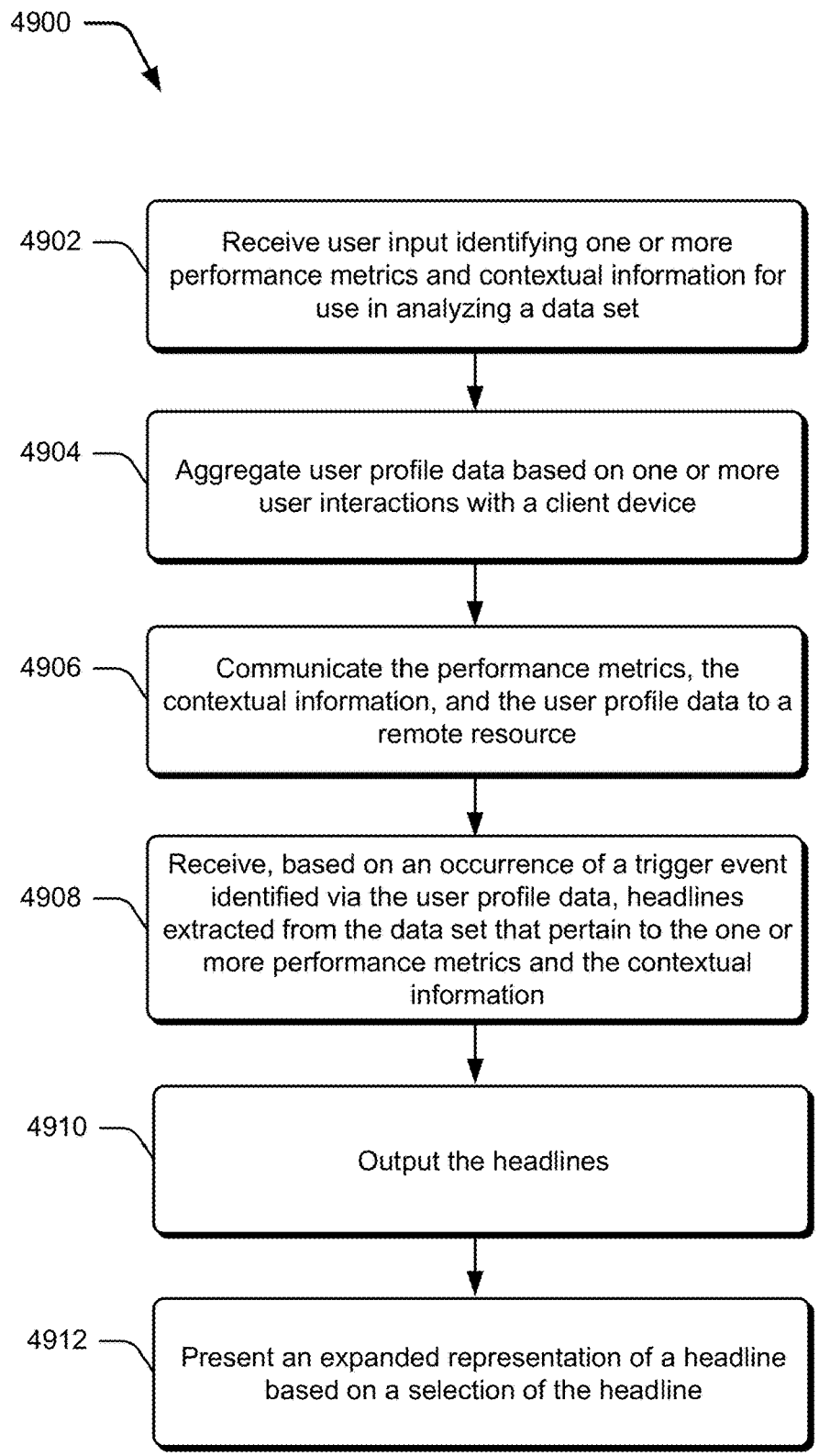
FIG. 49 illustrates an example method for retrieving headlines in accordance with one or more implementations.

FIG. 49 illustrates an example method 4900 for retrieving headlines in accordance with one or more implementations. At 4902, user input is received identifying one or more performance metrics and contextual information for use in analyzing a data set. A user, for instance, interacts with the computing device 104 to provide input to the client analytics module 108 to identify metrics and/or context information of interest, examples of which are described above. In at least one implementation, the user can select metrics and/or contextual information of interest via input to the metrics UI 4500 and/or the context UI 4600.

At 4904, user profile data is aggregated based on one or more user interactions with a client device. The client analytics module 108, for instance, monitors user interactions with the computing device 104, such as typical time ranges during which a user performs various tasks over a period of time. Examples of such user interactions include power on and power off events for the computing device 104, application launch events (e.g., the client analytics module 108), content request events (e.g., requesting headlines from the client analytics module 108), calendar access events, email events, and so forth.

At 4906, the performance metrics, the contextual information, and the user profile data are communicated to a remote resource. The client analytics module 108, for instance, causes this data to be communicated from the computing device 104 to the server 102 for utilization by the personalized analytics module 106. Generally, the performance metrics, the contextual information, and/or the user profile data can be used for curating data prior to generating headlines, such as for use by the curation engine module 110 for curating the user data 3402 to generate curated data 3404.

At 4908, based on an occurrence of a trigger event identified via the user profile data, headlines extracted from the data set are received that pertain to the one or more performance metrics and the contextual information. For example, the client analytics module 108 receives headlines from the personalized analytics module 108, such as based on data communicated between the server 102 and the computing device 104. In at least one implementation, the headlines are received as part of a narrated analytics playlist that includes headline content and playlist content. Generally, the trigger event may be detected in different ways. The client analytics module 108, for instance, detects the trigger event and notifies the personalized analytics module 106 of the occurrence of the trigger event. Alternatively or in addition, the personalized analytics module 106 detects the trigger event, such as independent of a notification from the client analytics module 108. Detailed examples of different trigger events are discussed above.

At 4910, the headlines are output. For example, the client analytics module 108 leverages the user interface module 130 to generate a user interface, and to output the headlines in the user interface. Outputting the headlines can include presenting headline content 4002 associated with different narrated analytics playlists 4102. At 4912, an expanded representation of a headline is presented based on a selection of the headline. A user, for instance, selects a particular headline from the group of headlines, and playlist content 4106 associated with the selected headline (e.g., as part of a particular narrated analytics playlist 4102) is output.

While the method 4900 is discussed in the context of certain actions being performed remotely from the computing device 104 and the client analytics module 108, it is to be appreciated that some or all of the recited operations and functionality may be performed locally by the client analytics module 108. For instance, instead of offloading the generation of headlines to a remote resource such as the personalized analytics module 106, the client analytics module 108 may locally perform some or all of the operations described as being performed at the personalized analytics module 106.

Figure 50:
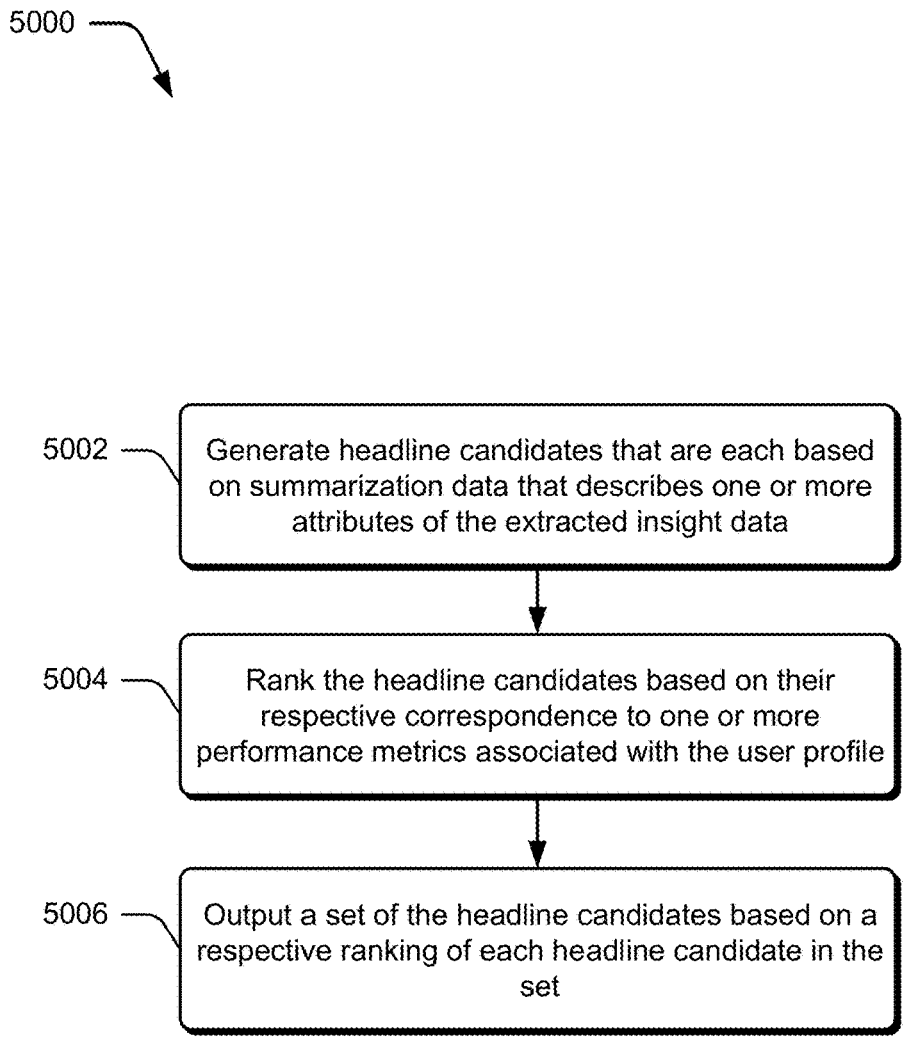
FIG. 50 illustrates an example method for ranking headlines in accordance with one or more implementations.

FIG. 50 illustrates an example method 5000 for ranking headlines in accordance with one or more implementations. The method 5000, for instance, may be integrated with the method 4800 and/or the method 4900 to enable headlines to be ranked by the personalized analytics module 106 and/or the client analytics module 108.

At 5002, headline candidates are generated that are each based on summarization data that describes one or more attributes of extracted insight data. The insight engine module 116, for example, generates different instance of insight data, and the headline module 136 generates headline candidates by summarizing each instance of insight data. Generally, each headline candidate can include various types of summarization content, such as text, images, animation, video, audio, and so forth.

At 5004, the headline candidates are ranked based on their respective correspondence to one or more performance metrics associated with the user profile. The ranking module 3302, for instance, quantifies each headline candidate to generate a metric value that characterizes its relative impact on a particular metric and/or contextual item of interest to a user, examples of which are detailed above. For instance, consider that a particular metric of interest is "cost savings" pertaining to a particular organization, such as an enterprise entity. Accordingly, each headline candidate can be characterized based on its relative impact on cost savings. As an example, a first headline candidate is "Delivery costs over Q3 2019 were 2.5% lower than Q2 2019, with a cost reduction of $125,150." A second headline candidate is "Cost for Packaging for Product A increased by 1.2% over Q3 2019 as compared with Q2 2019, with a cost increase of $7,315." By quantifying each of the headline candidates compared to a relative costs savings for the organization, the first headline candidate has a greater impact and is thus has a greater metric value and is ranked higher than the second headline candidate. Generating a metric value for a headline candidate can be performed in various ways, such as based on a value associated with the headline candidate, e.g., a percentage value, a numerical value, a time value, and so forth. Metric values for different headline candidates can then be compared to determine a relative effect of each metric value on a metric, and headline candidates that have a greater impact on the metric can be ranked higher than headline candidates with a less impact. In at least one implementation, "impact" refers to a relative increase or decrease in a quantity related to a metric of interest. Examples of other metrics and/or criteria that can be used for ranking headlines include:

User search patterns—the ranking module 3302 can obtain search history information for specific users, and can use frequently searched topics as ranking criteria.

Time parameters—headlines may also be ranked based on how recently an associated insight was observed and/or generated. For instance, headlines for more recent insights may be ranked higher than older insights.

User interactions with content—different user interactions with content can be utilized to rank headlines, such as based on user click patterns, video interactions (e.g., video replays, video pauses), content forwarding to other users, switching between different types of data charts, performing further content analysis (e.g., requesting drill path information), a speed with which a user interacts with content after receiving the content, etc.

Content annotations—user interactions to annotate content can be utilized as ranking criteria, such as adding notes to content, saving content to a file location, content tagging, etc.

Impact on key objectives—different user-related objectives can be utilized as ranking criteria, such as objectives defined for a user's job function, related to a currently active project, pertaining to upcoming scheduled calendar events, and so forth.

Insight model data—data from insight-related models can be utilized as ranking criteria, such as data utilized by the insight model 3612 to generate the insight data 3406 can also be utilized as ranking criteria. For instance, the learning data 3618 can be utilized as ranking criteria since in some cases, the learning data 3618 will indicate content-related preferences of users across different organizations 3602.

To provide greater accuracy in ranking, the ranking module 3302 may in some cases perform normalization of metric values for headline candidates. Generally, normalization helps remove biases and/or undesired characteristics that potentially reduce the integrity and/or quality of metric values, and thus enables more accuracy is gauging an effect of a headline candidate and its metric value on a metric of interest. Example details concerning data normalization are discussed above, such as in the discussion of FIG. 12.

At 5006, a set of the headline candidates is output based on a respective ranking of each headline candidate in the set. The user interface module 130, for instance, outputs the headline candidates arranged in their ranked order, such as in a user interface for user interaction. Generally, each output headline candidate is selectable to cause a respective expanded representation of extracted insight data to be presented. For example, selecting a particular headline candidate causes playlist content associated with the headline candidate to be output, such as part of a narrated analytics playlist.

Figure 51:
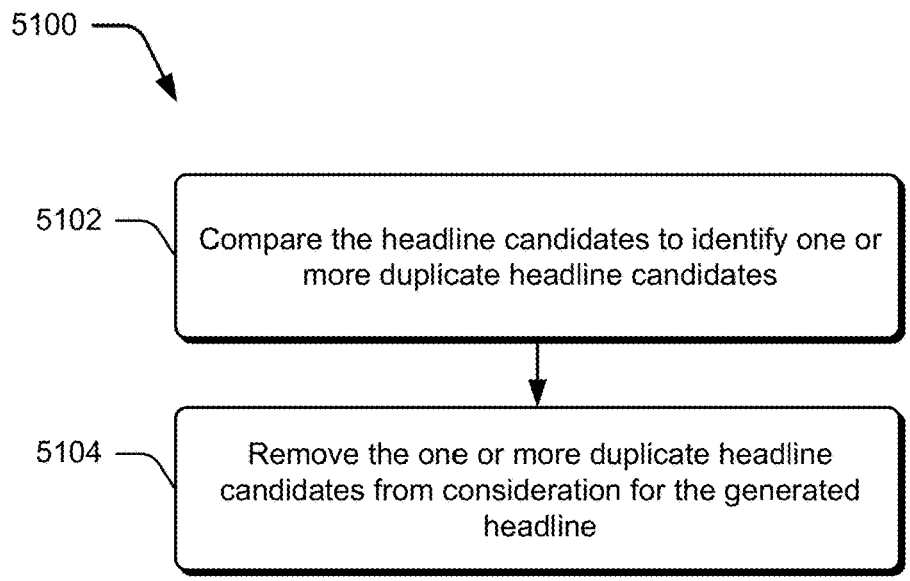
FIG. 51 illustrates an example method for identifying and removing duplicate headlines in accordance with one or more implementations.

FIG. 51 illustrates an example method 5100 for identifying and removing duplicate headlines in accordance with one or more implementations. The method 5100, for instance, may be integrated with the methods 4800-5000 to remove duplicate headlines in conjunction with the described methods. While implementations are described above that include ranking headline candidates prior to removing duplicate headlines, it is to be appreciated that deduplication may be performed at various points during headline generation, such as prior to ranking headline candidates.

At 5102, headline candidates are compared to identify one or more duplicate headline candidates. Generally, headline candidates can be compared in different ways, such as by the deduplicator module 3304 comparing headline content between different headline candidates to identify headline candidates with duplicate content. For instance, and as detailed above with reference to the scenarios 3900, 4000, the deduplicator module 3304 generates a headline identifier for each headline candidate by combining headline parameters for each headline candidate and hashing the combined headline parameters to generate a hash code that represents the headline identifier for each headline candidate. The deduplicator module 3304 compares the headline identifiers to determine that a headline identifier for the one or more duplicate headline candidates matches at least one other headline candidate, and thus represents a duplicate headline candidate.

Additionally or alternatively, duplicate headline candidates can be identified using other techniques, such as via content comparison and/or value comparison between headline candidates. For instance, the deduplicator module 3304 can perform a direct comparison of headline content between headline candidates, such as by comparing text content, images, and so forth, to determine if headline candidates include duplicate content. If multiple headline candidates include a threshold amount of duplicate content (e.g., 80% or more), the headline candidates are identified as duplicates. In another example, values in each headline candidate can be parsed and compared, such as values used as part of the Headline Formula described with reference to the scenario 4000. If these values are within a threshold similarity for multiple headline candidates (e.g., 90%), the headline candidates can be identified as duplicates.

At 5104, duplicate headline candidates are removed from consideration for generating a headline. The deduplicator module 3304, for instance, marks a duplicate candidate such that the duplicate candidate is not used for generating a headline for output. In at least one implementation where duplicate headline candidates are assigned ranking values, a duplicate candidate with a lower ranking value is removed and the higher ranking candidate is retained as a headline.

While a duplicate headline may initially be removed from consideration for generating headlines for output, a removed headline candidate may be retained for other purposes. For instance, where a user performs a search for headlines (e.g., using the search bar 4304), a resulting headline search may include searching available headline candidates including those that are removed during deduplication.

In addition to identifying and removing duplicate headlines, similar techniques may be employed to identify and remove duplicate narrated analytics playlists. For instance, as part of the method 2100 for generating narrated analytics playlists described with reference to FIG. 21, the personalized analytics module 106 can compare content from different narrated analytics playlists, such as utilizing the comparison techniques described above for comparing headline candidates. When duplicate narrated analytics playlists are identified, a duplicate playlist may be removed prior to being presented to a user for playback.

Generally, by identifying and removing duplicate headline candidates and/or playlists, system resources utilized for generating and presenting headlines and/or playlists can be conserved. For instance, memory space and processor bandwidth utilized for generating and outputting headlines and/or playlists can be conserved by removing duplicate headlines and/or playlists early in a headline and/or playlist generation process, thus avoid presenting headlines and/or playlists that are simply duplicates of other headlines and/or playlists. Further, by avoiding outputting duplicate headlines and/or playlists, display space of a presenting device (e.g., the computing device 104) may be conserved by presenting headlines and/or playlists that pertain to separate and distinct insights.

Figure 52:
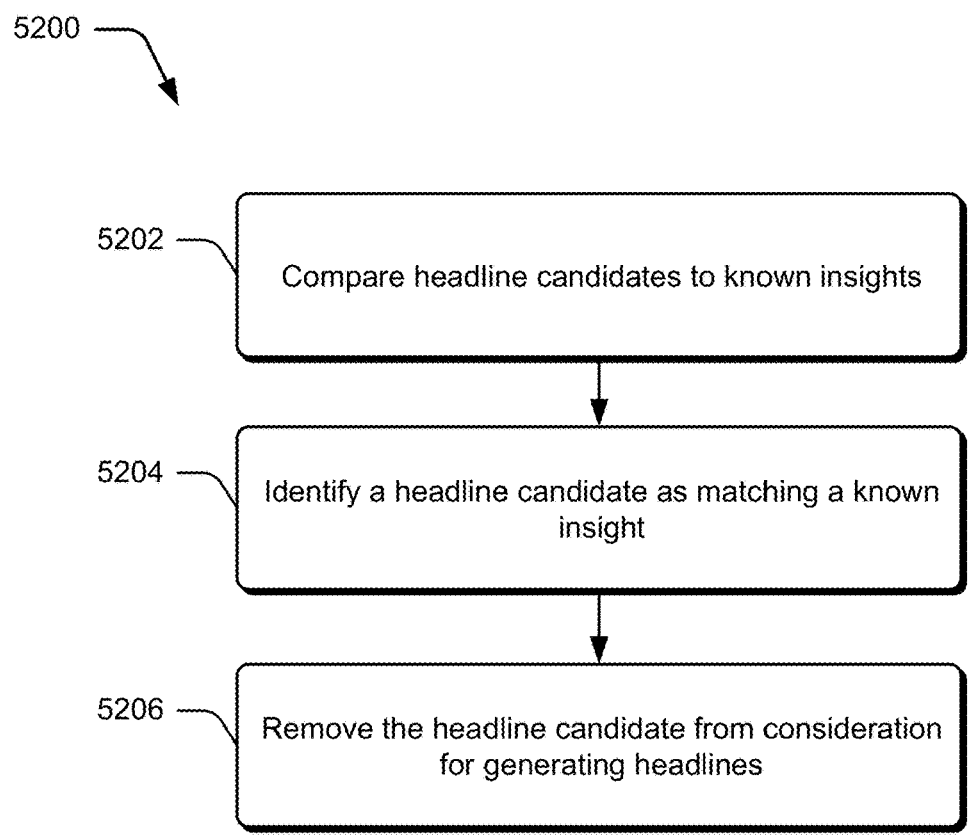
FIG. 52 illustrates an example method for avoiding presenting headlines that include insights that are likely well known in accordance with one or more implementations.

To avoid exposing a user to headlines that may include insights that are likely known to the user and thus less likely to be useful, implementations can filter out such headlines. For instance, FIG. 52 illustrates an example method 5200 for avoiding presenting headlines that include insights that are likely well known to a user in accordance with one or more implementations. The method may be performed at various stages of a headline generation process, before or after headline ranking and/or headline deduplication.

At 5202, headline candidates are compared to known insights. The personalized analytics module 124, for instance, stores data identifying known insights, such as in the database 124. Accordingly, the headline module 136 can compare content of a headline candidate (e.g., text content, semantic content) to instances of known insights to determine if the headline candidate pertains to similar (e.g., duplicate) subject matter of a known insight. Generally, a "known insight" represents an insight pertaining to a performance metric (e.g., an outlier) that is identified as commonly occurring, such as an insight that reoccurs multiple times over a period of time. In at least one implementation, a known insight threshold can be defined for tagging an insight as a known insight, such as an insight that occurs at least x times over a time period t. For instance, consider that for Coffee Co., its bestselling product over the past 3 years is cappuccino. Accordingly, an insight identifying cappuccino as the bestselling product at Coffee Co. may be labeled as a known insight, and headline candidates pertaining to the notion of cappuccino being the bestselling product may be matched to the known insight.

At 5204, a headline candidate is identified as matching a known insight. The headline module 136, for example, determines that a particular headline candidate matches a known insight, such as based on matching text content and/or semantic content. The headline module 136 can then tag the headline candidate as corresponding to a known insight. At 5206, the headline candidate is removed from consideration for generating headlines. For instance, the headline module 136 filters out (e.g., removes) the headline candidate from a set of headline candidates being processed for use in generating headlines. Alternatively, a known headline candidate may be processed in other ways, such as by reducing its ranking value relative to other ranked headline candidates, presenting the headline candidate in a separate portion of a headline GUI, and so forth.

Generally, by identifying headline candidates that correspond to known insights, system resources utilized for generating and presenting headlines can be conserved. For instance, memory space and processor bandwidth utilized for generating and outputting headlines can be conserved by removing known headlines early in a headline generation process, thus avoid presenting headlines that may be of lesser interest to a user. Further, by avoiding headlines pertaining to known insights, display space of a presenting device (e.g., the computing device 104) may be conserved by presenting headlines that are likely of interest to a user.

Having described implementations for generating headlines, consider now a discussion of dynamic phase generation and load reduction for a query in accordance with one or more implementations. Generally, the various implementations described below may be combined in various ways with the implementations described above, such as by combining and executing the different systems and functionalities described throughout this disclosure to realize the implementations discussed below.

Dynamic Phase Generation and Load Reduction for a Query

Figure 53:
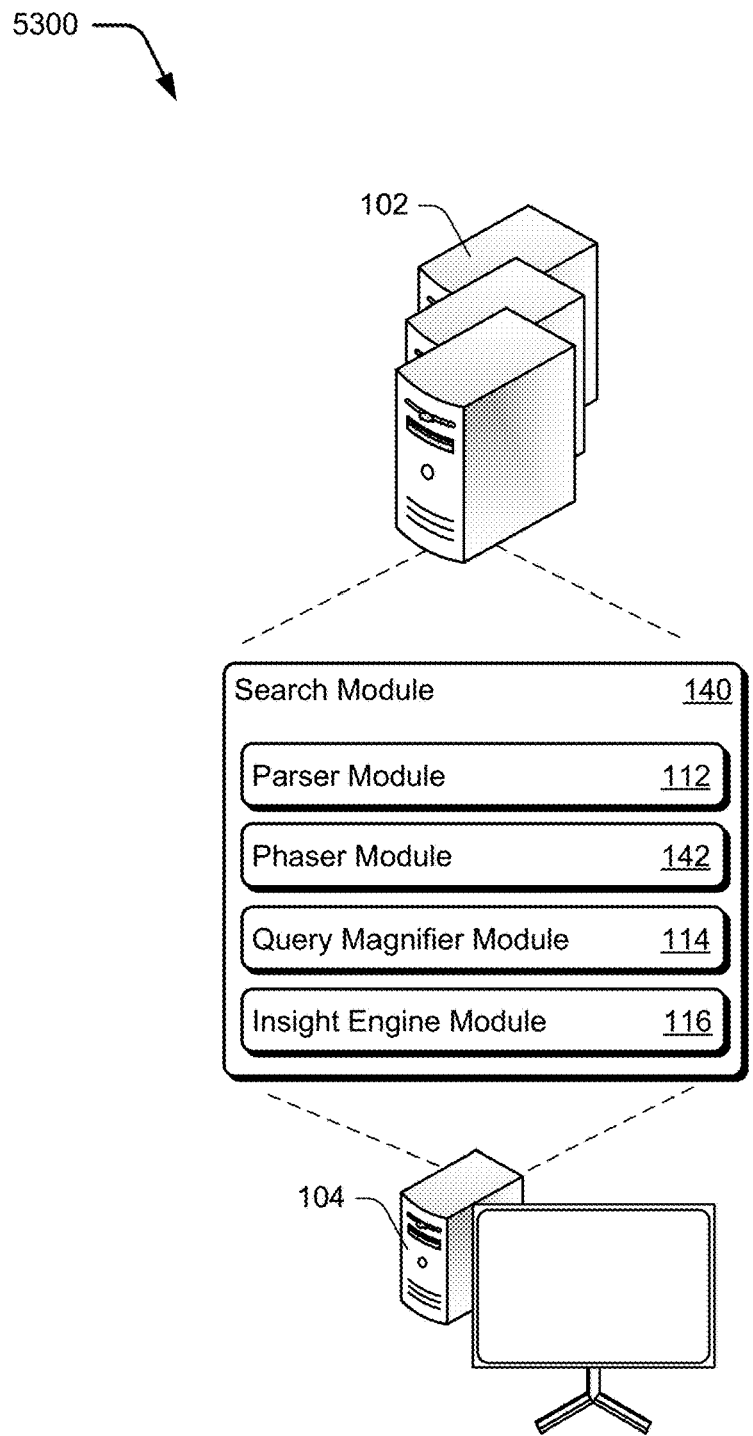
FIG. 53 depicts an example system for implementing techniques for dynamic phase generation and load reduction for a query in accordance with one or more implementations.

As part of various aspects for dynamic phase generation and load reduction for a query, FIG. 53 depicts a system 5300 including the search module 140, which may be implemented on the server 102, the computing device 104, and/or via any other suitable computing environment. The search module 140, for example, can be implemented as part of the personalized analytics module 106, the client analytics module 108, and/or in conjunction with a different application or service. In at least one implementation, the search module 140 is implemented as a standalone functionality that provides search capabilities for searching a variety of different data sources.

The search module 140 includes an implementation of the parser module 112, the phaser module 142, the query magnifier module 114, and the insight engine module 116. As further detailed below, these modules interact in various ways to perform different aspects of implementations for dynamic phase generation and load reduction for a query.

Figure 54:
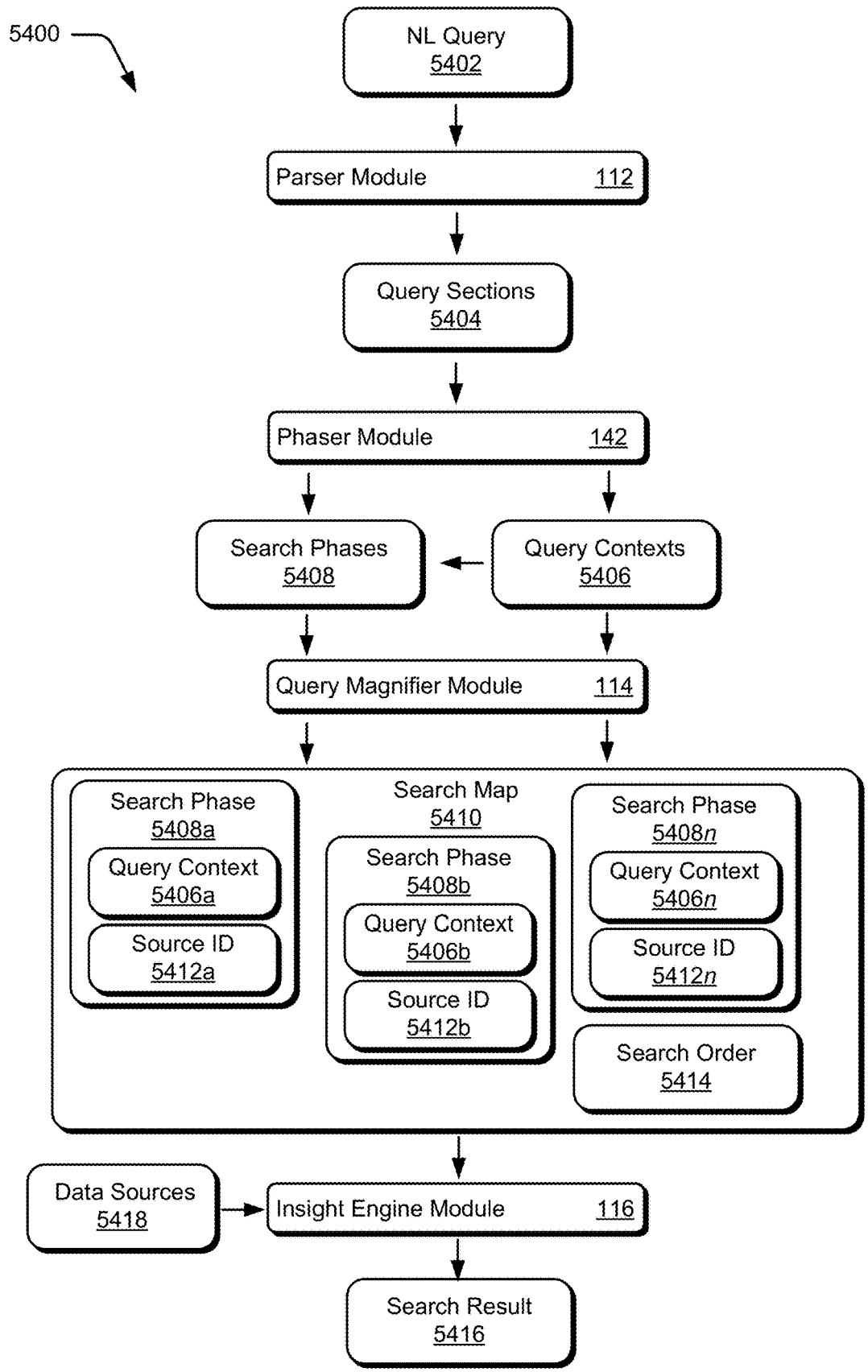
FIG. 54 depicts a system that is operable to provide an overview of techniques for dynamic phase generation and load reduction for a query described herein in accordance with one or more implementations.

FIG. 54 depicts a system 5400 that is operable to provide an overview of techniques for dynamic phase generation and load reduction for a query described herein. In the system 5400, the parser module 112 receives a natural language (NL) query 5402 as input. A user, for instance, enters a search phrase into a search functionality exposed by the search module 140, such as a series of words in a human-understandable language (e.g., visual and/or audible) that form a phrase and/or sentence. While implementations are discussed herein in the context of English NL queries, it is to be appreciated that the described techniques can be utilized for NL searching in a variety of different human-understandable languages. The parser module 112 processes the NL query 5402 to generate query sections 5404. Generally, the query sections 5404 represent logical sections of the NL query 5402 that are generated by the parser module 112 by dividing the NL query 5402 into different words and/or sub-phrases that each have a particular semantic meaning that contributes to the NL query 5402 as a whole. The parser module 112, for example, can implement NLP algorithms to divide the NL query 5402 into different keywords, phrases, and/or tokens that each represent a different query section 5404.

The phaser module 142 then takes the query sections 5404 as input, determines query contexts 5406 for the query sections 5404, and generates search phases 5408 based on the query sections 5404 and associated query contexts 5406. Generally, the query contexts 5406 represent different search criteria for the query sections 5404. For instance, for a particular query section 5404, a query context 5406 can specify criteria such as a type of data associated with the query section 5404, a user intent for the query section, how data is to be sorted, filtered, and/or grouped, a limit on a number of data records to be searched and/or retrieved, and so forth. Accordingly, the phaser module 142 generates the search phases 5408 based on the query sections 5404 and the query contexts 5406. Generally, the number of search phases 5408 generated may be less, the same, or more in number than the number of query sections 5404. For instance, each query section 5404 may be utilized to generate a corresponding search phase 5408, multiple query sections 5404 can be combined into a single search phase 5408, and/or a single query section 5404 can be utilized to generate multiple search phases 5408.

The query magnifier module 114 processes the search phases 5408 to generate a search map 5410 that specifies parameters for executing the search phases 5408. As part of generating the search map 5410, the query magnifier module 114 identifies a data source for each of the search phases 5408. In this particular example, the search phases 5408 include a search phase 5408a, a search phase 5408b, and a search phase 5408n. Further, each search phase 5408 is associated with a respective source identifier (ID) 5412 that specifies a data source upon which the respective search phase is to be executed. A variety of different data sources can be utilized for executing the search phases 5408, such as the databases 124, personal data storage on the computing device 104, output from a search phase 5404, and so forth.

As part of generating the search map 5410, the query magnifier module 114 also determines a search order 5414 that specifies an order in which the search phases 5408 are to be executed. The search order 5414, for instance, represents data that identifies the search phases 5408 and specifies an execution order for each search phase. Generally, the search order 5414 can depend on various factors, such as a type and/or availability of a data source. For instance, in a scenario where a particular search phase is to be executed on the output of a different search phase, the search order 5414 can specify that the different search phase is to be executed prior to the particular search phase.

The search map 5410 is then processed by the insight engine module 116 to generate a search result 5416. The insight engine module 116, for example, inspects the search order 5414 an executes the search phases 5408 on data sources 5418 identified by the source IDs 5412 and according to the search order 5414. The data sources 5418 may represent different types of data sources, such as the databases 124, personal data storage on the computing device 104, output from a search phase 5404, and so forth.

Further, the insight engine module 116 may utilize the query contexts 5406 for each of the search phases 5408 to determine criteria for executing the search phases 5408, such as how to retrieve and/or process data as part of the executing the search phases 5408. The insight engine module 116 generates the search result 5416 based on output of the different search phases 5408. The search result 5416 can take various forms, such as a data and/or multiple data sets, text strings, data statistics, and so forth. In at least some implementations, the search result 5416 can be further processed to provide output that conveys the search result 5416 in a form that is conducive to user understanding, such as to provide a user-consumable result to the NL query 5402. Consider, for example, the following discussion.

Figure 55:
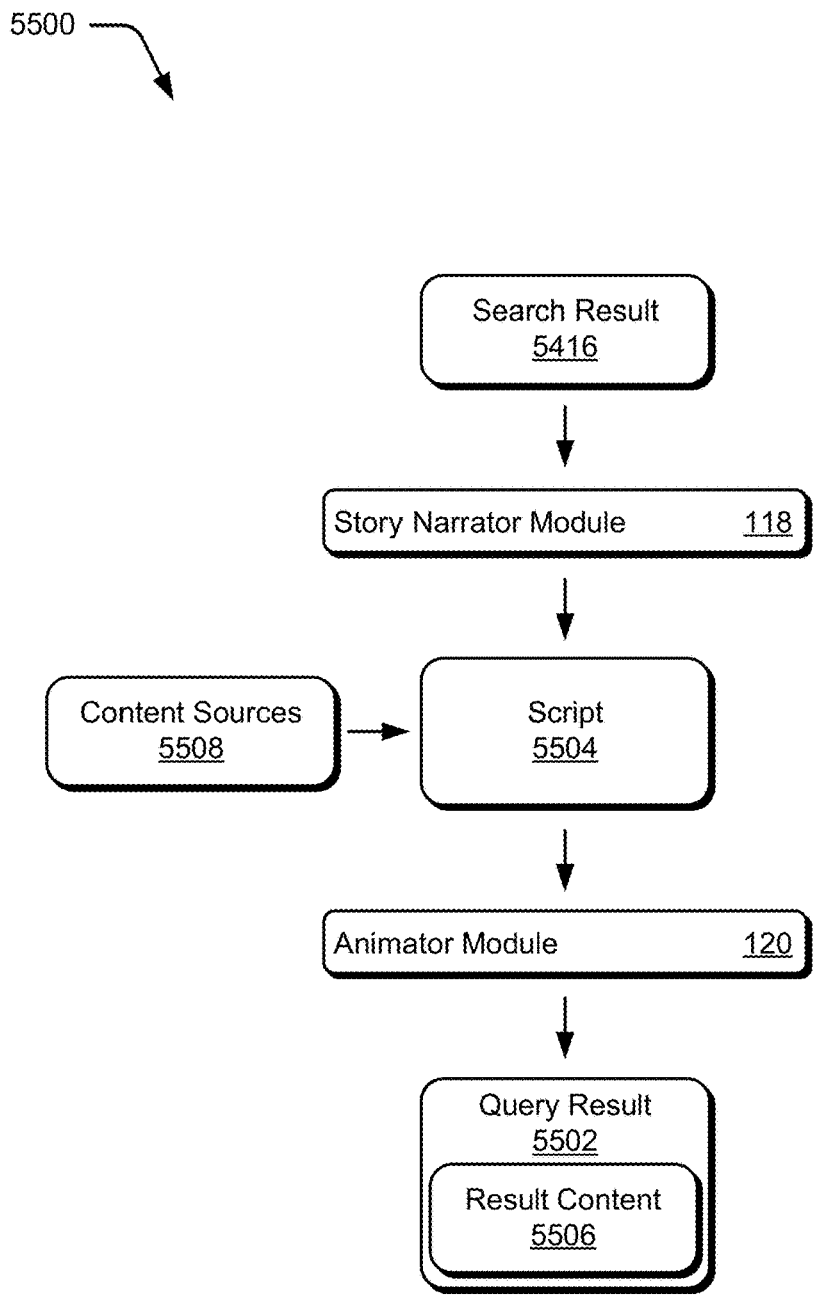
FIG. 55 depicts a system that is operable to generate a query result for a natural language query in accordance with one or more implementations.

FIG. 55 depicts a system 5500 that is operable to generate a query result for a NL query. The system 5500, for instance, is implemented in conjunction with the system 5400 to generate a user-consumable result for the NL query 5402. In the system 5500, the story narrator module 118 and the animator module 120 cooperate to generate a query result 5502 that conveys the search result in a human-understandable form. For example, the search result 5416 is input to the story narrator module 118, which processes the search result 5416 to generate a script 5504. Example functionality and operation of the story narrator module 118 is discussed above, such as with reference to FIG. 16. The story narrator module 118, for instance, determines how to articulate and/or describe the search result 5416 received from the insight engine module 116, such as what visualizations to include in the query result 5502 (e.g., charts, graphs, images, tables), what detailed narrative descriptions to include, and so forth.

Generally, the scripts 5504 can include descriptions of any suitable type of information, such as charts, narrative descriptions, storyline plots, design information, and so forth. In various implementations, the scripts 5504 indicate not only what type of information is to be included in the query result 5502, but also what order the information is presented in, when information is output simultaneously (e.g., audible output simultaneously with particular graphics), when to transition from a first piece of information to a second piece of information, and so forth. This can be achieved in any suitable manner, such as by marking transition and/or trigger points with flag data, identifying a time duration for each piece of information, and so on.

The animator module 120 obtains the scripts 5504 and generates the query result 5502 based on the scripts 5504. Example functionality and operation of the animator module 120 is described above, such as with reference to FIG. 17. Generally, this includes generating and/or obtaining result content 5506 from content sources 5508 for inclusion in the query result 5502 as specified in the scripts 5504, such as visuals (text strings, images, charts, videos, animations, and so forth), audio (e.g., audio files generated based on the scripts 5504), and so on. Thus, the query result 5502 includes the result content 5506 for output, as well as instructions for outputting the content, such as content ordering and timing.

Figure 56:
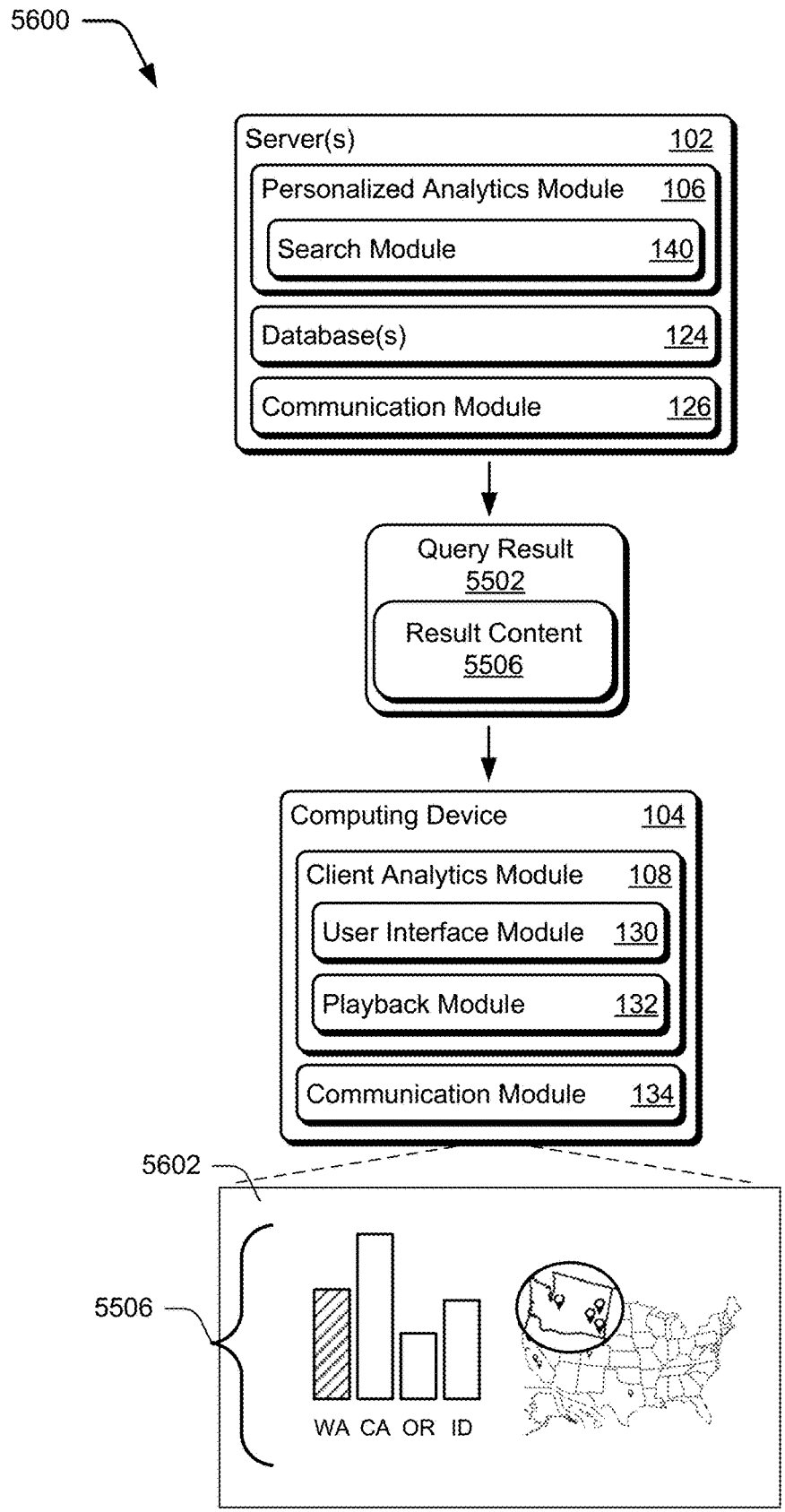
FIG. 56 depicts a scenario for outputting a query result in accordance with one or more implementations.

FIG. 56 depicts a scenario 5600 for outputting a query result. In the scenario 5600, the computing device 104 obtains the query result 5502 from the server 102, e.g., from the search module 140 and/or the personalized analytics module 106 operating on the server 102. The search module 140, for instance, causes the query result 5502 to be communicated to the computing device 104, such as via data communication over the communication cloud 128 between the communication module 126 of the server 102 and the communication module 134 of the computing device 104.

Continuing, the client analytics module 108 leverages the user interface module 130 to generate and output a user interface 5602, and the playback module 132 outputs the query result 5502 in the user interface 5602. As part of outputting the query result 5502, the result content 5506 is output in the user interface 5602. Further attributes of outputting a query result are detailed below.

Figure 57:
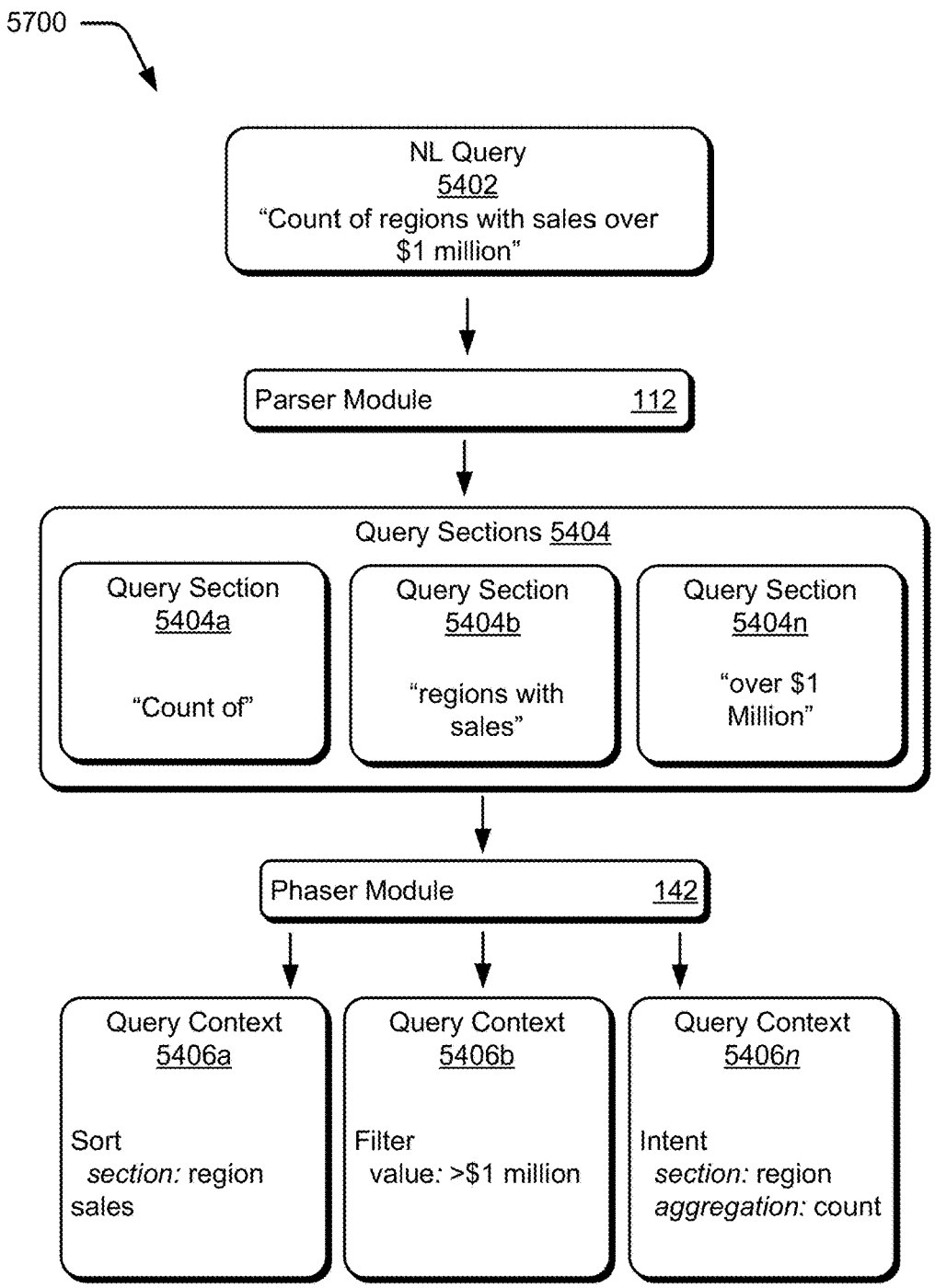
FIG. 57 depicts a system that is operable to parse a natural language query into query sections and to generate query contexts in accordance with one or more implementations.

FIG. 57 depicts a system 5700 that is operable to parse a NL query into query sections and to generate query contexts. In the system 5700, the parser module 112 receives the NL query 5402. The parser module 112 then processes the NL query 5402 to generate the query sections 5404. As discussed above, for example, a user enters the NL query 5402 as a phrase and/or sentence in a human-understandable language, and the parser module 112 parses the NL query 5402 into different logical sections represented by the query sections 5404. Generally, the query sections 5404 represent different keywords and/or phrases extracted from the NL query 5402. Further, the query sections 5404 may include data (e.g., metadata) that describes attributes of the individual query sections 5404, such as parts of speech (e.g., noun, verb, adjective, conjunction, etc.), section position (e.g., a position where a particular query section 5404 occurs in the NL query 5402), etc.

In this particular example, the NL query 5402 includes query text "Count of regions with sales over $1 million." Accordingly, the parser module 112 parses the NL query 5402 to generate the query sections 5404a, 5404b, and 5404n, that respectively include query fragments "Count of," "regions with sales," and "over $1 million." In at least one implementation, these different query sections 5404 represent logical divisions of the NL query 5402 that each have a specific semantic meaning within the context of the NL query 5402.

Continuing, the phaser module 142 takes the query sections 5404 as input and processes the query sections 5404 to determine query contexts 5406 for the query sections. In at least some implementations, the query contexts 5406 are based on different query context criteria that pertain to how search phases generated from the query sections 5404 are to be executed. Examples of such criteria that can be utilized to define the query contexts 5406 include:

GroupBy criteria: this criteria identifies how data from a search phase or set of search phases is to be grouped or partitioned. When used in the context of a search phase, the filter criteria can include fields such as:
  grouping attribute—specifies grouping criteria for data obtained as part of executing a search phase and/or set of search phases, such as grouping by data type, data category (e.g., name of database column), etc.;
  time unit—used to specify a time unit (e.g., day, week, month, year, etc.) to be used to aggregate data retrieved as part of executing a search phase and/or set of search phases. In at least some implementations, time unit can be utilized to aggregate data in different time units than those used to store the data in a data source.
Sort criteria: this criteria identifies sort order for data from a search phase or set of search phases. When used in the context of a search phase, the sort criteria can include fields such as:
  order—specifies a data sort order, such as descending values, ascending values, etc.;
  attribute—specifies sorting criteria for data obtained as part of executing a search phase and/or set of search phases, such as sorting by data type, data category (e.g., name of database column), etc.
Limit criteria: this criteria specifies a limit on a number of data records to retrieve from a search phase or set of search phases. When used in the context of a search phase, the limit criteria can be utilized in conjunction with the sort criteria to provide for data sorting and limiting. The limit criteria can include fields such as:
  attribute—specifies limit criteria for data obtained as part of executing a search phase and/or set of search phases, such as limiting by data type, data category (e.g., name of database column), etc.;
  position—specifies a position in a set of data at which to apply a limit, such as at topmost values (top n values), bottommost values (bottom n values), etc.;
  number—specifies a number of data values to be used to limit a search phase, such as limiting to n values based on position.
Filter criteria: this criteria defines a scope for data from a search phase or set of search phases. When used in the context of a search phase, the filter criteria can include fields such as:
  operator—specifies how to logically combine multiple filters defined for a search phase or set of search phases. For instance, operator can specify whether to utilize a union of multiple filtered results, to utilize common results from multiple filtered results, and so forth. operator can also be utilized to specify whether a filter or set of filters is to be applied before aggregating data from a data source (prefiltering) or after aggregating data from a data source (post filtering) as part of executing a search phase or set of search phases;
  operand—specifies filter details based on the section field (discussed below), such as section name, data type to be searched and/or filtered, and so forth;
  values—specifies data values to be used as part of filtering, such as particular data values to be applied by a filter, upper and/or lower bounds for filtered data values, and so forth;
  unit—specifies a particular data unit to be searched and/or filtered as part of a search phase. In at least one implementation, unit can be used to convert a data unit specified in an NL query to a corresponding data unit utilized in a data source to be searched.

season—specifies a time period and/or multiple time periods for which data is to be retrieved for a search phase. In at least one implementation, season can specify multiple discontinuous time periods (e.g., January sales for the past three years), and executing a search phases can include retrieving search result data for the multiple discontinuous time periods.

Focus criteria: This criteria specifies a Main <focus> of an NL query, a search phase, and/or set of search phases. In at least some implementations, the focus criteria can be utilized to enhance an NL query, such as to suggest relevant alternative queries and/or additional queries.

Intent criteria: This criteria identifies a user interest for an NL query, a search phase, or set of search phases. When used in the context of a search phase, the intent criteria can include fields such as:

section—identifies a section and/or sections of a data source that utilize for executing a search phase, such as an identifier for a column and/or row of a database;

aggregation method—specifies a type and/or type of aggregation to be applied to data obtained as part of execution of a search phase, e.g., sum, divide, subtract, etc. In at least some implementations, different search phases of a set of search phases can utilize different aggregation methods;

modifier—used to select and/or identify specific subsections of a data source (e.g., as identified by section) to be searched, such as specific rows of a database;

growth—used to specify if growth of a specified attribute is being requested as part of an NL query.

Input-data-sequencer: This criteria specifies and/or points to a search map for executing a set of search phases for an NL query.

Feedback: This criteria is usable to enable dynamic improvement over NL queries using feedback, such as suggestions for modifications and/or alternatives to an original input NL query. In at least one implementation, the feedback criteria can be utilized in conjunction with the focus criteria, described above.

While instances of criteria are described above with references to specific fields, it is to be appreciated that the described fields can be utilized across different instances and combinations of criteria within the scope of the implementations described herein.

Continuing with the system 5700, the phaser module 142 generates query contexts 5406a, 5406b, and 5406n based on the query sections 5404a-5404n. In this particular example, the query context 5406a includes a "sort" criteria of sales by region, the query context 5406b includes a filter criteria of sales values over $1 million, and the query context 5406n includes an "intent" criteria with a section field of "region" and an aggregation method of "count." These query contexts are presented for purpose of example, and other query contexts may be generated alternatively or additionally to these examples.

Figure 58:
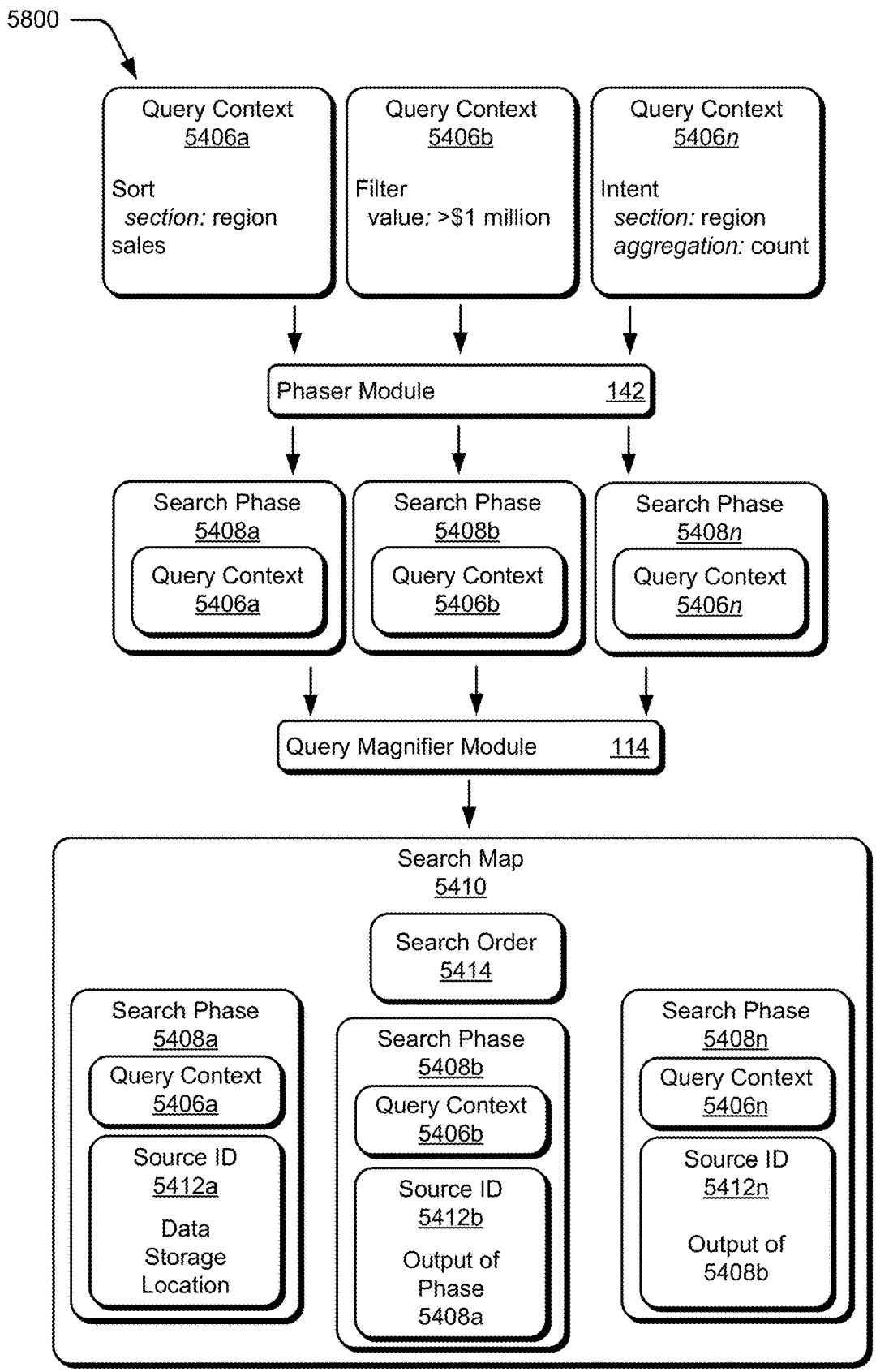
FIG. 58 depicts a system for generating search phases based on query contexts in accordance with one or more implementations.

FIG. 58 depicts a system 5800 for generating search phases based on query contexts. The system 5800, for example, is implemented in conjunction with the systems previously described. In the system 5800, the phaser module 142 utilizes the query contexts 5406 to generate the search phases 5408. For instance, the search phase 5408a is based on the query context 5406a, the search phase 5408b is based on the query context 5406b, and the search phase 5408n is based on the query context 5406n. The query magnifier module 114 then takes the search phases 5408 with query contexts 5406 as input and generates the search map 5410, which includes various parameters for executing the search phases 5408. The query magnifier module 114, for instance, identifies data sources for each of the search phases 5408 and associates each search phase 5408 with a corresponding source ID 5412. In this particular example, the search phase 5408a includes the source ID 5412a with identifies a data storage location upon which the search phase 5408a is to be executed. Further, the search phase 5408b includes the source ID 5412b which identifies the output of search phase 5408a as a data source for the search phase 5408b. Further, the search phase 5408n includes the source ID 5412n which identifies the output of search phase 5408b as a data source for the search phase 5408n.

The query magnifier module 114 also generates the search order 5414 which specifies an execution order for the search phases 5408. The search order 5414, for instance, specifies that the search phase 5408a is to be executed first, then the search phase 5408b, and then the search phase 5408n. In addition to identifying data sources and execution order for the search phases 5408, the search map 5410 can include other relevant data, such as data for the "focus criteria" described above for identifying a primary intended focus of the NL query 5402, feedback data based on the "feedback" criteria introduced above, and so forth.

Figure 59:
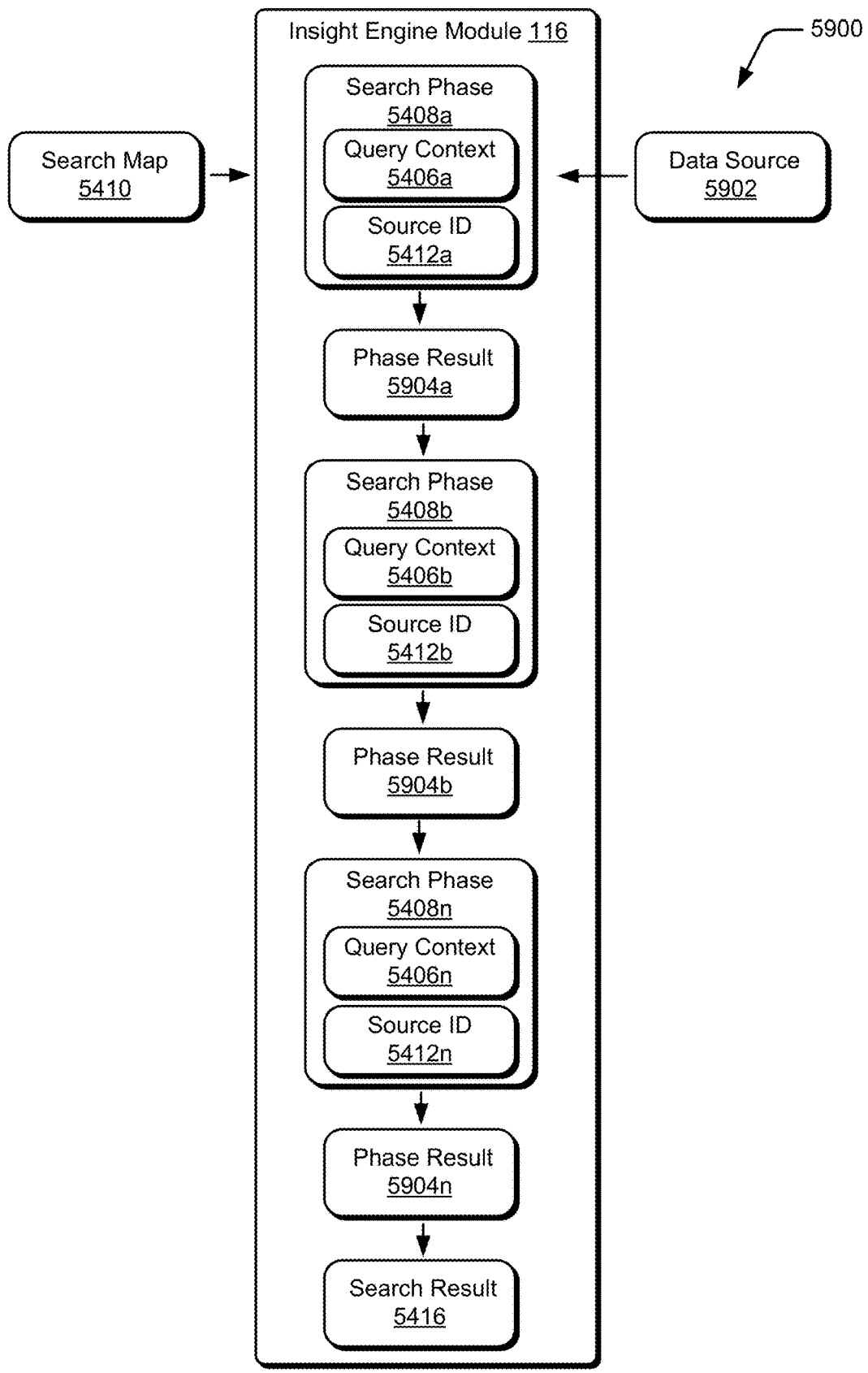
FIG. 59 depicts a system for executing search phases in accordance with one or more implementations.

FIG. 59 depicts a system 5900 for executing search phases. The system 5900, for example, is implemented in conjunction with the systems previously described. In the system 5900, the insight engine module 116 receives the search map 5410 is input and begins executing the search phases 5408. For instance, the insight engine module 116 executes the search phase 5408a on a data source 5902 identified by the source ID 5412a. In this particular example, the data source 5902 stores data that identifies sales numbers for different regions (e.g., geographical regions, enterprise regions, etc.), and thus the insight engine module 116 executes the search phase 5408a to extract data identifying sales numbers by region to generate a phase result 5904a. The insight engine module 116 then utilizes the phase result 5904a as input to execute the search phase 5408b, which filters the collection of sales by region to those regions with sales of more than $1 million, which generates a phase result 5904b. The insight engine module 116 then utilizes the phase result 5904b as input to execute the search phase 5408n, which counts the number of regions in the phase result 5904b to generate a phase result 5904n. The insight engine module 116 utilizes the phase result 5904n to generate the search result 5416. Generally, the search result 5416 represents output of execution of the search phases 5408. As discussed above with reference to FIG. 55, the search result 5416 can be utilized to generate various types of output to represent the query result 5502 for the NL query 5402.

Figure 60:
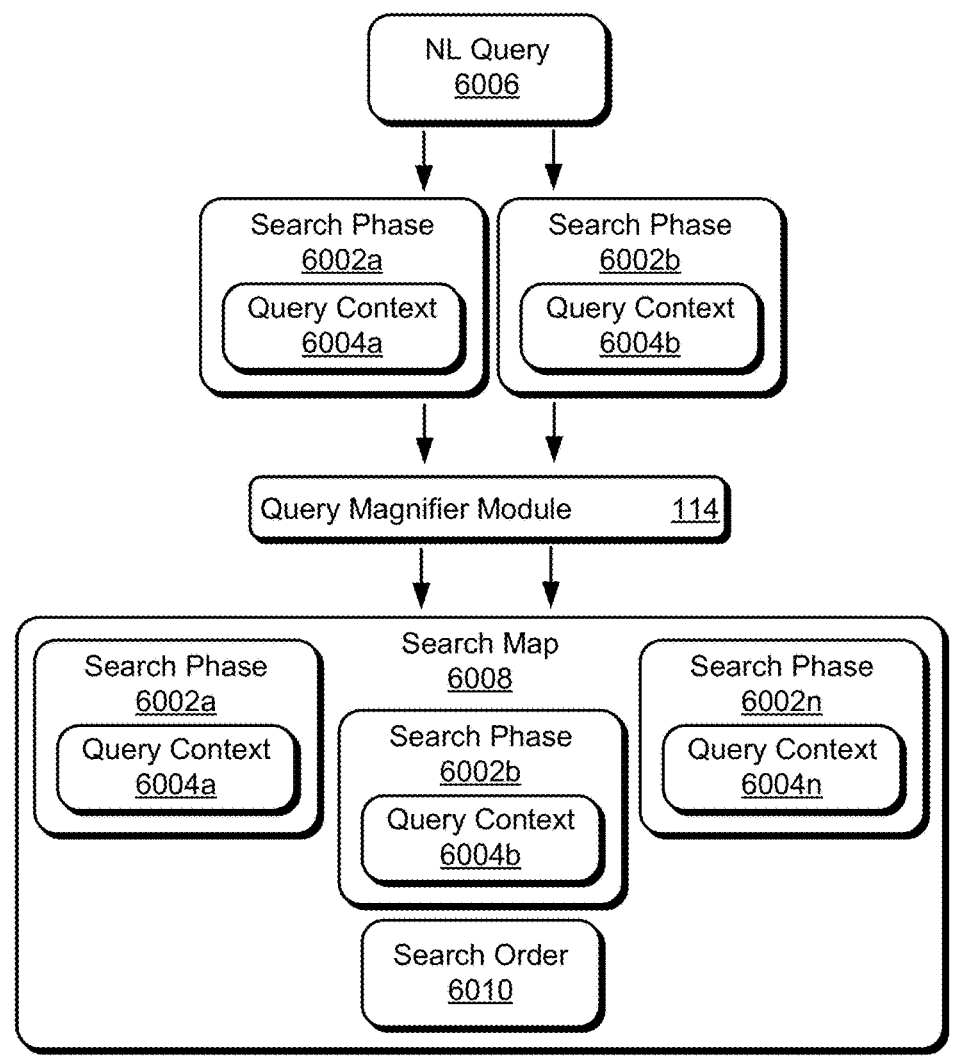
FIG. 60 depicts a system for dynamically generating search phases in accordance with one or more implementations.

FIG. 60 depicts a system 6000 for dynamically generating search phases. The system 6000, for instance, can be implemented in conjunction with the systems described above. In the system 6000, the query magnifier module 114 receives search phases 6002a, 6002b with respective query contexts 6004a, 6004n for an NL query 6006. Different ways for generating search phases and query contexts are detailed throughout this disclosure. The query magnifier module 114 processes the search phases 6002 and generates a search map 6008 that specifies various data and instructions for execution of the search phases 6002.

As part of processing the search phases 6002 and the query contexts 6004, the query magnifier module 114 determines that an additional search phase is to be added to generate a response to the NL query 6006. Accordingly, the query magnifier module 114 generates a search phase 6002n that includes a query context 6004n. Various conditions can occur that cause the query magnifier module 114 to determine that an additional search phase is to be generated. For instance, the query magnifier module 114 can determine that executing one of the search phases 6002a, 6002b involves multiple different data queries (e.g., database queries) and/or data sources, and thus is to be divided into multiple search phases. Accordingly, the query magnifier module 114 generates the search phase 6002n with the query context 6004n and includes the search phase 6002n as part of the search map 6008. The query magnifier module 114 also generates a search order 6010 that specifies an execution order for the search phases 6002. In at least one implementation, generating the search order 6010 includes modifying a previously-generated search order to include the newly-generated search phase 6002n. The search map 6008 may then be processed and executed by the insight engine module 116 to generate a search result for the NL query 6006, which may then be used to generate a query result for output. Example details for executing search phases for generating search results and query results are detailed throughout.

Figure 61:
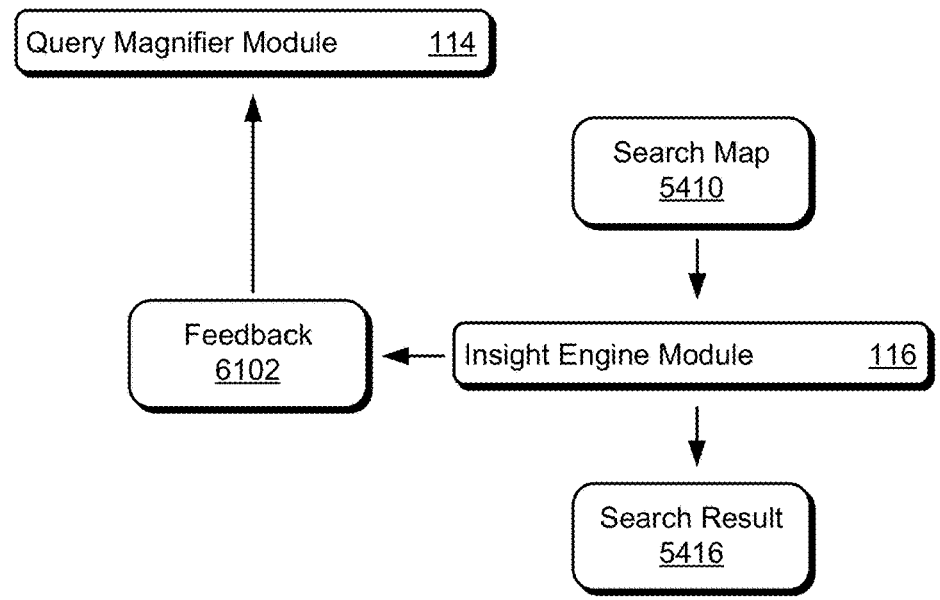
FIG. 61 depicts a system for generating feedback based on a natural language query in accordance with one or more implementations.

FIG. 61 depicts a system 6100 for generating feedback based on an NL query. The system 6100, for instance, can be implemented in conjunction with the systems described above. In the system 6100, the insight engine module 116 receives the search map 5410 that is generated based on the NL query 5402. Various attributes of the search map 5410 are detailed above. In addition to executing the search map 5410 to generate the search result 5416, the insight engine module 116 generates feedback 6102 for the NL query 5402. The feedback 6102, for instance, represents suggestions for modifications of and/or alternatives to the NL query 5402. As discussed above, in this example the NL query 5402 represents a query for a "Count of regions with sales over $1 million." Thus, the feedback 6102 can include modifications and/or alternatives such as "Names of regions with sales over $1 million," "Average number of stores in regions with sales over $1 million," "Best selling product in regions with sales over $1 million," and so forth.

In at least some implementations, the insight engine module 116 generates the feedback 6102 based on information regarding specific users of the personalized analytics module 106, such as user search history, user preferences, curated data gathered for the user, and so forth. Accordingly, the insight engine module 116 can cause the feedback 6102 to be provided to other parts of the system such as the query magnifier module 114 to enable relevant related searches to be suggested and/or performed. For instance, the user interface module 130 can output the feedback 6102 as text and/or other content in the search UI 5602. A user can then interact with the feedback 6102, such as to select instances of the feedback 6102 and to cause additional NL queries to be performed based on the feedback 6102.

Now consider a number of different methods that can be performed further to implementations discussed herein, such as for performing aspects of dynamic phase generation and load reduction for a query. The methods can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1, such as various modules included in personalized analytics module 106 and/or search module 140. While the methods illustrate steps in a particular order, it is to be appreciated that any specific order or hierarchy of the steps described may be implemented. For instance, other approaches may be used that rearrange the ordering of these steps. Thus, the order of the steps described here may be rearranged, and the illustrated ordering of these steps is not intended to be limiting.

Figure 62:
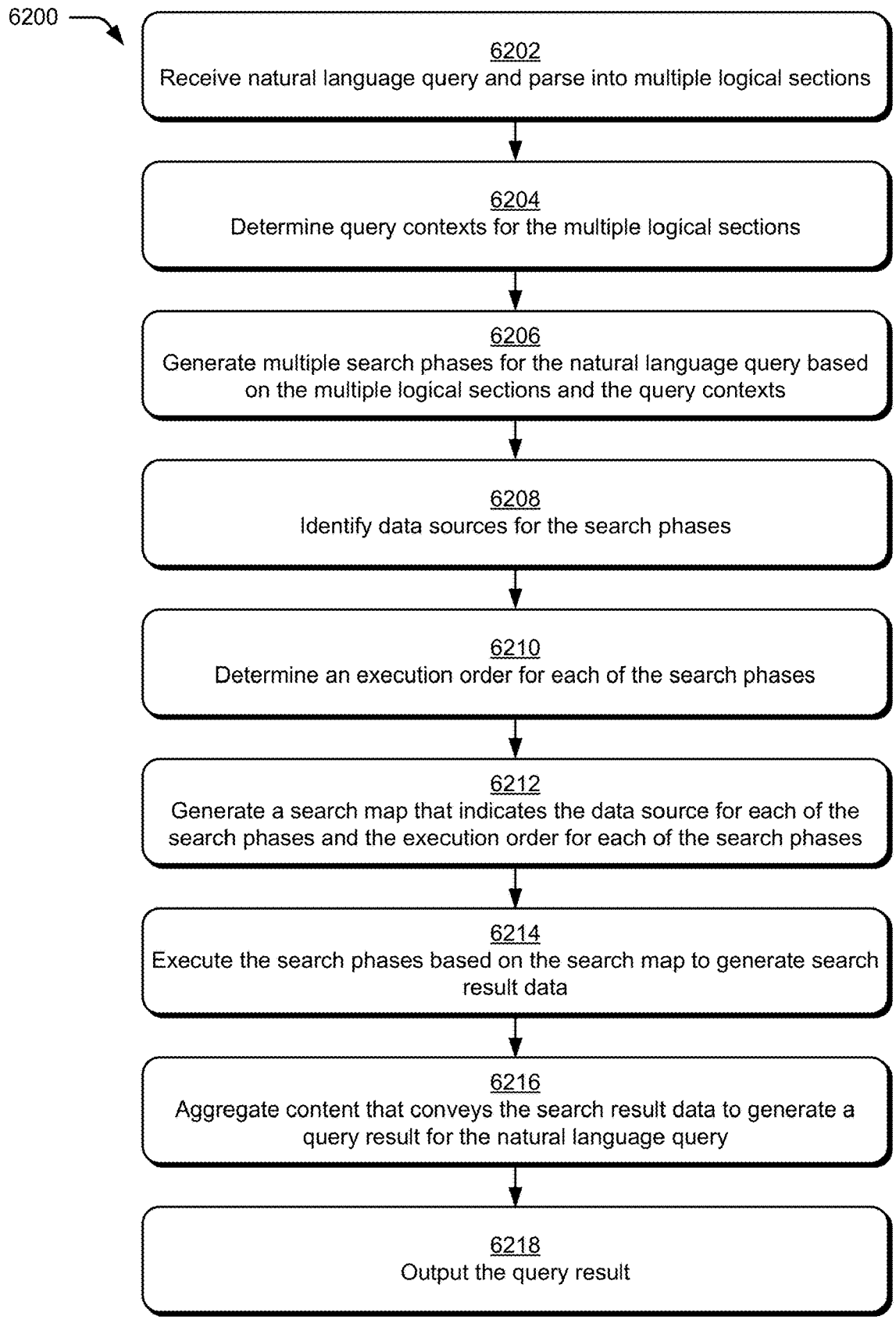
FIG. 62 illustrates an example method for dynamic phase generation and load reduction for a query in accordance with one or more implementations.

FIG. 62 illustrates an example method 6200 for dynamic phase generation and load reduction for a query in accordance with one or more implementations. At 6202, an NL query is received and parsed into multiple logical sections. A user, for instance, inputs an NL query to the search UI 5602 implemented by the search module 140. The parser module 112 then processes the NL query to parse the query into query sections that represent different logical sections of the NL query, such as keywords and/or phrases extracted from the NL query 5402.

At 6204, query contexts are determined for the multiple logical sections. For example, the phaser module 142 applies different query-related criteria to the logical sections to determine how each logical section is to be integrated into a search phase and/or set of search phases for generating a response to the NL query. Examples of different criteria that are usable to determine query contexts are detailed above. In at least one implementation, determining query contexts includes mapping natural language terms and/or phrases associated with the multiple logical sections to logical domain representations of the natural language phrases. For instance, the query context criteria discussed above can be represented as different logical attributes of a logical domain, and thus different natural language terms and/or phrases can be mapped to logical representations of the query context criteria based on the correlation to specific instances of the query context criteria.

In at least one implementation, query contexts are determined at least in part based on user-specific information, such as a user profile for a particular user of the personalized analytics module 106. For instance, anecdotal information aggregated for a user (such as detailed above) can be utilized to interpret the NL query and to determine the query contexts, such as based on historical user behaviors including previous instances of NL queries.

At 6206, multiple search phases are generated for the natural language query based on the multiple logical sections and the query contexts. The phaser module 142, for example, generates a set of search phases that are each based on a particular logical section and/or set of logical sections, and query context(s) for the logical section(s). In at least one implementation, individual logical sections represent subqueries that are derived from the NL query, and thus the search phases can be generated to enable the subqueries to be executed. Further, the phaser module 142 can generate the search phases independently of accessing a data source for each of the search phases. For instance, the phaser module 142 utilizes internal phase generation logic (e.g., phase generation rules that utilize the query context criteria discussed above) to generate the search phases, and without accessing and/or utilizing a data source that is external to the search module 140 and/or the personalized analytics module 106.

At 6208, data sources for the search phases are identified. The query magnifier module 114, for instance, processes the search phases to identify a data source for each search phase. Various data sources are available for executing a search phase, such as a data storage (e.g., local and/or remote (e.g., cloud based) storage), output from execution of a search phase, and so forth.

At 6210, an execution order is determined for each of the search phases. In at least one implementation, the execution order for a particular search is based on a data source for the search phase. For instance, if a data source for a particular search phase is the output from a different search phase, the particular search phase can be executed subsequently to the different search phase. Further, the execution order can specify that multiple search phases can be executed in parallel (e.g. concurrently), such as to increase a speed with which a set of search phases are executed.

At 6212, a search map is generated that indicates the data source for each of the search phases and the execution order for each of the search phases. The query magnifier module 114, for example, generates the search map as a data that identifies individual search phases, a data source for each search phase, and an execution order for each search phase. At 6214, the search phases are executed based on the search map to generate search result data. The insight engine module 116, for instance, executes each search phase on a data source identified in the search map for the search phase, and according to the specified execution order. Accordingly, search phase result data is obtained based on execution of each search phase, and search phase result data from multiple search phases is aggregated to generated search result data. In at least one implementation, the search result data may be in a raw form that is not conducive to user consumption, such as rows of data from a database, unstructured text strings, raw sets of numbers, and so forth. Thus, the search result data may be subjected to further processing before output for user consumption.

At 6216, content is aggregated that conveys the search result data to generate a query result for the natural language query. The story narrator module 118 and the animator module 120, for instance, cooperatively execute to generate the query result. In at least one implementation, this involves converting the search result data into content for user consumption, such as a text string and/or set of numbers in a human-understandable form (e.g., a sentence in a human language), audio content, video content, and so forth.

At 6218, the query result is output. For instance, the UI module 130 executing on the computing device 104 outputs the query result, such as in the search UI 5602.

Figure 63:
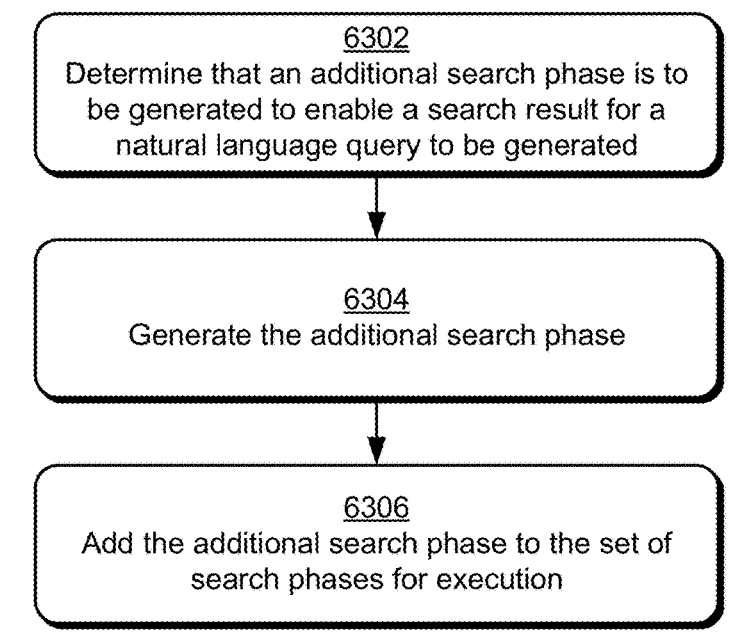
FIG. 63 illustrates an example method for adding a search phase to a set of search phases in accordance with one or more implementations.

FIG. 63 illustrates an example method 6300 for adding a search phase to a set of search phases in accordance with one or more implementations. The method 6300, for instance, can be implemented in conjunction with the method 6200. At 6302, it is determined that an additional search phase is to be generated to enable a search result for a natural language query to be generated. The query magnifier module 114, for instance, receives a set of search phases generated by the phaser module 142, and determines that an additional search phase is to be generated and added to the set of search phases. In at least one implementation, the query magnifier module 114 determines that a particular search phase of the set of search phases requires multiple search phases to be executed.

At 6304, the additional search phase is generated. For example, the query magnifier module 114 generates an additional search phase, such as based on additional query context to be used for generating a query result for an NL query. In at least one implementation, this includes dividing an existing search phase into multiple search phases. As part of generating the additional search phase, the query magnifier module 114 determines a data source for the additional search phase. For instance, where an existing search phase is divided into a first search phase and a second search phase, a data source for the second search phase can be identified as output from the first search phase.

At 6306, the additional search phase is added to the set of search phases for execution to generate search result data. The query magnifier module 114, for instance, adds the additional search phase to an existing search map to generate a modified search map. Further, the query magnifier module 114 includes a data source identifier for the additional search phase in the modified search map, and modifies search order data in the search map to incorporate a search order for the additional search phase. The modified search map can then be submitted to the insight engine module 116 for execution of the search phases to generate a search result.

Figure 64:
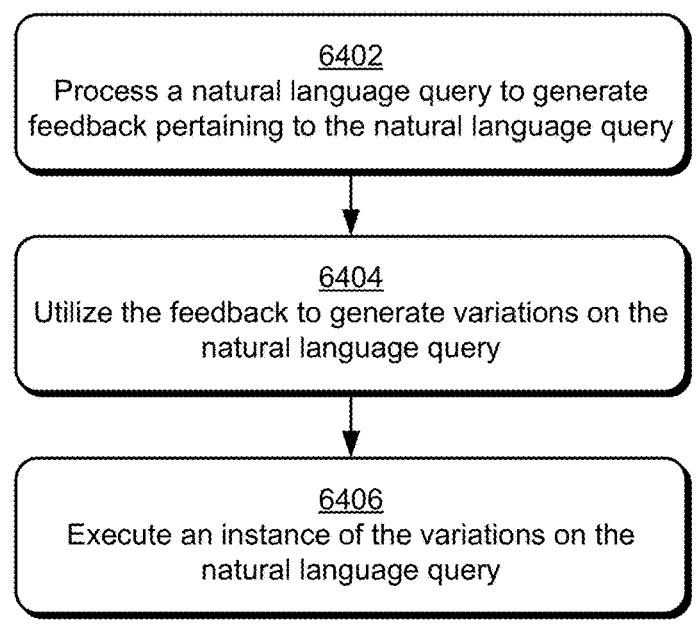
FIG. 64 illustrates an example method for generating feedback for a natural language query in accordance with one or more implementations.

FIG. 64 illustrates an example method 6400 for generating feedback for an NL query in accordance with one or more implementations. The method 6400, for instance, can be implemented in conjunction with the methods described above. At 6402, a natural language query is processed to generate feedback pertaining to the natural language query. The insight engine module 116, for example, processes data from a search map to determine alternatives to and/or variations on portions of an NL query. Generally, this can be performed in different ways. For instance, alternatives and/or variations on query terms and/or phrases can be identified, such as based on NL processing techniques. Further, different instances of query contexts can be identified as additions or replacements for existing query contexts of search phases, such as different aggregation methods, filtering criteria, sorting criteria, grouping criteria, and so forth.

At 6404, the feedback is utilized to generate variations on the natural language query. The query magnifier module 114, for example, utilizes the feedback to generate different variations on the NL query, such as replacement query terms and/or replacement queries.

At 6406, an instance of the variations on the natural language query is executed. For example, the variations on the NL query are presented for user selection, and a user selects an instance of the variations. The selected instance is then executed, such as utilizing techniques for dynamic phase generation and load reduction for a query described herein.

Figure 65:
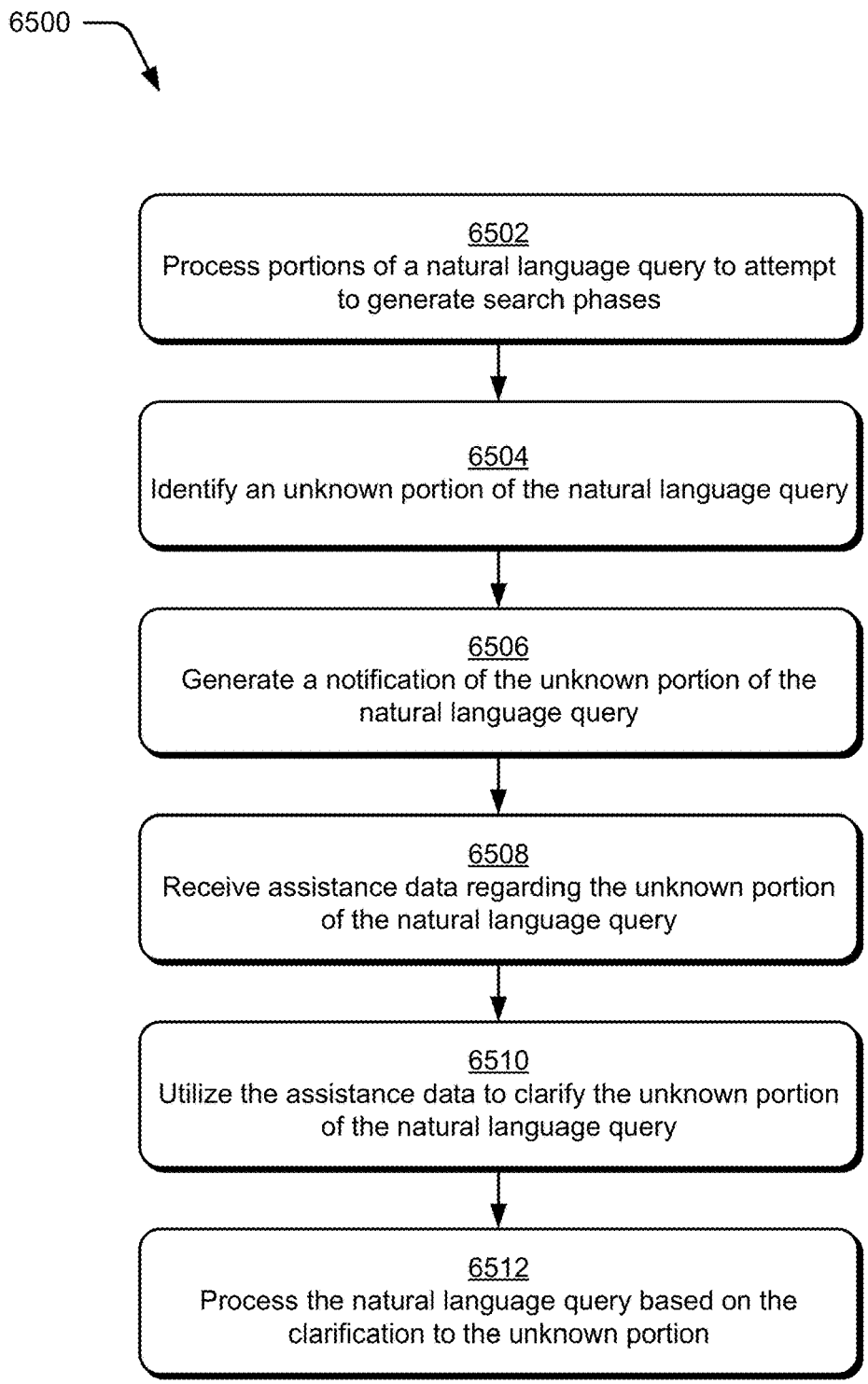
FIG. 65 illustrates an example method for determining an unknown portion of a natural language query in accordance with one or more implementations.

FIG. 65 illustrates an example method 6500 for determining an unknown portion of an NL query in accordance with one or more implementations. The method 6500, for instance, can be implemented in conjunction with the methods described above.

At 6502, portions of a natural language query are processed to attempt to generate search phases. The phaser module 142 and the query magnifier module 114, for example, cooperatively execute to generate search phases based on an NL query, and to generate a search map for execution of the search phases. Different aspects and attributes of generating search phases and a search map are detailed above.

At 6504, an unknown portion of the natural language query is identified. Generally, different conditions can result in an unknown portion of an NL query, such as when the relationship of the portion to other portions of the NL query cannot be determined, a data source for the portion cannot be identified and/or accessed, the portion of the NL query is not understood (e.g., is based on an unknown data domain), and so forth. The phaser module 142, for example, determines that a particular query section of a parsed NL query is not able to be correlated to a particular defined query context. In another example, the query magnifier module 114 determines that a data source for a particular search phase cannot be identified and/or is not accessible.

In yet another example, the phaser module 142 and/or the query magnifier module 114 determines that a context of a portion of an NL query is outside of a known data context. For instance, data requested by the portion of the NL query can relate to a data domain that is outside of a known data domain for the search module 140. Consider, for example, that the personalized analytics module 106 and/or the search module 140 are implemented in a data domain pertaining to a product sales enterprise. Accordingly, if an NL query is received that requests "List of patients for Dr. Smith awaiting check-in," the phaser module 142 may determines that a data domain for search terms of the NL query is not recognized. Further, the query magnifier module 114 may determine that a data source for the NL query cannot be identified, such as based on data requested by the NL query.

At 6506, a notification of the unknown portion of the natural language query is generated. The search module 140, for example, generates a notification that a portion of the NL query is not understood. Generally, the notification can be utilized for various purposes. For instance, the notification can be sent to other portions of the system (e.g., the curation engine module 110) for assistance in obtaining further information regarding the unknown portion of the NL query, such as help in identifying a data source and/or a data context for the unknown portion.

The notification may additionally or alternatively be output for user consumption, such as in the search UI 5602 presented by the search module 140. The notification, for instance, can identify the portion of the NL query that is not understood, and can request assistance in understanding the portion. For example, the notification can request that a data source and/or data domain for the portion of the NL query be identified. In at least one implementation, the notification can include a fillable field and/or navigable control that enables a user to provide input to provide the requested assistance.

At 6508, assistance data is received regarding the unknown portion of the natural language query. Generally, the assistance data may be received from various entities, such as other parts of the system (e.g., the curation engine module 110), user input to the search UI 5602, system personnel, and so forth. The assistance data can take various forms, such as an identifier for a data source for the unknown portion, a data domain for the unknown portion, a modified version of the unknown portion (e.g., a revised NL term and/or phrase), and so forth.

At 6510, the assistance data is utilized to clarify the unknown portion of the natural language query. The assistance data, for example, can be utilized to identify a data source and/or a data domain for use in generating a search phase based on the unknown portion, such as to assist the phaser module 142 in generating a query context and/or a search phase based on the unknown portion. Alternatively or additionally, the assistance data can be utilized to modify the NL query itself, such as to replace the unknown portion of the NL query.

At 6512, the natural language query is processed based on the clarification to the unknown portion. Generally, this can take various forms. For instance, where the clarification involves a modification and/or replacement of a search term of the NL query, the clarified NL query can be reprocessed by the parser module 112 to generate a new set of query sections, which can then be processed as described throughout. Where the clarification involves an identification of a data domain and/or a data source, the phaser module 142 and/or the query magnifier module 114 can generate a query context, search phase, and/or data source ID based on the clarification. Thus, the clarification can enable a modified and/or new search phase to be generated such that the system can further process a set of search phases to generate a search result and a query result for the NL query, such as utilizing techniques described above.

Accordingly, techniques for dynamic phase generation and load reduction for a query enable complex queries to be efficiently and accurately processed to generate query responses, which is not typically enabled by conventional search techniques.

Differentiation of Search Results for Accurate Query Output

Figure 66:
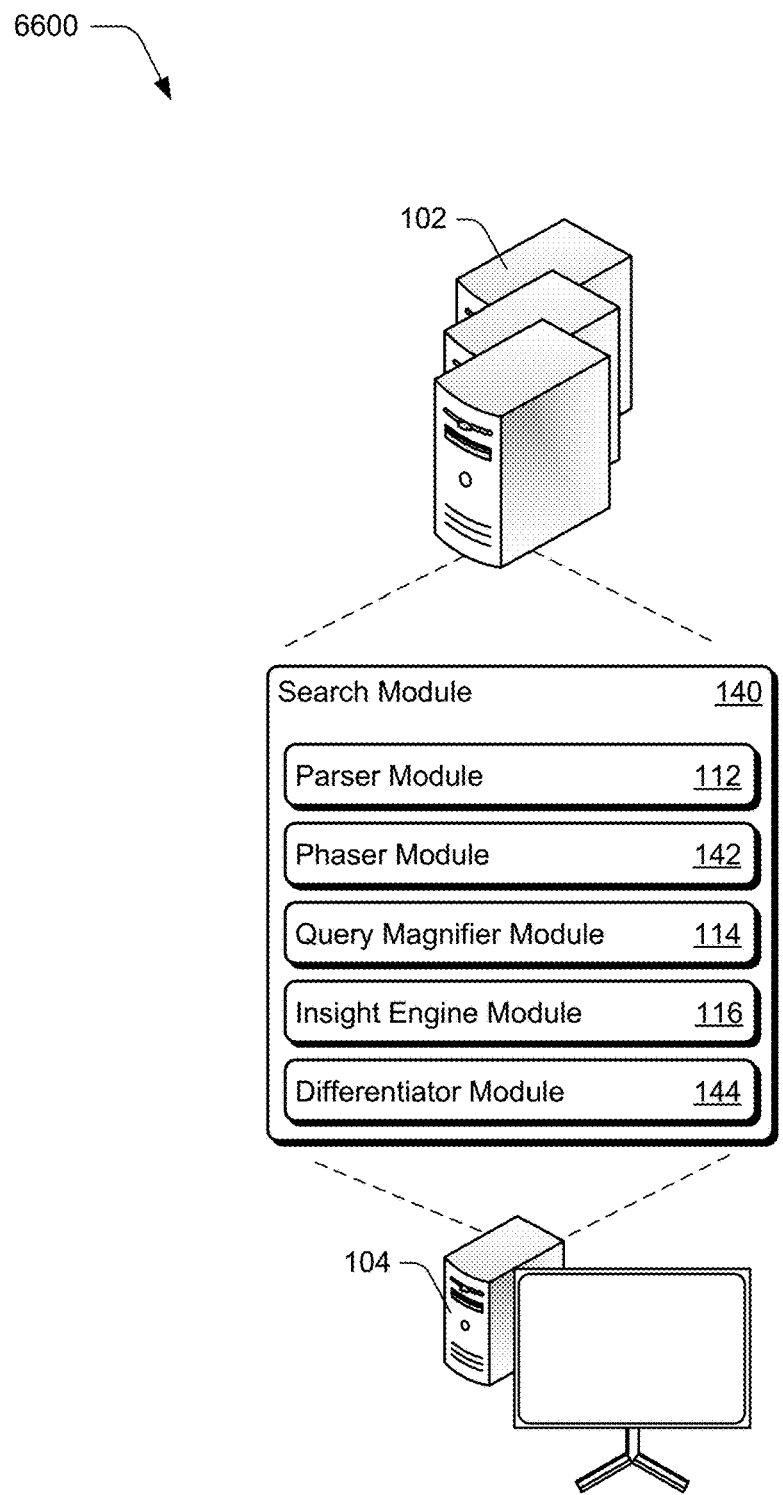
FIG. 66 depicts a system that is operable to provide an overview of techniques for differentiation of search results for accurate query output described herein in accordance with one or more implementations.

As part of various aspects for differentiation of search results for accurate query output, FIG. 66 depicts a system 6600 including the search module 140, which may be implemented on the server 102, the computing device 104, and/or via any other suitable computing environment. The search module 140, for example, can be implemented as part of the personalized analytics module 106, the client analytics module 108, and/or in conjunction with a different application or service. In at least one implementation, the search module 140 is implemented as a standalone functionality that provides search capabilities for searching a variety of different data sources.

The search module 140 includes an implementation of the parser module 112, the phaser module 142, the query magnifier module 114, the insight engine module 116, and the differentiator module 144. As further detailed below, these modules interact in various ways to perform different aspects of differentiation of search results for accurate query output.

Figure 67:
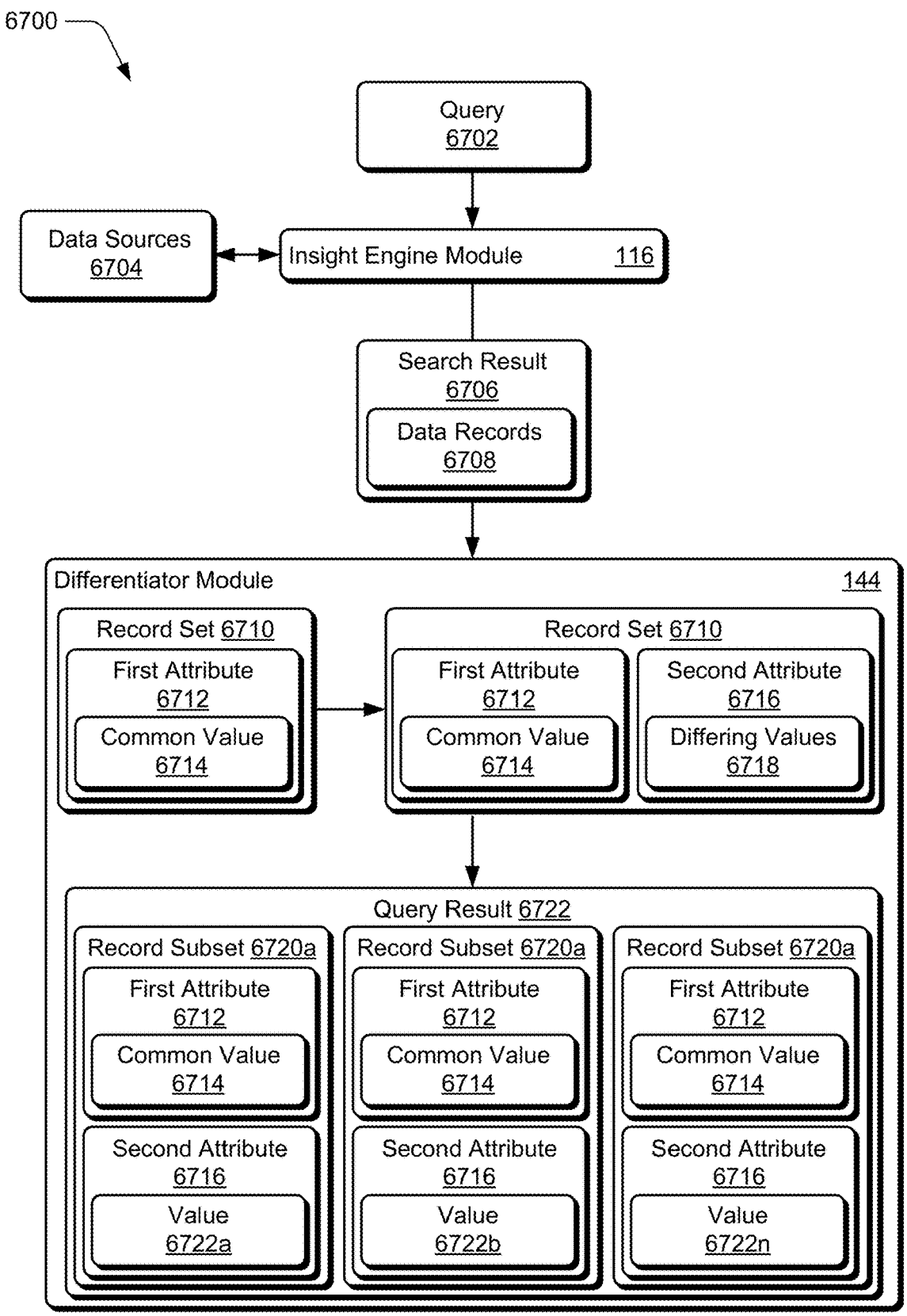
FIG. 67 depicts a system that represents an example operational overview of techniques for differentiation of search results for accurate query output in accordance with one or more implementations.

FIG. 67 depicts a system 6700 that represents an example operational overview of techniques for differentiation of search results for accurate query output. In the system 6700, the insight engine module 116 receives a query 6702 and searches data sources 6704 based on the query 6702 to generate a search result 6706. Various ways for processing and executing the query 6702 are detailed above, examples of which include parsing the query 6702 into different query sections (e.g., keywords and/or phrases), generating and executing different search phases, accessing a machine learning model to parse and/or characterize the query 6702 for execution, and so forth. Generally, the data sources 6704 represent different types of data sources, such as the databases 124, personal data storage on the computing device 104, output from a search phase 5404, and so forth.

The search result 6706 includes multiple data records 6708 that represent different instances of data collections gathered based on the query 6702. The data records 6708 can be implemented in various ways, such as different discrete data records from a database (e.g., rows each with a collection of data fields), data arrays with specific data elements, data objects with corresponding data fields, and so forth. The differentiator module 144 processes the multiple data records 6708 to identify a record set 6710 that represent different instances of the data records 6708 that share a common first attribute 6712 with a common value 6714 for the first attribute 6712. For instance, consider that the common attribute 6712 for each record of the record set 6710 represents a data field of "city." In such an example, the "city" data field shares a common value 6714 across the record set 6710, e.g., "Oakland."

The differentiator module 144 then processes the record set 6712 to determine that data records of the record set 6710 share a second attribute 6716 but that the second attribute 6716 has differing values 6718 across the record set 6710. In at least one implementation, the second attribute 6716 represents a contextual qualifier for the first attribute 6712, e.g., a data field that categorizes the first attribute 6712 into different contexts. Continuing the "city" example above, the second attribute 6716 represents a data field of "state" which qualifies different states (e.g., geographical locations) which include a city named "Oakland." In such an example, the differing values 6718 include different values for the "state" attribute for the city of Oakland, such as "California," "New Jersey," and "Michigan," which represent different states that include a city and/or region named "Oakland."

Further to the system 6700, the differentiator module 144 generates different record subsets 6720 by parsing the record set 6710 according to the differing values 6718. For instance, for the second attribute 6716, a record subset 6720a includes a common value 6722a, a record subset 6720b includes a common value 6722b, and record subset 6720n includes a common value 6722n. Generally, the common values 6722a-6722n are different than each other but are common within their respective record subsets 6720.

Figure 68:
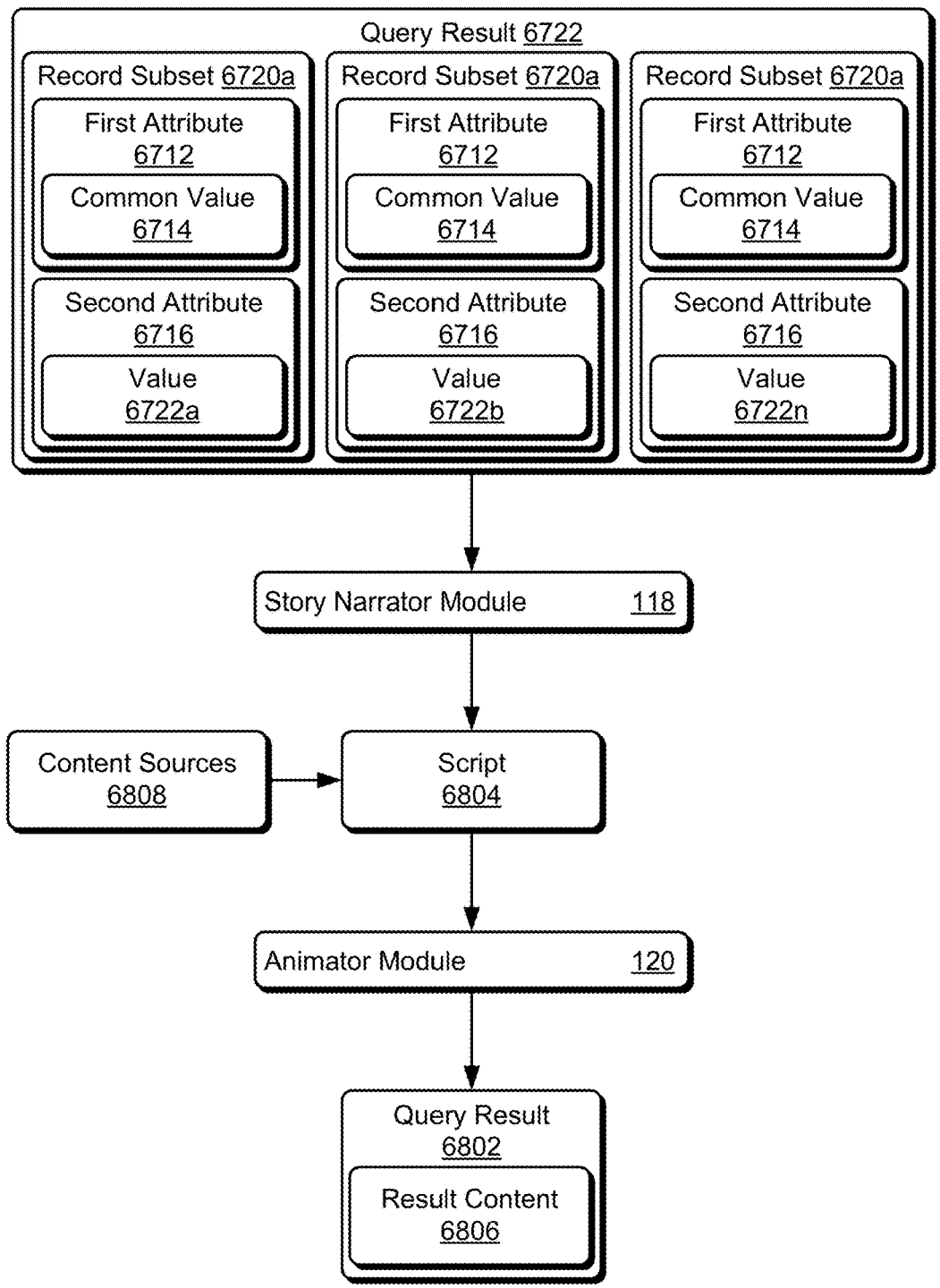
FIG. 68 depicts a system that represents further aspects of an example operational overview of techniques for differentiation of search results for accurate query output in accordance with one or more implementations.

FIG. 68 depicts a system 6800 that represents further aspects of an example operational overview of techniques for differentiation of search results for accurate query output. The system 6800, for example, for instance, is implemented in conjunction with the system 6700 to generate a user-consumable result for the query 6702. In the system 6800, the story narrator module 118 and the animator module 120 cooperate to generate a query result 6802 that conveys the record subsets 6720 in a human-understandable form. For example, the record subsets 6720 are input to the story narrator module 118 (e.g., are received from the search module 140), and the story narrator module 118 processes the record subsets 6720 to generate a script 6804. Example functionality and operation of the story narrator module 118 is discussed above, such as with reference to FIG. 16. The story narrator module 118, for instance, determines how to articulate and/or describe the record subsets 6720, such as what visualizations to include in the query result 6802 (e.g., charts, graphs, images, tables), what detailed narrative descriptions to include, and so forth.

Generally, the script 6804 can include descriptions of any suitable type of information, such as charts, narrative descriptions, storyline plots, design information, and so forth. In various implementations, the script 6804 indicates not only what type of information is to be included in the query result 6802, but also what order the information is presented in, when information is output simultaneously (e.g., audible output simultaneously with particular graphics), when to transition from a first piece of information to a second piece of information, and so forth. This can be achieved in any suitable manner, such as by marking transition and/or trigger points with flag data, identifying a time duration for each piece of information, and so on.

The animator module 120 obtains the script 6804 and generates the query result 5502 based on the script 6804. Example functionality and operation of the animator module 120 is described above, such as with reference to FIG. 17. Generally, this includes generating and/or obtaining result content 6806 from content sources 6808 for inclusion in the query result 6802 as specified in the script 6804, such as visuals (text strings, images, charts, videos, animations, and so forth), audio (e.g., audio files generated based on the script 6804), and so on. Thus, the query result 6802 includes the result content 6806 for output, as well as instructions for outputting the content, such as content ordering and timing.

Figure 69:
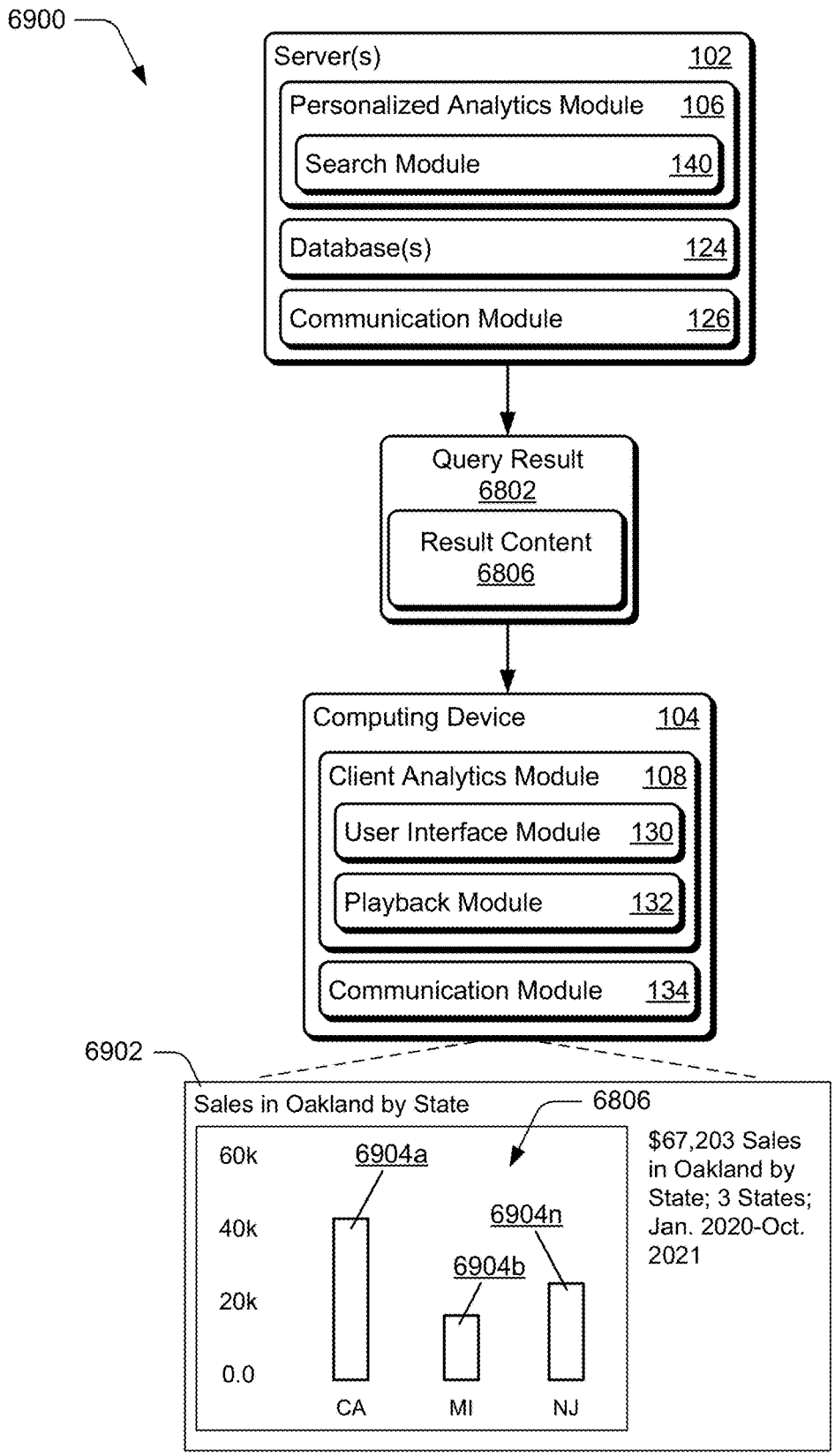
FIG. 69 depicts a system for outputting a query result in accordance with one or more implementations.

FIG. 69 depicts a system 6900 for outputting a query result. The system 6900, for example, represents a continuation of the systems 6700, 6800. In the system 6900, the computing device 104 obtains the query result 6802 from the server 102, e.g., from the search module 140 and/or the personalized analytics module 106 operating on the server 102. The search module 140, for instance, causes the query result 6802 to be communicated to the computing device 104, such as via data communication over the communication cloud 128 between the communication module 126 of the server 102 and the communication module 134 of the computing device 104.

Continuing, the client analytics module 108 leverages the user interface module 130 to generate and output a user interface 6902, and the playback module 132 outputs the query result 6802 in the user interface 6902. As part of outputting the query result 6802, the result content 6806 is output in the user interface 6902. Notice that the result content 6806 includes different result indicia 6904 including a result indicia 6904a, result indicia 6904b, and result indicia 6904n. Generally, the result indicia 6904 individually correspond to a different value 6722 for the second attribute 6716 of the record subsets 6720. For instance, the result indicia 6904a identifies the value 6722a, the result indicia 6904b identifies the value 6722b, and the result indicia 6904n identifies the value 6722n. Accordingly, the described techniques enable more accurate query results to be generated and output, such as to differentiate query results based on secondary contextual factors that may not be immediately apparent in conventional search techniques.

Figure 70:
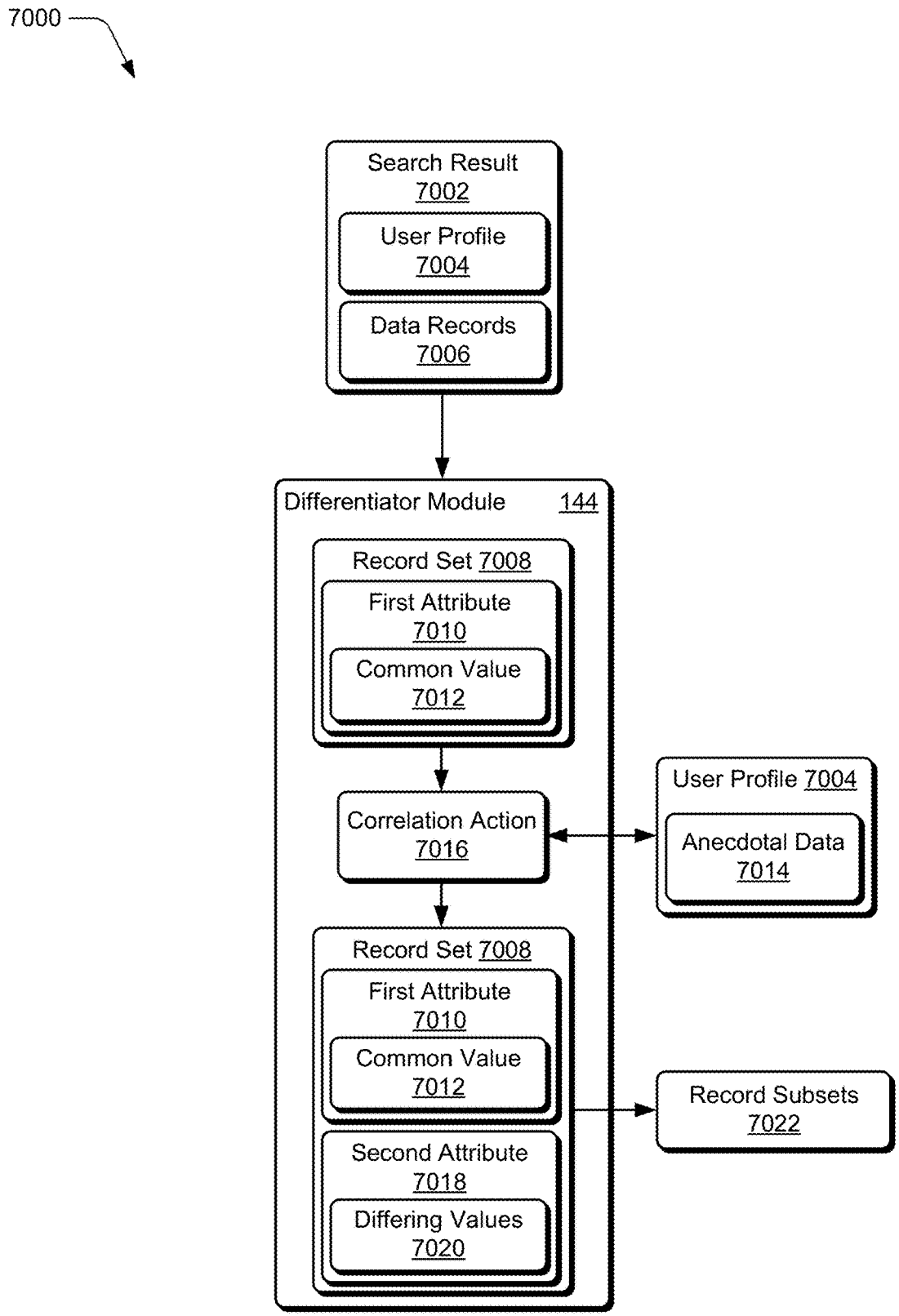
FIG. 70 depicts a system for utilizing anecdotal data for identifying a contextual attribute for differentiating query results in accordance with one or more implementations.

FIG. 70 depicts a system 7000 for utilizing anecdotal data for identifying a contextual attribute for differentiating query results. The system 7000, for example, can be implemented in conjunction with the systems described above. In the system 7000, a search result 7002 associated with a user profile 7004 is received by the differentiator module 144. The search result 7002, for instance, is received based on a query initiated via a device and/or process (e.g., an application) that is authenticated to the user profile 7004. The search result 7002 includes data records 7006. The differentiator module 144 processes the data records 7006 to identify a record set 7008 that represent different instances of the data records 7006 that share a common first attribute 7010 with a common value 7012 for the first attribute 7010.

To enable differentiation of the record set 7008, the differentiator module 144 retrieves anecdotal data 7014 associated with the user profile 7004. The anecdotal data 7014 includes various information describing attributes of the user profile 7004, such as user behaviors, user preferences, user system settings, and so forth. In at least one implementation, the anecdotal data 7014 describes previous user interactions with data sets, such as query terms entered by a user, data sorting behaviors, user feedback regarding query results, and so forth. The anecdotal data 7014, for example, describes query strings and sets of query strings associated with the user profile 7004, such as observed by the personalized analytics module 106 and/or the search module 140 in response to user interactions to initiate queries. As another example, the anecdotal data 7014 identifies ways in which a user has previously sorted data sets, such as data fields, data values, data types, and so forth, used to sort data sets. Thus, the anecdotal data 7014 is usable to infer various user preferences pertaining to queries and output of query results.

The differentiator module 144 utilizes the anecdotal data 7014 to execute a correlation action 7016 on the record set 7008 and to correlate a second attribute 7018 of the record set 7008 to the anecdotal data 7014. In at least one implementation, the second attribute 7018 represents a contextual qualifier for the first attribute 7010 that correlates to the anecdotal data 7014. The second attribute 7018, for example, represents a data field that attributes a particular quality to the first attribute 7010, such as by describing an environmental context for the first attribute 7010 (e.g., a geographical qualifier), an instance type for the first attribute 7010, an entity name for the first attribute 7010, and so forth.

Further, the correlation action 7016 includes correlating the anecdotal data 7014 to the second attribute 7018 in different ways. For instance, terminology from the anecdotal data 7014 is used to search the record set 7008 to identify matching data categories, e.g., data fields. A matching data category, for example, represents a data category with a type that is expressly identified in the anecdotal data 7014 and/or that is analogous to a data type identified in the anecdotal data 7014.

Further to the system 7000, the differentiator module 144 determines that the record set 7008 includes data records 7006 with differing values 7020 for the second attribute 7018. Accordingly, the differentiator module 144 generates record subsets 7022 based on the differing values 7020. The data records 7006 in each record subset 7022, for instance, include a common value the first attribute 7010 but values for the second attribute 7018 differ between different record subsets 7022. Different ways for generating record subsets based on different attribute values are detailed throughout. Accordingly, the record subsets 7022 can be used to generate a query result for output, such as described above.

Figure 71:
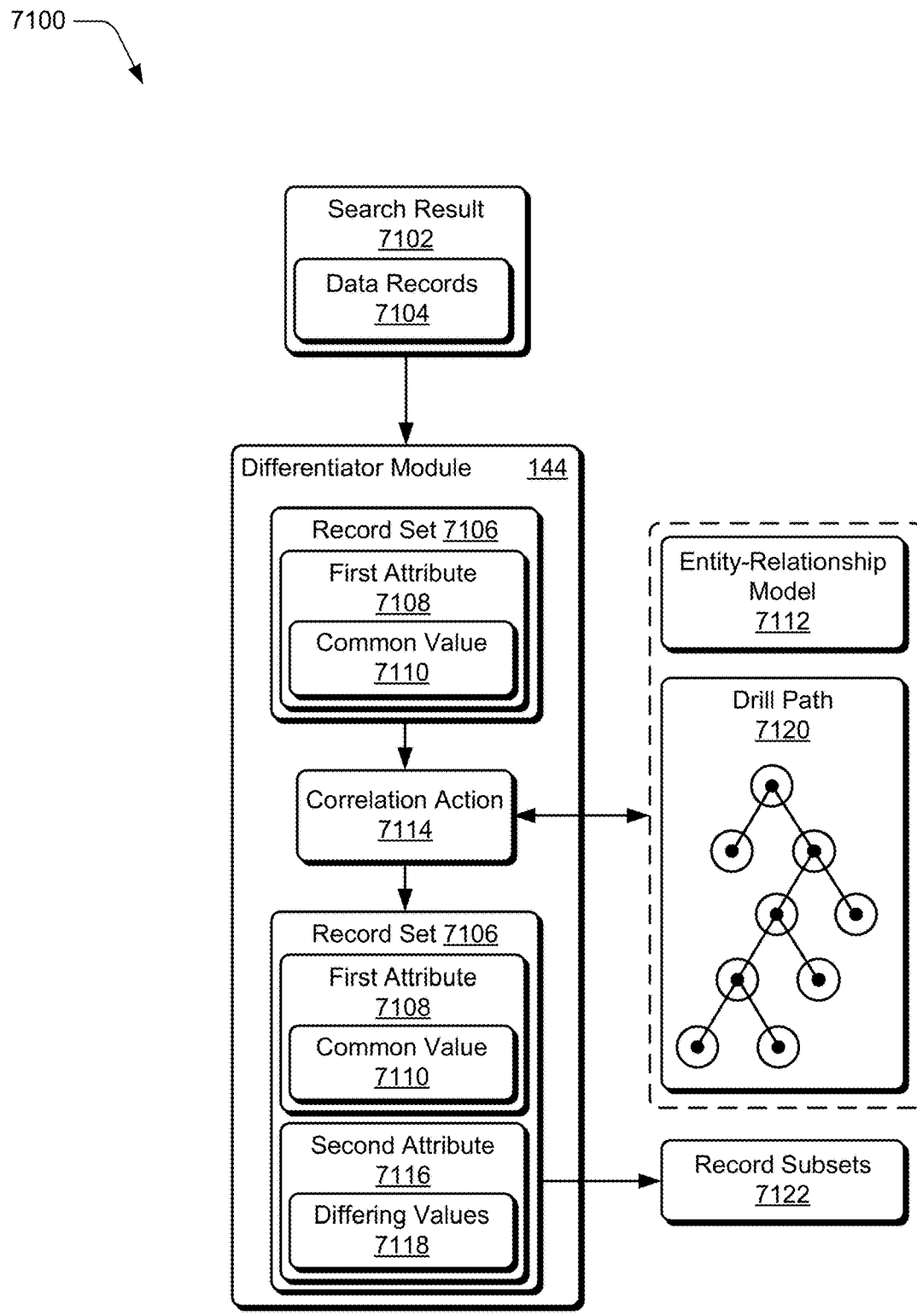
FIG. 71 depicts a system for utilizing an entity-relationship model for identifying a contextual attribute for differentiating query results in accordance with one or more implementations.

FIG. 71 depicts a system 7100 for utilizing an entity-relationship model for identifying a contextual attribute for differentiating query results. The system 7100, for example, can be implemented in conjunction with the systems described above. In the system 7100, and based on an input query, a search result 7102 that includes data records 7104 is received by the differentiator module 144. The differentiator module 144 processes the data records 7104 to identify a record set 7106 that represent different instances of the data records 7104 that share a common first attribute 7108 with a common value 7110 for the first attribute 7108.

To enable differentiation of the record set 7106 the differentiator module 144 accesses an entity-relationship model 7112. In at least one implementation the entity-relationship model 7112 is generated and managed by the ER model generation module 1204 to identify relationships between different data types, such as relationships between different data fields. As discussed above with reference to the ER model generation module 1204, the entity-relationship model 7112 utilizes a schema to describe different data relationships such as by defining dependencies between entities such as organization entities (e.g., businesses, government entities, educational entities, public service entities, etc.), objects (e.g., products), events, and so forth. Other example attributes that apply to the entity-relationship model 7112 are discussed above with reference to the curated relational data model database 1202.

The differentiator module 144 executes a correlation action 7114 by traversing the entity-relationship model 7112 using a data type for the first attribute 7108 to identify a second attribute 7116 with a data type that is related to the data type for the first attribute 7108. The entity-relationship model 7112, for example, indicates that the data type for the first attribute 7108 is linked to the data type for the second attribute 7116, e.g., that a dependency relationship exists between the data types. Generally, the relationship is based on a defined relationship between the actual data types and/or a defined relationship between values for the first attribute 7108 and the second attribute 7116 in the record set 7106.

In at least one implementation, the correlation action 7114 includes traversing the attributes of the record set 7106 based on the entity-relationship model 7112 to identify different attributes with defined relationships to the first attribute 7108 and for individual identified attributes, comparing attribute values across data records that share the identified attribute. For instance, a set of data records 7104 from the record set 7106 that share a common related attribute as well as a common value for the attribute is ignorable as part of the correlation action 7114 since the set of data records 7104 likely cannot be further differentiated based on the common related attribute since they share the same value for the attribute. However, a different set of data records 7104 that share a different common related attribute as well as differing values for the different attribute are usable for further differentiation of the record set 7106, e.g., the second attribute 7116. For instance, based on the correlation action 7114, the differentiator module 144 determines that the second attribute 7116 is related by the entity-relationship model 7112 to the first attribute 7108 and that some data records of the record set 7106 have different values 7118 for the second attribute 7116.

Additionally or alternatively to utilizing the entity-relationship model 7112, the correlation action 7114 utilizes a drill path 7120 for identifying the second attribute 7116. Generally, the drill path 7120 includes data describing a relationship between the first attribute 7108 and multiple other attributes of the record set 7106. In at least one implementation, the drill path 7120 is represented via linked data nodes that can be traversed to discover data instances and relationships between data. The data nodes, for instance, represent different attributes of the record set 7106 that are related in different ways, such as hierarchically. The drill path 7120 is traversable in various ways, such as via a drill-up path and/or a drill-down path. A drill-up path, for instance, corresponds to a higher-level perspective of subject matter pertaining to attributes of the record set 7106, such as to provide high-level contextual information about subject matter pertaining to attributes. A drill-down path corresponds to more granular and/or detailed information about attributes of the record set 7106, such as specific points in time, location, demographics, a breakdown of a particular attribute associated with an entity, such as a geography-based breakdown, etc. Thus, the first attribute 7108 can be represented as a node on the drill path 7120 and the correlation action 7114 can include traversing the drill path 7120 to identify related attributes and for each attribute encountered, comparing attribute values for the attribute to identify the second attribute 7116. In at least one implementation, the drill path 7120 is implemented as part of the entity-relationship model 7112.

Further to the system 7100, the differentiator module 144 generates record subsets 7122 based on the differing values 7118. The data records 7104 in each record subset 7122, for instance, include a common value for the first attribute 7108 but values for the second attribute 7116 differ between different record subsets 7122. Different ways for generating record subsets based on different attribute values are detailed throughout. Accordingly, the record subsets 7122 can be used to generate a query result for output, such as described above.

Figure 72:
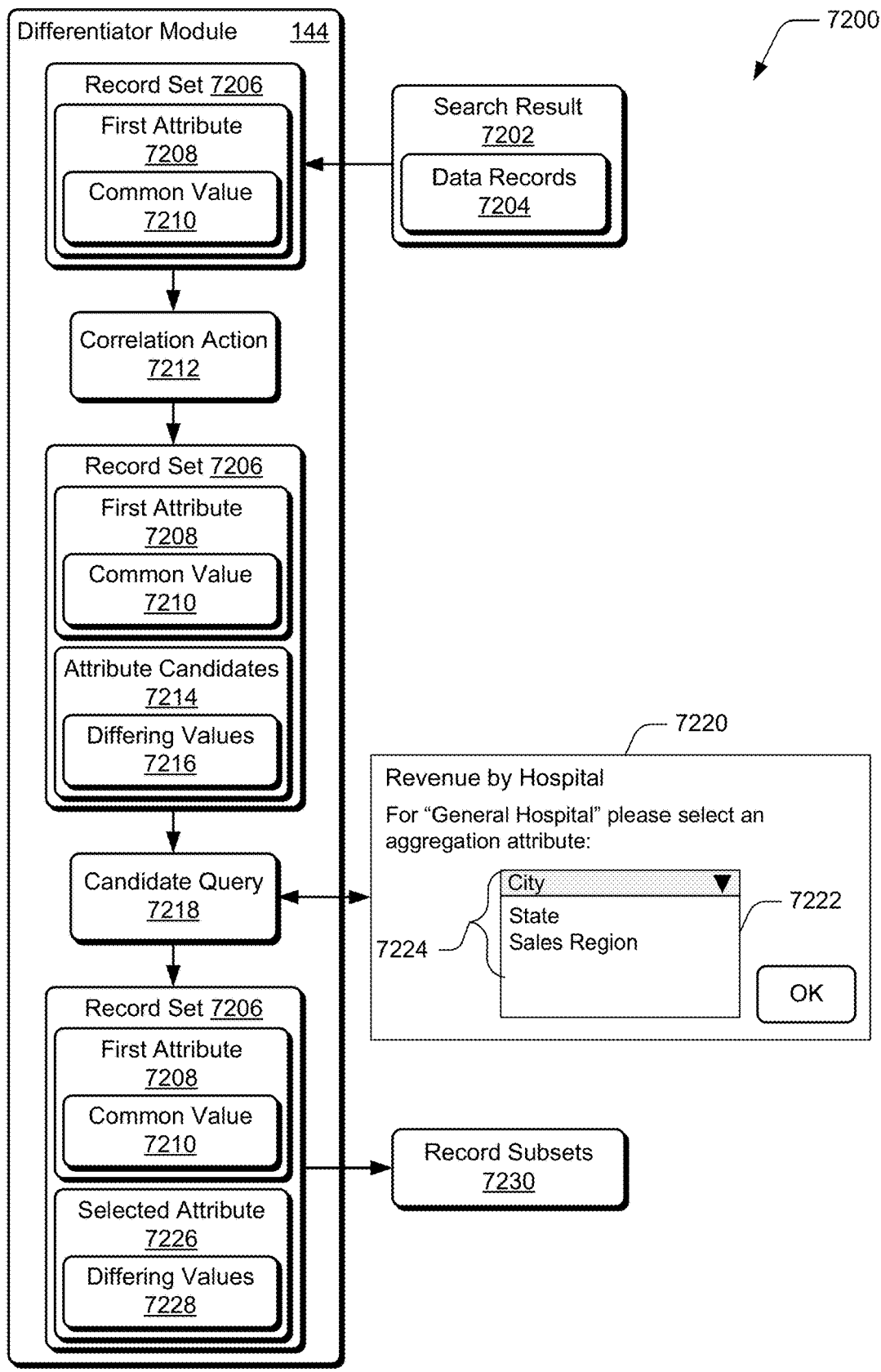
FIG. 72 depicts a system for utilizing user interaction for identifying a contextual attribute for differentiating query results in accordance with one or more implementations.

FIG. 72 depicts a system 7200 for utilizing user interaction for identifying a contextual attribute for differentiating query results. The system 7200, for example, can be implemented in conjunction with the systems described above. In the system 7200, and based on an input query, a search result 7202 that includes data records 7204 is received by the differentiator module 144. The differentiator module 144 processes the data records 7204 to identify a record set 7206 that represent different instances of the data records 7204 that share a common first attribute 7208 with a common value 7210 for the first attribute 7208.

The differentiation module 144 then executes a correlation action 7212 to identify other attributes of the record set 7206 that correlate to the first attribute 7208, e.g., that represent contextual qualifiers for the first attribute 7208 and that having differing values for instances of the attributes. Generally, the correlation action 7212 is performable in various ways such as described above and below, including based on anecdotal data, an entity-relationship model, traversing a drill path, leveraging a machine learning model, a phased query approach, and so forth. Based on the correlation action 7212, the differentiator module 144 identifies multiple attribute candidates 7214 that each have differing values 7216. The attribute candidates 7214, for example, represent different attributes that each relate to the first attribute in some way, such as by representing different contextual qualifiers for the first attribute 7208.

To determine which of the attribute candidates 7214 to utilize for differentiating the record set 7206, the differentiator module 144 executes a candidate query 7218 to enable a user to select an attribute of the attribute candidates 7214. As part of the candidate query 7218 the differentiator module 144 causes a candidate graphical user interface (GUI) 7220 to be presented. The candidate GUI 7220, for instance, indicates that multiple aggregation attributes are available for generating data subsets from the record set 7206. In this particular example, the candidate GUI 7220 includes a candidate menu 7222 that is populated with selectable indicia 7224 that each identify a different attribute candidate 7214 that is usable to divide the record set into different subsets of data records, which include the attributes "City," "State," and "Sales Region."

Accordingly, a user selects a particular selectable indicia 7224 from the candidate menu 7222 to cause the differentiator module 144 to generate a selected attribute 7226 that corresponds to the selected attribute candidate 7214. The record set 7206 includes differing values 7228 for the selected attribute 7226 and thus the differentiator module 144 generates record subsets 7230 based on the differing values 7228. The data records 7204 in each record subset 7230, for instance, include a common value for the first attribute 7208 but values for the selected attribute 7226 differ between different record subsets 7230. Different ways for generating record subsets based on different attribute values are detailed throughout. Accordingly, the record subsets 7230 can be used to generate a query result for output, such as described throughout.

Figure 73:
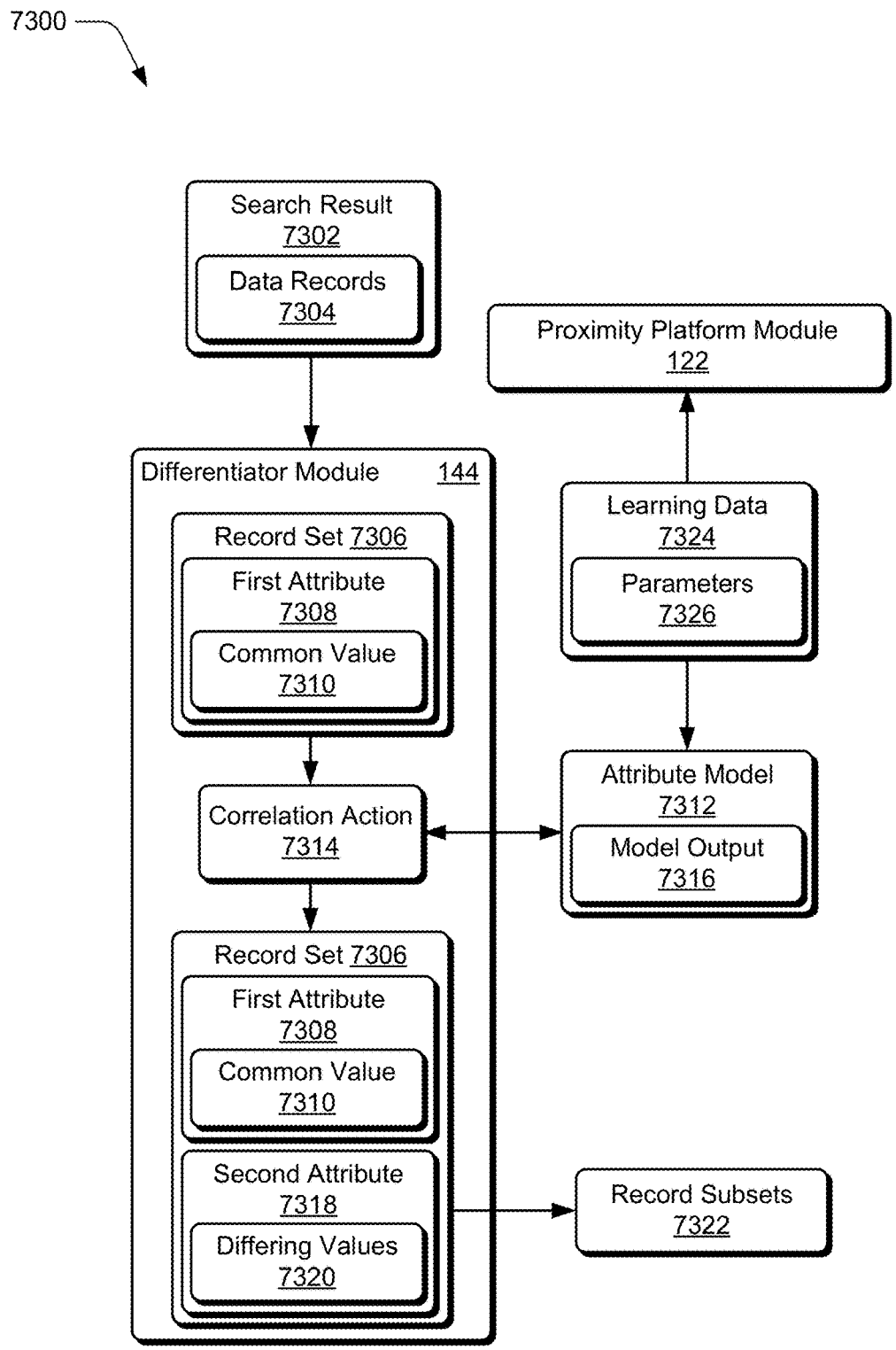
FIG. 73 depicts a system for utilizing a machine learning model for identifying a contextual attribute for differentiating query results in accordance with one or more implementations.

FIG. 73 depicts a system 7300 for utilizing a machine learning model for identifying a contextual attribute for differentiating query results. The system 7300, for example, can be implemented in conjunction with the systems described above. In the system 7300, and based on an input query, a search result 7302 that includes data records 7304 is received by the differentiator module 144. The differentiator module 144 processes the data records 7304 to identify a record set 7306 that represent different instances of the data records 7304 that share a common first attribute 7308 with a common value 7310 for the first attribute 7308.

To enable differentiation of the record set 7306 the differentiator module 144 accesses an attribute model 7312.

In at least one implementation the attribute model 7312 is generated and managed by the ER model generation module 1204 to enable relationships between data attributes to be predicted. The attribute model 7312, for example, is implemented as a machine learning algorithm and/or set of algorithms that are trained to predict attribute relationships for sets of data records. For instance, the attribute model 7312 is configured to predict dependencies and other relationships between data attributes, such as to predict attributes that are contextual qualifiers for other attributes. Example types and implementations of machine learning algorithms are described above. In at least one implementation, the attribute model 7312 is trained using training data generated from attribute relationships defined from a different set of data records and/or is trained using user-specific data, such as the anecdotal data 7014 for the user profile 7004. Generally, by training the attribute model 7312 to process the record set 7306 and extract attributes, the differentiator module 144 is able quickly identify pertinent attributes from the record set 7306, which lowers system latency time (e.g., of the server 102 and/or the computing device 104) and increases device performance, such as by increasing processing speed.

Accordingly, the differentiator module 144 executes a correlation action 7314 by inputting the record set 7306 and/or the first attribute 7308 into the attribute model 7312. The attribute model 7312 processes the record set 7306 and provides model output 7316. The differentiator module 144 then utilizes the model output 7316 to identify a second attribute 7318 that represents a contextual qualifier for the first attribute 7308. The model output 7316, for instance, identifies the second attribute 7318 as an attribute to be used for differentiating the record set 7306. Alternatively or additionally, the model output 7316 includes a set of attribute candidates that are predicted by the attribute model 7312 to be related to the first attribute 7308. In such an implementation, the differentiator module 144 processes the attribute candidates to determine which of the attribute candidates have differing values among the record set 7306. Accordingly, the differentiator module 144 determines that the second attribute 7318 is identified by the model output 7316 and that some data records of the record set 7306 have differing values 7320 for the second attribute 7318.

Further to the system 7100, the differentiator module 144 generates record subsets 7322 based on the differing values 7320. The data records 7304 in each record subset 7322, for instance, include a common value for the first attribute 7308 but values for the second attribute 7318 differ between different record subsets 7322. Different ways for generating record subsets based on different attribute values are detailed throughout. Accordingly, the record subsets 7322 can be used to generate a query result for output, such as described above.

Similarly to the discussion above such as with reference to FIGS. 15, 20A, 20B, algorithms that are utilized as part of identifying related attributes (e.g., the attribute model 7312) can be tuned and evolve to provide for more accurate and relevant output. Accordingly, as the differentiator module 144 applies and evolves the attribute model 7312 over time, the differentiator module 144 generates learning data 7324 that describes features of the attribute model 7312 as evolved over time. In at least one implementation, the learning data 7324 includes data that describes changes to the attribute model 7312 that are made based on user feedback, such as positive and/or negative feedback regarding query results that are presented to a user. The learning data 7324, for instance, includes model parameters 7326 that describe parameters of the respective models, such as weights used in an artificial neural network, hyper-parameter values, support vectors in a support vector machine, coefficients in a linear regression or logistic regression algorithm, an assumed distribution used in a statistical analysis (e.g., Gaussian distribution, binomial distribution, degenerate distribution, etc.), and so forth.

To enable the learning data 7324 to be utilized by others, the learning data 7324 is propagated to the proximity platform module 122. Prior to this, however, the aggregator module 144 and/or the search module 140 extracts personalized data from the learning data 7324, such as data that may provide visibility into values of the record subsets 7322. Accordingly, the proximity platform module 122 can distribute the learning data 7324 among other entities for use in tuning their algorithms without exposing sensitive data utilized by the aggregator module 144 as part of generating the record subsets 7322. Similarly, other entities can generate their own respective sets of learning data that are obtainable by the differentiator module 144 from the proximity platform module 122 for use in tuning and evolving the attribute model 7312.

Figure 74:
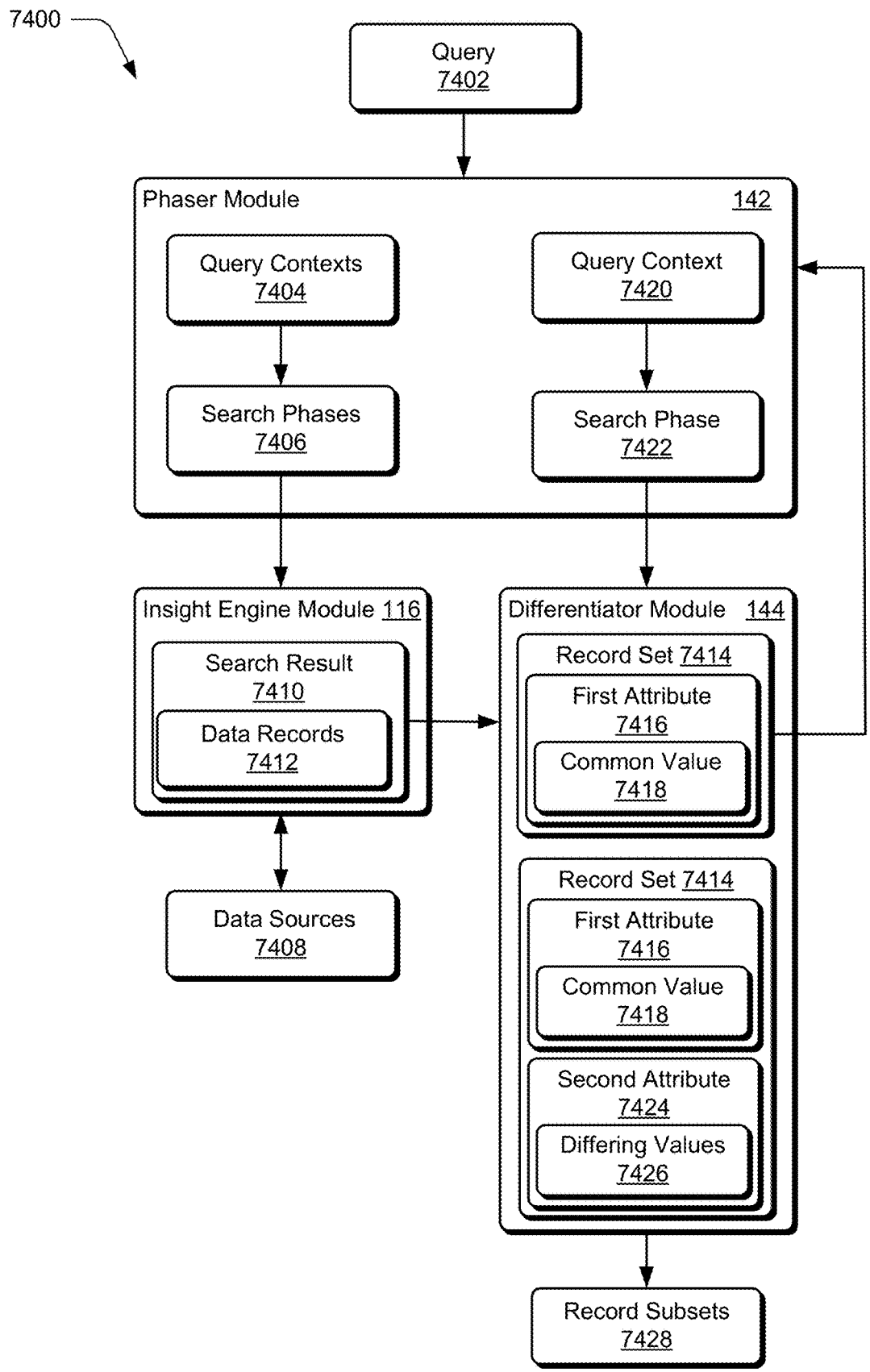
FIG. 74 depicts a system for utilizing phased searching for identifying a contextual attribute for differentiating query results in accordance with one or more implementations.

FIG. 74 depicts a system 7400 for utilizing phased searching for identifying a contextual attribute for differentiating query results. The system 7400, for example, can be implemented in conjunction with the systems described above. In the system 7400, the phaser module 142 receives a query 7402 and processes the query to determine query contexts 7404 for the query 7402. Generally, a query context represents search criteria for performing a query, such as a type of data associated with the query, a user intent for the query, how data is to be sorted, filtered, and/or grouped, a limit on a number of data records to be searched and/or retrieved, and so forth. Accordingly, based on the query contexts 7404, the phaser module 142 generates search phases 7406. Generally, a search phase represents an individual subquery that is individually executable to generate subquery result that contributes along with other phase results to generating an overall query result. Example instances of and ways for determining query contexts and search phases are detailed above.

The insight engine module 116 receives the search phases 7406 and executes the search phases 7406 on data sources 7408 to generate a search result 7410 that includes data records 7412. In at least one implementation, a particular search phase 7406 is executed on output of a different search phase 7406. The differentiator module 144 processes the data records 7412 to identify a record set 7414 that represents different instances of the data records 7412 that share a common first attribute 7416 with a common value 7418 for the first attribute 7416. The differentiator module 144 submits the first attribute 7416 to the phaser module 142, which determines a query context 7420 for the first attribute 7416 and generates a search phase 7422 based on the query context 7420. Accordingly, the differentiator module 144 receives the search phase 7422 and executes the search phase 7422 on the record set 7414 to identify a second attribute 7424 that represents a search result from of the search phase 7422. The differentiator module 144, for example, searches attributes of the record set 7414 based on the search phase 7422 to identify the second attribute 7424. Generally, the search phase 7422 can be implemented as a single search phase or a set of search phases that are executed on the record set 7414.

In at least one implementation executing the search phase 7422 identifies multiple different attributes from the record set 7414. In such a scenario the differentiator module 144 determines which instances of the identified attributes have differing values between respective instances and utilizes the determined attributes for the second attribute 7424. The differentiator module 144 generates record subsets 7428 based on the differing values 7426. The data records 7412 in each record subset 7428, for instance, include a common value for the first attribute 7416 but values for the second attribute 7424 differ between different record subsets 7428. Different ways for generating record subsets based on different attribute values are detailed throughout. Accordingly, the record subsets 7428 can be used to generate a query result for output, such as described above.

Now consider a number of different methods that can be performed further to implementations discussed herein, such as for performing aspects of differentiation of search results for accurate query output. The methods can be performed by any suitable combination of hardware, software, and/or firmware. In at least some embodiments, aspects of the method can be implemented by one or more suitably configured hardware components and/or software modules, such as various hardware and/or software modules associated with servers 102 and/or computing device 104 of FIG. 1, such as various modules included in personalized analytics module 106 and/or search module 140. While the methods illustrate steps in a particular order, it is to be appreciated that any specific order or hierarchy of the steps described may be implemented. For instance, other approaches may be used that rearrange the ordering of these steps. Thus, the order of the steps described here may be rearranged, and the illustrated ordering of these steps is not intended to be limiting.

Figure 75:
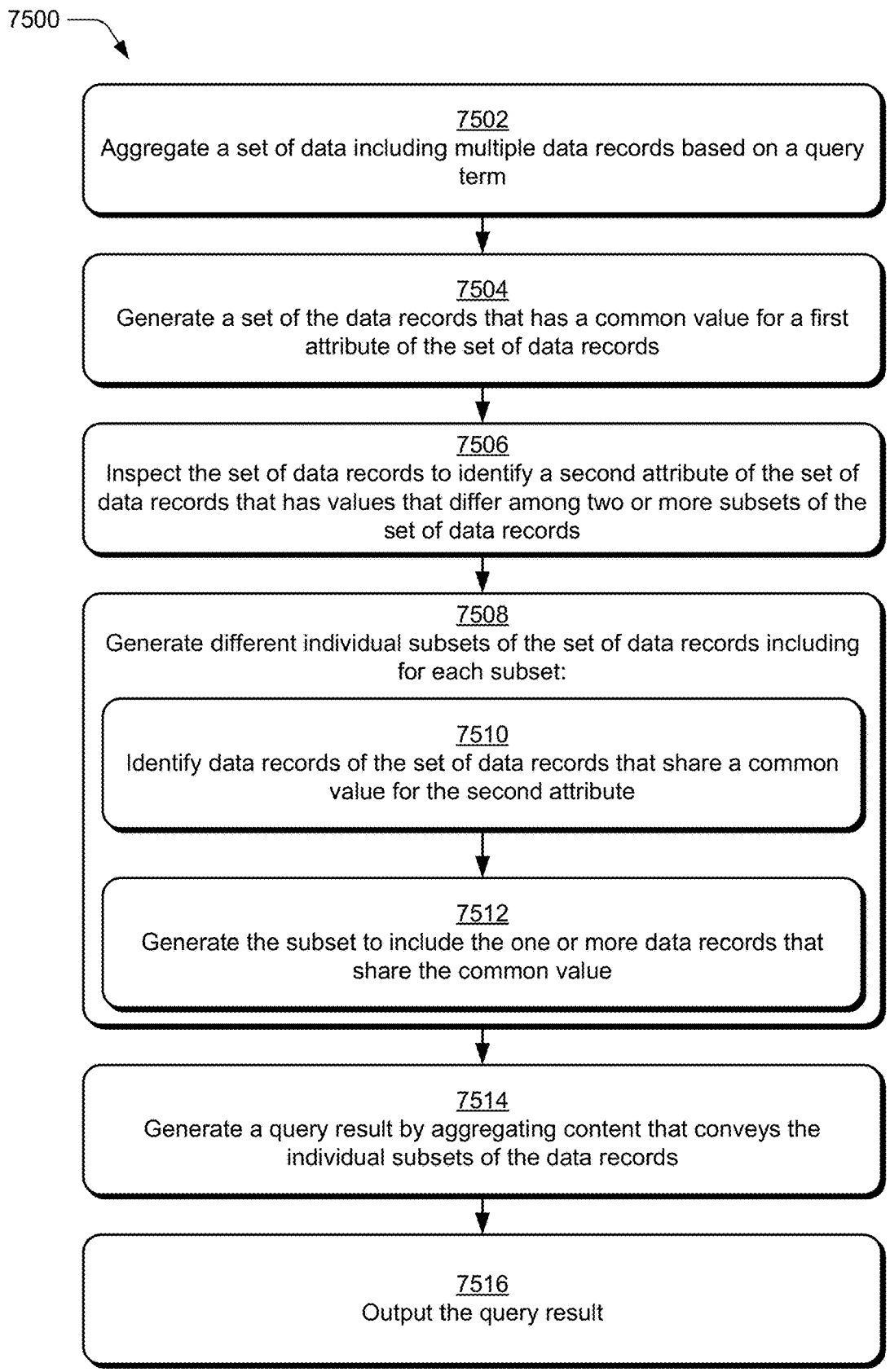
FIG. 75 illustrates an example method for differentiation of search results for accurate query output in accordance with one or more implementations.

FIG. 75 illustrates an example method 7500 for differentiation of search results for accurate query output in accordance with one or more implementations. At 7502 a set of data including multiple data records is aggregated based on a query term. The insight engine module 116, for instance, executes a query based on user input of a query string (e.g., an NL query) and aggregates a set of data based on the query including multiple data records that each correlate to the query term. Various implementations concerning generating and executing queries are detailed above.

At 7504 a set of the data records is identified that has a common value for a first attribute of the set of data records. The differentiator module 144, for example, iterates over the set of data records by comparing values for different data attributes (e.g., data fields) to identify a set of data records that share a common value for a particular data attribute. At 7506 the set of data records is inspected to identify a second attribute of the set of data records that represents a contextual qualifier for the first attribute and that has values that differ among two or more subsets of the set of data records. For instance, the differentiator module 144 inspects other attributes of the data records to identify an attribute that relates to the first attribute and that has values that differ among some of the data records of the set of data records. In at least one implementation, this is performed by executing a correlation action, examples of which are detailed above.

At 7508 different individual subsets of the set of data records are generated. The differentiator module 144, for example, generates the subsets of data records by executing actions including to, for each subset: At 7510 data records of the set of data records are identified that share a common value for the second attribute. For instance, the differentiator module 144 iterates over the set of data records to identify data records that share a common value for the second attribute. At 7512 the subset is generated to include the one or more data records that share the common value. The differentiator module 144, for example, generates each subset by aggregating data records that share a common value for the second attribute into the subset of data records.

At 7514 a query result is generated by aggregating content that conveys the individual subsets of the data records. The story narrator module 118, for example, aggregates content that conveys the subsets of data records from a content source and generates a script that specifies parameters for outputting the content. At 7516 the query result is output. For instance, the animator module 120 outputs the aggregated content based on parameters specified in the script.

Figure 76:
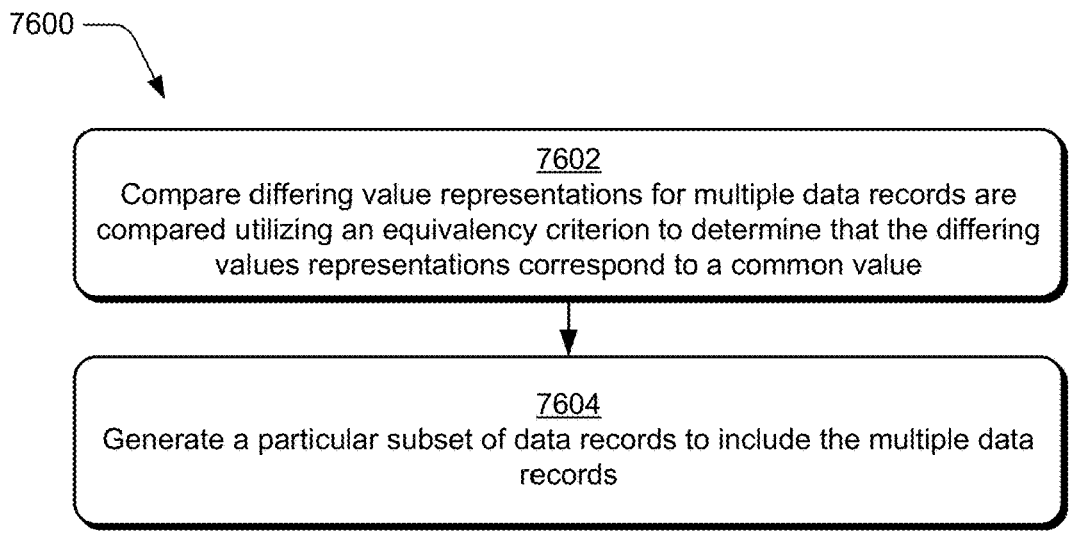
FIG. 76 illustrates an example method for determining whether representations of attribute values are equivalent in accordance with one or more implementations.

FIG. 76 illustrates an example method 7600 for determining whether representations of attribute values are equivalent in accordance with one or more implementations. At 7602 differing value representations of a second attribute for multiple data records are compared utilizing an equivalency criterion to determine that the differing values representations correspond to a common value. For instance, as part of determining whether data records share a common value for a second attribute (e.g., step 7510 of the method 7500), the differentiator module 144 utilizes a set of equivalency criteria in comparing value representations to one another. Generally, a value representation refers to how a value is characterized by the system, such as a character string (e.g., text and/or numbers) used to identify the value. For instance, a state value representation for California can be represented with different value representations such as "California," "CA," "Calif," and so forth. Thus, equivalency criteria are generated to enable different value representations that refer to an equivalent value to be identified as equivalent values for purposes of comparing attribute values. The equivalency criteria, for instance, map a set of differing value representations to a common value. Accordingly, for a particular set of differing value representations for an instance of an attribute across multiple data records, the differentiator module 144 compares the differing value representations using an equivalency criterion to determine that the differing values representations correspond to a common value.

At 7604 a particular subset of data records is generated to include the multiple data records. The differentiator module 144, for example, groups the data records into a subset of data records for use in generating a query response.

Figure 77:
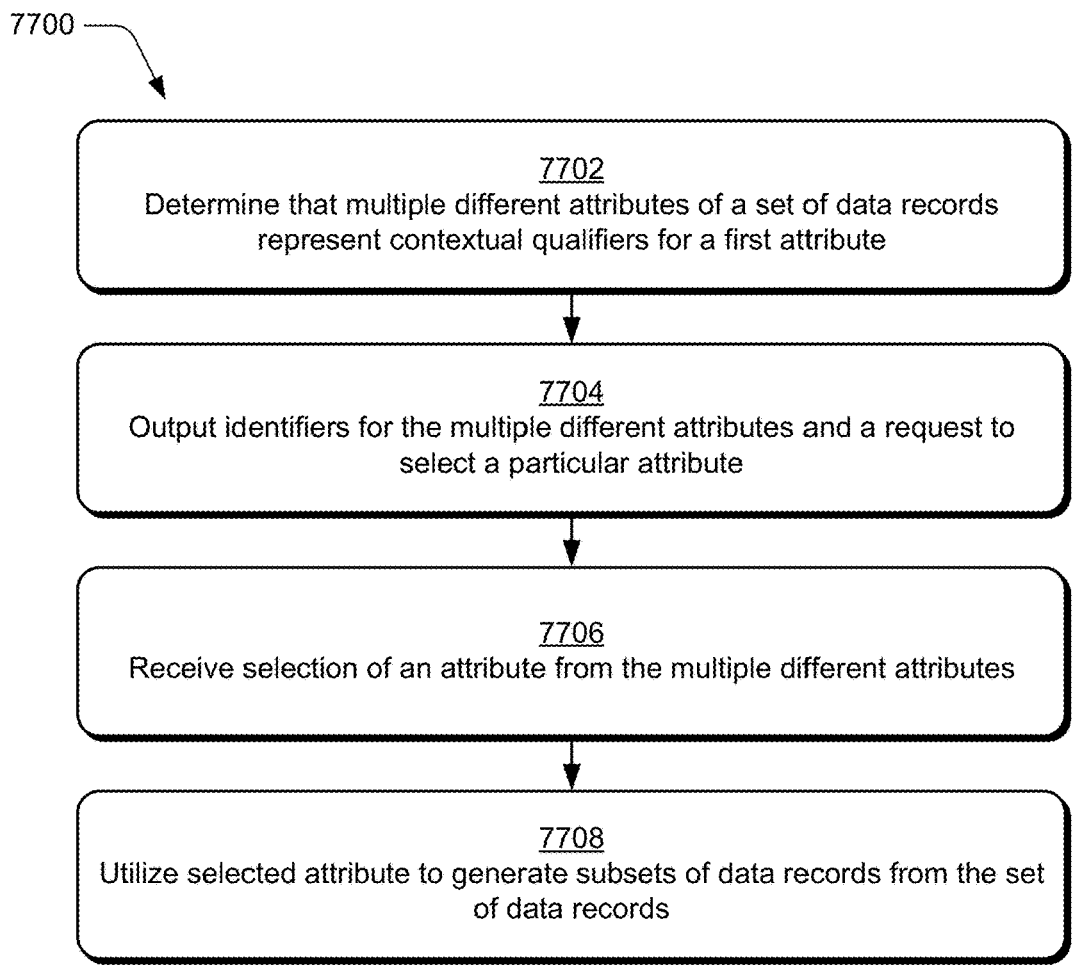
FIG. 77 illustrates an example method for enabling user selection of an attribute for differentiating data records in accordance with one or more implementations.

FIG. 77 illustrates an example method 7700 for enabling user selection of an attribute for differentiating data records in accordance with one or more implementations. The method 7700, for instance, describes an example way for implementing the steps 7506, 7508 of the method 7500. At 7702 multiple different attributes of a set of data records are determined to represent contextual qualifiers for the first attribute. The differentiator module 144, for example, determines that multiple attributes of a set of data records are contextual qualifier for a first attribute of the data records. Further, the differentiator module 144 determines that each attribute of the multiple attribute has values that differ among the data records.

At 7704 identifiers for the multiple different attributes and a request to select a particular attribute from the multiple different attributes are output. For instance, the differentiator module 144 outputs a request to select an attribute from a set of attributes for use in differentiating the set of data records. Generally, the identifiers and the request can be output in different ways, such as visually and/or audibly. One such example is described above with reference to the candidate GUI 7220.

At 7706 a selection of an attribute from the multiple different attributes is received. A user, for instance, selects an attribute, such as via input to the candidate GUI 7220, voice input, gesture input, and so forth. At 7708 the selected attribute is utilized to generate subsets of data records from the set of data records. The differentiator module 144, for example, utilizes the selected attribute to differentiate a set of data records into different subsets of data records, e.g., as the "second attribute" discussed herein.

Figure 78:
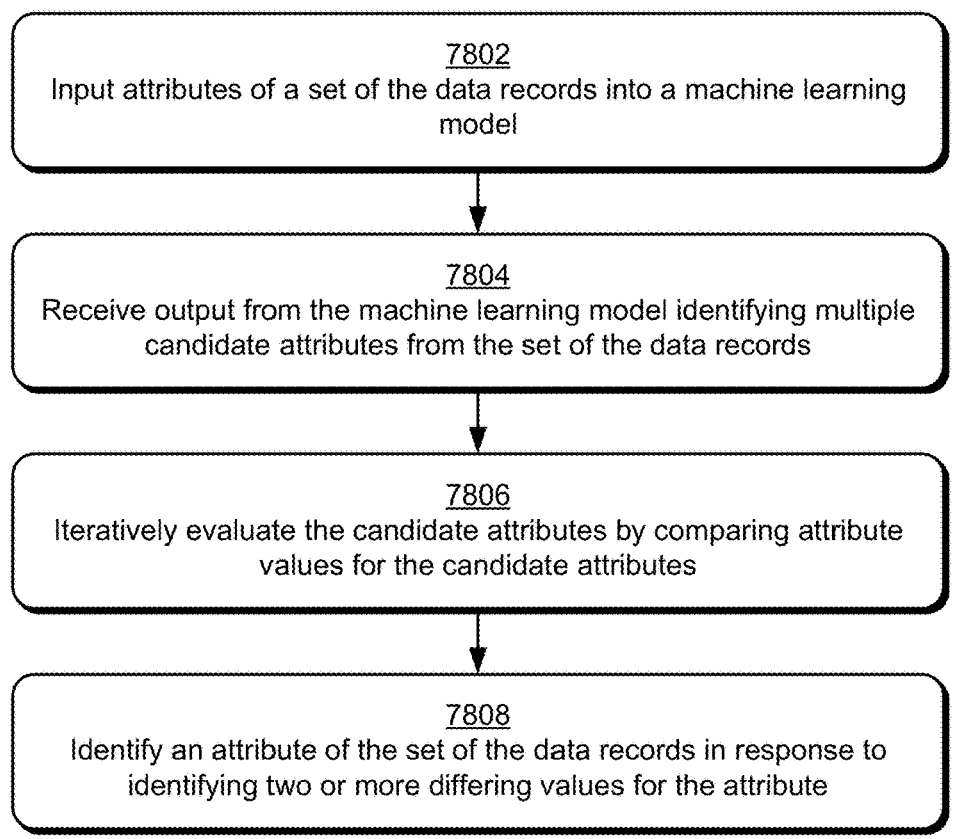
FIG. 78 illustrates an example method for utilizing a machine learning model for differentiating data records in accordance with one or more implementations.

FIG. 78 illustrates an example method 7800 for utilizing a machine learning model for differentiating data records in accordance with one or more implementations. At 7802 attributes of a set of the data records are input into a machine learning model. The differentiator module 144, for instance, inputs a set of data records and/or attributes of the set of data records into a machine learning model, such as the attribute model 7312 described above. In at least one implementation, the attribute model 7312 is trained using training data generated from attribute relationships defined from a different set of data records.

At 7804 output from the machine learning model identifying multiple candidate attributes from the set of the data records is received. The differentiator module 144, for example, receives output from the attribute model 7312 identifying different candidate attributes for use in differentiating a set of data records. At 7806 the candidate attributes are iteratively evaluated by comparing attribute values for the candidate attributes. For instance, the differentiator module 144 evaluates each of the candidate attributes across the set of data records, such as by comparing attribute values for each of the candidate attributes.

At 7808 an attribute of the set of the data records is identified in response to identifying two or more differing values for the attribute. The differentiator module 144. for example, identifies that a particular attribute being evaluated has differing values across the set of data records. Thus, the attribute is utilized as part of differentiating the set of data records into subsets of data records, such as detailed above.

Figure 79:
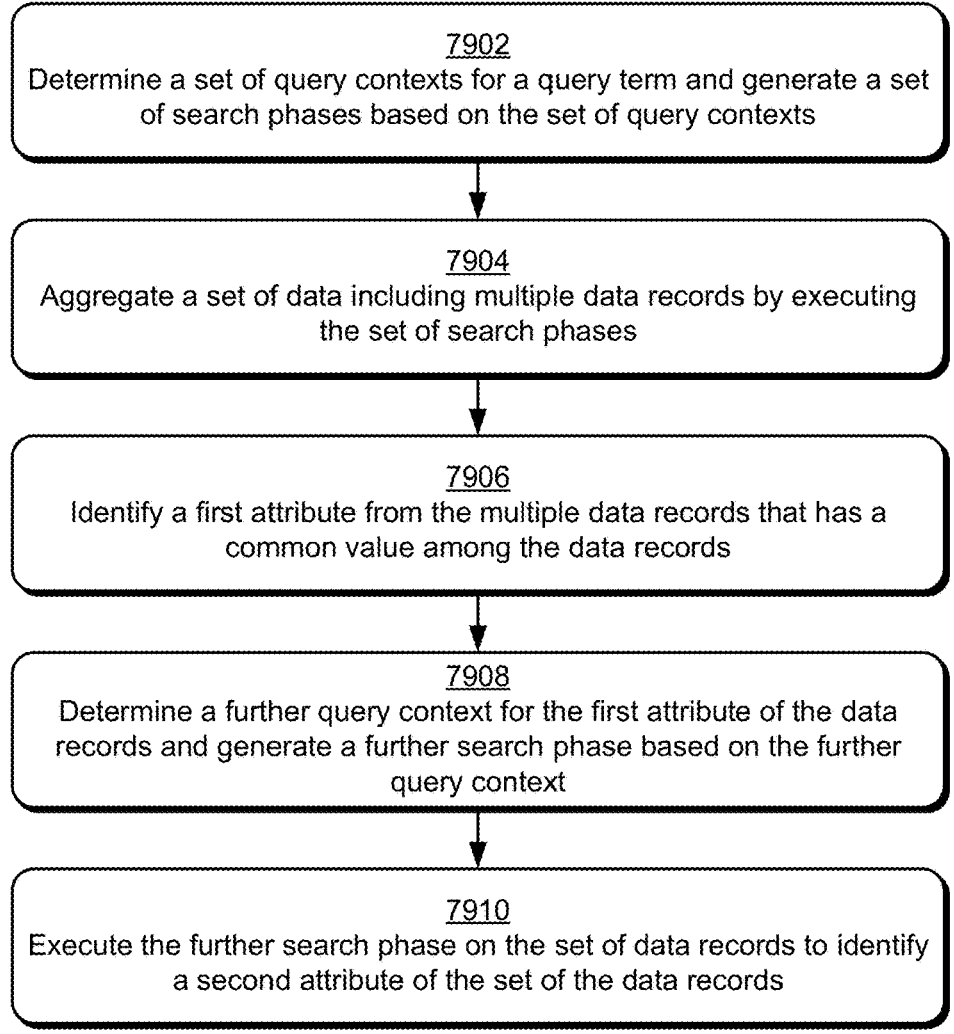
FIG. 79 illustrates an example method for utilizing search phases for differentiating data records in accordance with one or more implementations.

FIG. 79 illustrates an example method 7900 for utilizing search phases for differentiating data records in accordance with one or more implementations. At 7902 a set of query contexts are determined for a query term and a set of search phases are generated based on the set of query contexts. The phaser module 142, for instance, receives a query (e.g., an NL query) and generates multiple search phases based on the query. Example ways for generating search phases are detailed above.

At 7904 a set of data including multiple data records is aggregated by executing the set of search phases. For example, the insight engine module 116 executes the search phases on a data source and/or output from a search phase to generate a search result that includes the data records. At 7906 a first attribute from the multiple data records is identified that has a common value among the data records. The differentiator module 144, for instance, evaluates the data records to identify an attribute that exhibits common values among the data records.

At 7908 a further query context is determined for the first attribute of the data records and a further search phase is generated based on the further query context. The differentiator module 144, for instance, submits a particular attribute of the data records to the phaser module 142 and the phaser module 142 generates a further query context based on the particular attribute. Generally, the further query context can be based on various aspects of the particular attribute, such as a data type, a value type, a dependency relationship, anecdotal data related to the particular attribute, and so forth.

Accordingly, the phaser module 142 generates a further search phase based on the query context.

At 7910 the further search phase is executed on the set of data records to identify a second attribute of the set of the data records. The aggregator module 144 and/or the insight engine module 116, for instance, executes the further search phase on the set of data records to identify the second attribute. In at least one implementation, executing the further search phase includes applying query parameters indicated by the further search phase to attributes of the set of data records to identify an attribute or set of attributes that satisfy the query parameters. Thus, the second attribute is usable to perform differentiation of the data records into different subsets of data records, such as detailed above.

Figure 80:
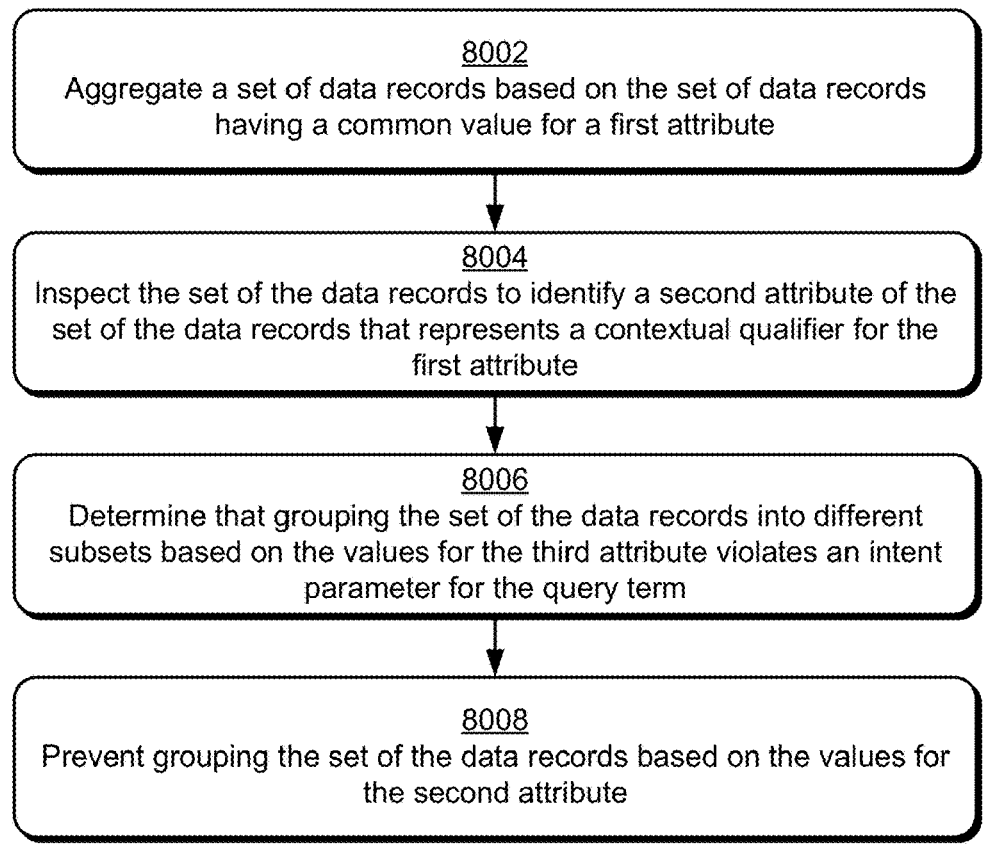
FIG. 80 illustrates an example method for utilizing a query intent parameter to prevent differentiating data records based on a particular attribute in accordance with one or more implementations.

FIG. 80 illustrates an example method 8000 for utilizing a query intent parameter to prevent differentiating data records based on a particular attribute in accordance with one or more implementations. At 8002 a set of data records is aggregated based on the set of data records having a common value for a first attribute. Ways for aggregating data records with a common value for an attribute are detailed above. At 8004 the set of the data records is inspected to identify a second attribute of the set of the data records that represents a contextual qualifier for the first attribute. The differentiator module 144, for instance, searches the set of data records an identifies the second attribute as a contextual qualifier for the first attribute and having differing values among the data records.

At 8006 grouping the set of the data records into different subsets based on the values for the third attribute is determined to violate an intent parameter for the query term. Generally, an intent parameter is derived from the query, such as based on a type of data requested by the query. Thus, if grouping a set of data records would result in a query result that does not satisfy the intent of the query, the grouping violates an intent parameters. Examples on determining intent are discussed above such as with reference to the system 5600.

At 8008 grouping the set of the data records based on the values for the second attribute is prevented. The differentiator module 144, for example, does not group the set of the data records into different subsets based on the values for the third attribute in response to determining that the grouping violates the query intent parameter for the query term.

Having described implementations for differentiation of search results for accurate query output, consider now example devices in which can be used for various implementations.

Example Devices

Figure 81:
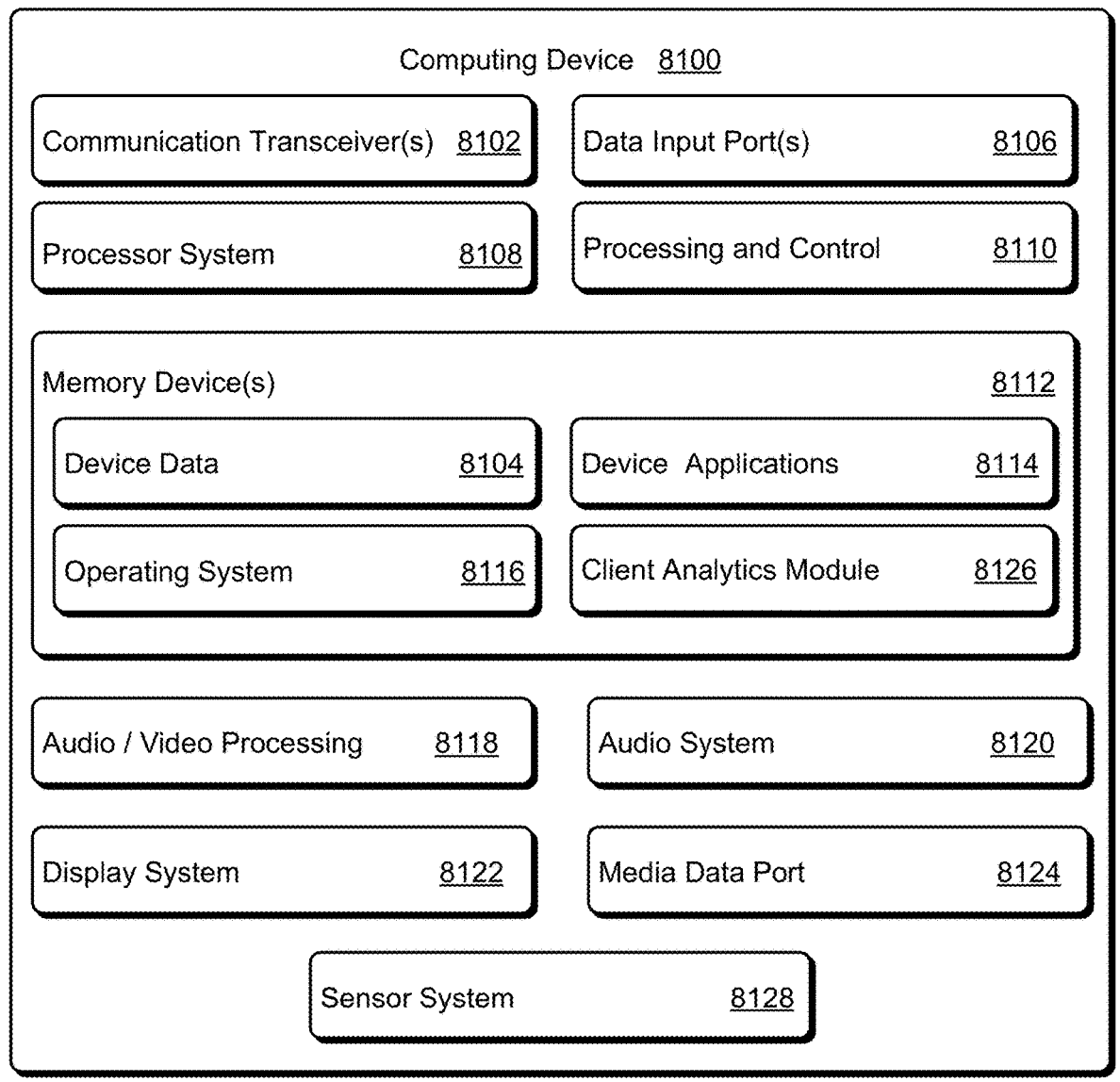
FIG. 81 is an illustration of an example computing device in accordance with one or more implementations.
Figure 82:
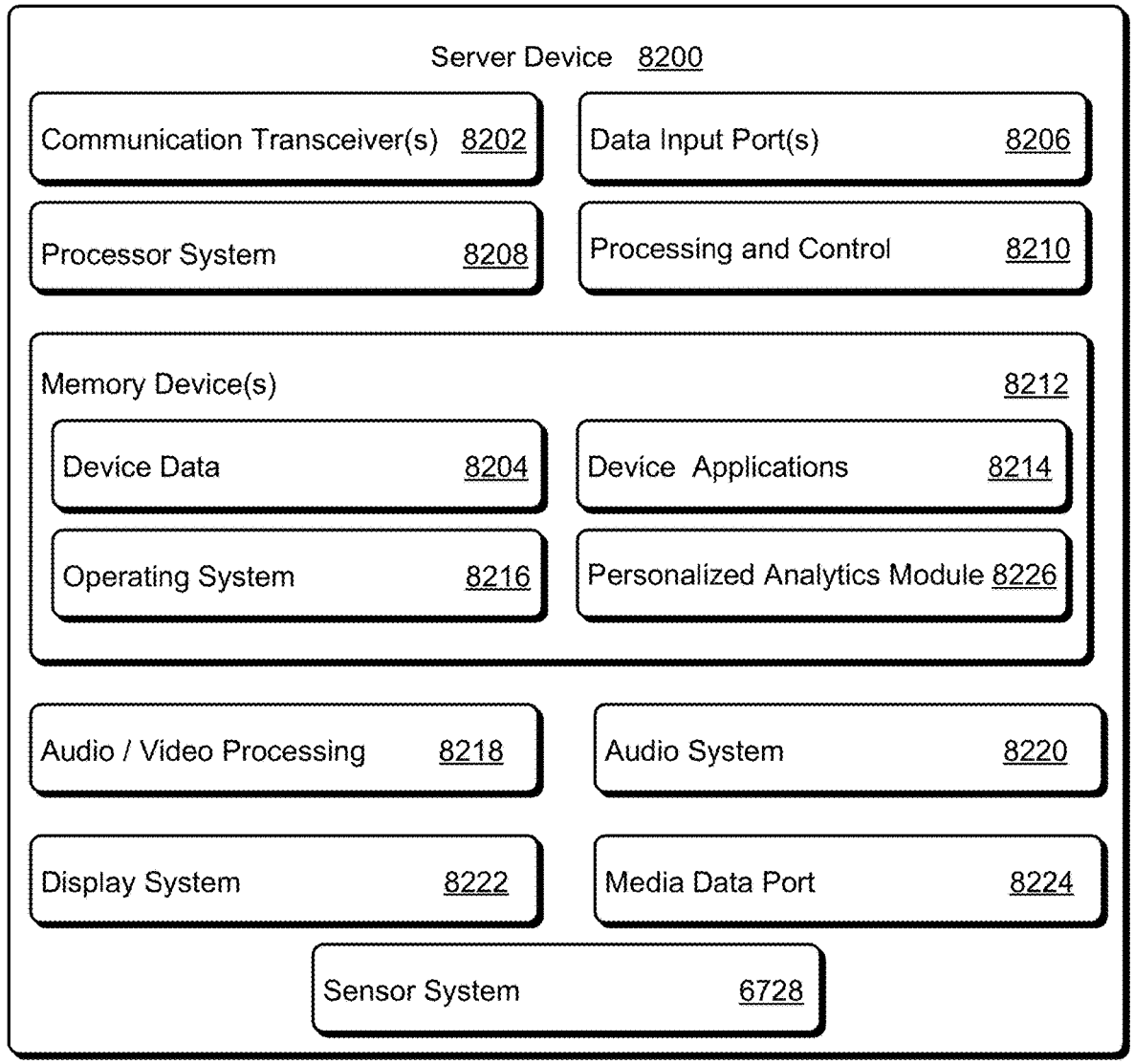
FIG. 82 is an illustration of an example server device in accordance with one or more implementations.

FIG. 81 illustrates various components of an example computing device 8100, such as computing device 104 of FIG. 1, while FIG. 81 illustrates various components of an example server device 8200, such as one of servers 102 of FIG. 1. Accordingly, computing device 8100 and/or server device 8200 can be utilized to implement various aspects of context-based testing as further described herein. In some implementations, computing device 8100 and server device 8200 have at least some similar components. Accordingly, for the purposes of brevity, FIGS. 81 and 82 will be described together. Similar components associated with FIG. 81 will be identified as components having a naming convention of "8/XX", and components associated with FIG. 82 will be identified as components having a naming convention of "82XX". Conversely, components distinct to each device will be described separately and after the similar components.

Computing device 8100/server device 8200 includes communication transceivers 8102/communication transceivers 8202 that enable wired or wireless communication of device data 8104/device data 8204, such as received data and transmitted data. While referred to as a transceiver, it is to be appreciated that communication transceivers 8102/communication transceivers 8202 can additionally include separate transmit antennas and receive antennas without departing from the scope of the claimed subject matter. Example communication transceivers include Wireless Personal Area Network (WPAN) radios compliant with various Institute of Electrical and Electronics Engineers (IEEE) 802.15 (Bluetooth™) standards, Wireless Local Area Network (WLAN) radios compliant with any of the various IEEE 802.11 (WiFi™) standards, Wireless Wide Area Network (WWAN) radios for cellular telephony (3GPP-compliant), wireless metropolitan area network radios compliant with various IEEE 802.16 (WiMAX™) standards, and wired Local Area Network (LAN) Ethernet transceivers.

Computing device 8100/server device 8200 may also include one or more data input ports 8106/data input ports 8206 via which any type of data, media content, and inputs can be received, such as user-selectable inputs, messages, music, television content, recorded video content, and any other type of audio, video, or image data received from any content or data source. Data input ports 8106/data input ports 8206 may include Universal Serial Bus (USB) ports, coaxial-cable ports, and other serial or parallel connectors (including internal connectors) for flash memory, Digital Versatile Discs (DVDs), Compact Disks (CDs), and the like. These data-input ports may be used to couple the electronic device to components, peripherals, or accessories such as keyboards, microphones, or cameras.

Computing device 8100/server device 8200 of this example includes processor system 8108/processor system 8208 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively, or in addition, the electronic device can be implemented with any one or combination of software, hardware, firmware, or fixed-logic circuitry that is implemented in connection with processing and control circuits, which are generally identified as processing and control 8110/processing and control 8210. Although not shown, computing device 8100/server device 8200 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Computing device 8100/server device 8200 also includes one or more memory devices 8112/memory devices 8212 that enable data storage, examples of which include random access memory (RAM), non-volatile memory (e.g., read-only memory (ROM), flash memory, EPROM, EEPROM, etc.), and a disk storage device. Memory devices 8112/memory devices 8212 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 8112/memory devices 8212 provide data storage mechanisms to store the device data 8104/device data 8204, other types of information or data, and/or various device applications 8114/device applications 8214 (e.g., software applications). For example, operating system 8116/operating system 8216 can be maintained as software instructions within memory devices 8112/memory devices 8212 and executed by processor system 8108/processor system 8208.

Computing device 8100/server device 8200 optionally includes audio and video processing system 8118/audio and video processing system 8218 that processes audio data and passes through the audio and video data to optional audio system 8120/audio system 8220. Audio system 8120/audio system 8220 and optional display system 8122/display system 8222 may include any modules that process, display, or otherwise render audio, video, display, or image data. Display data and audio signals can be communicated to an audio component and to a display component via a radio-frequency link, S-video link, HDMI, composite-video link, component-video link, digital video interface, analog-audio connection, or other similar communication link, such as optional media data port 8124/media data port 8224. In some implementations, optional audio system 8120/audio system 8220 and optional display system 8122/display system 8222 are external components to computing device 8100/server device 8200. Alternatively, or additionally, optional audio system 8120/audio system 8220 and optional display system 8122/display system 8222 can be an integrated component of the example computing device 8100/server device 8200, such as part of an integrated speaker and/or an integrated display and touch interface.

In some aspects, memory devices 8112 of computing device 8100 includes client analytics module 8126 to provide personalized analytics system features. Client analytics module 8126 can include a web browser accessing a remote server web page, a client application that executes in conjunction with cloud-based services, a stand-alone application, and/or a client application that exchanges data with a server application, to provide personalized analytics as further described herein. Various implementations of client analytics module collect anecdotal data about user interactions with the personalized analytics system, which is then referenced later to aid in curating data and/or generating narrated analytics playlists. While client analytics module 8126 is illustrated here as residing on memory devices 8112, alternate or additional implementations can be implemented in varying combinations of software, and/or firmware.

In some aspects, memory devices 8212 of server device 8200 includes personalized analytics module 8226 to provide personalized analytics to various computing devices. In one or more implementations, personalized analytics module 8226 is implemented to provide cloud-based services to remote devices, such as computing device 8100 of FIG. 66. Personalized analytics module 8226 identifies data sources to scan, curates data from the data sources, and performs query analyses on the curated data. This can include performing multiple variations of the query analysis, and statistically combining the information from the multiple variations as a way to identify insights as further described herein. In some implementations, the personalized analytics system automatically generates a narrated analytics playlist from the insights, where the playlist includes images and narrative audible output. One or more implementations of the personalized analytics module includes a proximity platform to enable the exchange of machine-learning algorithm parameters without exposing data used to train the machine-learning algorithms.

Computing device 8100/server device 8200 also include sensor system 8128/sensor system 8228 that include and/or leverage different types and instances of sensor for sensing different phenomena. Example types of sensors utilized by the sensor system 8128/sensor system 8228 hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. In at least some implementations, sensor system 8128/sensor system 8228 are configured to detect various system and/or environmental states (e.g., changes in state) that can be used to generate trigger events for generating headlines according to techniques described herein. Examples of such states/changes in state are discussed above, such as with reference to the trigger data 3504.

In view of the many possible aspects to which the principles of the present discussion may be applied, it should be recognized that the implementations described herein with respect to the drawing figures are meant to be illustrative only and should not be taken as limiting the scope of the claims. Therefore, the techniques as described herein contemplate all such implementations as may come within the scope of the following claims and equivalents thereof.

We claim:

1. A system comprising:
   a processing system; and
   one or more computer-readable storage media storing instructions that are executable by the processing system to implement:
   an insight engine module to aggregate a set of data based on a query term, the set of data including multiple data records that each correlate to the query term;
   a differentiator module to:
   identify a set of the data records that has a common value for a first attribute of the set of data records;
   inspect the set of data records to identify a second attribute of the set of data records that represents a contextual qualifier for the first attribute and that has values that differ among two or more subsets of the set of data records;
   generate different individual subsets of the set of data records including to, for each subset, identify one or more data records of the set of data records that share a common value for the second attribute, and generate the subset to include the one or more data records that share the common value;
   inspect the set of the data records to identify a third attribute of the set of the data records that represents a further contextual qualifier for the first attribute of the set of the data records, the third attribute having values that are different among two or more further subsets of the set of data records;
   determine that grouping the set of the data records into different subsets based on the values for the third attribute violates a query parameter for the query term; and perform an action to prevent grouping the set of the data records into different subsets based on the values for the third attribute in response to determining that the grouping violates the query parameter for the query term; and an output module to:
generate a query result by aggregating content that conveys the individual subsets of the data records; and
cause the query result to be output.

2. The system of claim 1, wherein the second attribute comprises an environmental qualifier for the first attribute, and the values for the environmental qualifier describe different environments for the first attribute.

3. The system of claim 1, wherein the query term is based on a query associated with a particular user profile, and wherein the differentiator module is further implemented to:
retrieve anecdotal data for the user profile that describes a previous user interaction with a data set; and
correlate, utilizing the anecdotal data, the first attribute of the set of the data records to the second attribute of the set of the data records.

4. The system of claim 1, wherein the first attribute corresponds to a first data type of the set of the data records, and wherein the differentiator module is further implemented to:
identify an entity-relationship model that identifies associations between data types included in the set of the data records; and
compare the first attribute to the entity-relationship model to identify the second attribute, the second attribute corresponding to a second data type of the set of the data records.

5. The system of claim 1, wherein to identify the one or more data records of the set of data records that share a common value for the second attribute includes implementing the differentiator module to:
compare differing value representations of the second attribute for two or more data records of the set of data records utilizing an equivalency criterion to determine that the differing values representations correspond to a common value; and
generate a particular subset of the individual subsets of the set of data records to include the two or more data records.

6. The system of claim 1, wherein to identify the second attribute of the set of data records includes implementing the differentiator module to:
determine that multiple different attributes of the set of data records represent contextual qualifiers for the first attribute;
output identifiers for the multiple different attributes and a request to select a particular attribute from the multiple different attributes; and
receive a selection of the second attribute from the multiple different attributes.

7. The system of claim 1, wherein to identify the second attribute of the set of data records includes implementing the differentiator module to:
identify a drill path that includes data describing a relationship between the first attribute and multiple other attributes of the set of the data records;
traverse the drill path and for each attribute encountered, compare attribute values for the attribute; and
identify the second attribute of the set of the data records in response to identifying two or more differing values for the second attribute.

8. The system of claim 1, further comprising a phaser module to:
determine a set of query contexts for the query term and generate a set of search phases based on the set of query contexts; and
determine a further query context for the first attribute of the set of the data records and generate a further search phase based on the further query context, wherein:
the insight engine module is implemented to execute the set of search phases to aggregate the set of data, and
the differentiator module is implemented to execute the further search phase on the set of data records to identify the second attribute of the set of the data records.

9. The system of claim 1, wherein to identify the second attribute of the set of data records comprises implementing the differentiator module to:
input attributes of the set of the data records into a machine learning model trained using training data generated from attribute relationships defined from a different set of data records;
receive output from the machine learning model identifying multiple candidate attributes from the set of the data records;
iteratively evaluate the candidate attributes by comparing attribute values for the candidate attributes; and
identify the second attribute of the set of the data records in response to identifying two or more differing values for the second attribute.

10. The system of claim 1, wherein the query parameter comprises a data type requested by the query term.

11. A method comprising:
aggregating a set of data based on a query term associated with a user profile, the set of data including multiple data records that each correlate to the query term;
identifying a set of the data records that has a common value for a first attribute of the set of data records;
retrieving anecdotal data for the user profile that describes a previous user interaction with a data set, and correlating, utilizing the anecdotal data, the first attribute of the set of the data records to a second attribute of the set of the data records;
determining that the second attribute has values that differ among two or more subsets of the set of data records;
generating different individual subsets of the set of data records including, for each subset, identifying one or more data records of the set of data records that share a common value for the second attribute, and generating the subset to include the one or more data records that share the common value for the second attribute;
inspecting the set of the data records to identify a third attribute of the set of the data records that represents a further contextual qualifier for the first attribute of the set of data records, the third attribute having values that are different among two or more further subsets of the set of data records;
determining that grouping the set of the data records into different subsets based on the values for the third attribute violates a query parameter for the query term;
performing an action for preventing grouping the set of the data records into different subsets based on the values for the third attribute in response to determining that the grouping violates the query parameter for the query term;
generating a query result by aggregating content that conveys the individual subsets of the data records; and
causing the query result to be output.

12. The method of claim 11, wherein the anecdotal data describes a user interaction with a different set of data to sort the different data set based on one or more attributes of the different data set, and wherein the second attribute of the set of the data records corresponds to the one or more attributes of the different set of data.

13. The method of claim 11, wherein the query term is based on a query associated with the user profile and the anecdotal data describes a user preference determined from a previous user query associated with the user profile, and wherein the second attribute correlates to the user preference.

14. The method of claim 11, wherein the query term is based on a query associated with the user profile and the anecdotal data is based on user feedback regarding subsets of data records generated for a previous user query associated with the user profile, and wherein the second attribute is identified based at least in part on the user feedback.

15. The method of claim 11, wherein said correlating the first attribute of the set of the data records to the second attribute of the set of the data records comprises:
   identifying a drill path that includes data describing a relationship between the first attribute and multiple other attributes of the set of the data records;
   traversing the drill path and for each attribute encountered, comparing the attribute to the anecdotal data; and
   identifying the second attribute of the set of the data records in response to determining that the second attribute correlates to the anecdotal data.

16. The method of claim 11, further comprising:
   determining a set of query contexts for the query term and generating a set of search phases based on the set of query contexts;
   aggregating the set of data including the multiple data records by executing the set of search phases;
   determining a further query context for the first attribute and based on the anecdotal data, and generating a further search phase based on the second further query context; and
   executing the further search phase on the set of data records to identify the second attribute of the set of the data records.

17. A method comprising:
   aggregating a set of data based on a query term, the set of data including multiple data records that each correlate to the query term;
   identifying a set of the data records that has a common value for a first attribute of the set of data records, the first attribute corresponding to a first data type of the set of the data records;
   identifying an entity-relationship model that identifies associations between data types included in the set of the data records, and comparing the first attribute to the entity-relationship model to identify a second attribute that corresponds to a second data type of the set of the data records;
   determining that the set of the data records has values for the second attribute that differ among two or more subsets of the set of data records;
   generating different individual subsets of the set of data records including, for each subset, identifying one or more data records of the set of data records that share a common value for the second attribute, and generating the subset to include the one or more data records that share the common value for the second attribute;
   generating a query result by aggregating content that conveys the individual subsets of the data records; and
   causing the query result to be output, wherein said comparing the first attribute to the entity-relationship model identifies a third attribute having a third data type and having values that different among two or more further subsets of the set of data records, the method further comprising:
   determining that grouping the set of the data records into different subsets based on the values for the third attribute violates a query parameter for the query term, and
   performing an action for preventing grouping the set of the data records into different subsets based on the values for the third attribute in response to determining that the grouping violates the query parameter for the query term.

18. The method of claim 17, wherein the entity-relationship model defines a dependencies between the data types included in the set of the data records, the method further comprising traversing attributes of the set of the data records based on the dependencies and identifying the second attribute based on a dependency defined by the entity-relationship model between the first data type of the first attribute and the second type of the second attribute.

19. The method of claim 17, wherein the entity-relationship model defines dependencies between the data types included in the set of the data records, the method further comprising:
   traversing one or more attributes of the set of the data records based on the dependencies and for each attribute encountered, comparing attribute values for the attribute; and
   identifying the second attribute in response to identifying two or more differing values for the second attribute.

20. The method of claim 17, wherein the query parameter comprises a data type requested by the query term.

* * * * *